(12) United States Patent
Honda et al.

(10) Patent No.: US 11,746,834 B2
(45) Date of Patent: Sep. 5, 2023

(54) POSITION DETECTION DEVICE

(71) Applicant: DENSO CORPORATION, Kariya (JP)

(72) Inventors: Hitomi Honda, Kariya (JP); Yoshinori Inuzuka, Kariya (JP); Yusuke Kimura, Nisshin (JP); Shinji Komatsu, Nisshin (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/940,327

(22) Filed: Sep. 8, 2022

(65) Prior Publication Data

US 2023/0003267 A1 Jan. 5, 2023

Related U.S. Application Data

(63) Continuation of application No. PCT/JP2021/008807, filed on Mar. 5, 2021.

(30) Foreign Application Priority Data

Mar. 10, 2020 (JP) .................................. 2020-041276
Sep. 29, 2020 (JP) .................................. 2020-163958

(51) Int. Cl.
*F16D 27/118* (2006.01)
*F16D 48/06* (2006.01)
(Continued)

(52) U.S. Cl.
CPC .......... *F16D 27/118* (2013.01); *F16D 48/064* (2013.01); *G01D 5/2451* (2013.01);
(Continued)

(58) Field of Classification Search
CPC ...... F16D 27/118; F16D 27/14; F16D 27/108; F16D 27/10; F16D 28/00; F16D 11/14;
(Continued)

(56) References Cited

U.S. PATENT DOCUMENTS

2009/0165582 A1 7/2009 Tsunashima et al.
2019/0055997 A1* 2/2019 Inose ...................... F16H 48/40
(Continued)

FOREIGN PATENT DOCUMENTS

WO WO-2015055339 A1 * 4/2015 .............. F16D 11/14

*Primary Examiner* — Timothy Hannon
(74) *Attorney, Agent, or Firm* — Nixon & Vanderhye P.C.

(57) ABSTRACT

A position detection device includes a magnetic detection element that is positioned radially outside a first clutch component portion and a second clutch component portion of a dog clutch around an axis. The magnetic detection element is provided between a first magnetic flux path portion and a second magnetic flux path portion. The magnetic detection element outputs a sensor signal indicating the direction of a magnetic flux passing between the first magnetic flux path portion and the second magnetic flux path portion. The magnetic detection element outputs a sensor signal indicating a position relationship between the first clutch component portion concerning a first hole portion as well as a first tooth portion and the second clutch component portion concerning the second hole portion as well as the second tooth portion, based on changes in magnetic flux directions depending on the position relationship in a rotation direction around the axis.

25 Claims, 58 Drawing Sheets

(51) Int. Cl.
  *G01D 5/245* (2006.01)
  *F16D 27/14* (2006.01)
  *F16D 11/14* (2006.01)
(52) U.S. Cl.
  CPC ............. *F16D 11/14* (2013.01); *F16D 27/14* (2013.01); *F16D 2300/18* (2013.01); *F16D 2500/1022* (2013.01); *F16D 2500/10462* (2013.01); *F16D 2500/5012* (2013.01)
(58) Field of Classification Search
  CPC ......... F16D 2300/18; F16D 2500/1022; F16D 2500/10462; F16D 2500/5012; G01D 5/2451; G01B 7/00; G01B 7/30
  See application file for complete search history.

(56) References Cited

U.S. PATENT DOCUMENTS

2019/0195291 A1* 6/2019 Eisl .................. F16D 11/14
2020/0355228 A1* 11/2020 Barrientos Blanco .. F16D 23/02

* cited by examiner

AT TIMING T1

AT TIMING T2

AT TIMING T3

AT TIMING T4

AT TIMING T5

AT TIMING T6

AT TIMING T7

AT TIMING T8

AT TIMING T1

AT TIMING T2

AT TIMING T3

AT TIMING T4

AT TIMING T5

AT TIMING T6

AT TIMING T7

AT TIMING T8

POSITION DETECTION DEVICE

CROSS REFERENCE TO RELATED APPLICATION

The present application is a continuation application of International Patent Application No. PCT/JP2021/008807 filed on Mar. 5, 2021, which designated the U.S. and claims the benefit of priority from Japanese Patent Applications No. 2020-041276 filed on Mar. 10, 2020, and No. 2020-163958 filed on Sep. 29, 2020. The entire disclosures of all of the above applications are incorporated herein by reference.

TECHNICAL FIELD

The present disclosure relates to a position detection device.

BACKGROUND

A conventional transmission apparatus includes a transmission and a twin-clutch gearbox. The transmission includes pairs of gears between a main shaft and a countershaft. The twin-clutch gearbox is placed over the main shaft, and allows the transmission to connect and disconnect from the rotational driving force of an engine. The main shaft includes an inner main spindle and an outer main spindle that rotatably supports the inner main spindle. The twin-clutch gearbox includes a first clutch and a second clutch. The first clutch connects and disconnects a rotational driving force transmitted to the inner main spindle. The second clutch connects and disconnects a rotational driving force transmitted to the outer main spindle. The transmission is configured so that a dog clutch including dog teeth and dog holes transmits a rotational driving force between adjacent transmission gears on the spindles.

SUMMARY

According to an aspect of a position detection device of the present disclosure, a magnetic detection element may be positioned radially outside a first clutch component portion and a second clutch component portion around the axis between a first magnetic flux path portion and a second magnetic flux path portion, to output a sensor signal indicating the direction of the magnetic flux passing between the first magnetic flux path portion and the second magnetic flux path portion. Furthermore, the magnetic detection element may be configured to output a sensor signal indicating a position relationship between the first clutch component portion concerning a first hole portion as well as a first tooth portion and the second clutch component portion concerning a second hole portion as well as a second tooth portion, based on changes in directions of the magnetic flux depending on the position relationship in a rotation direction around the axis.

According to another aspect of a position detection device of the present disclosure, a magnetic detection element may be positioned radially outside a first clutch component portion and a second clutch component portion around the axis, between a first magnetic flux path portion and a second magnetic flux path portion, and may configured to output a sensor signal indicating a direction of a composite magnetic flux with a combination of a first magnetic flux passing between the first clutch component portion and the first magnetic flux path portion and a second magnetic flux passing between the second clutch component portion and the second magnetic flux path portion. In addition, the magnetic detection element may be configured to output the sensor signal indicating the position relationship between the first clutch component portion concerning a first hole portion as well as a first tooth portion and the second clutch component portion concerning a second hole portion as well as a second tooth portion, based on changes in directions of the composite magnetic flux depending on the position relationship in a rotation direction around the axis.

According to another aspect of a position detection device of the present disclosure, a magnetic detection element may be positioned radially outside a first clutch component portion and a second clutch component portion around the axis between a first magnetic pole formation portion and a second magnetic pole formation portion, and may be configured to output a sensor signal indicating the direction of a magnetic flux generated by a magnetic field generator. In addition, the magnetic detection element may be configured to output the sensor signal indicating a position relationship between the first clutch component portion concerning the first hole portion as well as the first tooth portion and the second clutch component portion concerning the second hole portion as well as the second tooth portion in a rotation direction around the axis, based on changes in the sensor signal amplitude depending on the position relationship.

Thus, it is possible to provide a position detection device that detects the position relationship between the first clutch component portion and the second clutch component portion in the direction of rotation.

BRIEF DESCRIPTION OF THE DRAWINGS

The above and other objects, features and advantages of the present disclosure will be more clearly understood from the following detailed description with reference to the accompanying drawings. In the drawings.

DESCRIPTION OF EMBODIMENTS

Figure 1:
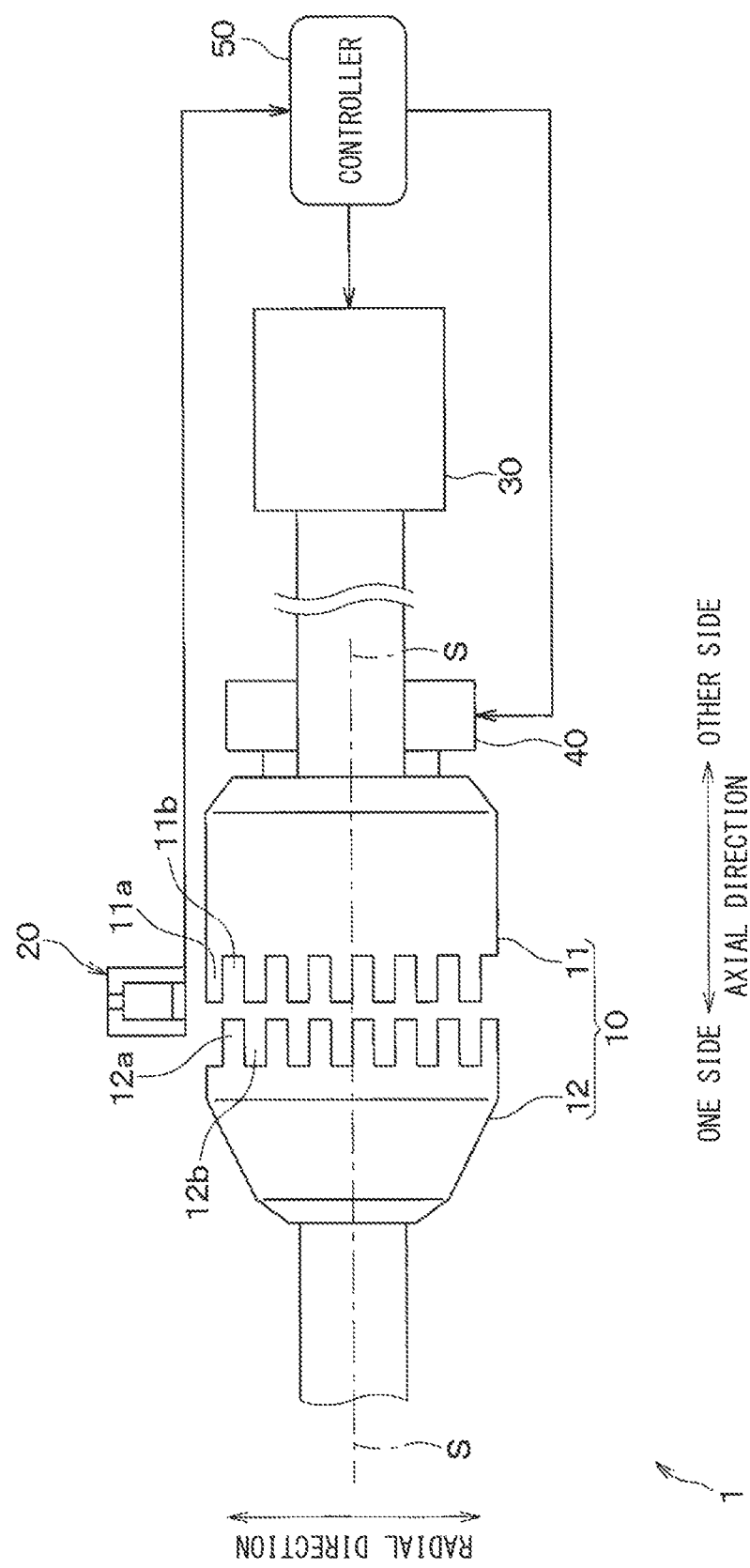
FIG. 1 is an external view of the overall configuration of a power transmission system according to a first embodiment as viewed from the radial outside around the axis and illustrates a dog clutch with two clutch component portions separated.

For example, a transmission apparatus may include a gear position sensor, an inner main-spindle rotation speed sensor, an outer main-spindle rotation speed sensor, and a control unit. The gear position sensor detects a transmission gear selection. The inner main-spindle rotation speed sensor detects the rotation speed of the inner main spindle. The outer main-spindle rotation speed sensor detects the rotation speed of the outer main spindle. The control unit controls the transmission. The control unit detects the engagement of a dog clutch based on a rotation speed difference between the inner main spindle and the outer main spindle and information about the transmission gear selection.

When the dog clutch needs to be disengaged, the control unit determines whether the disengagement is completed normally or a dog tooth is caught in a dog hole. When the dog clutch needs to be engaged, the control unit determines whether the engagement is completed normally or a dog tooth does not enter a dog hole.

The inventors of the present application examined and studied the normal engagement of the dog clutch in the above transmission apparatus.

Typically, the dog clutch includes a first clutch component portion and a second clutch component portion. The first clutch component portion is configured to be rotatable around an axis. The second clutch component portion is positioned at the other side of the first clutch component portion in the axial direction and is configured to be rotatable around the axis.

The first clutch component portion includes a first dog tooth and a first dog hole that are alternately positioned in the circumferential direction around the axis. The first dog tooth protrudes toward the other side in the axial direction. The first dog hole is recessed toward one side in the axial direction. The second clutch component portion includes a second dog tooth and a second dog hole that are alternately positioned in the circumferential direction around the axis. The second dog tooth protrudes toward one side in the axial direction. The second dog hole is recessed toward the other side in the axial direction.

The engagement of the dog clutch requires a control unit that controls the actuator to move the first clutch component portion to the second clutch component portion while the drive source rotates the first clutch component portion around the axis.

To normally complete the engagement, the control unit determines that the first dog tooth opposes the second dog hole and the second dog tooth opposes the first dog hole. Then, the control unit drives the first clutch component portion to move toward the second clutch component portion.

To determine that the first dog tooth opposes the second dog hole and the second dog tooth opposes the first dog hole, it is necessary to detect the position relationship between the first clutch component portion and the second clutch component portion in the direction of rotation.

Normal completion of the dog clutch engagement requires a position detection device to detect the position relationship between the first clutch component portion concerning the first dog tooth as well as the first dog hole and the second clutch component portion concerning the second dog tooth as well as the second dog hole.

It is an object of the present disclosure to provide a position detection device that detects the position relationship between the first clutch component portion and the second clutch component portion in the direction of rotation.

According to an aspect of the present disclosure, a position detection device may be applied to a power transmission system. The position detection device includes a dog clutch, a magnetic field generator, a yoke. The dog clutch includes a first clutch component portion and a second clutch component portion.

The first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis.

The second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis.

In a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion.

The magnetic field generator is positioned radially outside the first clutch component portion and the second clutch component portion around the axis, and includes a first magnetic pole portion and a second magnetic pole portion to form different polarities.

The yoke includes a first end surface, a first magnetic flux path portion, a second end surface, and a second magnetic flux path portion. The first end surface is positioned radially outside one of the first tooth portion and the first hole portion around the axis, the first magnetic flux path portion is configured to pass a magnetic flux between the first end surface and the first magnetic pole portion, the second end surface is positioned radially outside one of the second tooth portion and the second hole portion around the axis, and the second magnetic flux path portion is configured to pass a magnetic flux between the second magnetic pole portion and the second end surface.

The magnetic detection element is positioned radially outside the first clutch component portion and the second clutch component portion around the axis between the first magnetic flux path portion and the second magnetic flux path portion, to output a sensor signal indicating the direction of the magnetic flux passing between the first magnetic flux path portion and the second magnetic flux path portion. Furthermore, the magnetic detection element is configured to output a sensor signal indicating the position relationship between the first clutch component portion concerning the first hole portion as well as the first tooth portion and the second clutch component portion concerning the second hole portion as well as the second tooth portion, based on changes in directions of the magnetic flux depending on the position relationship in a rotation direction around the axis.

Thus, it is possible to provide a position detection device that detects the position relationship between the first clutch component portion and the second clutch component portion in the direction of rotation.

According to another aspect of the present disclosure, a position detection device may be applied to a power transmission system. The position detection device includes a dog clutch, a magnetic field generator, a yoke, and a magnetic detection element. The dog clutch includes a first clutch component portion and a second clutch component portion.

The first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis. The second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis.

In a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion.

The magnetic field generator is positioned radially outside the first clutch component portion and the second clutch component portion around the axis, and includes a first magnetic pole portion and a second magnetic pole portion having the same polarity. The yoke includes: a first end surface positioned radially outside one of the first tooth portion and the first hole portion around the axis; a first magnetic flux path portion configured to pass a magnetic flux between the first end surface and the first magnetic pole portion; a second end surface positioned radially outside one of the second tooth portion and the second hole portion around the axis; and a second magnetic flux path portion configured to pass a magnetic flux between the second end surface and the second magnetic pole portion.

The magnetic detection element is positioned radially outside the first clutch component portion and the second clutch component portion around the axis, between the first magnetic flux path portion and the second magnetic flux path portion, and is configured to output a sensor signal indicating a direction of a composite magnetic flux with a combination of a first magnetic flux passing between the first clutch component portion and the first magnetic flux path portion and a second magnetic flux passing between the second clutch component portion and the second magnetic flux path portion. In addition, the magnetic detection element is configured to output the sensor signal indicating the position relationship between the first clutch component portion concerning the first hole portion as well as the first tooth portion and the second clutch component portion concerning the second hole portion as well as the second tooth portion, based on changes in directions of the composite magnetic flux depending on the position relationship in a rotation direction around the axis.

Thus, it is possible to provide a position detection device that detects the position relationship between the first clutch component portion and the second clutch component portion in the direction of rotation.

According to another aspect of the present disclosure, a position detection device may be applied to a power transmission system. The position detection device includes a dog clutch, a magnetic field generator, and a magnetic detection element.

The dog clutch includes a first clutch component portion and a second clutch component portion. The first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis. The second clutch component portion is positioned at the other side in the axial direction with respect to the first clutch component portion to have a clearance between the first clutch component portion and the second clutch component portion, and the second clutch component portion is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis.

In a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion.

The magnetic field generator includes a first magnetic pole formation portion and a second magnetic pole formation portion. The first magnetic pole formation portion is positioned radially outside the axis with respect to the clearance and has a first end surface providing a magnetic pole. The second magnetic pole formation portion is positioned radially outside the axis with respect to the clearance to be shifted from the first magnetic pole formation portion in a circumferential direction around the axis and has a second end surface providing a magnetic pole.

The magnetic detection element is positioned radially outside the first clutch component portion and the second clutch component portion around the axis between the first magnetic pole formation portion and the second magnetic pole formation portion, and is configured to output a sensor signal indicating the direction of a magnetic flux generated by the magnetic field generator. In addition, the magnetic detection element is configured to output the sensor signal indicating the position relationship between the first clutch component portion concerning the first hole portion as well as the first tooth portion and the second clutch component portion concerning the second hole portion as well as the second tooth portion in a rotation direction around the axis, based on changes in the sensor signal amplitude depending on the position relationship.

Thus, it is possible to provide a position detection device that detects the position relationship between the first clutch component portion and the second clutch component portion in the direction of rotation.

According to another aspect of the present disclosure, a position detection device may be applied to a power transmission system. The position detection device includes a dog clutch, a magnetic field generator, and a magnetic detection element.

The dog clutch includes a first clutch component portion and a second clutch component portion. The first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis. The second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis.

In a state where the first clutch component portion is rotated around the axis by a drive source of the power transmission system, one of the first clutch component portion and the second clutch component portion is moved by an actuator of the power transmission system from the one side to the other side, to engage the first tooth portion with the second hole portion and to engage the second tooth portion with the first hole portion, and torque output from the drive source is transmitted from the first clutch component portion to the second clutch component portion.

The magnetic field generator includes: a first magnetic pole formation portion positioned radially outside one of the first tooth portion and the first hole portion around the axis and has a first end surface providing a magnetic pole; and a second magnetic pole formation portion positioned radially outside one of the second tooth portion and the second hole portion around the axis and has a second end surface providing a magnetic pole.

The magnetic detection element is positioned radially outside the first clutch component portion and the second clutch component portion around the axis between the first magnetic pole formation portion and the second magnetic pole formation portion, and is configured to output a sensor signal indicating the direction of the magnetic flux generated by the magnetic field generator. In addition, the magnetic detection element is configured to output the sensor signal indicating the position relationship between the first clutch component portion concerning the first hole portion as well as the first tooth portion and the second clutch component portion concerning the second hole portion as well as the second tooth portion in a rotation direction around the axis, based on changes in the sensor signal amplitude depending on the position relationship.

Thus, it is possible to provide a position detection device that detects the position relationship between the first clutch component portion and the second clutch component portion in the direction of rotation.

Embodiments of the present invention will be described in further detail by reference to the accompanying drawings. Hereinafter, the mutually corresponding or comparable parts in the embodiments are designated by the same reference numerals for simplicity of description.

First Embodiment

The description below explains a power transmission system 1 according to the first embodiment by reference to FIGS. 1 to 3, for example.

Figure 2:
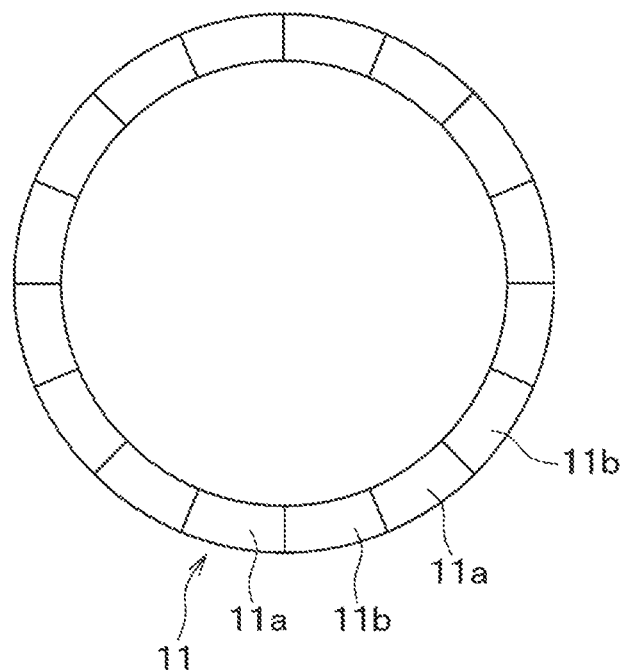
FIG. 2 a diagram illustrating multiple teeth and holes of one of the two clutch component portions of the dog clutch in FIG. 1 according to the first embodiment, in which the clutch component portion is placed at one side in the axial direction and is viewed from the other side in the axial direction.

As illustrated in FIG. 1, the power transmission system 1 includes a dog clutch 10, a position detection device 20, a drive source 30, an actuator 40, and a control device 50.

The dog clutch 10 includes clutch component portions 11 and 12. As illustrated in FIGS. 1 and 2, the clutch component portion 11 is rotatable around an axis S. The clutch component portion 11 is configured as a second clutch component portion including multiple tooth portions 11a and hole portions 11b.

The multiple tooth portions 11a are formed to protrude toward one side in the axial direction and correspond to second tooth portions. The axial direction signifies a predetermined direction in which the axis S extends. The axis S is a virtual line extending in the axial direction. The multiple hole portions 11b are formed to be recessed toward the other side in the axial direction and correspond to second hole portions.

The multiple tooth portions 11a and hole portions 11b are alternately placed in the circumferential direction around the axis S. The clutch component portion 11 according to the present embodiment is configured to be movable in the axial direction.

The clutch component portion 12 is located at one side in the axial direction with respect to the clutch component portion 11. The clutch component portion 12 transmits a torque transmitted from the clutch component portion 11 to a transmission target (unshown). The clutch component portion 12 is rotatable around the axis S. The clutch component portion 12 is configured as a first clutch component portion including multiple tooth portions 12a and hole portions 12b.

Figure 3:
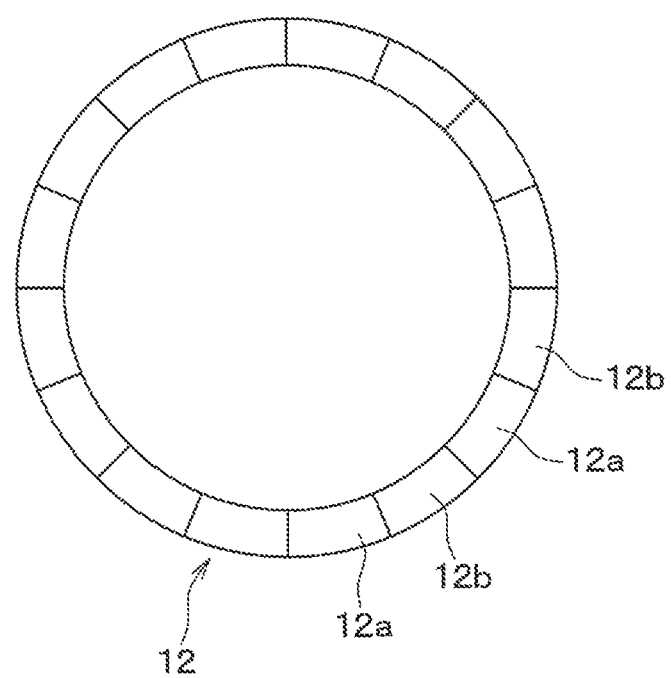
FIG. 3 a diagram illustrating multiple teeth and holes of the other of the two clutch component portions of the dog clutch in FIG. 1 according to the first embodiment, in which the clutch component portion is placed at the other side in the axial direction and is viewed from one side in the axial direction.

As illustrated in FIGS. 1 and 3, the multiple tooth portions 12a are formed to protrude toward the other side in the axial direction and correspond to first tooth portions. The multiple hole portions 12b are formed to be recessed toward one side in the axial direction and correspond to first hole portions. The multiple tooth portions 12a and hole portions 12b are alternately placed in the circumferential direction around the axis S.

According to the present embodiment, the clutch component portions 11 and 12 are made of a magnetic material including iron. The multiple tooth portions 11a and the tooth portions 12a are also made of a magnetic material including iron. The tooth portions 11a, the hole portions 11b, the tooth portions 12a, and the hole portions 12b are exposed to the atmosphere.

As will be described later, the position detection device 20 detects position relationship among the tooth portions 11a and the hole portions 11b of the clutch component portion 11 and the tooth portions 12a and the hole portions 12b of the clutch component portion 12 based on the rotational direction around the axis S. The configuration of the position detection device 20 will be described in detail later.

The drive source 30 is composed of an electric motor or an engine, for example, and applies torque to the clutch component portion 11 to rotate the clutch component portion 11 around the axis S. As will be described later, the actuator 40 moves the clutch component portion 11 toward one side or the other side in the axial direction.

The actuator 40 according to the present embodiment is composed of an electric motor and an electromagnetic solenoid.

The control device 50 is composed of a microcomputer and memory, for example, and controls the drive source 30. The control device 50 also controls the actuator 40 based on sensor signals output from the position detection device 20. The memory is a non-transitory tangible storage medium.

The description below explains operations of the power transmission system 1 according to the present embodiment.

Initially, the clutch component portion 11 of the dog clutch 10 separates from the clutch component portion 12. Then, the control device 50 controls the drive source 30 to apply a torque around the axis S to the clutch component portion 11.

When the clutch component portion 11 separates from the clutch component portion 12, the tooth portions 11a separate from the corresponding hole portions 12b, and the tooth portions 12a separate from the corresponding hole portions 11b.

In this state, the clutch component portion 11 rotates around the axis S through the torque supplied from the drive source 30.

The clutch component portion 12 rotates through the torque supplied from another drive source (unshown).

The position detection device 20 detects rotational position relationship between the clutch component portions 11 and 12 around the axis S. The position detection device 20 outputs a sensor signal to the control device 50. The sensor signal indicates the detected rotational position relationship.

The rotational position relationship relates to the tooth portions 11a and the hole portions 11b of the clutch component portion 11 and the tooth portions 12a and the hole portions 12b of the clutch component portion 12.

The control device 50 repeats the determination based on sensor signals output from the position detection device 20 as follows.

The control device 50 determines whether the tooth portions 11a oppose any of the hole portions 12b and the tooth portions 12a oppose any of the hole portions 11b.

The control device 50 determines that the tooth portions 11a oppose any of the hole portions 12b and the tooth portions 12a oppose any of the hole portions 11b.

Then, the control device 50 controls the actuator 40. The actuator 40 is controlled by the control device 50 and pushes the clutch component portion 11 toward one side in the axial direction. The clutch component portion 11 moves toward one side in the axial direction according to the driving force from the actuator 40.

Then, the tooth portions 11a engage with any of the hole portions 12b, and the tooth portions 12a engage with any of the hole portions 11b.

Consequently, the clutch component portion 11 is coupled to the clutch component portion 12. The torque of the clutch component portion 11 is transmitted to the clutch component portion 12. The clutch component portion 12 rotates along with the clutch component portion 11 around the axis S. The torque output from the drive source 30 is transmitted to a drive target (unshown) via the clutch component portions 11 and 12.

The description below explains in detail the structure of the position detection device 20 according to the present embodiment by reference to FIG. 4.

Figure 4:
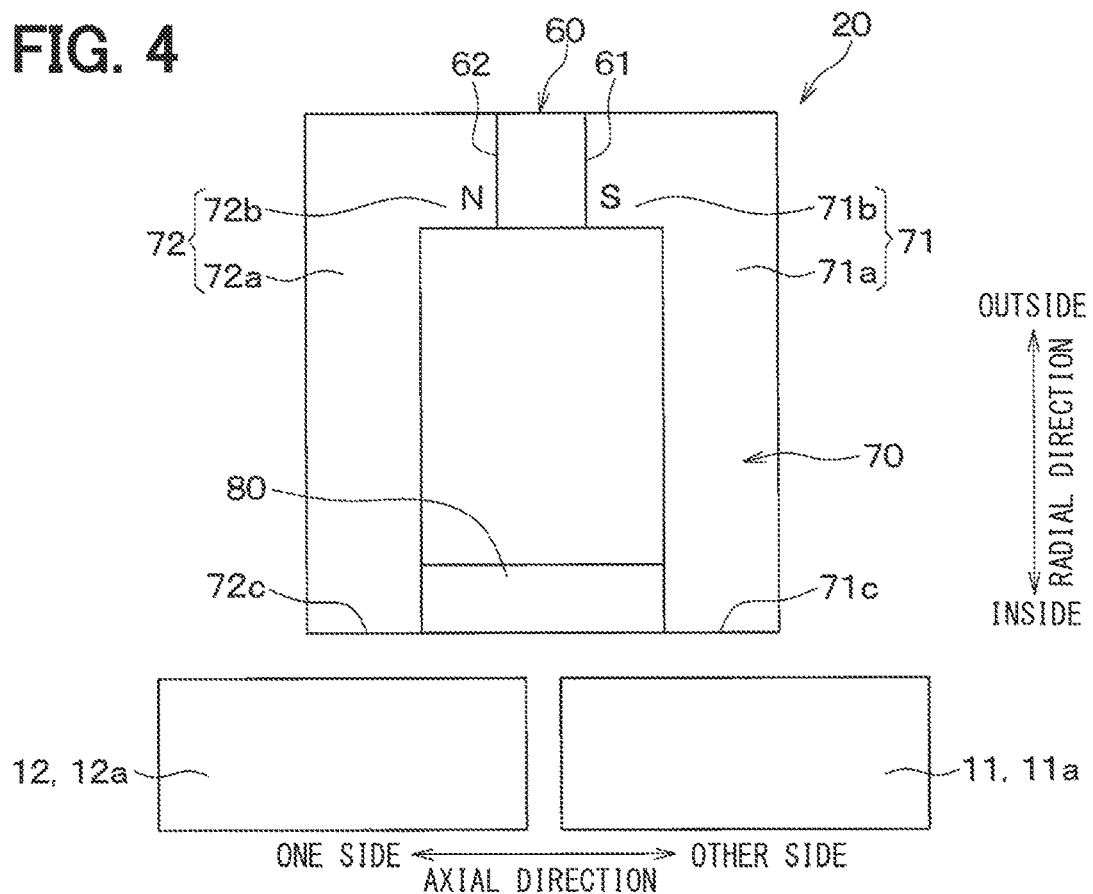
FIG. 4 is an enlarged view of the position detection device in FIG. 1 according to the first embodiment.

As illustrated in FIG. 4, the position detection device 20 according to the present embodiment includes a magnet 60, a yoke 70, and a magnetic detection element 80.

The magnet 60 is positioned radially outside the clutch component portions 11 and 12 around the axis S. The magnet 60 according to the present embodiment is a permanent magnet formed into a cube having six faces including faces 61 and 62.

The magnet 60 is positioned so that the face 61 is oriented axially toward the other side and the face 62 is oriented axially toward one side. The magnet 60 according to the present embodiment configures a magnetic field generator.

The faces 61 and 62 provide first and second magnetic pole portions where different magnetic poles are magnetized. According to the present embodiment, the face 61 provides the second magnetic pole portion where the S pole is formed. The face 62 provides the first magnetic pole portion where the N pole is formed.

The yoke 70 includes magnetic flux path portions 71 and 72. The magnetic flux path portion 71 is positioned radially outside the clutch component portion 11 around the axis S. The magnetic flux path portion 71 configures a second magnetic flux path portion that allows the magnetic flux to pass between the clutch component portion 11 and the face 61 (S pole) of the magnet 60.

The magnetic flux path portion 72 is positioned radially outside the clutch component portion 12 around the axis S. The magnetic flux path portion 72 configures a first magnetic flux path portion that allows the magnetic flux to pass between the clutch component portion 12 and the face 62 (N pole) of the magnet 60.

The magnetic flux path portion 72 includes a radial path portion 72a and a protruded path portion 72b. The radial path portion 72a includes an end surface 72c as a first end surface that opposes the tooth portion 12a or the hole portion 12b of the clutch component portion 12. The radial path portion 72a is formed from the end surface 72c to the radial outside around the axis S.

The protruded path portion 72b protrudes from the radially outer end of the radial path portion 72a toward the other side in the axial direction. The tip of the protruded path portion 72b touches the face 61 of the magnet 60.

The magnetic flux path portion 71 is positioned radially outside the clutch component portion 11 around the axis S. The magnetic flux path portion 71 configures a magnetic flux path that allows the magnetic flux to pass between the clutch component portion 11 and the face 61 (S pole) of the magnet 60.

The magnetic flux path portion 71 includes a radial path portion 71a and a protruded path portion 71b. The radial path portion 71a includes an end surface 71c as a second end surface that opposes the tooth portion 11a or the hole portion 11b of the clutch component portion 11. The radial path portion 71a is formed from the end surface 71c to the radial outside around the axis S.

The protruded path portion 71b protrudes from the radially outer end of the radial path portion 71a toward one side in the axial direction. The tip end side of the protruded path portion 71b touches the face 61 of the magnet 60. The magnetic detection element 80 is positioned radially outside the clutch component portions 11 and 12 around the axis S. The magnetic detection element 80 is positioned between magnetic flux path portions 71 and 72.

The magnetic detection element 80 opposes any of the tooth portions 11a and the hole portions 11b of the clutch component portion 11.

The magnetic detection element 80 includes a detection portion and a detection circuit. The detection portion detects the direction of magnetic flux. The detection circuit outputs a sensor signal indicating the magnetic flux direction detected by the detection portion. Specifically, the detection portion includes two Hall elements. One Hall element detects the magnetic flux density in the axial direction (horizontal direction on the drawing). The other Hall element detects the magnetic flux density in the radial direction (vertical direction on the drawing) around the axis S.

Hereinafter, for explanatory convenience, an X-axis Hall element is assumed to detect the magnetic flux density in the axial direction. A Y-axis Hall element is assumed to detect the magnetic flux density in the radial direction around the axis S.

According to the present embodiment, the detection portion of the magnetic detection element 80 identifies the direction of magnetic flux passing through the detection portion by using angle $\theta$ found from $Y/X = \tan\theta$, where X denotes the magnetic flux density detected by the X-axis Hall element and Y denotes the magnetic flux density detected by the Y-axis Hall element.

The detection circuit of the magnetic detection element 80 outputs a sensor signal indicating the magnetic flux direction based on detection values from the X-axis Hall element and the Y-axis Hall element.

The description below explains operations of the position detection device 20 according to the present embodiment by reference to FIGS. 5, 6, 7, and 8.

The drive source 30 changes a rotation speed supplied to the clutch component portion 11 to change the speed of the clutch component portion on the other side relative to the clutch component portion 12 on one side. Then, the position relationship between the clutch component portions 11 and 12 changes in the rotation direction around the axis S as illustrated in FIGS. 5, 6, 7, and 8, for example.

Figure 5:
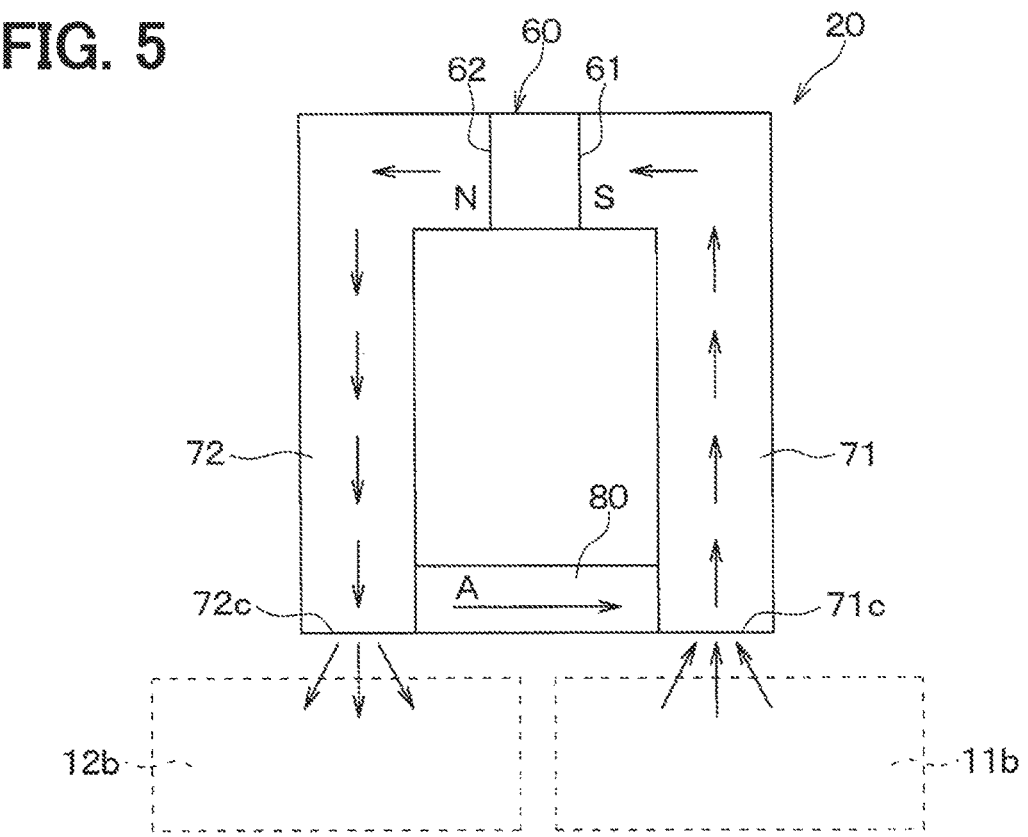
FIG. 5 is a diagram illustrating a state where hole portions of the two clutch component portions in the dog clutch oppose two end surfaces of the position detection device in FIG. 1 according to the first embodiment.

In the state of FIG. 5, the end surface 72c of the yoke 70 opposes one of the hole portions 12b and the end surface 71c of the yoke 70 opposes one of the hole portions 11b.

In FIG. 5, the magnetic detection element 80 opposes the one hole portion 11b and the one hole portion 12b.

In the case of FIG. 5, the magnetic flux passes through the N pole of the magnet 60 and then goes to the S pole of the magnet 60 through the magnetic flux path portion 72, the one hole portion 12b, the one hole portion 11b, and the magnetic flux path portion 71 as indicated by arrows.

At this time, a magnetic flux is also generated to go from the magnetic flux path portion 72 to the magnetic flux path portion 71 through the magnetic detection element 80. The magnetic flux detected by the magnetic detection element 80 is directed to the other side in the axial direction as illustrated by arrow A.

Figure 6:
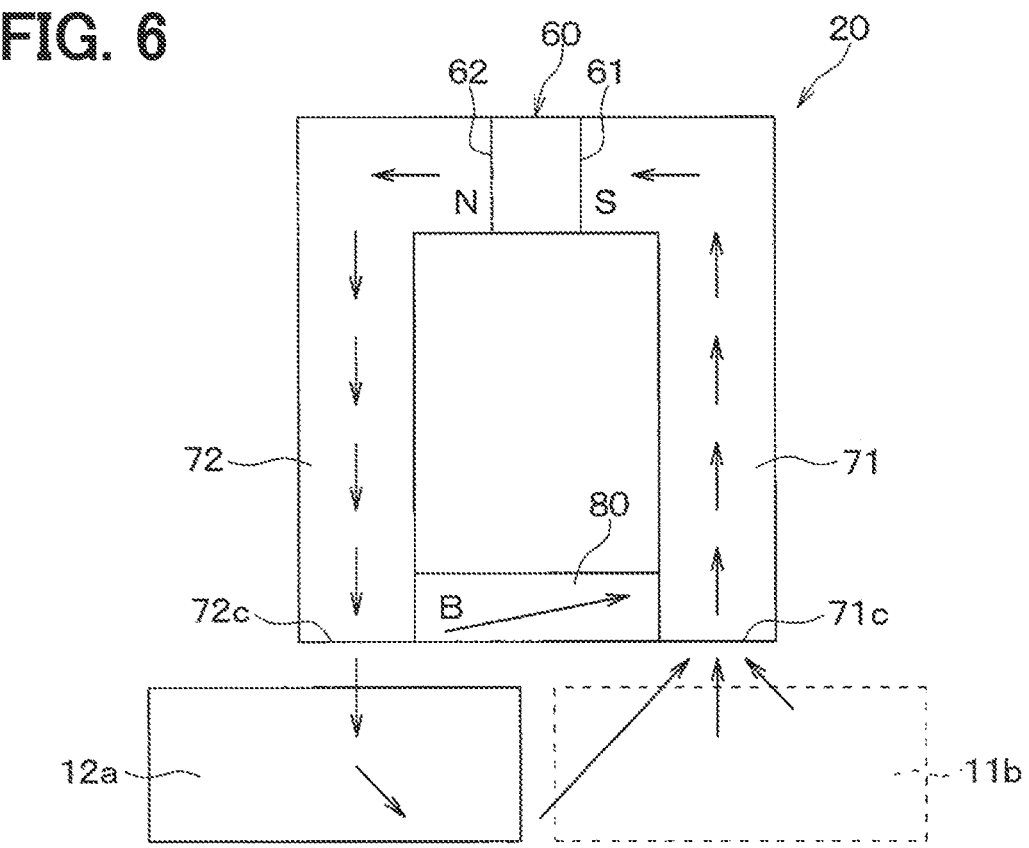
FIG. 6 is a diagram illustrating a state where the end surface of the position detection device in FIG. 1 according to the first embodiment at one side in the axial direction opposes a tooth portion of the clutch component portion in the dog clutch at one side and the end surface thereof at the other side in the axial direction opposes a hole portion of the clutch component portion at the other side.

In the state of FIG. 6, the end surface 72c of the yoke 70 opposes one of the tooth portions 12a and the end surface 71c of the yoke 70 opposes one the hole portions 11b.

In FIG. 6, the magnetic detection element 80 opposes the one tooth portion 12a and the one hole portion 11b.

In the case of FIG. 6, as indicated by arrows, the magnetic flux passes through the N pole of the magnet 60 and then goes to the S pole of the magnet 60 through the magnetic flux path portion 72, the one tooth portion 12a, the one hole portion 11b, and the magnetic flux path portion 71.

At this time, a magnetic flux is also generated to go from the magnetic flux path portion 72 to the magnetic flux path portion 71 through the magnetic detection element 80. Moreover, a magnetic flux is generated to go from the one tooth portion 12a to the magnetic flux path portion 71 through the magnetic detection element 80.

In this case, as indicated by arrow B, the one tooth portion 12a changes the direction of the magnetic flux detected by the detection portion of the magnetic detection element 80. Arrow B denotes the direction in which arrow A rotates counterclockwise and tilts radially outward.

Figure 7:
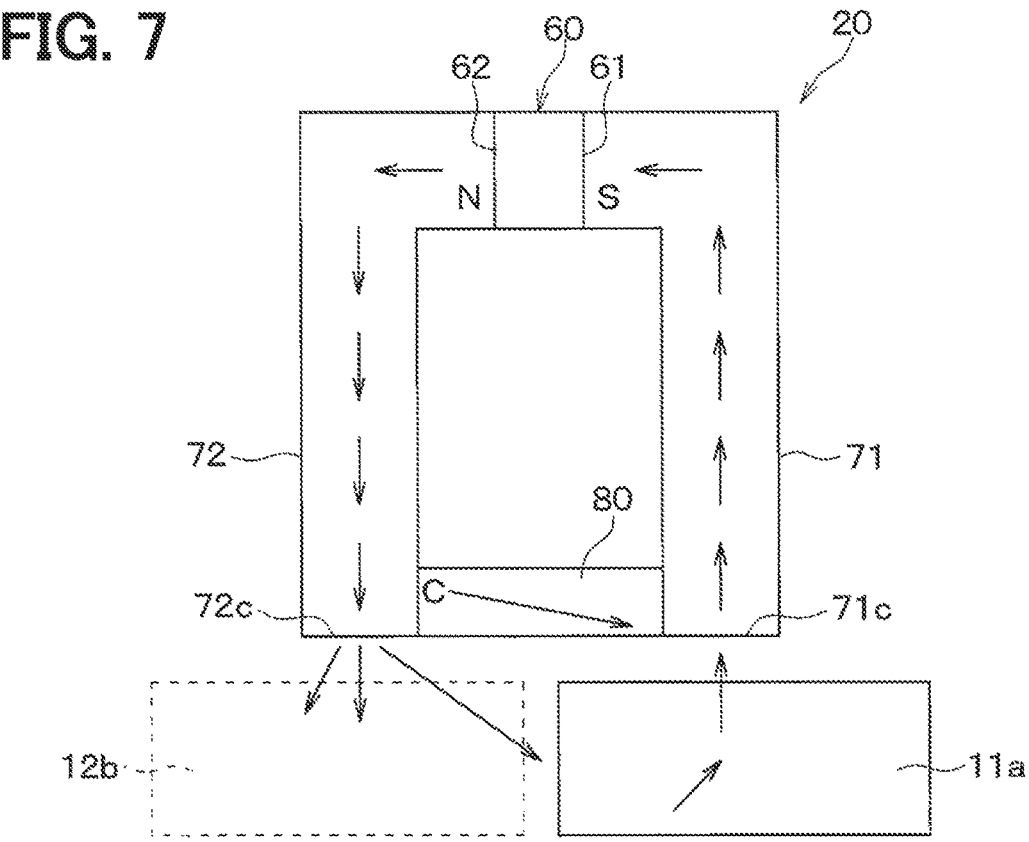
FIG. 7 is a diagram illustrating a state where the end surface of the position detection device in FIG. 1 according to the first embodiment at one side in the axial direction opposes a hole portion of the clutch component portion in the dog clutch at one side and the end surface thereof at the other side in the axial direction opposes a tooth portion of the clutch component portion at the other side.

In the state of FIG. 7, the end surface 72c of the yoke 70 opposes one of the hole portions 12b and the end surface 71c of the yoke 70 opposes one of the tooth portions 11a.

In FIG. 7, the magnetic detection element 80 opposes the one tooth portion 11a and the one hole portion 12b.

In the case of FIG. 7, as indicated by arrows, the magnetic flux passes through the N pole of the magnet 60 and then goes to the S pole of the magnet 60 through the magnetic flux path portion 72, the one hole portion 12b, the one tooth portion 11a, and the magnetic flux path portion 71.

At this time, a magnetic flux is also generated to go from the magnetic flux path portion 72 to the magnetic flux path portion 71 through the magnetic detection element 80. Moreover, a magnetic flux is generated to go from the magnetic detection element 80 to the one tooth portion 11a.

In this case, as indicated by arrow C, the one tooth portion 11a changes the direction of the magnetic flux detected by the magnetic detection element 80. Arrow C denotes the direction in which arrow A rotates clockwise and tilts radially inward.

Figure 8:
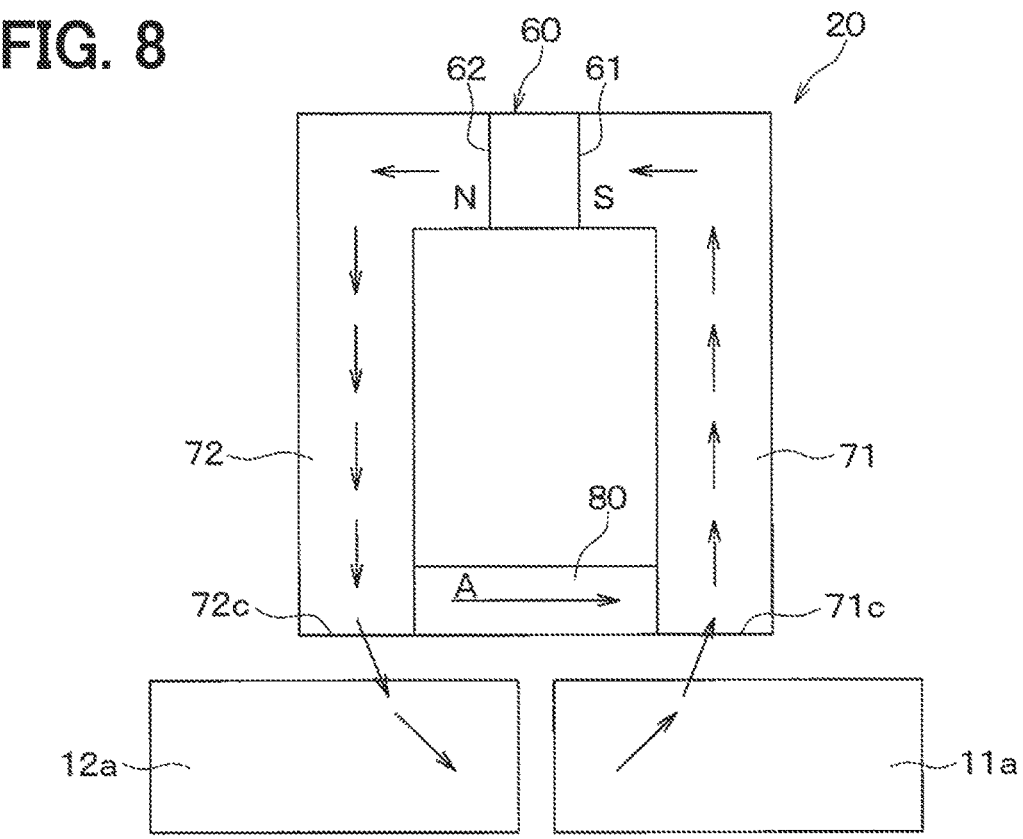
FIG. 8 is a diagram illustrating a state where the end surface of the position detection device in FIG. 1 according to the first embodiment at one side in the axial direction opposes a tooth portion of the clutch component portion in the dog clutch at one side and the end surface thereof at the other side in the axial direction opposes a tooth portion of the clutch component portion at the other side.

In the state of FIG. 8, the end surface 72c of the yoke 70 opposes one of the tooth portions 12a and the end surface 71c of the yoke 70 opposes one of the tooth portions 11a.

In FIG. 8, the magnetic detection element 80 opposes the one tooth portion 11a and the one tooth portion 12a.

In the case of FIG. 8, as indicated by arrows, the magnetic flux passes through the N pole of the magnet 60 and then goes to the S pole of the magnet 60 through the magnetic flux path portion 72, the one tooth portion 12a, the one tooth portion 11a, and the magnetic flux path portion 71.

At this time, a magnetic flux is also generated to go from the magnetic flux path portion 72 to the magnetic flux path portion 71 through the magnetic detection element 80. Arrow A, axially toward the other side, indicates the direction of the magnetic flux detected by the detection portion of the magnetic detection element 80.

According to the present embodiment, as illustrated in FIGS. 5 and 8, the direction of the magnetic flux detected by the detection portion of the magnetic detection element 80 corresponds to arrow A. In this case, the magnetic detection element 80 outputs a sensor signal of signal level Sa.

As illustrated in FIG. 6, the direction of the magnetic flux detected by the detection portion of magnetic detection element 80 corresponds to arrow B. In this case, the magnetic detection element 80 outputs a sensor signal of signal level Sb.

As illustrated in FIG. 7, the direction of the magnetic flux detected by the detection portion of magnetic detection element 80 corresponds to arrow C. In this case, the magnetic detection element 80 outputs a sensor signal of signal level Sc.

The present embodiment assigns different values to signal levels Sa, Sb, and Sc.

Suppose the magnetic detection element 80 outputs the sensor signal of signal level Sb to the control device 50. Alternatively, suppose the magnetic detection element 80 outputs the sensor signal of signal level Sc to the control device 50.

Then, the control device 50 determines that the tooth portions 11a oppose one of the hole portions 12b, and the tooth portions 12a oppose one of the hole portions 11b.

In this case, the control device 50 controls the actuator 40 to supply a driving force that pushes the clutch component portion 11 from the actuator 40 toward one side in the axial direction. The clutch component portion 11 moves to one side in the axial direction according to the driving force from the actuator 40.

The tooth portions 11a engage any of the hole portions 12b. The tooth portions 12a engage any of the hole portions 11b. Namely, the clutch component portion 11 couples with the clutch component portion 12.

According to the present embodiment as above, the power transmission system 1 is equipped with the dog clutch 10 including the clutch component portions 11 and 12 and the position detection device 20.

The clutch component portion 11 is rotatable around the axis S. The tooth portions 11a protrude toward one side in the axial direction. The hole portions 11b are recessed toward the other side in the axial direction. The tooth portions 11a and hole portions 11b are alternately formed one by one in the circumferential direction around the axis S.

The clutch component portion 12 is positioned at one side in the axial direction with respect to the clutch component portion 11 and is rotatable around the axis S. The tooth portions 12a protrude toward the other side in the axial direction. The hole portions 12b are recessed toward one side in the axial direction. The tooth portions 12a and hole portions 12b are alternately formed one by one in the circumferential direction around the axis S.

Based on the control device 50, the drive source 30 rotates the clutch component portion 11 around the axis S. When the tooth portion 11a opposes the hole portion 12b and the tooth portion 12a opposes the hole portion 11b, the actuator 40 moves the clutch component portion 11 toward the clutch component portion 12.

The tooth portion 11a engages the hole portion 12b, and the tooth portion 12a engages the hole portion 11b. The clutch component portion 11 is coupled with the clutch component portion 12. The torque output from the drive source 30 is transmitted from the clutch component portion 11 to the clutch component portion 12.

The magnetic detection element 80 determines whether the tooth portion 11a opposes the hole portion 12b and the tooth portion 12a opposes the hole portion 11b. To do this, the magnetic detection element 80 detects the position relationship between the clutch component portions 11 and 12 in the rotation direction around the axis S.

The position detection device 20 is positioned radially outside the clutch component portions 11 and 12 around the axis S. The position detection device 20 includes the magnet 60, the yoke 70, and the magnetic detection element 80. The magnet 60 includes the faces 61 and 62 forming the S and N poles of different polarities.

The yoke 70 includes the magnetic flux path portions 71 and 72. The magnetic flux path portion 71 includes the end surface 71c that is placed radially outside the tooth portion 11a or the hole portion 11b around the axis S and allows the magnetic flux to pass from the face 61 of the magnet 60 toward the end surface 71c.

The magnetic flux path portion 72 includes the end surface 72c that is placed radially outside the tooth portion 12a or the hole portion 12b around the axis S and allows the magnetic flux to pass from the end surface 72c toward the face 62 of the magnet 60.

The magnetic detection element 80 is provided between the magnetic flux path portions 71 and 72 radially outside the clutch component portions 11 and 12 around the axis S. The magnetic detection element 80 configures the detection portion to detect the magnetic flux and outputs a sensor signal indicating the direction of the magnetic flux detected by the detection portion.

The tooth portions 11a and the tooth portions 12a of the dog clutch 10 are made of a magnetic material including iron. The tooth portions 11a, the hole portions 11b, the tooth portions 12a, and the hole portions 12b of the dog clutch 10 are exposed to the atmosphere. The hole portions 11b and 12b contain air.

Therefore, the tooth portions 11a indicate a higher magnetic permeability than the hole portions 11b. The tooth portions 12a indicate a higher magnetic permeability than the hole portions 12b.

The direction of the magnetic flux detected by the detection portion of the magnetic detection element 80 varies with the position relationship between the clutch component portions 11 and 12 in the rotation direction around the axis S.

Suppose the tooth portion 11a opposes the tooth portion 12a, the end surface 71c opposes the tooth portion 11a, and the end surface 72c opposes the tooth portion 12a. Then, as indicated by arrow A in FIG. 5, the magnetic detection element 80 outputs a sensor signal of signal level Sa indicating the direction of the magnetic flux detected by the detection portion.

Suppose the hole portion 11b opposes the hole portion 12b, the end surface 71c opposes the tooth portion 11a, and the end surface 72c opposes the tooth portion 12a. Then, as indicated by arrow A in FIG. 8, the magnetic detection element 80 outputs a sensor signal of signal level Sa indicating the direction of the magnetic flux passing through the detection portion.

Suppose the hole portion 11b opposes the tooth portion 12a, the end surface 71c opposes the hole portion 11b, and the end surface 72c opposes the tooth portion 12a. Then, as illustrated by arrow B in FIG. 6, the magnetic detection element 80 outputs a sensor signal of signal level Sb indicating the direction of the magnetic flux passing through the detection portion.

Suppose the tooth portion 11a opposes the hole portion 12b, the end surface 71c opposes the tooth portion 11a, and the end surface 72c opposes the first hole portion. Then, as illustrated by arrow C in FIG. 7, the magnetic detection element 80 outputs a sensor signal of signal level Sc indicating the direction of the magnetic flux passing through the detection portion.

Arrows A, B, and C indicate different directions of the magnetic flux. Signal levels Sa, Sb, and Sc are set to different values. It is possible to provide the position detection device 20 that detects the position relationship between the clutch component portions 11 and 12 in the rotation direction around the axis S.

The control device 50 can control the clutch component portion 11 via the actuator 40 based on sensor signals output from the magnetic detection element 80, and allow the clutch component portions 11 and 12 to normally engage with each other. Therefore, it is possible to inhibit the tooth portions 11a and 12a from colliding with each other to generate noise or to be damaged.

The present embodiment uses one magnet 60 to configure the position detection device 20 and is more cost-effective than the use of the multiple magnets 60 to configure the position detection device 20.

According to the present embodiment, the control device 50 determines the position relationship between the clutch component portions 11 and 12 based on the magnetic flux direction detected by the magnetic detection element 80. The position relationship between the clutch component portions 11 and 12 can be satisfactorily determined even if the position detection device 20 separates from the dog clutch 10 to decrease the density of magnetic flux passing through the magnetic detection element 80.

The present embodiment determines the position relationship between the clutch component portions 11 and 12 by using one position detection device 20 composed of the magnet 60, the yoke 70, and the magnetic detection element 80. The position detection device 20 can satisfactorily detect the direction of magnetic flux passing through the magnetic detection element 80 even in the power transmission system 1 that provides a small distance between the clutch component portions 11 and 12.

Moreover, it is possible to reduce the size and costs of the position detection device 20 and the power transmission system 1.

The present embodiment uses one position detection device 20 and therefore can determine the position relationship between the clutch component portions 11 and 12 without performing processes such as calculation. It is possible to improve the responsiveness of the control device 50 to control the actuator 40.

Figure 9:
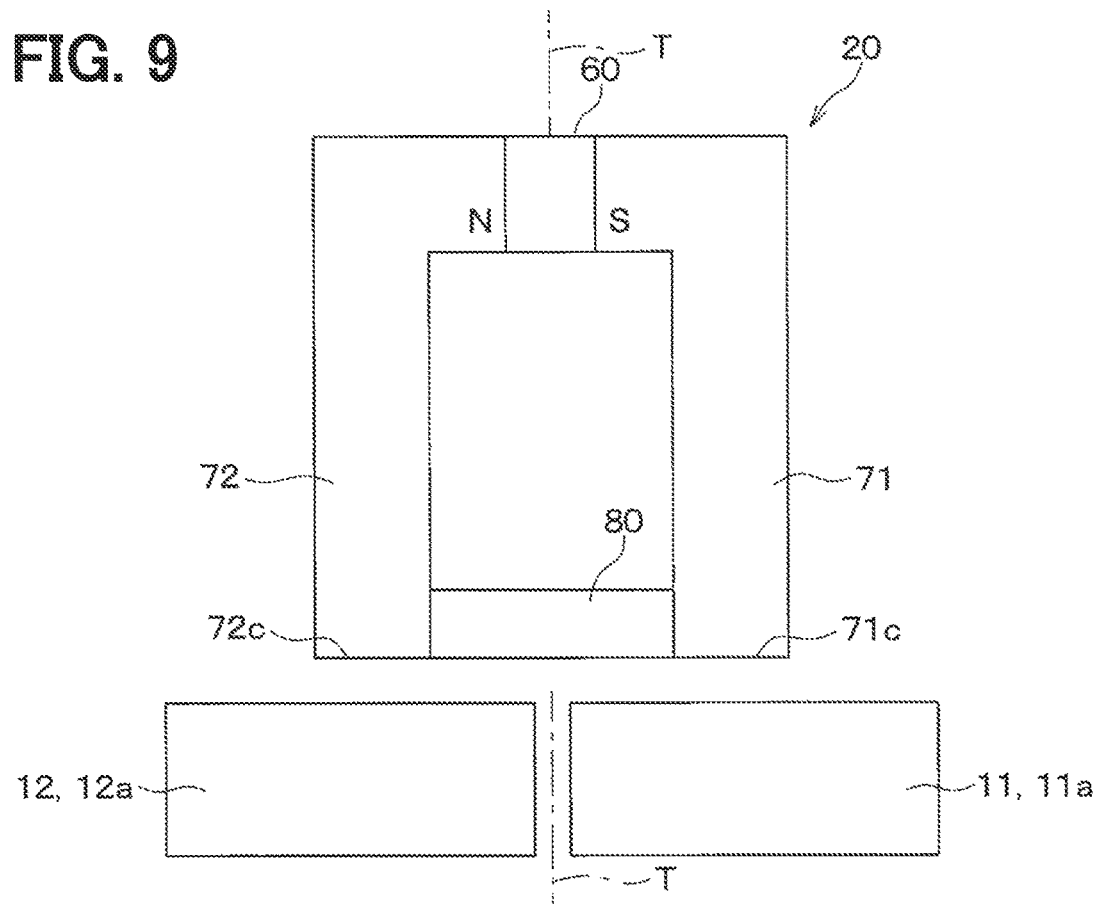
FIG. 9 is a diagram illustrating that the axial centerline of the position detection device in FIG. 1 according to the first embodiment corresponds to the axial centerline between the two clutch component portions in the dog clutch.
Figure 11:
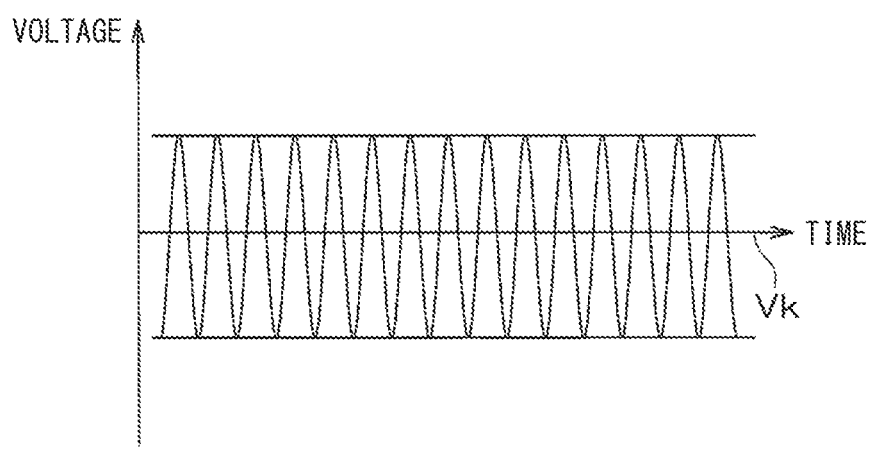
FIG. 11 is a timing chart illustrating a sensor signal from a magnetic detection element of the position detection device in FIG. 9 according to the first embodiment.

As illustrated in FIG. 9, the present embodiment configures the tooth portions 11a and 12a to be line-symmetric with respect to an axial centerline T of the position detection device 20. The centerline T is a virtual line that passes through the midpoint of the position detection device 20 in the axial direction and extends in the radial direction around the axis S. In this case, as illustrated in FIG. 11, the sensor signal from the magnetic detection element 80 shows a waveform that oscillates based on a reference voltage Vk.

Figure 10:
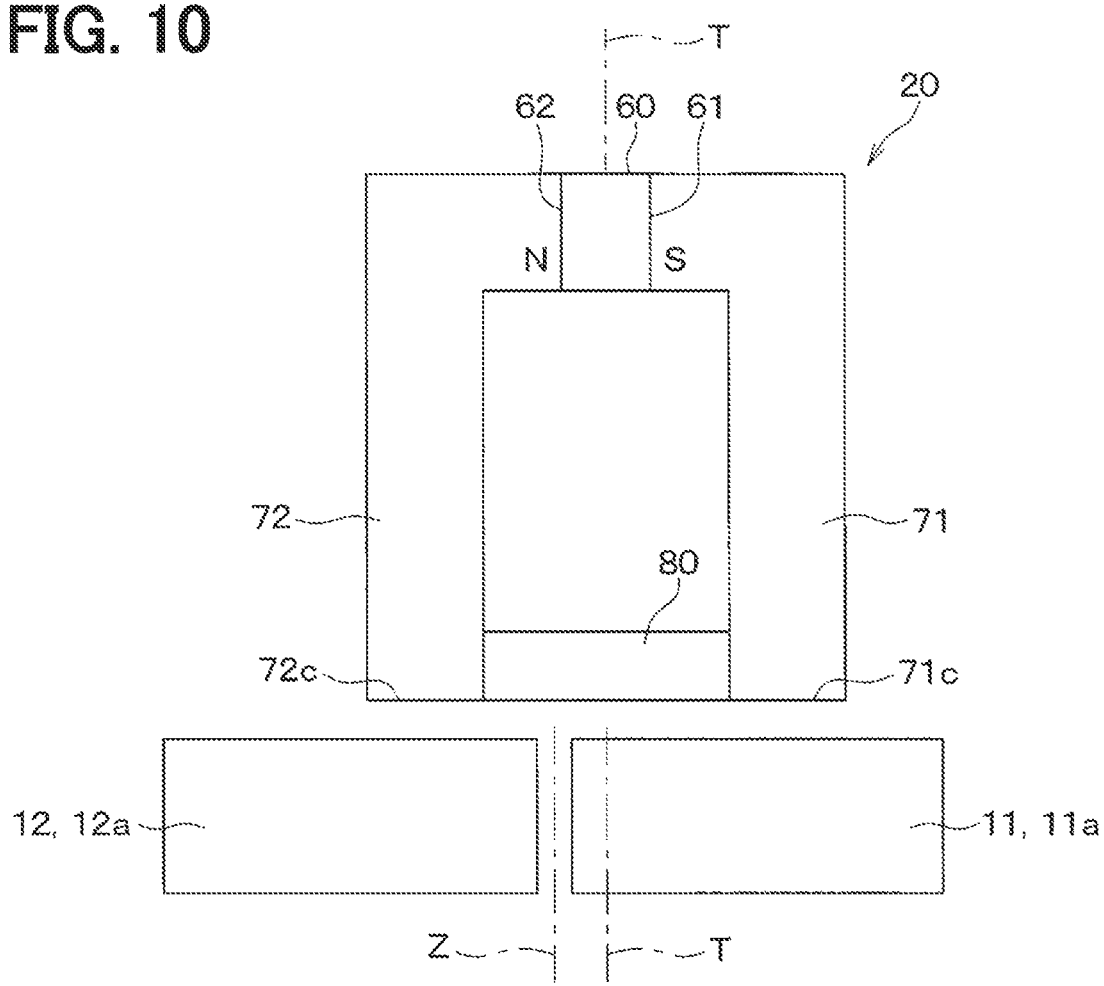
FIG. 10 is a diagram illustrating that the axial centerline of the position detection device in FIG. 1 according to the first embodiment shifts from the axial centerline between the two clutch component portions in the dog clutch.
Figure 12:
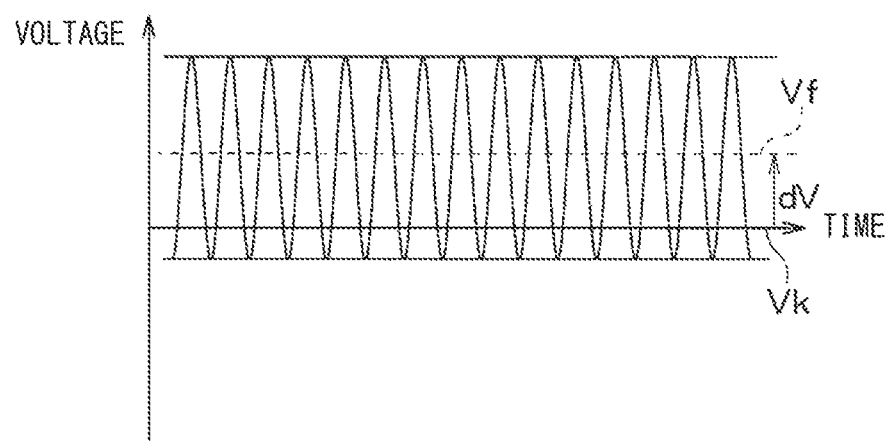
FIG. 12 is a timing chart illustrating a sensor signal from a magnetic detection element of the position detection device in FIG. 10 according to the first embodiment.

As illustrated in FIG. 10, however, the axial centerline T of the position detection device 20 shifts toward the other side in the axial direction with respect to an axial centerline Z between the clutch component portions 11 and 12. In this case, the sensor signal from the magnetic detection element 80 is generated as illustrated in FIG. 12. The centerline Z is a virtual line that passes through the midpoint between the clutch component portions 11 and 12 and extends in the radial direction around the axis S.

The sensor signal from the magnetic detection element 80 in FIG. 12 shows a waveform that oscillates based on a reference voltage Vf. The reference voltage Vf corresponds to a voltage value resulting from adding an offset value ΔV to the reference voltage Vk.

The centerline T of the position detection device 20 may shift from the centerline Z between the clutch component portions 11 and 12 in the axial direction. Even in this case, the sensor signal from the magnetic detection element 80 varies only in the waveform that shifts to a larger or smaller voltage.

The centerline T of the position detection device 20 may axially shift from the axial centerline Z between the tooth portions 11a and 12a due to the assembly of the dog clutch 10 or misalignment between the clutch component portions 11 and 12. Even in such a case, the waveform of the sensor signal keeps the same amplitude. Therefore, the control device 50 can detect the position relationship between the clutch component portions 11 and 12 based on the sensor signal from the magnetic detection element 80.

Second Embodiment

The first embodiment above has described the example of the position detection device 20 using one magnet 60. Instead, by reference to FIG. 13, the description below explains the second embodiment of configuring the position detection device 20 using two magnets 60. For the convenience of explanation, the present embodiment identifies the two magnets 60 composed of a magnet 60A as the first magnet at one side and a magnet 60B as the second magnet at the other side.

Figure 13:
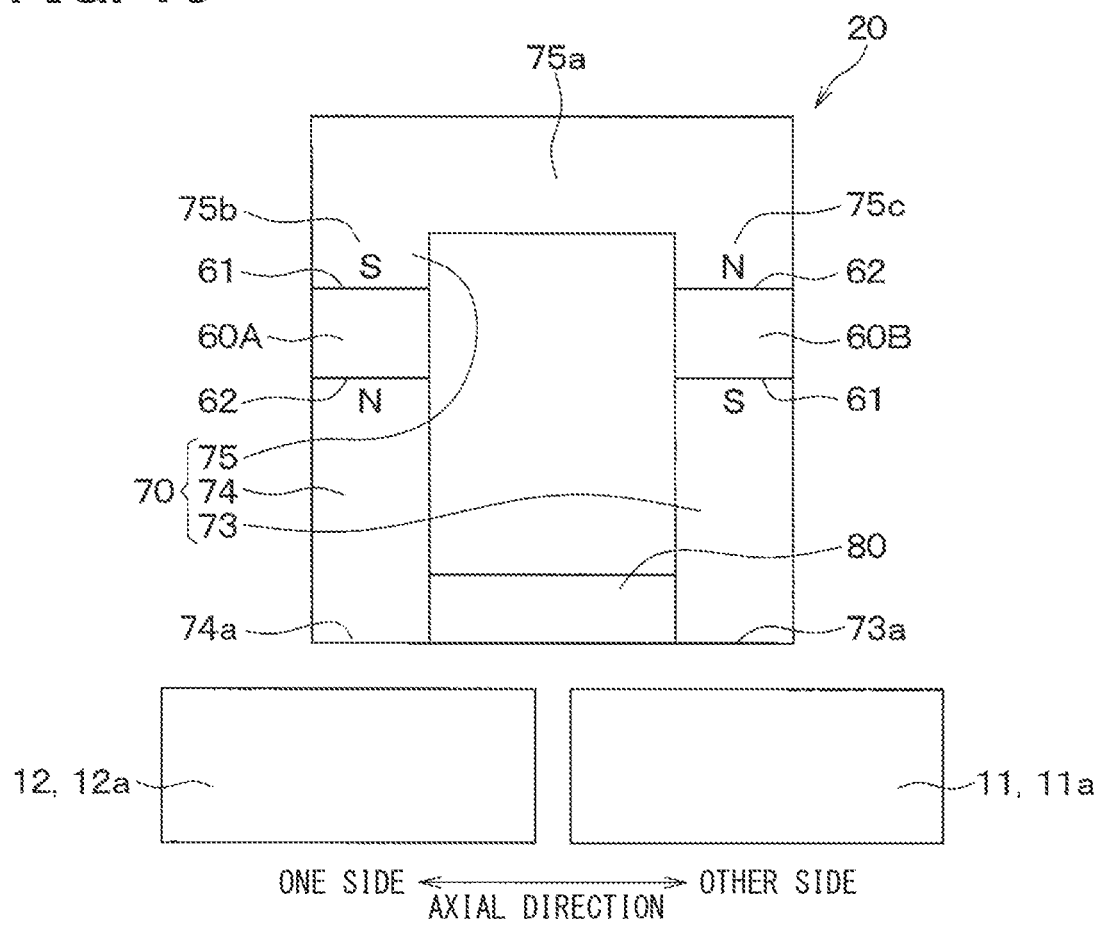
FIG. 13 is an enlarged view of the position detection device according to a second embodiment and is comparable to FIG. 4.

As illustrated in FIG. 13, the position detection device 20 according to the present embodiment includes the magnets 60A and 60B, the yoke 70, and the magnetic detection element 80.

The magnets 60A and 60B are positioned radially outside the clutch component portions 12 and 11 around the axis S, respectively. The magnet 60A is positioned at one side in the axial direction with respect to the magnet 60B. The magnets 60A and 60B are each formed into a cube having six faces, including faces 61 and 62, respectively.

The face 62 of the magnet 60A is positioned radially inside around the axis S. The face 61 of the magnet 60A is positioned radially outside around the axis S. The face 61 of the magnet 60B is positioned radially inside around the axis S. The face 62 of the magnet 60B is positioned radially outside around the axis S.

According to the present embodiment, each face 62 of the magnets 60A and 60B forms an N pole. The faces 62 of the magnets 60A and 60B have the same polarity.

Each face 61 of the magnets 60A and 60B forms an S pole.

The faces 61 of the magnets 60A and 60B have the same polarity. The magnets 60A and 60B are positioned so that the distance between the magnet 60A and the axis S is approximately equal to the distance between the magnet 60B and the axis S.

According to the present embodiment, the magnets 60A and 60B along with the magnetic flux path portion 75 of the yoke 70 configure a magnetic field generator. The face 62 of the magnet 60A configures the first magnetic pole portion. The face 61 of the magnet 60A configures the third magnetic pole portion. The face 61 of the magnet 60B configures the second magnetic pole portion. The face 62 of the magnet 60B configures the fourth magnetic pole portion.

The yoke 70 includes magnetic flux path portions 73, 74, and 75. The magnetic flux path portion 73 is positioned radially outside the clutch component portion 11 around the axis S. The magnetic flux path portion 73 configures a second magnetic flux path portion that allows the magnetic flux to pass between the clutch component portion 11 and the face 61 (S pole) of the magnet 60B.

The magnetic flux path portion 73 includes an end surface 73a as a second end surface opposing the tooth portion 11a or the hole portion 11b of the clutch component portion 11. The magnetic flux path portion 73 is formed from the end surface 73a radially toward outside around the axis S.

The magnetic flux path portion 74 is positioned radially outside the clutch component portion 12 around the axis S. The magnetic flux path portion 74 configures a first magnetic flux path portion that allows the magnetic flux to pass between the clutch component portion 12 and the face 62 (N pole) of the magnet 60A.

The magnetic flux path portion 74 includes an end surface 74a opposing the tooth portion 12a or the hole portion 12b of the clutch component portion 12. The magnetic flux path portion 74 is formed from the end surface 74a radially toward outside around the axis S.

The magnetic flux path portion 75 is positioned radially outside the magnetic flux path portions 74 and 73 and the magnets 60A and 60B around the axis S. The magnetic flux path portion 75 configures a third magnetic flux path portion that allows the magnetic flux to pass between the face 61 of the magnet 60A and the face 62 of the magnet 60B.

Specifically, the magnetic flux path portion 75 includes an axial path 75a and protruding portions 75b and 75c. The axial path 75a is formed along the axial direction between the face 61 of the magnet 60A and the face 62 of the magnet 60B.

The protruding portion 75b protrudes from the end of the axial path 75a on one side in the axial direction toward the face 61 of the magnet 60A. The protruding portion 75c protrudes from the end of the axial path 75a on the other side in the axial direction toward the face 62 of the magnet 60B.

The magnetic detection element 80 is positioned between the magnetic flux path portions 73 and 74. The magnetic detection element 80 opposes any one of the tooth portions 11a and the hole portions 11b of the clutch component portion 11. The magnetic detection element 80 also opposes any one of the tooth portions 12a and the hole portions 12b of the clutch component portion 12.

The magnetic detection element 80 according to the present configures a detection portion that detects the direction of magnetic flux passing between the magnetic flux path portions 73 and 74. The magnetic detection element 80 outputs a sensor signal indicating the direction of magnetic flux passing through the detection portion. Similar to the first embodiment, the magnetic detection element 80 according to the present embodiment is composed of two Hall elements.

The present embodiment configured as above differs from the first embodiment in the configuration of the yoke 70 and the number of magnets but is substantially equal to the first embodiment in terms of the magnetic circuit configured as the position detection device 20.

The sensor signal indicates the rotational position relationship between the clutch component portions 11 and 12 around the axis S. The magnetic detection element 80 outputs the sensor signal to the control device 50 according to (a), (b), (c), and (d) described below.

(a) The end surface 74a of the yoke 70 may oppose one of the hole portions 12b and the end surface 73a of the yoke 70 may oppose one of the hole portions 11b. In this state, the magnetic circuit operates substantially the same as described by reference to FIG. 5.

In this case, the magnetic detection element 80 opposes the one hole portion 11b and the one hole portion 12b.

The magnetic flux passing through the N pole of the magnet 60A passes through the magnetic flux path portion 74, the above one hole portion 12b, the above one hole portion 11b, and the magnetic flux path portion 73 and goes to the S pole of the magnet 60B. The magnetic flux passing through the S pole of the magnet 60B passes through the magnetic flux path portion 75 and the S pole of the magnet 60A and goes to the N pole of the magnet 60A.

At this time, a magnetic flux is also generated from the magnetic flux path portion 74 toward the magnetic flux path portion 73 through the magnetic detection element 80. The magnetic flux passing through the detection portion of the magnetic detection element 80 is directed to the other side in the axial direction as indicated by arrow A in FIG. 5. The magnetic detection element 80 outputs the sensor signal of signal level Sa.

(b) The end surface 74a of the yoke 70 may oppose one of the tooth portions 12a, and the end surface 73a of the yoke 70 may oppose one of the hole portions 11b. In this state, the magnetic circuit operates substantially the same as described by reference to FIG. 6.

In this case, the magnetic detection element 80 opposes the one tooth portion 12a and the one hole portion 11b.

The magnetic flux passing through the N pole of the magnet 60A passes through the magnetic flux path portion 74, the one tooth portion 12a, the one hole portion 11b, and the magnetic flux path portion 73 and goes to the S pole of the magnet 60B. The magnetic flux passing through the S pole of the magnet 60B passes through the magnetic flux path portion 75 and the S pole of the magnet 60A and goes to the N pole of the magnet 60A.

At this time, a magnetic flux is also generated from the magnetic flux path portion 74 toward the magnetic flux path portion 73 through the magnetic detection element 80. A magnetic flux is also generated from the one tooth portion 12a toward the magnetic flux path portion 73 through the magnetic detection element 80.

In this case, as indicated by arrow B in FIG. 6, the one tooth portion 12a changes the direction of the magnetic flux passing through the detection portion of the magnetic detection element 80. Arrow B denotes the direction in which arrow A rotates counterclockwise. The magnetic detection element 80 outputs a sensor signal of signal level Sb.

(c) The end surface 74a of the yoke 70 opposes one of the hole portions 12b, and the end surface 73a of the yoke 70 opposes one of the tooth portions 11a. In this state, the magnetic circuit operates substantially the same as described by reference to FIG. 7.

In this case, the magnetic detection element 80 opposes the one tooth portion 11a and the one hole portion 12b.

The magnetic flux passing through the N pole of the magnet 60A passes through the magnetic flux path portion 74, the one hole portion 12b, the one tooth portion 11a, and the magnetic flux path portion 73 and goes to the S pole of the magnet 60B. The magnetic flux passing through the S pole of the magnet 60B passes through the magnetic flux path portion 75 and the S pole of the magnet 60A and goes to the N pole of the magnet 60A.

A magnetic flux is also generated from the magnetic flux path portion 74 toward the one tooth portion 11a through the magnetic detection element 80. In this case, as indicated by arrow C in FIG. 7, the one tooth portion 11a changes the direction of the magnetic flux passing through the detection portion of the magnetic detection element 80. Arrow C denotes the direction in which arrow A rotates clockwise. The magnetic detection element 80 outputs a sensor signal of signal level Sc.

(d) The end surface 74a of the yoke 70 may oppose one of the tooth portions 12a, and the end surface 73a of the yoke 70 may oppose one of the tooth portions 11a. In this state, the magnetic circuit operates substantially the same as described by reference to FIG. 8.

In this case, the magnetic detection element 80 opposes the one tooth portion 11a and the one tooth portion 12a.

The magnetic flux passing through the N pole of the magnet 60A passes through the magnetic flux path portion 74, the one tooth portion 12a, the one tooth portion 11a, and the magnetic flux path portion 73 and goes to the S pole of the magnet 60B. The magnetic flux passing through the S pole of the magnet 60B passes through the magnetic flux path portion 75 and the S pole of the magnet 60A and goes to the N pole of the magnet 60A.

A magnetic flux is also generated from the magnetic flux path portion 74 toward the magnetic flux path portion 73 through the magnetic detection element 80. The magnetic flux passing through the detection portion of the magnetic detection element 80 is directed to the other side in the axial direction as indicated by arrow A in FIG. 8. The magnetic detection element 80 outputs the sensor signal of signal level Sa.

According to the present embodiment as above, signal levels Sa, Sb, and Sc are set to different values. Therefore, the magnetic detection element 80 outputs the sensor signal of signal level Sb or Sc to the control device 50.

Then, the control device 50 determines that the multiple tooth portions 11a oppose any one of the hole portions 12b, and the multiple tooth portions 12a oppose any one of the hole portions 11b.

As above, it is possible to provide the position detection device 20 that detects the position relationship between the clutch component portions 11 and 12 in the rotation direction around the axis S.

The present embodiment configures the position detection device 20 by using two magnets 60A and 60B and therefore increases the magnetic flux density detected by the magnetic detection element 80 compared to the first embodiment above. It is possible to improve the robustness of the position detection device 20. The robustness here signifies an ability to prevent the output from varying due to the influence of disturbance.

The present embodiment configures the position detection device 20 by using two magnets 60A and 60B. Each of the magnets 60A and 60B can become reduced in size compared to the magnet 60 used for the position detection device 20 according to the first embodiment. Therefore, the position detection device 20 can be downsized.

Third Embodiment

The third embodiment explains an example of providing the magnetic flux path portions 73 and 74 of the yoke 70 of the position detection device 20 according to the second embodiment with protruding portions 73*d* and 74*d* protruding toward the magnetic detection element 80.

The present embodiment differs from the second embodiment mainly in the configurations of the magnetic flux path portions 73 and 74 of the yoke 70 of the position detection device 20 and shares the other configurations with the second embodiment.

Figure 14:
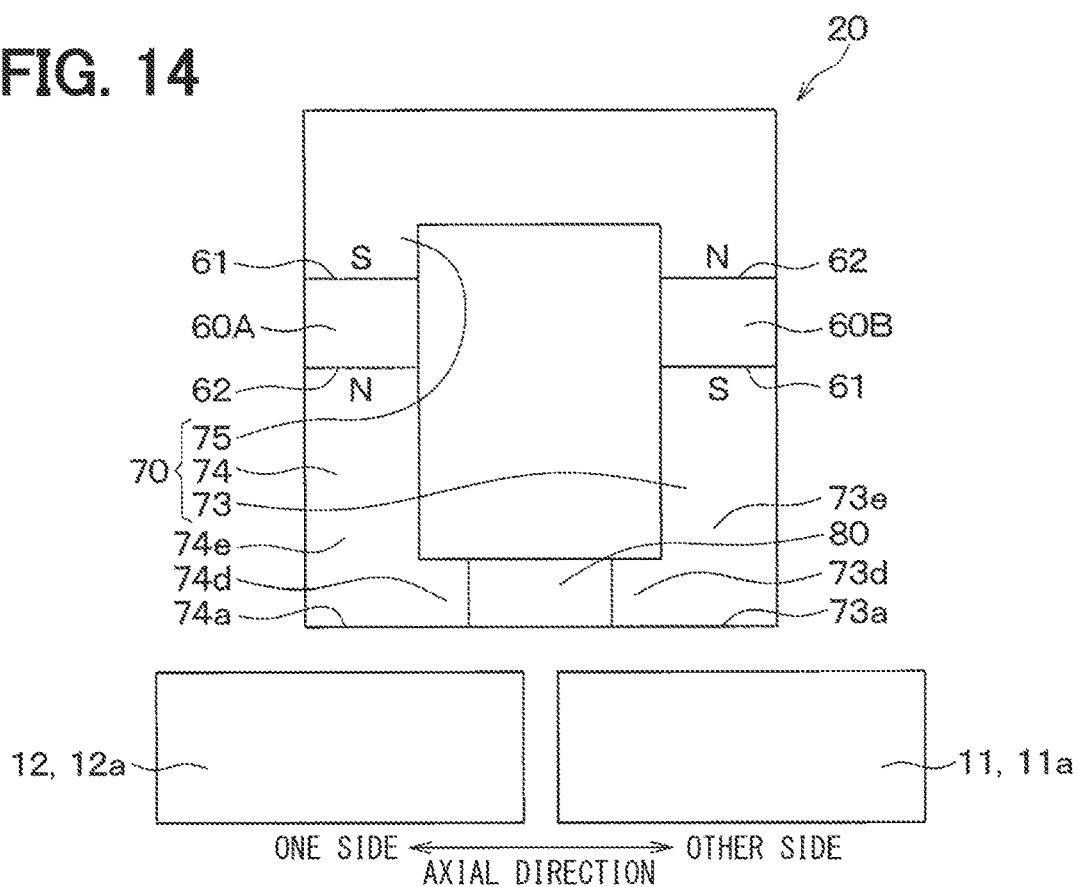
FIG. 14 is an enlarged view of the position detection device according to a third embodiment and is comparable to FIG. 4.

The description below mainly explains the magnetic flux path portions 73 and 74 of the yoke 70 of the position detection device 20, as the difference between the present embodiment and the second embodiment, by reference to FIG. 14.

The protruding portion 73*d* is provided for the magnetic flux path portion 73 of the yoke 70 of the position detection device 20.

Specifically, the magnetic flux path portion 73 includes a radial magnetic flux path portion 73*e* and the protruding portion 73*d*. The radial magnetic flux path portion 73*e* is a second path portion formed from the end surface 73*a* radially toward the outside around the axis S. The protruding portion 73*d* is a second protruding portion that protrudes toward the magnetic detection element 80 from the end of the radial magnetic flux path portion 73*e* toward the radial inside around the axis S.

The protruding portion 73*d* according to the present embodiment guides the magnetic flux passing through the magnetic detection element 80 to the radial magnetic flux path portion 73*e*.

A magnetic flux path portion 74*d* is provided for the magnetic flux path portion 74 of the yoke 70 of the position detection device 20. Specifically, the magnetic flux path portion 74 includes the radial magnetic flux path portion 74*e* and the protruding portion 74*d*. The radial magnetic flux path portion 74*e* is a first path portion formed from the end surface 74*a* to the radial outside around the axis S. The protruding portion 74*d* is a first protruding portion that protrudes toward the magnetic detection element 80 from the end of the radial magnetic flux path portion 74*e* toward the radial inside around the axis S.

The protruding portion 74*d* according to the present embodiment guides the magnetic flux passing through the radial magnetic flux path portion 74*e* to the magnetic detection element 80.

According to the present embodiment, the magnetic detection element 80 outputs sensor signals, indicating the position relationship between the clutch component portions 11 and 12, to the control device 50 in the direction of rotation around the axis S according to (a), (b), (c), and (d) as described in the second embodiment.

As above, the protruding portions 73*d* and 74*d* are provided for the magnetic flux path portions 73 and 74 of the yoke 70 of the position detection device 20 according to the present embodiment. The magnetic detection element 80 is sandwiched between the protruding portions 73*d* and 74*d*. The protruding portion 74*d* guides the magnetic flux passing through the radial magnetic flux path portion 74*e* to the magnetic detection element 80. The protruding portion 73*d* guides the magnetic flux passing through the magnetic detection element 80 to the radial magnetic flux path portion 73*e*.

According to the present embodiment as above, the yoke 70 includes the protruding portions 73*d* and 74*d*. When the clutch component portions 11 and 12 maintain the rotational position relationship of (a) or (d), the direction of the magnetic flux passing through the detection portion of the magnetic detection element 80 can highly accurately approximate the axial direction (horizontal direction on the drawing).

When the clutch component portions 11 and 12 maintain the rotational position relationship of (a) or (d), the direction of the magnetic flux detected by the magnetic detection element 80 highly accurately approximates the magnetic flux detection direction corresponding to the X-axis Hall element of the magnetic detection element 80.

In the case of (a) or (d), it is possible to increase the magnetic flux passing through the magnetic detection element 80 in the magnetic flux detection direction of the X-axis Hall element as compared with the first embodiment. In the case of (b), the tooth portion 12*a* can greatly affect the direction of the magnetic flux detected by the magnetic detection element 80. In the case of (c), the tooth portion 11*a* can greatly affect the direction of the magnetic flux detected by the magnetic detection element 80.

The magnetic flux detection direction of the X-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80.

Moreover, as above, the present embodiment provides the yoke 70 with the protruding portions 73*d* and 74*d*. It is possible to increase the magnetic flux density passing through the magnetic detection element 80 between the magnetic flux path portions 74 and 73.

It is possible to improve the robustness of the magnetic detection element 80 and the position detection device 20.

Fourth Embodiment

Figure 15:
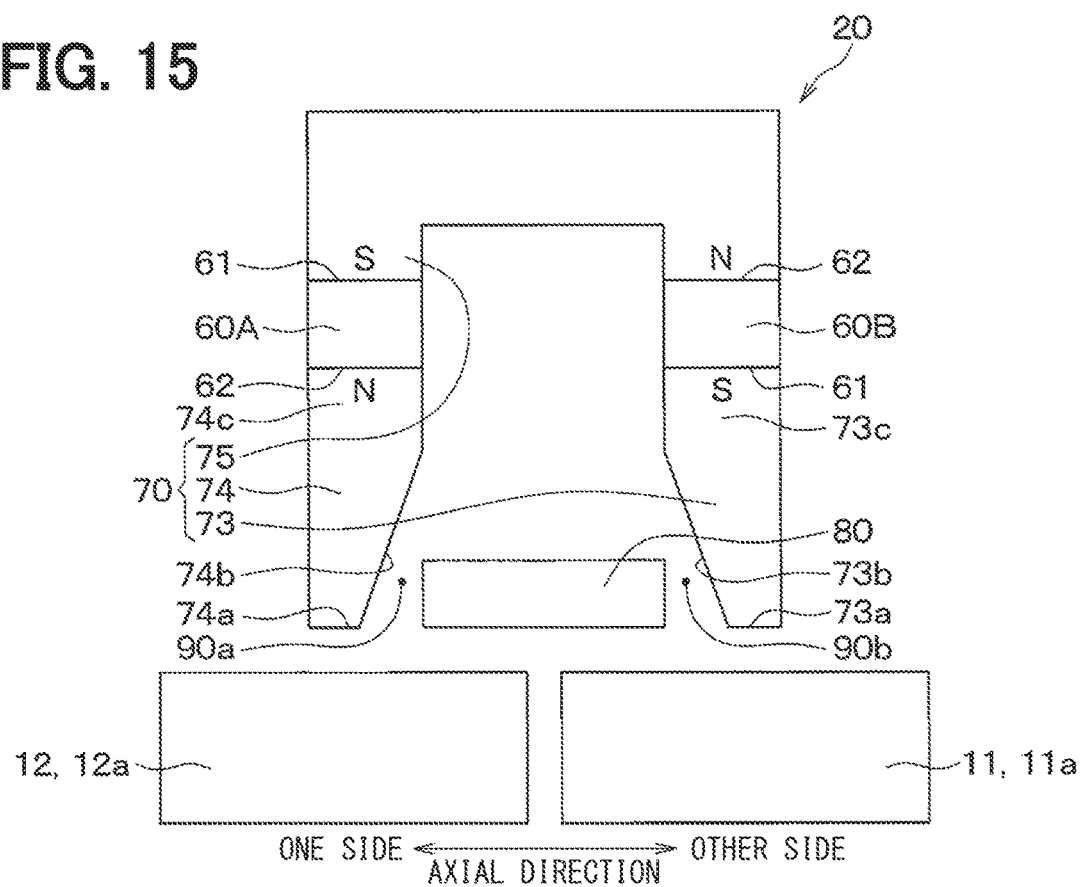
FIG. 15 is an enlarged view of the position detection device according to a fourth embodiment and is comparable to FIG. 4.

By reference to FIG. 15, the fourth embodiment explains an example of providing opposing faces 73*b* and 74*b* for the magnetic flux path portions 73 and 74 of the yoke 70 of the position detection device 20 according to the second embodiment. The opposing faces 73*b* and 74*b* oppose the magnetic detection element 80 via gaps 90*a* and 90*b*.

The present embodiment differs from the second embodiment mainly in the configurations of the magnetic flux path portions 73 and 74 of the yoke 70 of the position detection device 20 and shares the other configurations with the second embodiment.

By reference to FIG. 15, the description below mainly explains the magnetic flux path portions 73 and 74 of the yoke 70 of the position detection device 20, as the difference between the present embodiment and the second embodiment.

The magnetic flux path portion 74 according to the present embodiment includes the opposing face 74*b* as a first opposing face that axially opposes the magnetic detection element 80 at one side via the gap 90*a*. The opposing face 74*b* is formed to approach the outside from the inside in the radial direction around the axis S according to the axial direction from one side to the other side. Namely, the opposing face 74b is radially tilted around the axis S. The opposing face 74b and the end surface 74a are connected to form a corner.

The magnetic flux path portion 73 includes the opposing face 73b as a second opposing face that axially opposes the magnetic detection element 80 at the other side via the gap 90b. The opposing face 73b is formed to approach the outside from the inside in the radial direction around the axis S according to the axial direction from the other side to one side. Namely, the opposing face 73b is radially tilted around the axis S. The opposing face 73b and the end surface 73a are connected to form a corner.

According to the present embodiment, the magnetic flux path portion 73 is assumed to include the opposing face 73b and a region 73c as a remainder in the radial direction around the axis S. The ratio of the opposing face 73b to the magnetic flux path portion 73 is larger than the ratio of the region 73c to the same.

The magnetic flux path portion 74 is assumed to include the opposing face 74b and a region 74c as a remainder in the radial direction around the axis S. The ratio of the opposing face 74b to the magnetic flux path portion 74 is larger than the ratio of the region 74c to the same.

According to the present embodiment, the magnetic detection element 80 outputs sensor signals, indicating the position relationship between the clutch component portions 11 and 12, to the control device 50 according to (a), (b), (c), and (d) as described in the second embodiment. It is possible to provide the position detection device 20 that detects the position relationship between the clutch component portions 11 and 12.

According to the present embodiment, as above, the magnetic flux path portion 74 includes the opposing face 74b, and the magnetic flux path portion 73 includes the opposing face 73b. It is possible to generate a magnetic flux that passes through the opposing face 74b, the magnetic detection element 80, and then the opposing face 73b.

When the clutch component portions 11 and 12 maintain the rotational position relationship of (a) or (d), the direction of the magnetic flux detected by the magnetic detection element 80 highly accurately approximates the magnetic flux detection direction corresponding to the X-axis Hall element of the magnetic detection element 80.

In the case of (a) or (d), it is possible to increase the magnetic flux passing through the magnetic detection element 80 in the magnetic flux detection direction of the X-axis Hall element as compared with the first embodiment. In the case of (b) or (c), similar to the third embodiment above, the tooth portion 12a or 11a can greatly influence the direction of the magnetic flux detected by the magnetic detection element 80. Similar to the third embodiment, the magnetic flux detection direction of the X-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80. It is possible to improve the robustness of the magnetic detection element 80 and the position detection device 20.

Fifth Embodiment

As described in the fourth embodiment, the magnetic flux path portion 73 or 74 is assumed to include the opposing face 73b or 74b and the region 73c or 74c, respectively, as a remainder in the radial direction around the axis S. The ratio of the opposing face 73b or 74b to the magnetic flux path portion 74 is larger than the ratio of the region 73c or 74c to the same, respectively.

Instead, the description below explains the fifth embodiment in which the ratio of the opposing face 73b or 74b to the magnetic flux path portion 74 is smaller than the ratio of the region 73c or 74c to the same, respectively. As above, the magnetic flux path portion 73 or 74 is assumed to include the opposing face 73b or 74b and the region 73c or 74c, respectively, as a remainder in the radial direction around the axis S.

Figure 16:
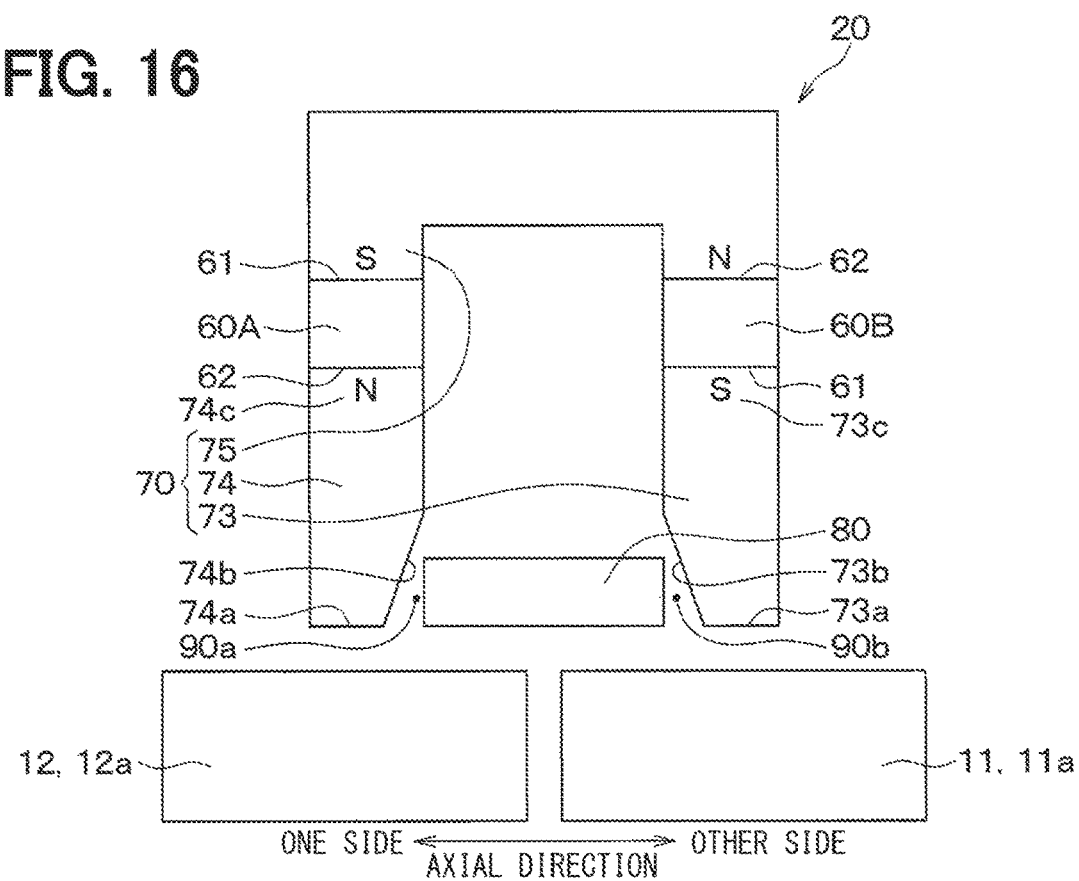
FIG. 16 is an enlarged view of the position detection device according to a fifth embodiment and is comparable to FIG. 4.

As illustrated in FIG. 16, the present embodiment differs from the fourth embodiment in the opposing faces 73b and 74b of the magnetic flux path portions 73 and 74 of the yoke 70 of the position detection device 20 and shares the other configurations with the fourth embodiment.

Sixth Embodiment

Figure 17:
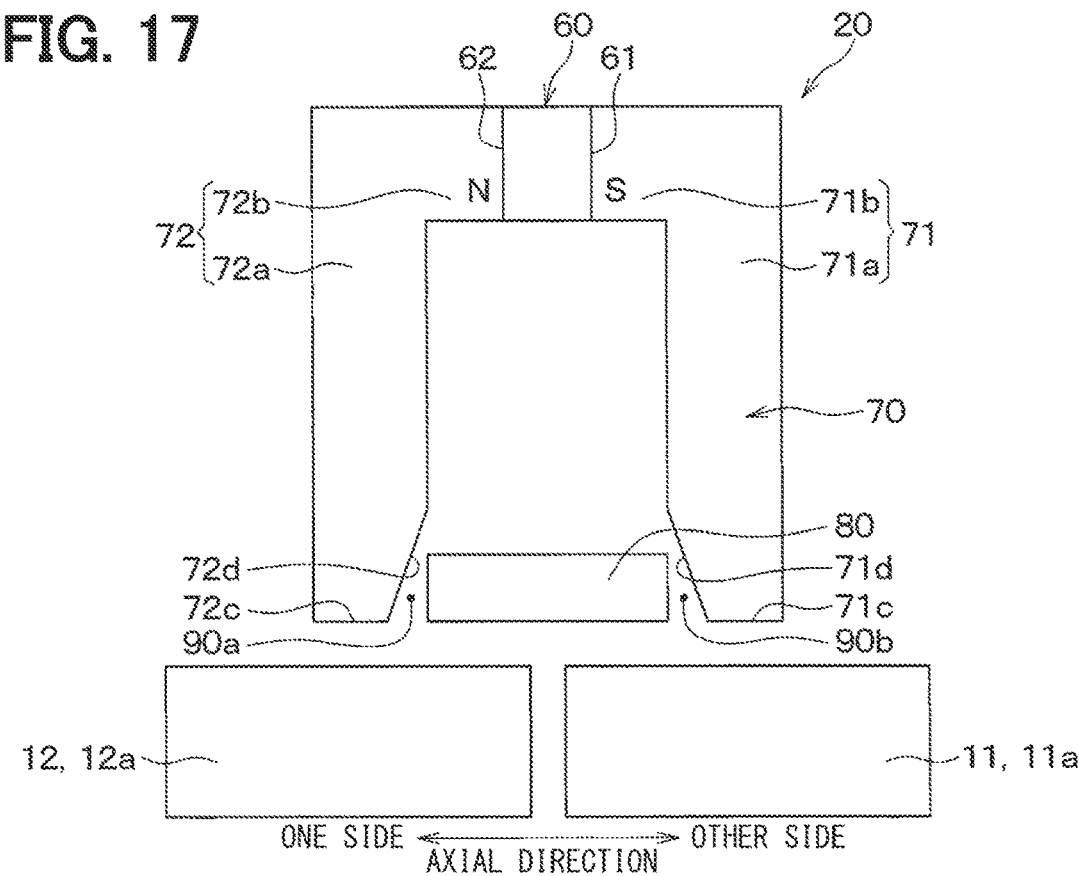
FIG. 17 is an enlarged view of the position detection device according to a sixth embodiment and is comparable to FIG. 4.

The fifth embodiment configure the position detection device 20 by using the magnets 60A and 60B. Instead, by reference to FIG. 17, the description below explains the sixth embodiment that configures the position detection device 20 by using one magnet 60.

The present embodiment differs from the fifth embodiment in the configuration of the yoke 70 of the position detection device 20 and shares the other configurations with the fifth embodiment.

Similar to the first embodiment, the yoke 70 of the position detection device 20 according to the present embodiment includes the magnetic flux path portions 71 and 72.

The magnetic flux path portion 71 of the yoke 70 according to the present embodiment includes an opposing face 71d as the second opposing face corresponding to the opposing face 73b according to the fifth embodiment.

The opposing face 71d axially opposes the other side of the magnetic detection element 80 via the gap 90b. The opposing face 71d is formed to approach the outside from the inside in the radial direction around the axis S according to the axial direction from the other side to one side. Namely, the opposing face 71d is radially tilted around the axis S.

The magnetic flux path portion 72 of the yoke 70 according to the present embodiment includes an opposing face 72d as the first opposing face corresponding to the opposing face 74b according to the fifth embodiment. The opposing face 72d opposes one side of the magnetic detection element 80 in the axial direction via the gap 90a.

The opposing face 72d is formed to approach the outside from the inside in the radial direction around the axis S according to the axial direction from one side to the other side. Namely, the opposing face 72d is radially tilted around the axis S.

The present embodiment can generate a magnetic flux that passes through the opposing face 72d, the magnetic detection element 80, and the opposing face 71d. When the clutch component portions 11 and 12 maintain the rotational position relationship of (a) or (d), the direction of the magnetic flux detected by the magnetic detection element 80 highly accurately approximates the magnetic flux detection direction corresponding to the X-axis Hall element of the magnetic detection element 80.

In the case of (a) or (d), it is possible to increase the magnetic flux passing through the magnetic detection element 80 in the magnetic flux detection direction of the X-axis Hall element as compared with the first embodiment. In the case of (b) or (c), similar to the third embodiment above, the tooth portion 12a or 11a can greatly influence the direction of the magnetic flux detected by the magnetic detection element 80.

The magnetic flux detection direction of the X-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80. It is possible to improve the robustness of the magnetic detection element 80 and the position detection device 20.

Seventh Embodiment

Figure 18:
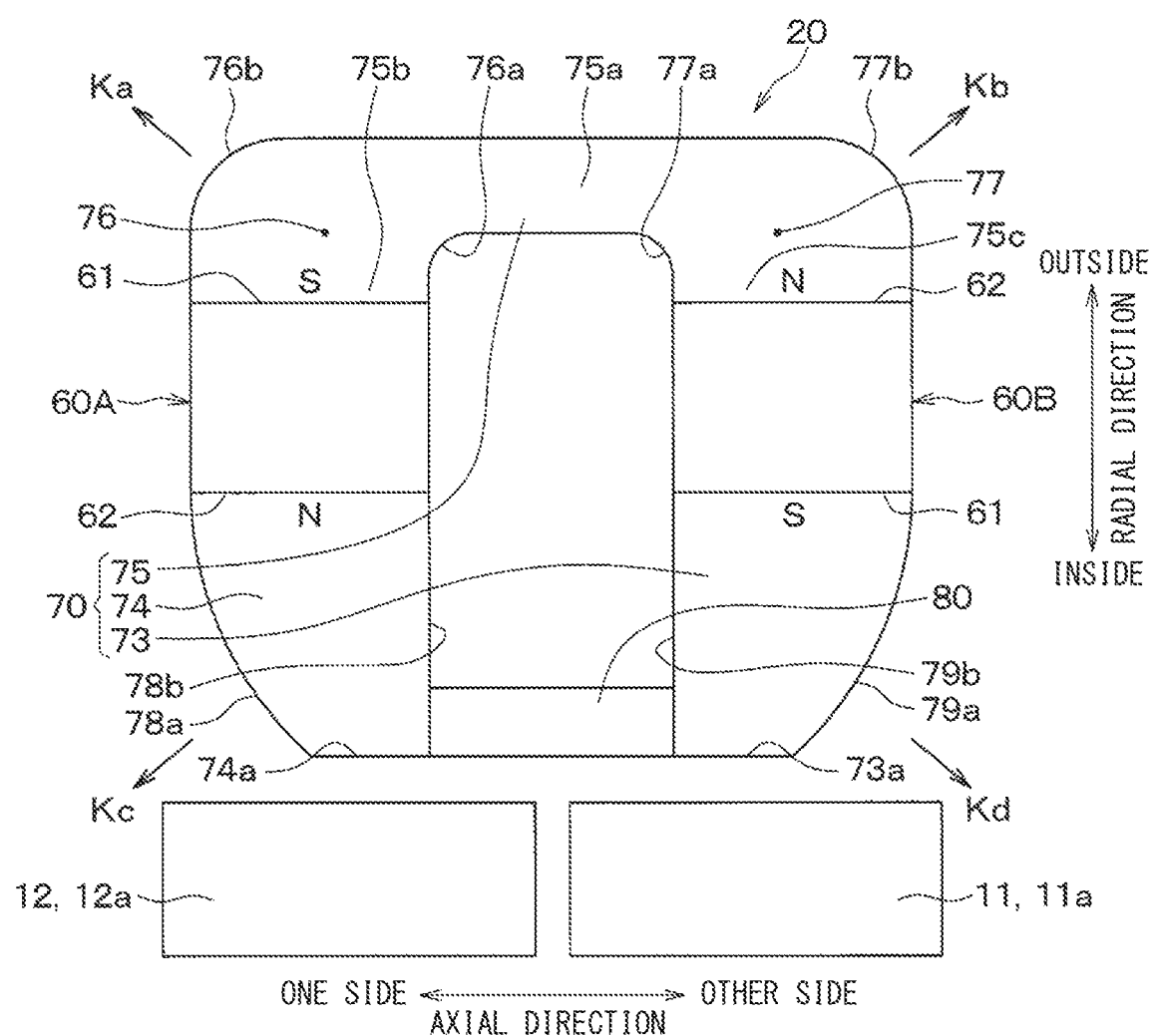
FIG. 18 is an enlarged view of the position detection device according to a seventh embodiment and is comparable to FIG. 4.

By reference to FIG. 18, the seventh embodiment explains an example of curving the magnetic flux path portions 73 and 74 of the yoke 70 of the position detection device 20 according to the second embodiment.

The present embodiment differs from the second embodiment in the yoke 70 and the magnets 60A and 60B of the position detection device 20 and shares the other configurations with the second embodiment.

By reference to FIG. 18, the description below explains the yoke 70 and the magnets 60A and 60B of the position detection device 20, as the difference between the present embodiment and the second embodiment.

According to the present embodiment, the axial dimension of each of the magnets 60A and 60B is larger than the radial dimension of the same around the axis S in the magnetic flux path portion 75.

In the magnetic flux path portion 75, the axial dimension of the protruding portion 75b is larger than the radial dimension of the axial path 75a around the axis S. The axial dimension of protruding portion 75c is larger than the radial dimension of the axial path 75a around the axis S.

A connecting portion 76 connects the axial path 75a with the protruding portion 75b and is formed with an inner peripheral portion 76a and an outer peripheral portion 76b. The inner peripheral portion 76a is curved to be recessed in a first direction Ka. The outer peripheral portion 76b is curved to protrude in the first direction Ka. In FIG. 18, the first direction Ka indicated by the arrow corresponds to the result of clockwise rotating the direction of the arrow pointing toward one side in the axial direction.

A connecting portion 77 connects the axial path 75a with the protruding portion 75c and is formed with an inner peripheral portion 77a and an outer peripheral portion 77b that are both curved.

The inner peripheral portion 77a is curved to be recessed in a second direction Kb. The outer peripheral portion 77b is curved to protrude in the second direction Kb. In FIG. 18, the second direction Kb indicated by the arrow corresponds to the result of counterclockwise rotating the direction of the arrow pointing toward the other side in the axial direction.

An outer peripheral portion 78a of the magnetic flux path portion 74 is curved to protrude in a third direction Kc. In FIG. 18, the third direction Kc indicated by the arrow corresponds to the result of counterclockwise rotating the direction of the arrow pointing toward one side in the axial direction. An inner peripheral portion 78b of the magnetic flux path portion 74 is formed in the radial direction around the axis S.

An outer peripheral portion 79a of the magnetic flux path portion 73 is curved to protrude in a fourth direction Kd. In FIG. 18, the fourth direction Kd indicated by the arrow corresponds to the result of clockwise rotating the direction of the arrow pointing toward the other side in the axial direction. An inner peripheral portion 79b of the magnetic flux path portion 73 is formed in the radial direction around the axis S.

The inner peripheral portions 76a and 77a and the outer peripheral portions 76b and 77b of the magnetic flux path portion 75 are curved. The outer peripheral portion 78a of the magnetic flux path portion 74 and the outer peripheral portion 79a of the magnetic flux path portion 73 are curved.

The first direction Ka, the second direction Kb, the third direction Kc, and the fourth direction Kd are differently oriented and intersect the axial direction and the radial direction around the axis S.

A magnetic flux can smoothly pass within the yoke 70 through the magnets 60A and 60B and the magnetic detection element 80. As above, the outer peripheral portion 78a of the magnetic flux path portion 74 is curved to protrude in the third direction Kc. The outer peripheral portion 79a of the magnetic flux path portion 73 is curved to protrude in the fourth direction Kd.

According to the present embodiment, the outer peripheral portion 78a is comparable to a first side face that is axially positioned at one side of the magnetic flux path portion 74 and is formed from the end surface 74a radially toward the outside around the axial line. The inner peripheral portion 78b is comparable to a second side face that is axially positioned at the other side of the magnetic flux path portion 74 and is formed from the end surface 74a radially toward the outside around the axial line.

The outer peripheral portion 78a is curved so that the distance between the outer peripheral portion 78a and the inner peripheral portion 78b decreases as approaching the magnetic detection element 80 in the radial direction around the axis S.

According to the present embodiment, the inner peripheral portion 79b is comparable to a third side face that is axially positioned at one side of the magnetic flux path portion 73 and is formed from the end surface 73a radially toward the outside around the axis. The outer peripheral portion 79a is comparable to a fourth side face that is axially positioned at the other side of the magnetic flux path portion 74 and is formed from the end surface 73a radially toward the outside around the axial line.

The outer peripheral portion 79a is curved so that the distance between the outer peripheral portion 79a and the inner peripheral portion 79b decreases as approaching the magnetic detection element 80 in the radial direction around the axis S.

The present embodiment can increase the magnetic flux density passing through the magnetic detection element 80 between the magnets 60A and 60B compared to the case of parallel forming the outer peripheral portions 78a and 79a in the radial direction around the axis S. The magnetic detection element 80 can satisfactorily detect the magnetic flux direction. It is possible to improve the robustness of the magnetic detection element 80 and the position detection device 20.

Eighth Embodiment

Figure 19:
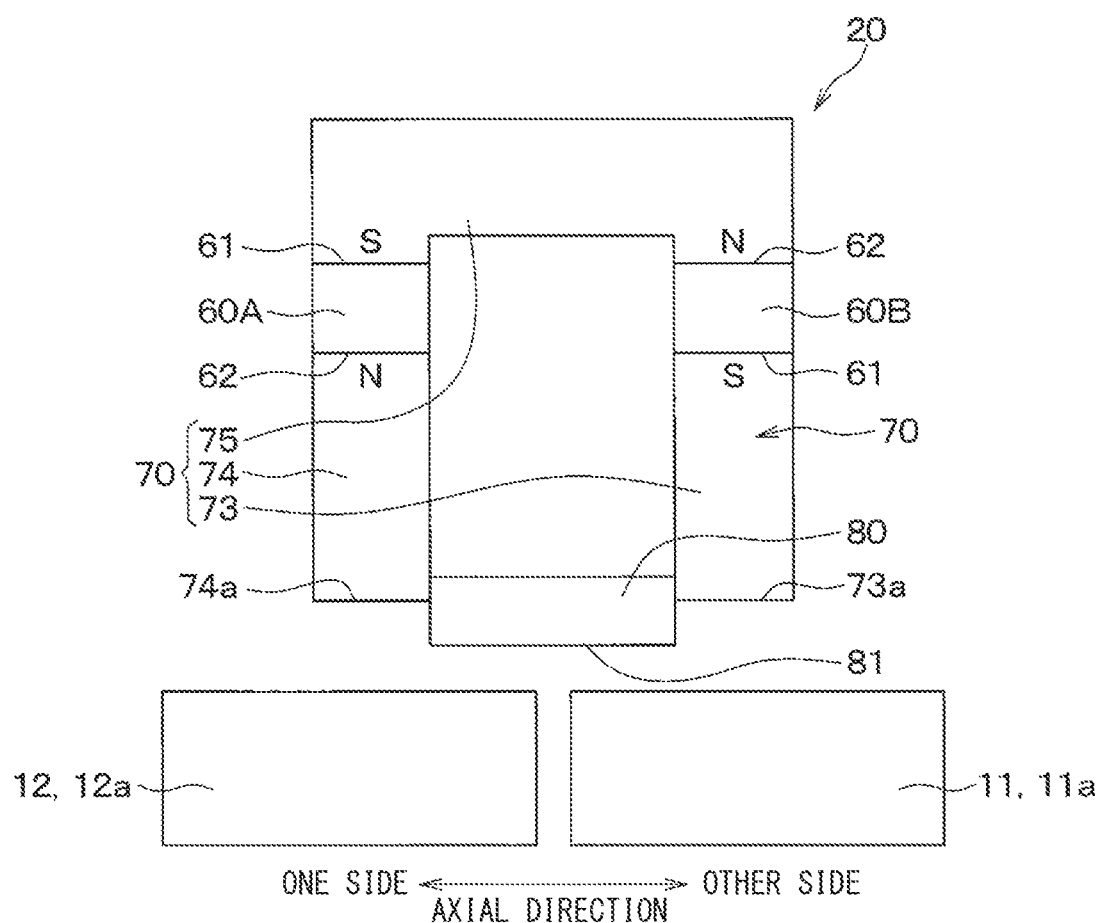
FIG. 19 is an enlarged view of the position detection device according to an eighth embodiment and is comparable to FIG. 4.

By reference to FIG. 19, the eighth embodiment explains an example of using the magnetic detection element 80 according to the second embodiment that is formed to protrude from the end surface 73a of the magnetic flux path portion 73 and the end surface 74a of the magnetic flux path portion 74 radially toward the inside around the axis S.

The present embodiment differs from the second embodiment in the placement of the magnetic detection element 80 of the yoke 70 of the position detection device 20 and shares the other configurations with the second embodiment. The description below explains the magnetic detection element 80 according to the present embodiment.

The magnetic detection element 80 is formed to protrude radially inward around the axis S from the end surfaces 73*a* and 74*a* of the magnetic flux path portions 73 and 74. The magnetic detection element 80 includes an end surface 81 that is positioned radially inward around the axis S away from the end surfaces 73*a* and 74*a* of the magnetic flux path portions 73 and 74.

The magnetic detection element 80 can approach the clutch component portions 11 and 12 closer than the second embodiment. The magnetic detection element 80 can be positioned where the magnetic flux varies greatly. A change in the position relationship between the clutch component portions 11 and 12 increases a change in the direction of the magnetic flux passing through the magnetic detection element 80. It is possible to improve the robustness of the magnetic detection element 80 and the position detection device 20.

Ninth Embodiment

Figure 20:
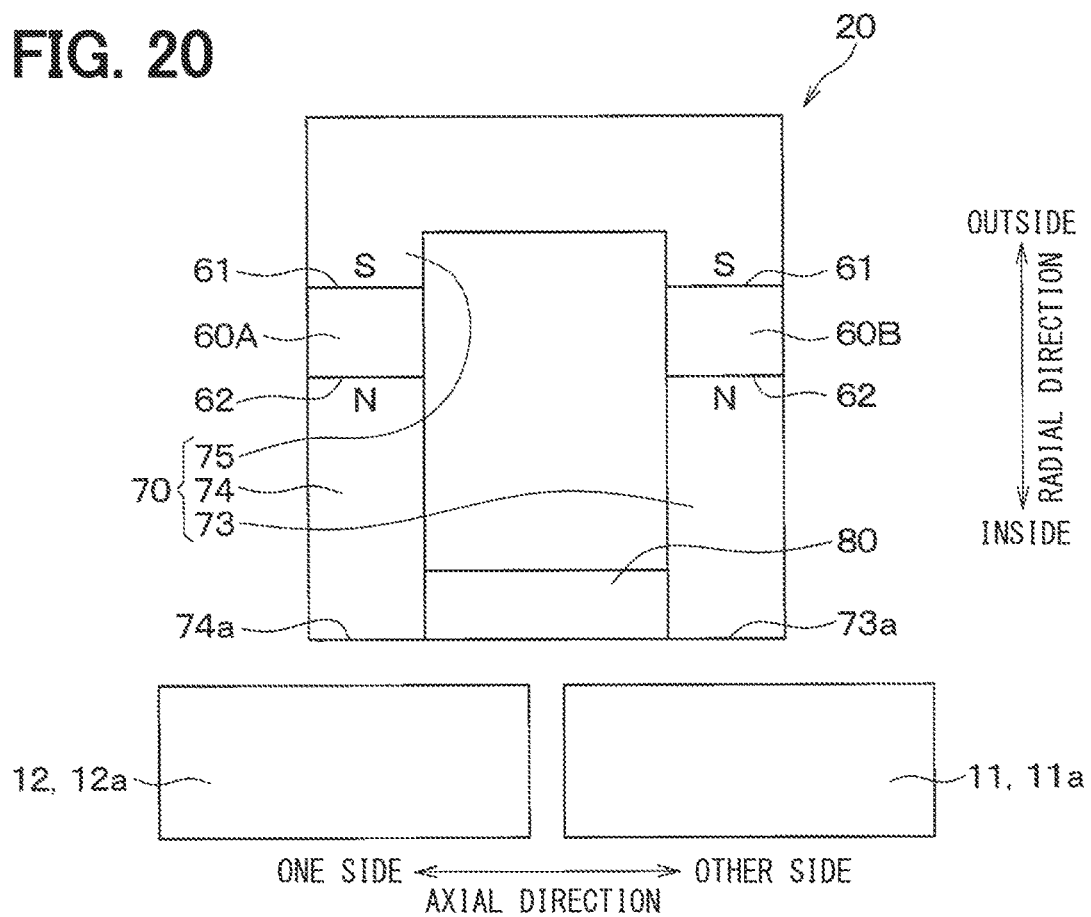
FIG. 20 is an enlarged view of the position detection device according to a ninth embodiment and is comparable to FIG. 4.

By reference to FIG. 20, the ninth embodiment explains an example of positioning the faces 62 of the magnets 60A and 60B radially inward around the axis S and positioning the faces 61 of the magnets 60A and 60B radially outward around the axis S as compared with the second embodiment.

The present embodiment differs from the second embodiment in the positioning of the faces 61 and 62 of the magnets 60A and 60B of the yoke 70 of the position detection device 20 and shares the other configurations with the second embodiment. The description below explains the magnets 60A and 60B according to the present embodiment.

The magnets 60A and 60B are positioned so that the corresponding faces 62 are oriented radially inward around the axis S. Consequently, the magnets 60A and 60B are positioned so that the corresponding N poles are oriented radially inward around the axis S.

According to the present embodiment, the face 62 of the magnet 60A configures a first magnetic pole portion. The face 62 of the magnet 60B configures a second magnetic pole portion. Consequently, the faces 62 of the magnets 60A and 60B provide the same polarity.

The magnets 60A and 60B are positioned so that the corresponding faces 61 are oriented radially outward around the axis S. Consequently, the magnets 60A and 60B are positioned so that the corresponding S poles are oriented radially outward around the axis S.

According to the present embodiment, the face 61 of the magnet 60A configures a third magnetic pole portion. The face 61 of the magnet 60B configures a fourth magnetic pole portion. Consequently, the faces 61 of the magnets 60A and 60B provide the same polarity.

According to the present embodiment, the magnets 60A and 60B along with the magnetic flux path portion 75 of the yoke 70 configure a magnetic field generator. The face 62 of the magnet 60A configures a first magnetic pole portion. The face 61 of the magnet 60A configures a third magnetic pole portion. The face 62 of the magnet 60B configures a second magnetic pole portion. The face 61 of the magnet 60B configures a fourth magnetic pole portion.

According to the present embodiment, the magnets 60A and 60B are positioned so that the distance between the magnet 60A and the axis S is equal to the distance between the magnet 60B and the axis S.

Based on the above-described configuration according to the present embodiment, similar to the first embodiment, the magnetic detection element 80 outputs sensor signals, representing the rotational position relationship between the clutch component portions 11 and 12, to the control device 50 according to (e), (f), (g), and (h) described below.

Figure 21:
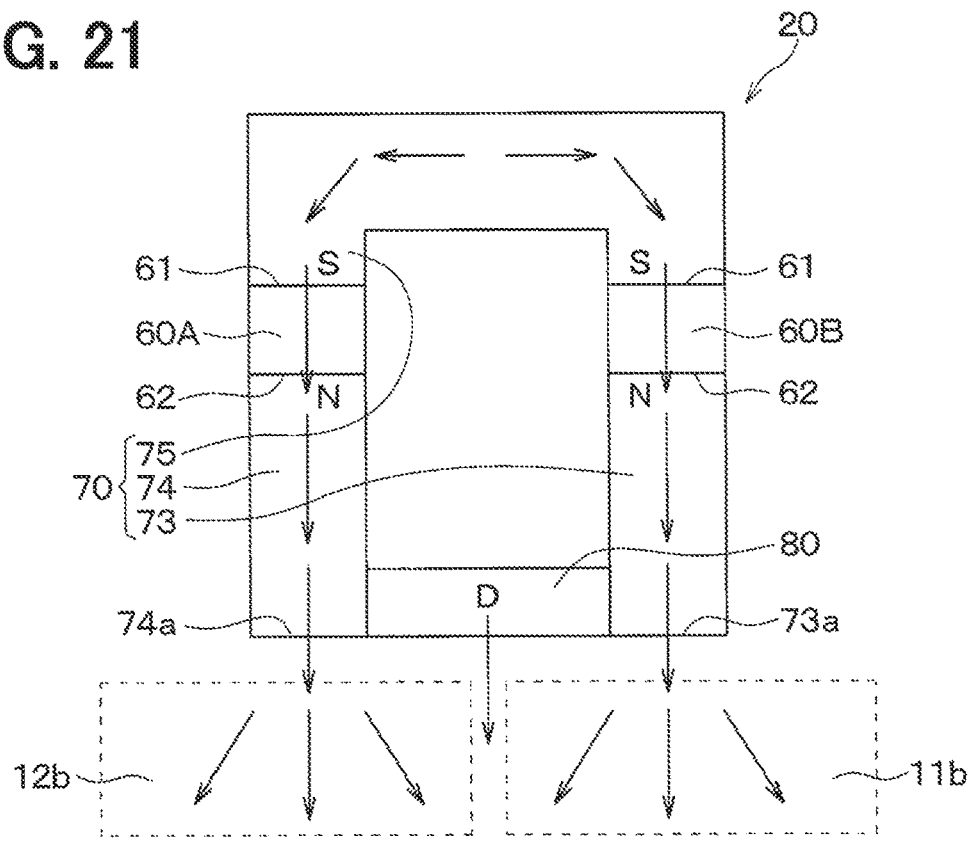
FIG. 21 is a diagram illustrating a state where the end surface of the position detection device in FIG. 20 according to the ninth embodiment at one side in the axial direction opposes a hole portion of the clutch component portion in the dog clutch at one side and the end surface thereof at the other side in the axial direction opposes a hole portion of the clutch component portion at the other side.

(e) The end surface 74*a* of the yoke 70 may oppose one of the hole portions 12*b*, and the end surface 73*a* of yoke 70 may oppose one of the hole portions 11*b*. In this state, the magnetic circuit operates as illustrated in FIG. 21.

In this case, the magnetic detection element 80 opposes the one hole portion 11*b* and the one hole portion 12*b*.

The magnetic flux generated from the magnet 60A goes from the magnetic flux path portion 74 to the one hole portion 12*b*. The magnetic flux generated from the magnet 60B goes from the magnetic flux path portion 73 to the one hole portion 11*b*.

The magnetic flux element 80 also allows passage of the magnetic flux from the magnetic flux path portion 73 and the magnetic flux from the magnetic flux path portion 74. Therefore, the detection portion of the magnetic flux element 80 allows passage of a composite magnetic flux, namely, a combination of the magnetic flux from the magnetic flux path portion 73 and the magnetic flux from the magnetic flux path portion 74. The magnetic flux passing through the detection portion of the magnetic detection element 80 is directed radially inward around the axis S as indicated by arrow D. The magnetic detection element 80 outputs the sensor signal of signal level Sd.

Figure 22:
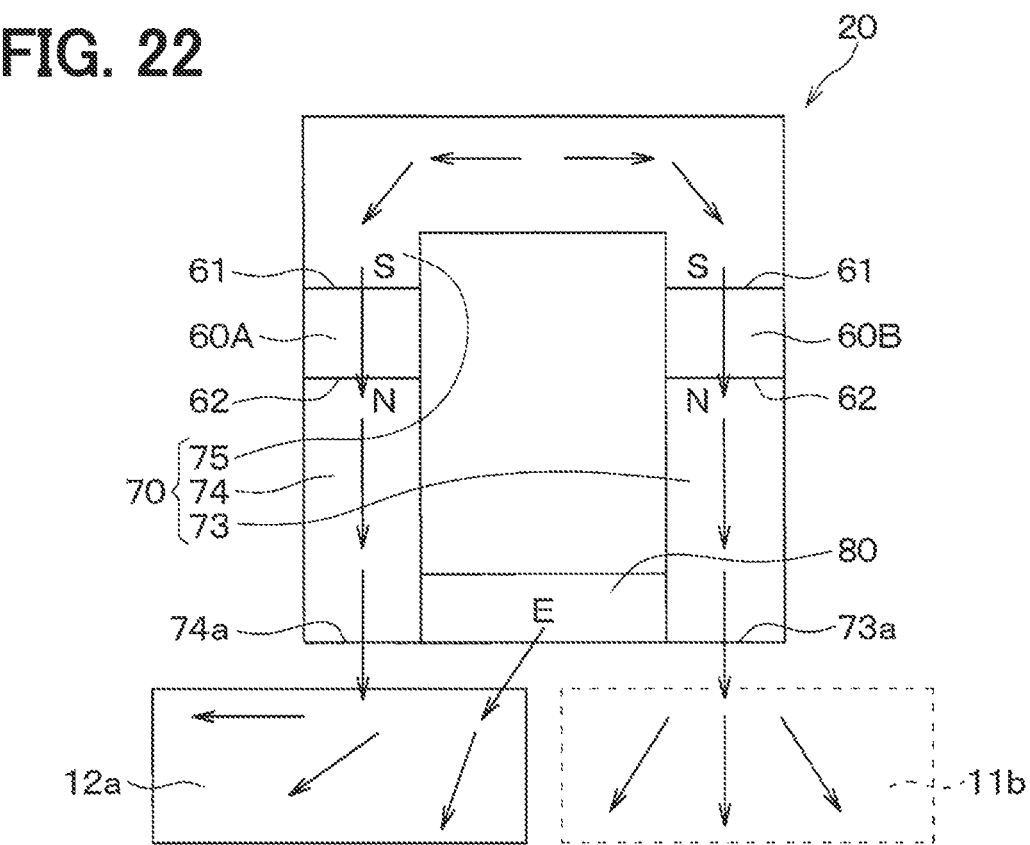
FIG. 22 is a diagram illustrating a state where the end surface of the position detection device in FIG. 20 according to the ninth embodiment at one side in the axial direction opposes a tooth portion of the clutch component portion at one side and the end surface thereof at the other side in the axial direction opposes a hole portion of the clutch component portion at the other side.

(f) The end surface 74*a* of the yoke 70 may oppose one of the tooth portions 12*a*, and the end surface 73*a* of the yoke 70 may oppose one of the hole portions 11*b*. In this state, the magnetic circuit operates as illustrated in FIG. 22.

In this case, the magnetic detection element 80 opposes the one tooth portion 12*a* and the one hole portion 11*b*.

The magnetic flux generated from the magnet 60A goes from the magnetic flux path portion 74 to the one hole portion 12*a*. The magnetic flux generated from the magnet 60B goes from the magnetic flux path portion 73 to the one hole portion 11*b*.

The magnetic flux element 80 also allows passage of the magnetic flux from the magnetic flux path portion 73 and the magnetic flux from the magnetic flux path portion 74. A magnetic flux is also generated from the magnetic detection element 80 toward the one tooth portion 12*a*. Consequently, the magnetic detection element 80 allows passage of a composite magnetic flux, namely, a combination of the magnetic flux from the magnetic flux path portion 73 and the magnetic flux from the magnetic flux path portion 74.

The one tooth portion 12*a* affects the direction of the magnetic flux passing through the magnetic detection element 80 as indicated by arrow E. Arrow E is tilted from arrow D toward one side in the axial direction. The magnetic detection element 80 outputs the sensor signal of signal level Se.

Figure 23:
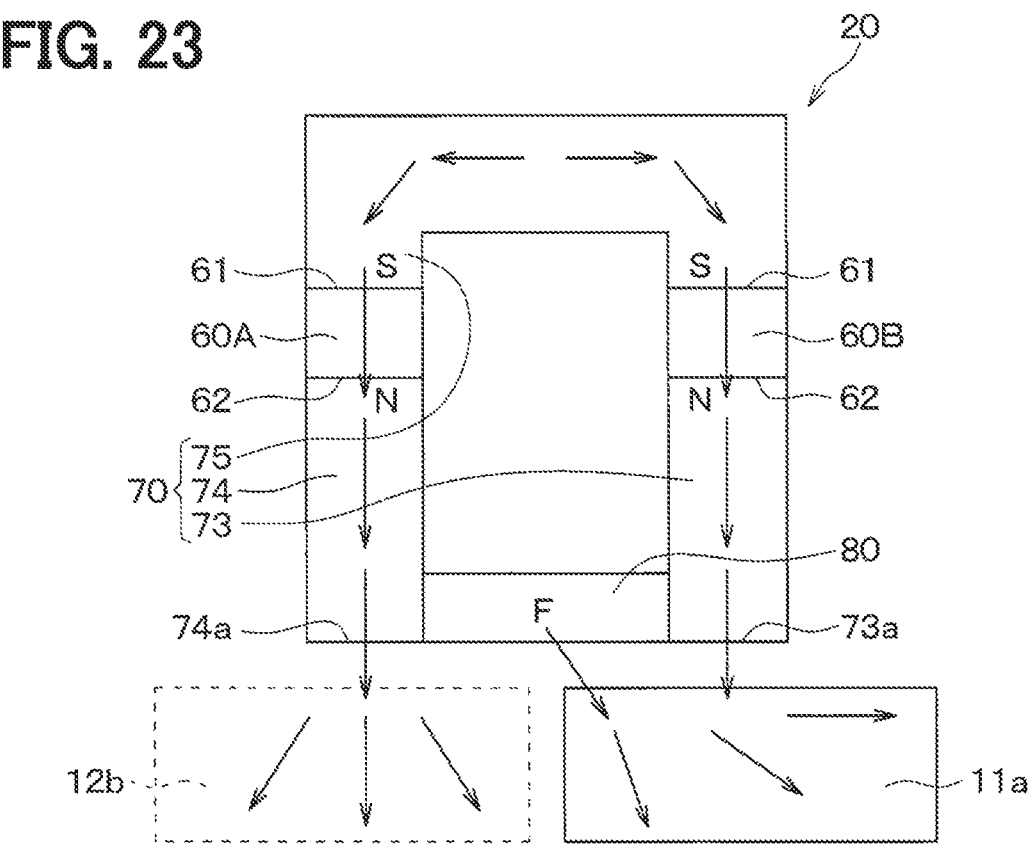
FIG. 23 is a diagram illustrating a state where the end surface of the position detection device in FIG. 20 according to the ninth embodiment at one side in the axial direction opposes a hole portion of the clutch component portion at one side and the end surface thereof at the other side in the axial direction opposes a tooth portion of the clutch component portion at the other side.

(g) The end surface 74*a* of the yoke 70 opposes one of the hole portions 12*b*, and the end surface 73*a* of the yoke 70 opposes one of the tooth portions 11*a*. In this state, the magnetic circuit operates as illustrated in FIG. 23.

In this case, the magnetic detection element 80 opposes the one tooth portion 11*a* and the one tooth portion 12*b*.

The magnetic flux generated from the magnet 60A goes from the magnetic flux path portion 74 to the one hole portion 12b. The magnetic flux generated from the magnet 60B goes from the magnetic flux path portion 73 to the one tooth portion 11a.

The magnetic flux element 80 also allows passage of the magnetic flux from the magnetic flux path portion 73 and the magnetic flux from the magnetic flux path portion 74. A magnetic flux is also generated from the magnetic detection element 80 toward the one tooth portion 11a. Consequently, the magnetic detection element 80 allows passage of a composite magnetic flux, namely, a combination of the magnetic flux from the magnetic flux path portion 73 and the magnetic flux from the magnetic flux path portion 74.

The one tooth portion 11a affects the direction of the magnetic flux passing through the magnetic detection element 80 as indicated by arrow F. Arrow F is tilted from arrow D toward the other side in the axial direction. The magnetic detection element 80 outputs the sensor signal of signal level Sf.

Figure 24:
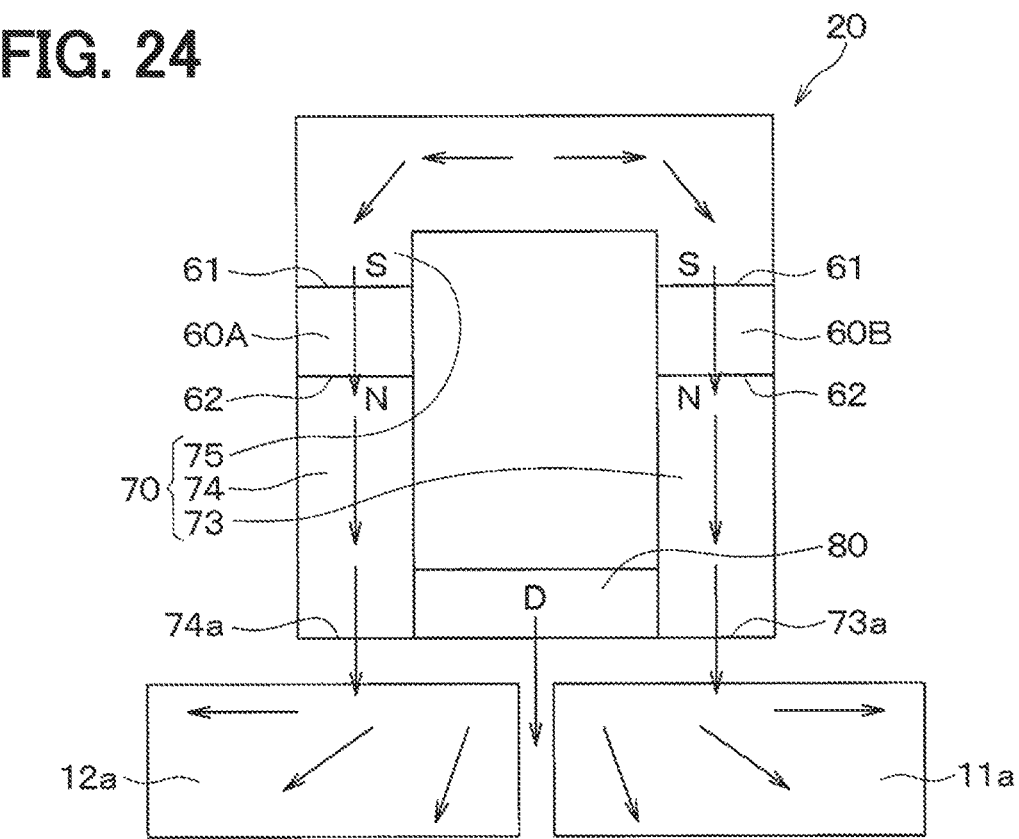
FIG. 24 is a diagram illustrating a state where the end surface of the position detection device in FIG. 20 according to the ninth embodiment at one side in the axial direction opposes a tooth portion of the clutch component portion at one side and the end surface thereof at the other side in the axial direction opposes a tooth portion of the clutch component portion at the other side.

(h) The end surface 74a of the yoke 70 may oppose one of the tooth portions 12a, and the end surface 73a of the yoke 70 may oppose one of the tooth portions 11a. In this state, the magnetic circuit operates as illustrated in FIG. 24.

In this case, the magnetic detection element 80 opposes the one tooth portion 11a and the one tooth portion 12a.

The magnetic flux generated from the magnet 60A goes from the magnetic flux path portion 74 to the one tooth portion 12a. The magnetic flux generated from the magnet 60B goes from the magnetic flux path portion 73 to the one tooth portion 11a.

The magnetic flux element 80 also allows passage of the magnetic flux from the magnetic flux path portion 73 and the magnetic flux from the magnetic flux path portion 74. Consequently, the magnetic detection element 80 allows passage of a composite magnetic flux, namely, a combination of the magnetic flux from the magnetic flux path portion 73 and the magnetic flux from the magnetic flux path portion 74.

The magnetic flux passing through the magnetic detection element 80 is directed radially inward around the axis S as indicated by arrow D. The magnetic detection element 80 outputs the sensor signal of signal level Sd.

According to the present embodiment as above, signal levels Sd, Se, and Sf are set to different values. Therefore, the magnetic detection element 80 outputs the sensor signal of signal level Se or Sf to the control device 50.

Then, the control device 50 determines that the multiple tooth portions 11a oppose any one of the hole portions 12b, and the multiple tooth portions 12a oppose any one of the hole portions 11b.

It is possible to provide the position detection device 20 that detects the position relationship between the clutch component portions 11 and 12.

The present embodiment configures the position detection device 20 by using the two magnets 60A and 60B. The magnetic flux detected by the magnetic detection element 80 increases similarly to the second embodiment. It is possible to improve the robustness of the position detection device 20.

The present embodiment configures the position detection device 20 by using two magnets 60A and 60B. Similar to the second embodiment, each of the magnets 60A and 60B can become reduced in size compared to the magnet 60 used for the position detection device 20 according to the first embodiment. Therefore, the position detection device 20 can be downsized.

According to the present embodiment, the magnets 60A and 60B are positioned so that the magnetic flux generated from the magnets 60A and 60B is directed toward the clutch component portions 11 and 12. Therefore, a change in the rotational position relationship between the clutch component portions 11 and 12 can increase a change in the direction of the magnetic flux detected by the magnetic detection element 80.

A dead zone is formed between the magnetic flux path portions 73 and 74 according to the present embodiment. The dead zone does not change the magnetic flux direction despite a change in the rotational position relationship between the clutch component portions 11 and 12. Therefore, the present embodiment positions the detection portion of the magnetic detection element 80 to be closer to the clutch component portions 11 and 12 than the dead zone.

Tenth Embodiment

The ninth embodiment has described the example of directing the N poles of the magnets 60A and 60B radially inward around the axis S and directing the S poles of the magnets 60A and 60B radially outward around the axis S.

Figure 25:
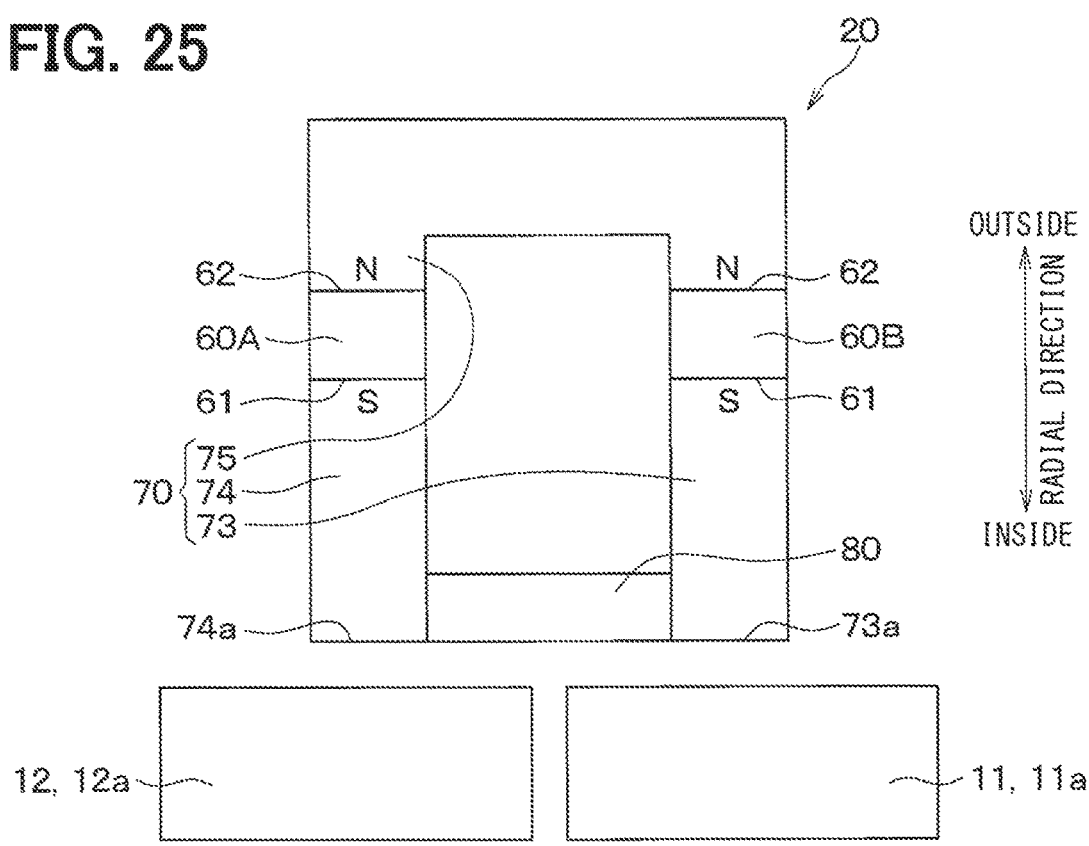
FIG. 25 is an enlarged view of the position detection device according to a tenth embodiment and is comparable to FIG. 4.

Instead, by reference to FIG. 25, the description below explains the tenth embodiment that directs the S poles of the magnets 60A and 60B radially inward around the axis S and directs the N poles of the magnets 60A and 60B radially outward around the axis S.

The present embodiment differs from the ninth embodiment in the positioning of the magnets 60A and 60B of the yoke 70 of the position detection device 20 and shares the other configurations with the ninth embodiment. The description below explains the magnets 60A and 60B according to the present embodiment.

The magnets 60A and 60B are positioned so that the corresponding faces 61 are oriented radially inward around the axis S. Consequently, the magnets 60A and 60B are positioned so that the corresponding S poles are oriented radially inward around the axis S.

The magnets 60A and 60B are positioned so that the corresponding faces 62 are oriented radially outward around the axis S. Consequently, the magnets 60A and 60B are positioned so that the corresponding N poles are oriented radially outward around the axis S.

According to the present embodiment, the magnets 60A and 60B along with the magnetic flux path portion 75 of the yoke 70 configure a magnetic field generator. The face 61 of the magnet 60A configures a first magnetic pole portion. The face 62 of the magnet 60A configures a third magnetic pole portion. The face 61 of the magnet 60B configures a second magnetic pole portion. The face 62 of the magnet 60B configures a fourth magnetic pole portion.

The faces 61 of the magnets 60A and 60B provide the same polarity. The faces 62 of the magnets 60A and 60B provide the same polarity.

Based on the above-described configuration according to the present embodiment, the magnetic detection element 80 outputs sensor signals, representing the rotational position relationship between the clutch component portions 11 and 12, to the control device 50 according to (i), (j), (k), and (l) described below.

Figure 26:
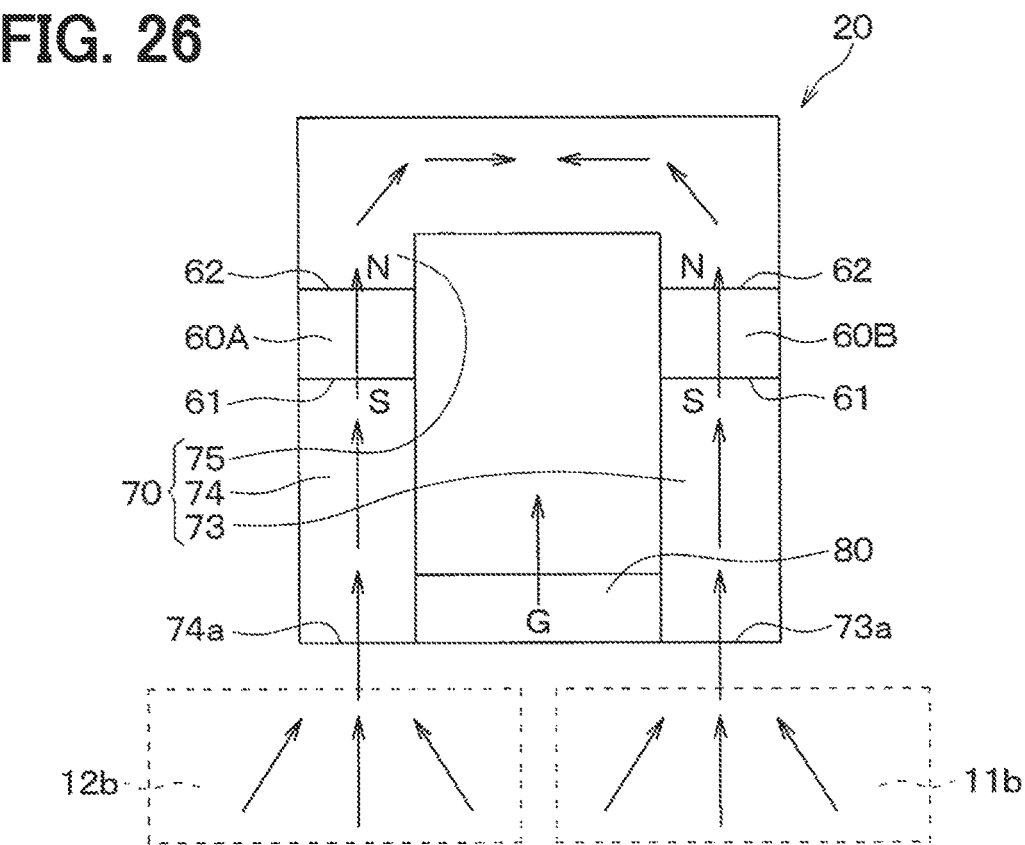
FIG. 26 is a diagram illustrating a state where the end surface of the position detection device in FIG. 25 according to the tenth embodiment at one side in the axial direction opposes a hole portion of the clutch component portion at one side and the end surface thereof at the other side in the axial direction opposes a hole portion of the clutch component portion at the other side.

(i) The end surface 74a of the yoke 70 may oppose one of the hole portions 12b, and the end surface 73a of yoke 70 may oppose one of the hole portions 11b. In this state, the magnetic circuit operates as illustrated in FIG. 26.

In this case, the magnetic detection element 80 opposes the one hole portion 11b and the one hole portion 12b.

The magnetic flux generated from the N pole of the magnet 60A is emitted to the outside from the magnetic flux path portion 75. The emitted magnetic flux passes through the outside of the magnetic flux path portion 74, the one hole portion 12b, the end surface 74a, the magnetic flux path portion 74, and the S pole of the magnet 60A, and then goes to the N pole of the magnet 60A.

The magnetic flux generated from the N pole of the magnet 60B is emitted to the outside from the magnetic flux path portion 75. The emitted magnetic flux passes through the outside of the magnetic flux path portion 73, the one hole portion 11b, the end surface 73a, the magnetic flux path portion 73, and the S pole of the magnet 60B, and then goes to the N pole of the magnet 60B.

The magnetic flux element 80 also allows passage of the magnetic flux from the one hole portion 11b and the one hole portion 12b. Consequently, the magnetic detection element 80 allows passage of a composite magnetic flux, namely, a combination of the magnetic flux from the one hole portion 11b and the magnetic flux from the one hole portion 12b. The magnetic flux passing through the detection portion of the magnetic detection element 80 is directed radially outward around the axis S as indicated by arrow G in FIG. 26. The magnetic detection element 80 outputs the sensor signal of signal level Sg indicating the direction of the magnetic flux detected by the detection portion.

Figure 27:
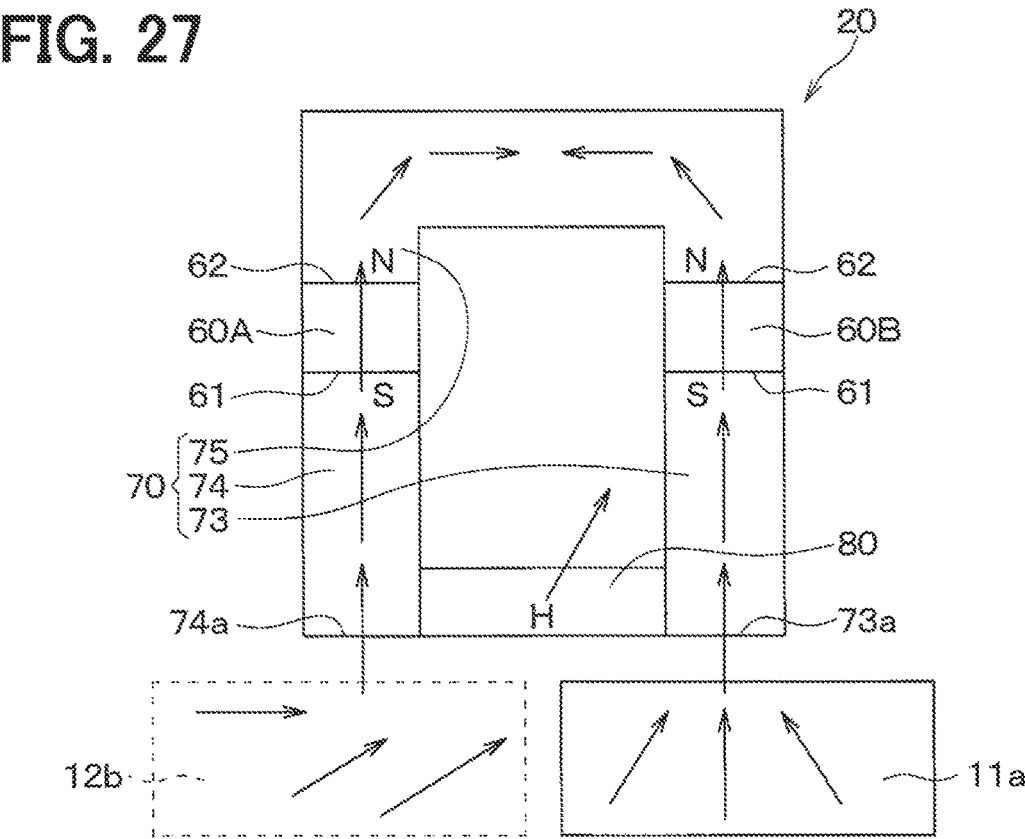
FIG. 27 is a diagram illustrating a state where the end surface of the position detection device in FIG. 25 according to the tenth embodiment at one side in the axial direction opposes a hole portion of the clutch component portion at one side and the end surface thereof at the other side in the axial direction opposes a tooth portion of the clutch component portion at the other side.

(j) The end surface 74a of the yoke 70 opposes one of the hole portions 12b, and the end surface 73a of the yoke 70 opposes one of the tooth portions 11a. In this state, the magnetic circuit operates as illustrated in FIG. 27.

In this case, the magnetic detection element 80 opposes the one tooth portion 11a and the one tooth portion 12b.

The magnetic flux generated from the N pole of the magnet 60A is emitted to the outside from the magnetic flux path portion 75. The emitted magnetic flux passes through the outside of the magnetic flux path portion 74, the one hole portion 12b, the end surface 74a, the magnetic flux path portion 74, and the S pole of the magnet 60A, and then goes to the N pole of the magnet 60A.

The magnetic flux generated from the N pole of the magnet 60B is emitted to the outside from the magnetic flux path portion 75. The emitted magnetic flux passes through the outside of the magnetic flux path portion 73, the one tooth portion 11a, the end surface 73a, the magnetic flux path portion 73, and the S pole of the magnet 60B, and then goes to the N pole of the magnet 60B.

The magnetic flux element 80 also allows passage of the magnetic flux from the one tooth portion 11a and the one hole portion 12b. Consequently, the detection portion of the magnetic detection element 80 allows passage of a composite magnetic flux, namely, a combination of the magnetic flux from the tooth portion 11a and the magnetic flux from the one hole portion 12b.

The one tooth portion 11a affects the direction of the magnetic flux passing through the magnetic detection element 80 as indicated by arrow H in FIG. 27. Arrow H is tilted from arrow G toward the other side in the axial direction. The magnetic detection element 80 outputs the sensor signal of signal level Sh indicating the direction of the magnetic flux detected by the detection portion.

Figure 28:
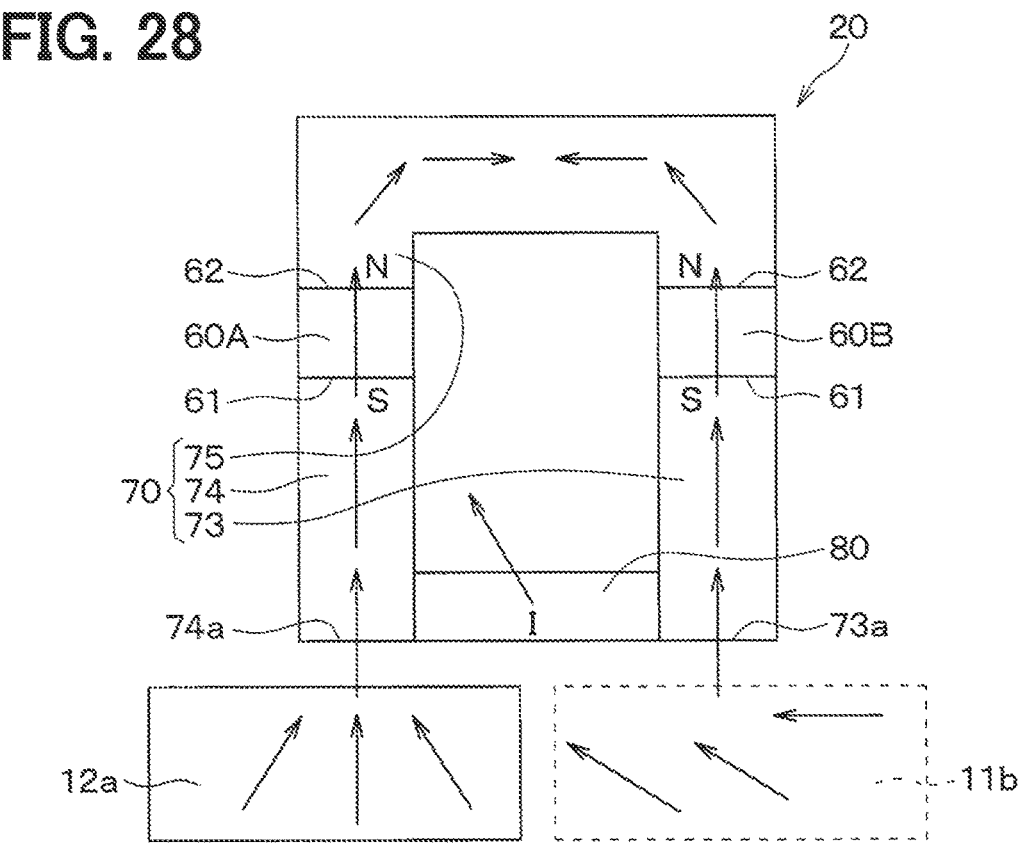
FIG. 28 is a diagram illustrating a state where the end surface of the position detection device in FIG. 25 according to the tenth embodiment at one side in the axial direction opposes a tooth portion of the clutch component portion at one side and the end surface thereof at the other side in the axial direction opposes a hole portion of the clutch component portion at the other side.

(k) The end surface 74a of the yoke 70 may oppose one of the tooth portions 12a, and the end surface 73a of the yoke 70 may oppose one of the hole portions 11b. In this state, the magnetic circuit operates as illustrated in FIG. 28.

In this case, the magnetic detection element 80 opposes the one hole portion 11b and the one tooth portion 12a.

The magnetic flux generated from the N pole of the magnet 60A is emitted to the outside from the magnetic flux path portion 75. The emitted magnetic flux passes through the outside of the magnetic flux path portion 74, the one tooth portion 12a, the end surface 74a, the magnetic flux path portion 74, and the S pole of the magnet 60A, and then goes to the N pole of the magnet 60A.

The magnetic flux generated from the N pole of the magnet 60B is emitted to the outside from the magnetic flux path portion 75. The emitted magnetic flux passes through the outside of the magnetic flux path portion 73, the one hole portion 11b, the end surface 73a, the magnetic flux path portion 73, and the S pole of the magnet 60B, and then goes to the N pole of the magnet 60B.

The magnetic flux element 80 also allows passage of the magnetic flux from the one tooth portion 12a and the one hole portion 11b. Consequently, the magnetic detection element 80 allows passage of a composite magnetic flux, namely, a combination of the magnetic flux from the tooth portion 12a and the magnetic flux from the one hole portion 11b. The one tooth portion 12a affects the direction of the magnetic flux passing through the magnetic detection element 80 as indicated by arrow I in FIG. 28. Arrow I is tilted from arrow G toward one side in the axial direction. The magnetic detection element 80 outputs the sensor signal of signal level Si indicating the direction of the magnetic flux detected by the detection portion.

Figure 29:
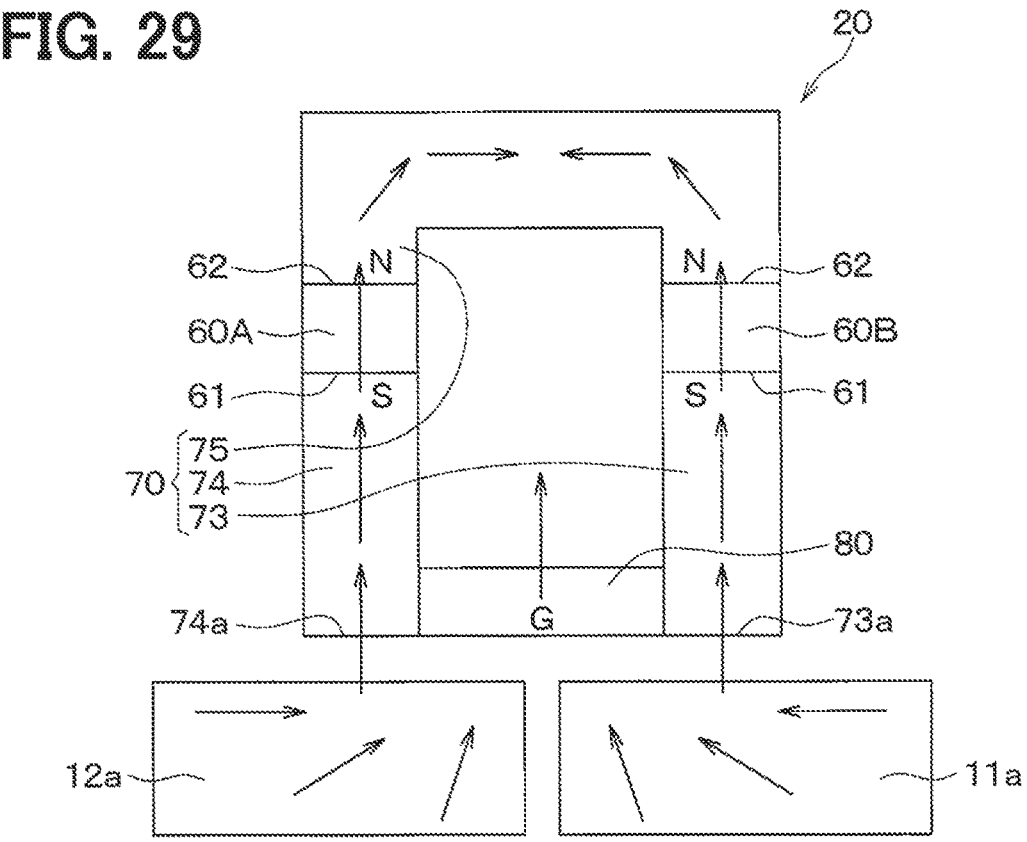
FIG. 29 is a diagram illustrating a state where the end surface of the position detection device in FIG. 25 according to the tenth embodiment at one side in the axial direction opposes a tooth portion of the clutch component portion at one side and the end surface thereof at the other side in the axial direction opposes a tooth portion of the clutch component portion at the other side.

(l) The end surface 74a of the yoke 70 may oppose one of the tooth portions 12a, and the end surface 73a of the yoke 70 may oppose one of the tooth portions 11a. In this state, the magnetic circuit operates as illustrated in FIG. 29.

In this case, the magnetic detection element 80 opposes the one tooth portion 11a and the one tooth portion 12a.

The magnetic flux generated from the N pole of the magnet 60A is emitted to the outside from the magnetic flux path portion 75. The emitted magnetic flux passes through the outside of the magnetic flux path portion 74, the one tooth portion 12a, the end surface 74a, the magnetic flux path portion 74, and the S pole of the magnet 60A, and then goes to the N pole of the magnet 60A. The magnetic flux generated from the N pole of the magnet 60B is emitted to the outside from the magnetic flux path portion 75. The emitted magnetic flux passes through the outside of the magnetic flux path portion 73, the one tooth portion 11a, the end surface 73a, the magnetic flux path portion 73, and the S pole of the magnet 60B, and then goes to the N pole of the magnet 60B.

The magnetic flux element 80 also allows passage of the magnetic flux from the one tooth portion 11a and the one tooth portion 12a. Consequently, the detection portion of the magnetic detection element 80 allows passage of a composite magnetic flux, namely, a combination of the magnetic flux from the tooth portion 11a and the magnetic flux from the one tooth portion 12a.

The magnetic flux passing through the detection portion of the magnetic detection element 80 is directed radially outward around the axis S as indicated by arrow G. The magnetic detection element 80 outputs the sensor signal of signal level Sg indicating the direction of the magnetic flux detected by the detection portion.

According to the present embodiment as above, signal levels Sg, Sh, and Si are set to different values. Therefore, the magnetic detection element 80 outputs the sensor signal of signal level Sh or Si to the control device 50.

Then, the control device 50 determines that the multiple tooth portions 11a oppose any one of the hole portions 12b, and the multiple tooth portions 12a oppose any one of the hole portions 11b.

It is possible to provide the position detection device 20 that detects the position relationship between the clutch component portions 11 and 12.

Similar to the ninth embodiment, the present embodiment also forms a dead zone between the magnetic flux path portions 73 and 74. The dead zone does not change the magnetic flux direction despite a change in the rotational position relationship between the clutch component portions 11 and 12. Therefore, the present embodiment positions the detection portion of the magnetic detection element 80 to be closer to the clutch component portions 11 and 12 than the dead zone.

Eleventh Embodiment

Figure 30:
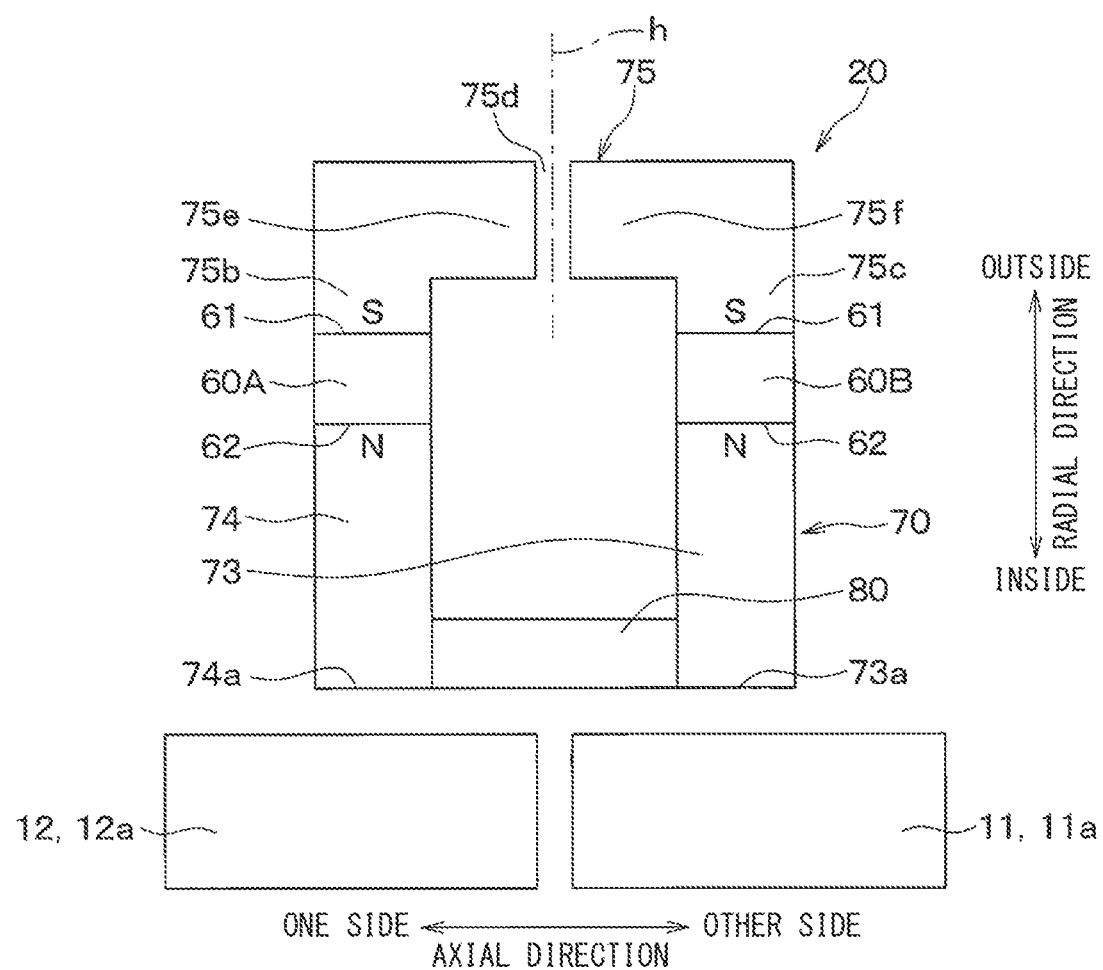
FIG. 30 is an enlarged view of the position detection device according to an eleventh embodiment and is comparable to FIG. 4.

By reference to FIG. 30, the eleventh embodiment explains an example of providing a gap 75d for the magnetic flux path portion 75 in the yoke 70 of the position detection device 20 according to the nine embodiment.

The present embodiment differs from the ninth embodiment in the magnetic flux path portion 75 and shares the other configurations with the ninth embodiment.

The magnetic flux path portion 75 according to the present embodiment includes axial paths 75e and 75f, and the protruding portions 75b and 75c. The axial paths 75e and 75f are positioned in the axial direction via the gap 75d. The axial path 75e is formed in the axial direction between centerline h (between the magnets 60A and 60B) and the face 61 of the magnet 60A. The axial path 75f is formed in the axial direction between the centerline h (between the magnets 60A and 60B) and the face 61 of the magnet 60B.

The protruding portion 75b projects from the end of the axial path 75e at one side in the axial direction toward the face 62 of the magnet 60A. The protruding portion 75c projects from the end of the axial path 75f at the other side in the axial direction toward the face 62 of the magnet 60B.

The axial path 75e and the protruding portion 75b configure a magnetic flux path that allows passage of the magnetic flux directed from the centerline h toward the face 61 of the magnet 60A. The axial path 75f and the protruding portion 75c configure a magnetic flux path that allows passage of the magnetic flux directed from the centerline h toward the face 61 of the magnet 60B.

According to the present embodiment as above, the magnetic detection element 80 outputs sensor signals, representing the rotational position relationship between the clutch component portions 11 and 12, to the control device 50 according to (e), (f), (g), and (h) similar to the ninth embodiment. It is possible to provide the position detection device 20 that detects the position relationship between the clutch component portions 11 and 12.

According to the present embodiment, the gap 75d is provided for the magnetic flux path portion 75, but the magnetic flux does not pass through the centerline h in the magnetic flux path portion 75. It is possible to decrease the effects on the magnetic detection element 80 that detects the magnetic flux direction.

Twelfth Embodiment

Figure 31:
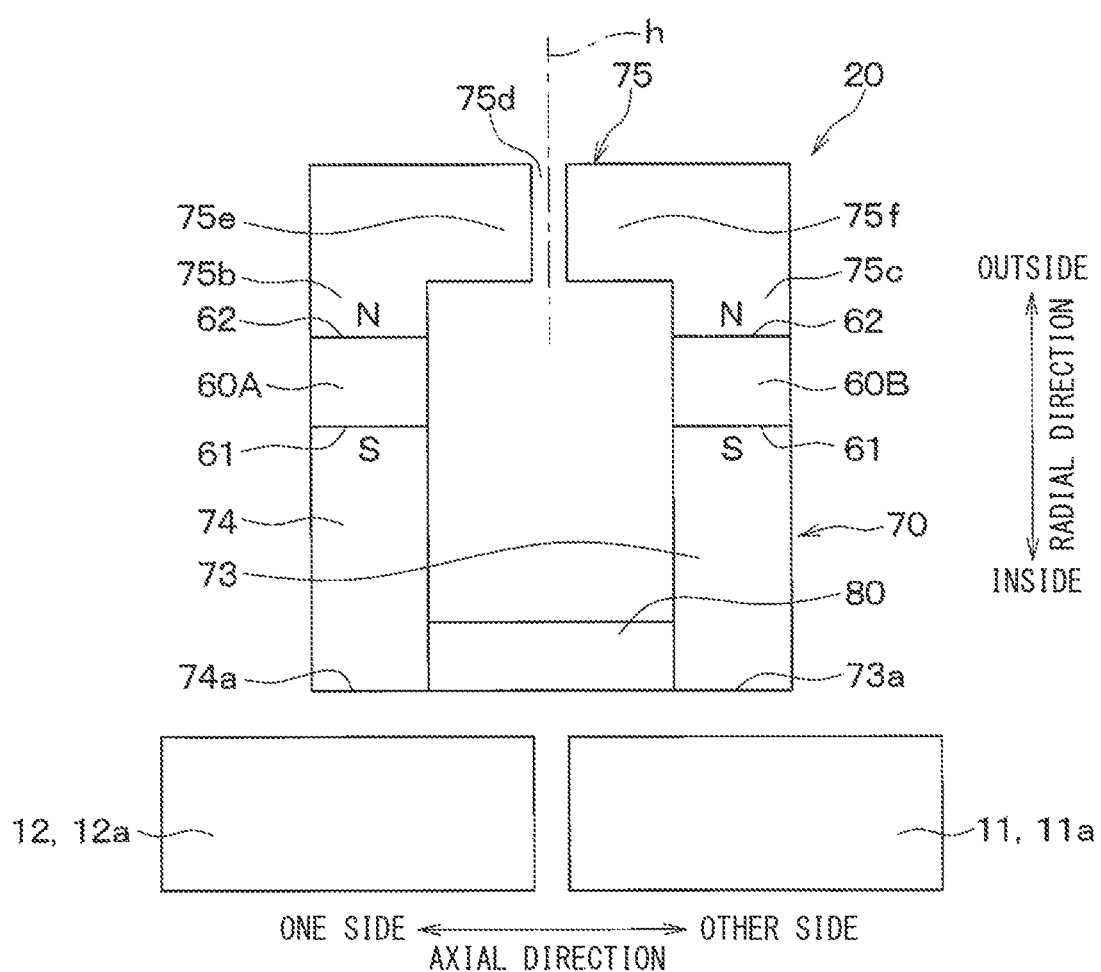
FIG. 31 is an enlarged view of the position detection device according to a twelfth embodiment and is comparable to FIG. 4.

By reference to FIG. 31, the twelfth embodiment explains an example of providing the gap 75d for the magnetic flux path portion 75 in the yoke 70 of the position detection device 20 according to the tenth embodiment.

The present embodiment differs from the tenth embodiment in the magnetic flux path portion 75 and shares the other configurations with the tenth embodiment.

Similar to the eleventh embodiment, the magnetic flux path portion 75 according to the present embodiment includes the axial paths 75e and 75f, and the protruding portions 75b and 75c.

The axial paths 75e and 75f are positioned in the axial direction via the gap 75d. The axial path 75e is formed in the axial direction between the centerline h (between the magnets 60A and 60B) and the face 62 of the magnet 60A. The axial path 75f is formed in the axial direction between the centerline h (between the magnets 60A and 60B) and the face 61 of the magnet 60B.

The protruding portion 75b protrudes from the end of the axial path 75e at one side toward the face 62 of the magnet 60A. The protruding portion 75c protrudes from the end of the axial path 75f at the other side toward the face 62 of the magnet 60B.

The axial path 75e and the protruding portion 75b configure a magnetic flux path that allows passage of the magnetic flux directed from the face 62 of the magnet 60A toward the centerline h. The axial path 75f and the protruding portion 75c configure a magnetic flux path that allows passage of the magnetic flux directed from the face 61 of the magnet 60B toward the centerline h.

According to the present embodiment, the magnetic detection element 80 outputs sensor signals, representing the rotational position relationship between the clutch component portions 11 and 12, to the control device 50 according to (i), (j), (k), and (l) similar to the tenth embodiment. It is possible to provide the position detection device 20 that detects the position relationship between the clutch component portions 11 and 12, particularly, concerning the tooth portion 11a and the hole portion 11b of the clutch component portion 11 and the tooth portion 12a and hole portion 12b of the clutch component portion 12.

According to the present embodiment, the gap 75d is provided for the magnetic flux path portion 75, but the magnetic flux does not pass through the centerline h in the magnetic flux path portion 75. It is possible to decrease the effects on the magnetic detection element 80 that detects the magnetic flux direction.

Thirteenth Embodiment

The fourth embodiment has described the example of providing the opposing faces 73b and 74b for the magnetic flux path portions 73 and 74 and positioning the face 62 of the magnet 60A and the face 61 of the magnet 60B toward the inside in the radial direction around the axis S.

Figure 32:
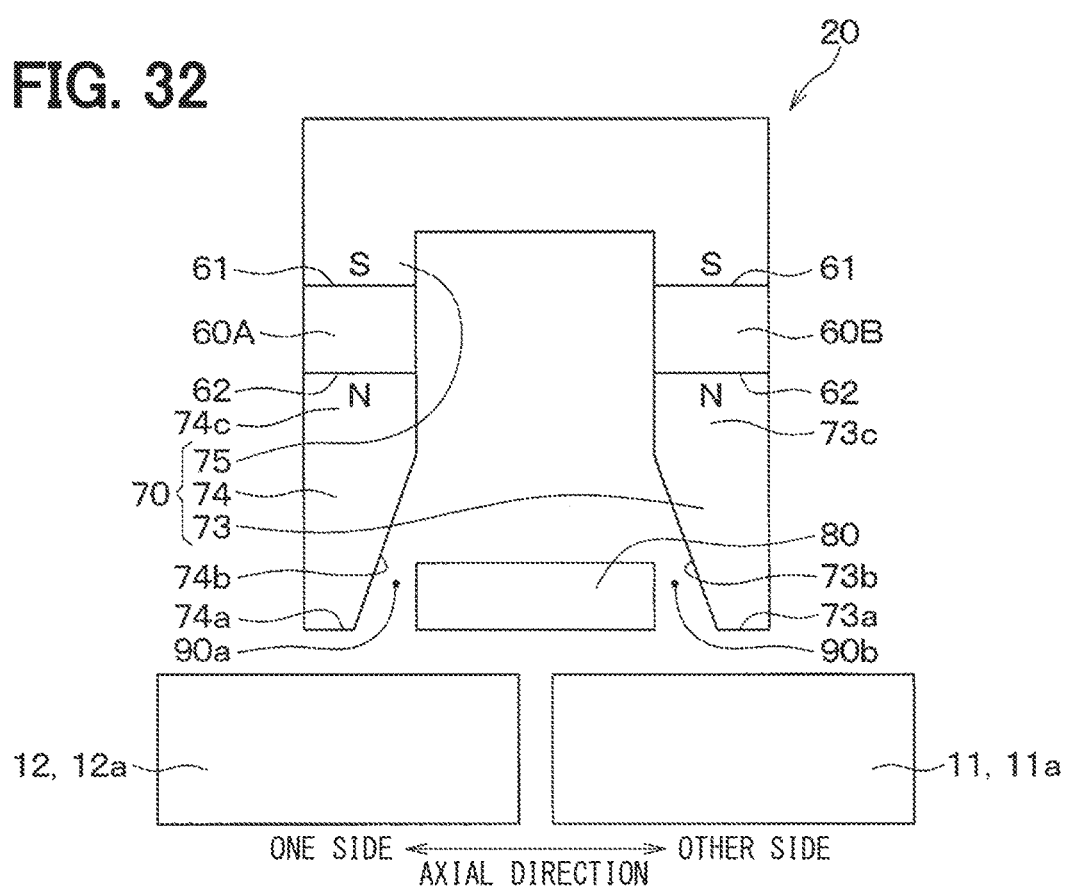
FIG. 32 is an enlarged view of a magnetic flux path portion in the position detection device according to a thirteenth embodiment.

Instead, by reference to FIG. 32, the description below explains the thirteenth embodiment that provides the opposing faces 73b and 74b for the magnetic flux path portions 73 and 74 and positions the faces 62 of the magnets 60A and 60B toward the inside in the radial direction around the axis S.

The present embodiment differs from the fourth embodiment in the orientations of the faces 61 and 62 of the magnets 60A and 60B and shares the other configurations with the fourth embodiment. The description below explains the orientations of the faces 61 and 62 of the magnets 60A and 60B according to the present embodiment.

According to the present embodiment, the faces 62 of the magnets 60A and 60B are positioned radially inward around the axis S. The faces 61 of the magnets 60A and 60B are positioned radially outward around the axis S.

Consequently, the N poles of the magnets 60A and 60B are positioned radially inward around the axis S. The S poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (e), (f), (g), and (h) similar to the ninth embodiment. It is possible to provide the position detection device 20 that detects the position relationship between the clutch component portions 11 and 12.

According to the present embodiment, the magnetic flux path portion 74 includes the opposing face 74b. It is possible to guide the magnetic flux from the N pole of the magnet 60A to the magnetic detection element 80. Moreover, the magnetic flux path portion 73 includes the opposing face 73b. It is possible to guide the magnetic flux from the N pole of the magnet 60B to the magnetic detection element 80.

When the clutch component portions 11 and 12 maintain the rotational position relationship of (e) or (h), the direction of the magnetic flux detected by the magnetic detection element 80 can highly accurately approximate the radial direction (vertical direction on the drawing) around the axis S. The magnetic detection element 80 detects a composite magnetic flux, namely, a combination of the magnetic flux from the magnetic flux path portion 73 and the magnetic flux from the magnetic flux path portion 74.

When the clutch component portions 11 and 12 maintain the rotational position relationship of (e) or (h), the direction of the magnetic flux detected by the magnetic detection element 80 highly accurately approximates the magnetic flux detection direction corresponding to the Y-axis Hall element of the magnetic detection element 80.

In the case of (e) or (h), it is possible to increase the magnetic flux passing through the magnetic detection element 80 in the magnetic flux detection direction of the Y-axis Hall element as compared with the ninth embodiment. In the case of (f), the tooth portion 12a can greatly influence the direction of the magnetic flux detected by the magnetic detection element 80. In the case of (g), the tooth portion 11a can greatly influence the direction of the magnetic flux detected by the magnetic detection element 80. The magnetic flux detection direction of the Y-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80 as compared with the ninth embodiment.

It is possible to improve the robustness of the magnetic detection element 80 and the position detection device 20.

Fourteenth Embodiment

The fifth embodiment has described the example of providing the opposing faces 73b and 74b for the magnetic flux path portions 73 and 74 and positioning the face 62 of the magnet 60A and the face 61 of the magnet 60B toward the inside in the radial direction around the axis S.

Instead, by reference to FIG. 33, the description below explains the fourteenth embodiment that provides the opposing faces 73b and 74b for the magnetic flux path portions 73 and 74 and positions the faces 62 of the magnets 60A and 60B toward the inside in the radial direction around the axis S.

According to the present embodiment, the faces 61 of the magnets 60A and 60B are positioned radially outward around the axis S.

Consequently, the magnets 60A and 60B are positioned so that the corresponding N poles are oriented radially inward around the axis S. The magnets 60A and 60B are positioned so that the corresponding S poles are oriented radially outward around the axis S.

Figure 33:
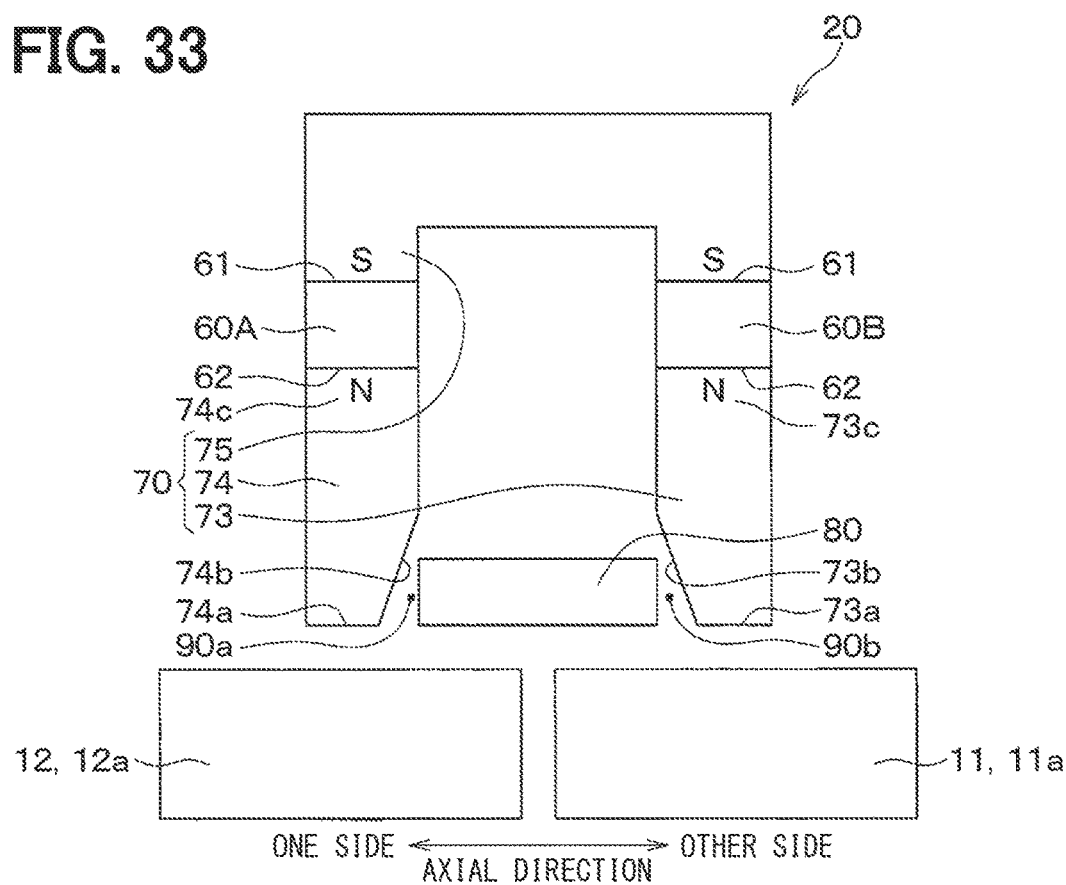
FIG. 33 is an enlarged view of a magnetic flux path portion in the position detection device according to a fourteenth embodiment.

As illustrated in FIG. 33, the present embodiment differs from the fifth embodiment in the orientations of the faces 61 and 62 of the magnets 60A and 60B and shares the other configurations with the fifth embodiment.

Fifteenth Embodiment

The seventh embodiment has described the example of curving the magnetic flux path portions 73 and 74 and positioning the face 62 of the magnet 60A and the face 61 of the magnet 60B toward the inside in the radial direction around the axis S.

Figure 34:
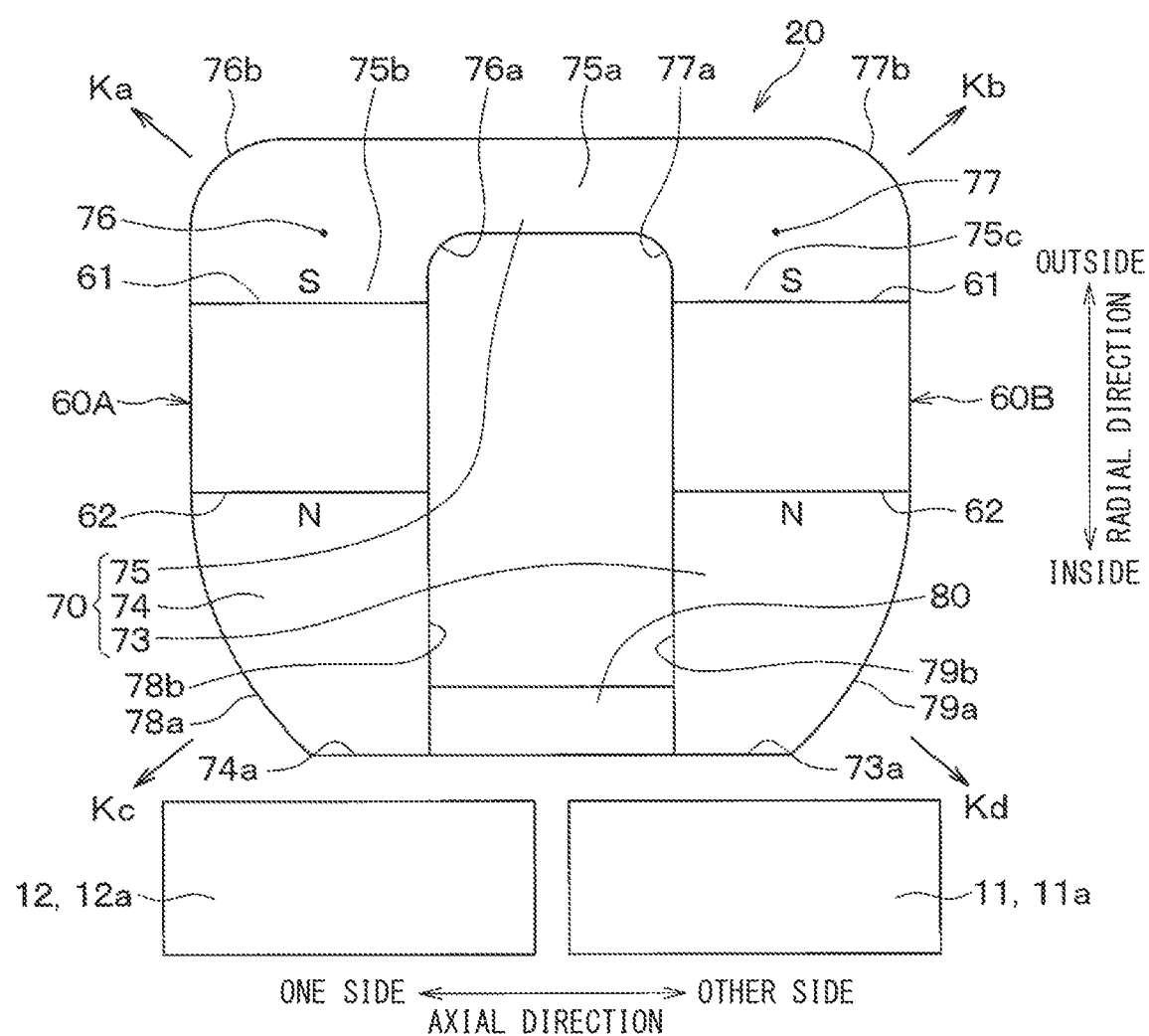
FIG. 34 is an enlarged view of a magnetic flux path portion in the position detection device according to a fifteenth embodiment.

Instead, by reference to FIG. 34, the description below explains the fifteenth embodiment that curves the magnetic flux path portions 73 and 74 and positions the faces 62 of the magnets 60A and 60B toward the inside in the radial direction around the axis S.

The present embodiment differs from the seventh embodiment in the orientations of the faces 61 and 62 of the magnets 60A and 60B and shares the other configurations with the seventh embodiment. The description below explains the orientations of the faces 61 and 62 of the magnets 60A and 60B according to the present embodiment.

According to the present embodiment similar to the ninth embodiment, the faces 62 of the magnets 60A and 60B are positioned radially inward around the axis S. The faces 61 of the magnets 60A and 60B are positioned radially outward around the axis S.

Consequently, the N poles of the magnets 60A and 60B are positioned radially inward around the axis S. The S poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (e), (f), (g), and (h) similar to the ninth embodiment. It is possible to provide the position detection device 20 that detects the position relationship between the clutch component portions 11 and 12.

According to the present embodiment, the outer peripheral portion 78a is comparable to a first side face that is axially positioned at one side of the magnetic flux path portion 74 and is formed from the end surface 74a radially toward the outside around the axial line. The inner peripheral portion 78b is comparable to a second side face that is axially positioned at the other side of the magnetic flux path portion 74 and is formed from the end surface 74a radially toward the outside around the axial line.

The outer peripheral portion 78a is curved so that the distance between the outer peripheral portion 78a and the inner peripheral portion 78b decreases as approaching the magnetic detection element 80 in the radial direction around the axis S. Therefore, the magnetic flux from the N pole of the magnet 60A can be guided to the magnetic detection element 80 and the end surface 74a.

According to the present embodiment, the inner peripheral portion 79b is comparable to a third side face that is axially positioned at one side of the magnetic flux path portion 73 and is formed from the end surface 73a radially toward the outside around the axis. The outer peripheral portion 79a is comparable to a fourth side face that is axially positioned at the other side of the magnetic flux path portion 74 and is formed from the end surface 73a radially toward the outside around the axial line.

The outer peripheral portion 79a is curved so that the distance between the outer peripheral portion 79a and the inner peripheral portion 79b decreases as approaching the magnetic detection element 80 in the radial direction around the axis S. It is possible to guide the magnetic flux from the N pole of the magnet 60B to the magnetic detection element 80 and the end surface 73a.

As above, the present embodiment can increase the magnetic flux density passing between the magnet 60A and the magnetic detection element 80 and the magnetic flux density passing between the magnet 60B and the magnetic detection element 80 as compared with the case of parallel forming the outer peripheral portions 78a and 79a in the radial direction around the axis S. The magnetic detection element 80 can satisfactorily detect the magnetic flux direction. It is possible to improve the robustness of the magnetic detection element 80 and the position detection device 20.

Sixteenth Embodiment

The eighth embodiment has described the example of positioning the magnetic detection element 80 to protrude from the end surfaces 73a and 74a radially inward around the axis S and positioning the face 62 of the magnet 60A and the face 61 of the magnet 60B radially inward around the axis S.

Figure 35:
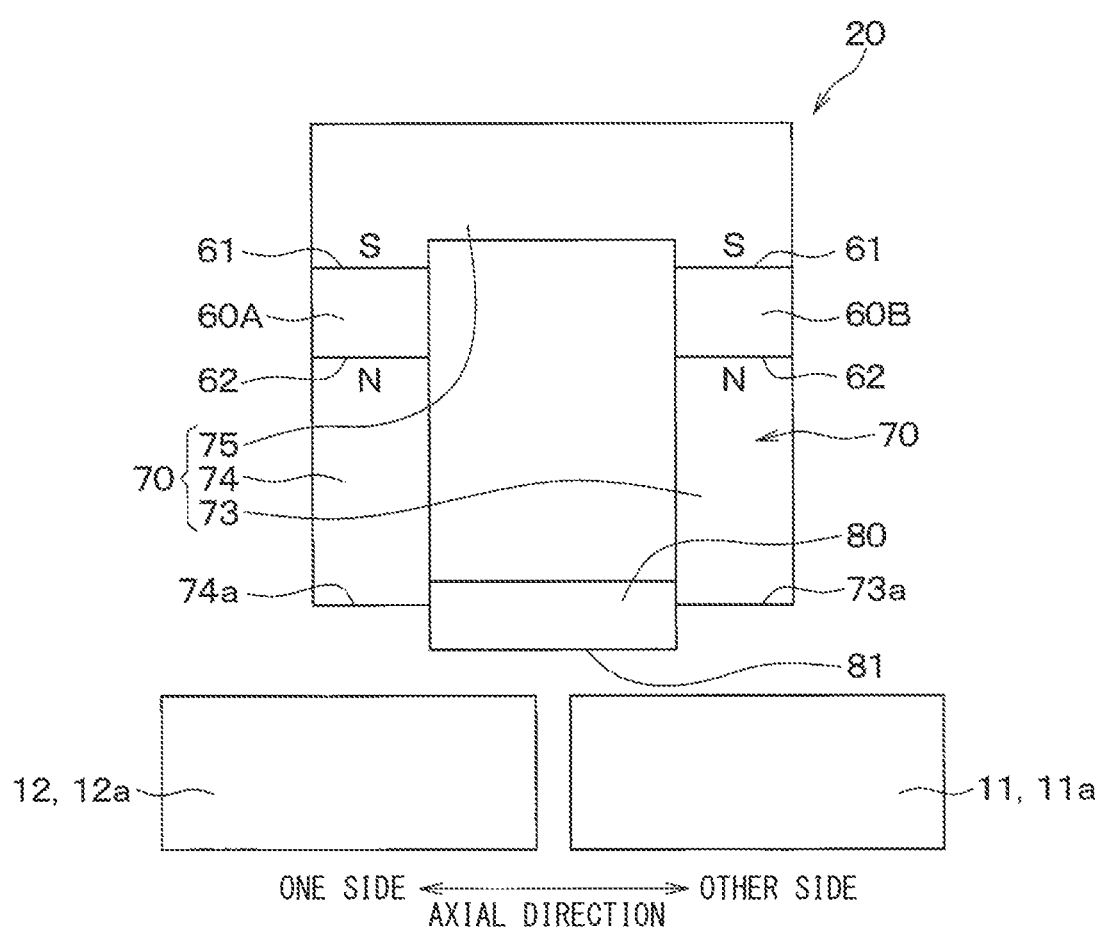
FIG. 35 is an enlarged view of a magnetic flux path portion in the position detection device according to a sixteenth embodiment.

Instead, by reference to FIG. 35, the description below explains the sixteenth embodiment that positions the magnetic detection element 80 to protrude from the end surfaces 73a and 74a radially inward around the axis S and positions the surfaces 62 of the magnets 60A and 60B radially inward.

The present embodiment differs from the eighth embodiment in the orientations of the faces 61 and 62 of the magnets 60A and 60B and shares the other configurations with the eighth embodiment. The description below explains the orientations of the faces 61 and 62 of the magnets 60A and 60B according to the present embodiment.

According to the present embodiment, similar to the ninth embodiment, the faces 62 of the magnets 60A and 60B are positioned radially inward around the axis S. The faces 61 of the magnets 60A and 60B are positioned radially outward around the axis S.

Consequently, the N poles of the magnets 60A and 60B are positioned radially inward around the axis S. The S poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (e), (f), (g), and (h) similar to the ninth embodiment. It is possible to provide the position detection device 20 that detects the position relationship between the clutch component portions 11 and 12.

According to the present embodiment, the magnetic detection element 80 can approach the clutch component portions 11 and 12 closer than the ninth embodiment. The magnetic detection element 80 can be positioned where the magnetic flux varies greatly. A change in the position relationship between the clutch component portions 11 and 12 increases a change in the direction of the magnetic flux passing through the magnetic detection element 80. It is possible to improve the robustness of the magnetic detection element 80 and the position detection device 20.

Seventeenth Embodiment

The thirteenth embodiment has described the example of providing the opposing faces 73b and 74b for the magnetic flux path portions 73 and 74 and positioning the faces 62 of the magnets 60A and 60B toward the inside in the radial direction around the axis S.

Figure 36:
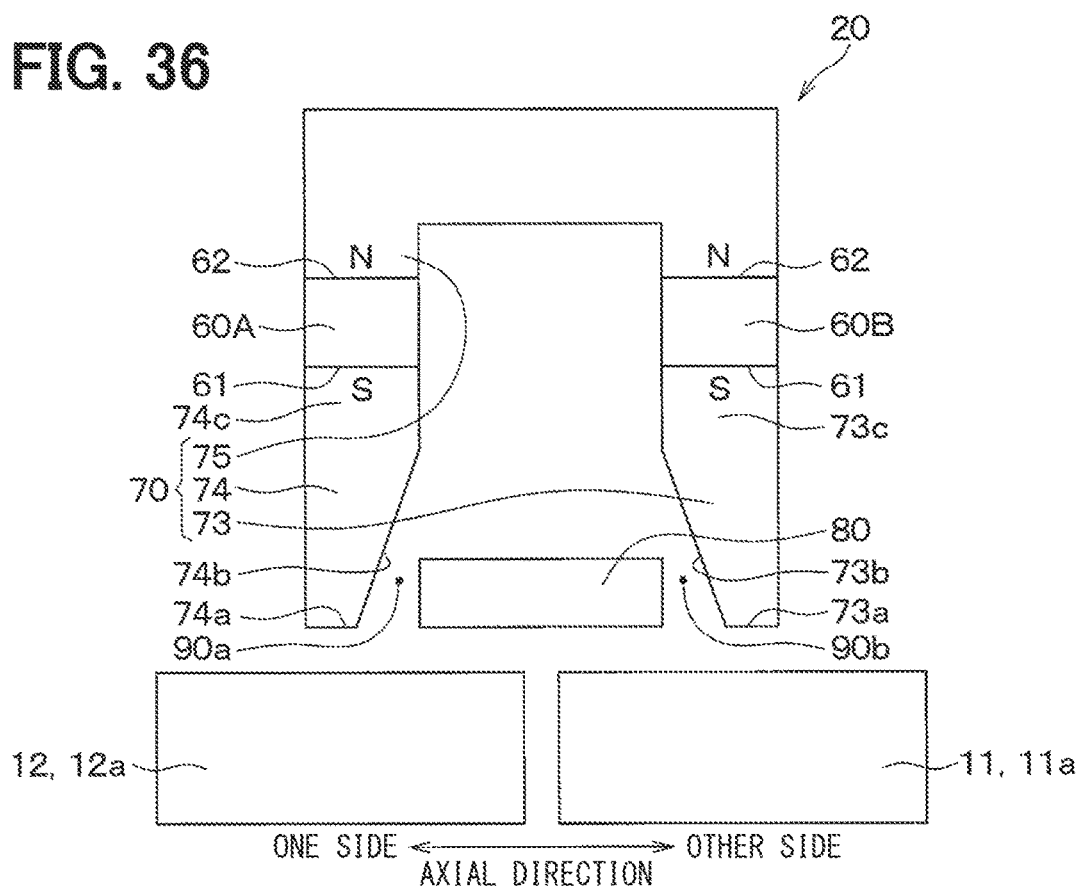
FIG. 36 is an enlarged view of a magnetic flux path portion in the position detection device according to a seventeenth embodiment.

Instead, by reference to FIG. 36, the description below explains the seventeenth embodiment that provides the opposing faces 73b and 74b for the magnetic flux path portions 73 and 74 and positions the faces 61 of the magnets 60A and 60B toward the inside in the radial direction around the axis S.

The present embodiment differs from the thirteenth embodiment in the orientations of the faces 61 and 62 of the magnets 60A and 60B and shares the other configurations with the thirteenth embodiment. The description below explains the orientations of the faces 61 and 62 of the magnets 60A and 60B according to the present embodiment.

According to the present embodiment, similar to the tenth embodiment, the faces 61 of the magnets 60A and 60B are positioned radially inward around the axis S. The faces 62 of the magnets 60A and 60B are positioned radially outward around the axis S.

Consequently, the S poles of the magnets 60A and 60B are positioned radially inward around the axis S. The N poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (i), (j), (k), and (l) similar to the tenth embodiment. It is possible to provide the position detection device 20 that detects the position relationship between the clutch component portions 11 and 12.

According to the present embodiment as above, the magnetic flux path portion 74 includes the opposing face 74b. It is possible to guide the magnetic flux from the magnetic detection element 80 to the face 61 of the magnet 60A. Moreover, the magnetic flux path portion 73 includes the opposing face 73b. It is possible to guide the magnetic flux from the magnetic detection element 80 to the face 61 of the magnet 60B.

When the clutch component portions 11 and 12 maintain the rotational position relationship of (i) or (l), the direction of the magnetic flux detected by the magnetic detection element 80 can highly accurately approximate the radial direction (vertical direction on the drawing) around the axis S.

When the clutch component portions 11 and 12 maintain the rotational position relationship of (i) or (l), the direction of the magnetic flux detected by the magnetic detection element 80 highly accurately approximates the magnetic flux detection direction corresponding to the Y-axis Hall element of the magnetic detection element 80.

In the case of (i) or (l), it is possible to increase the magnetic flux passing through the magnetic detection element 80 in the magnetic flux detection direction of the Y-axis Hall element as compared with the tenth embodiment. In the case of (j), the tooth portion 11a can greatly affect the direction of the magnetic flux detected by the magnetic detection element 80. In the case of (k), the tooth portion 12a can greatly influence the direction of the magnetic flux detected by the magnetic detection element 80.

The magnetic flux detection direction of the Y-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80 as compared with the tenth embodiment.

It is possible to improve the robustness of the magnetic detection element 80 and the position detection device 20.

Eighteenth Embodiment

The fourteenth embodiment has described the example of providing the opposing faces 73b and 74b for the magnetic flux path portions 73 and 74 and positioning the faces 62 of the magnets 60A and 60B toward the inside in the radial direction around the axis S.

Instead, by reference to FIG. 37, the description below explains the eighteenth embodiment that provides the opposing faces 73b and 74b for the magnetic flux path portions 73 and 74 and positions the faces 61 of the magnets 60A and 60B toward the inside in the radial direction around the axis S.

The present embodiment positions the faces 62 of the magnets 60A and 60B radially outward around the axis S.

Consequently, the N poles of the magnets 60A and 60B are positioned radially outward around the axis S. The S poles of the magnets 60A and 60B are positioned radially inward around the axis S.

Figure 37:
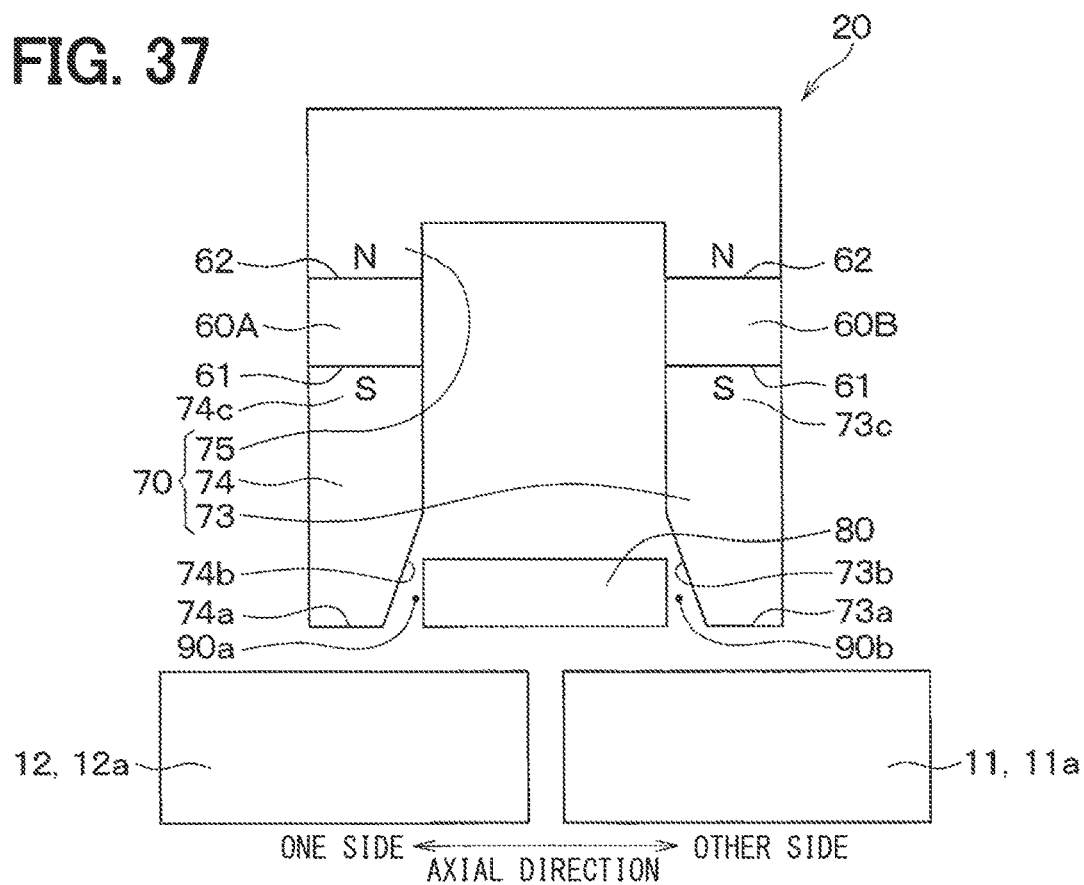
FIG. 37 is an enlarged view of a magnetic flux path portion in the position detection device according to an eighteenth embodiment.

As illustrated in FIG. 37, the present embodiment differs from the fifth embodiment in the orientations of the faces 61 and 62 of the magnets 60A and 60B and shares the other configurations with the fifth embodiment.

Nineteenth Embodiment

The fifteenth embodiment has described the example of curving the magnetic flux path portions 73 and 74 and positioning the faces 62 of the magnets 60A and 60B toward the inside in the radial direction around the axis S.

Figure 38:
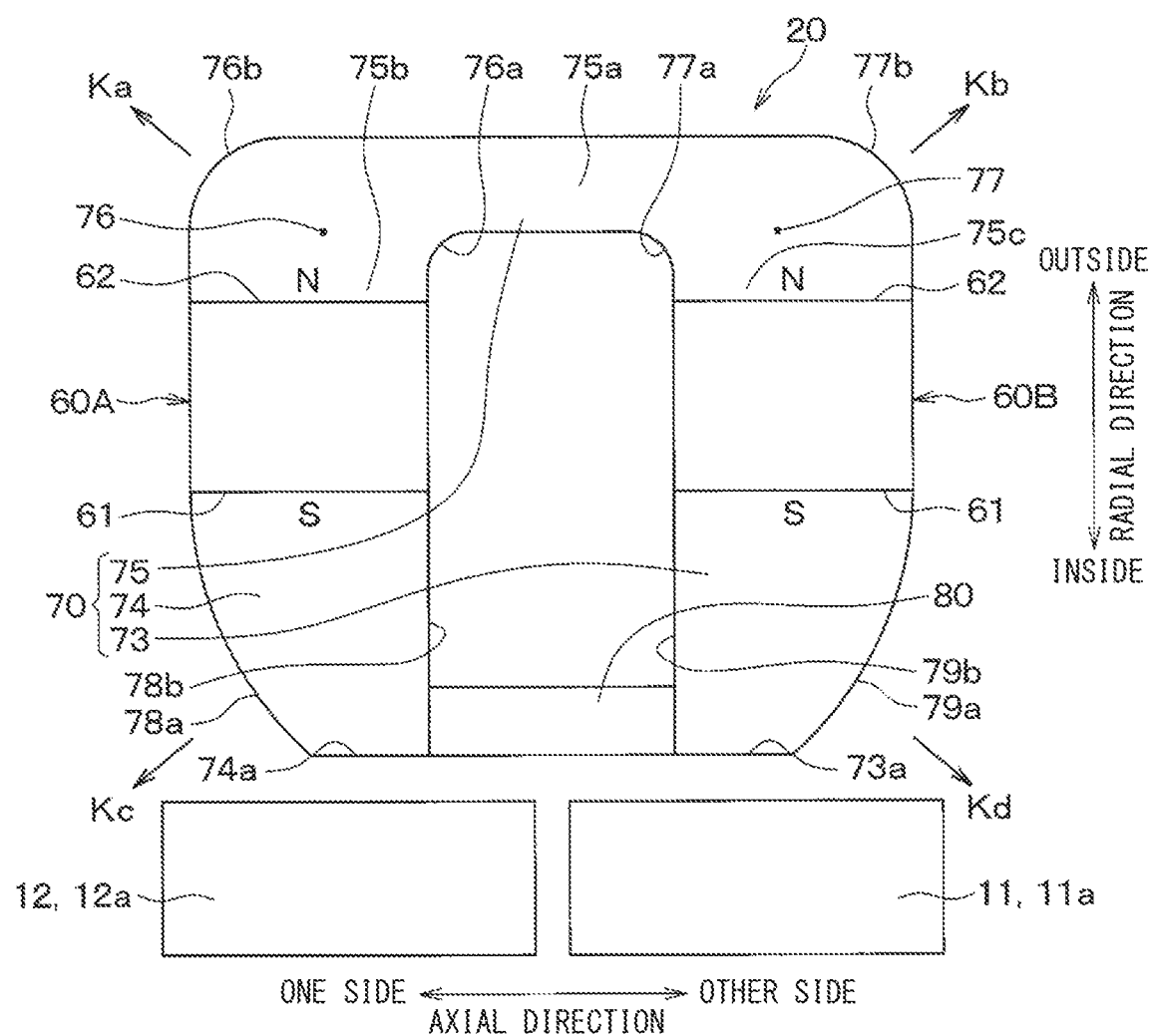
FIG. 38 is an enlarged view of a magnetic flux path portion in the position detection device according to a nineteenth embodiment.

Instead, by reference to FIG. 38, the description below explains the nineteenth embodiment that curves the magnetic flux path portions 73 and 74 and positions the faces 61 of the magnets 60A and 60B toward the inside in the radial direction around the axis S.

The present embodiment differs from the fifteenth embodiment in the orientations of the faces 61 and 62 of the magnets 60A and 60B and shares the other configurations with the fifteenth embodiment. The description below explains the orientations of the faces 61 and 62 of the magnets 60A and 60B according to the present embodiment.

According to the present embodiment, similar to the tenth embodiment, the faces 61 of the magnets 60A and 60B are positioned radially inward around the axis S. The faces 62 of the magnets 60A and 60B are positioned radially outward around the axis S.

Consequently, the S poles of the magnets 60A and 60B are positioned radially inward around the axis S. The N poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (i), (j), (k), and (l) similar to the tenth embodiment. It is possible to provide the position detection device 20 that detects the position relationship between the clutch component portions 11 and 12.

According to the present embodiment, similar to the fifteenth embodiment, the outer peripheral portion 78a is curved so that the distance between the outer peripheral portion 78a and the inner peripheral portion 78b decreases as approaching the magnetic detection element 80 in the radial direction around the axis S. Therefore, the magnetic flux from the magnetic detection element 80 and the end surface 74a can be guided to the S pole of the magnet 60A.

According to the present embodiment, similar to the fifteenth embodiment, the outer peripheral portion 79a is curved so that the distance between the outer peripheral portion 79a and the inner peripheral portion 79b decreases as approaching the magnetic detection element 80 in the radial direction around the axis S. It is possible to guide the magnetic flux from the magnetic detection element 80 and the end surface 74a to the S pole of the magnet 60B.

As above, the present embodiment can increase the magnetic flux density passing between the magnet 60A and the magnetic detection element 80 and the magnetic flux density passing between the magnet 60B and the magnetic detection element 80 as compared with the case of parallel forming the outer peripheral portions 78a and 79a in the radial direction around the axis S. The magnetic detection element 80 can satisfactorily detect the magnetic flux direction. It is possible to improve the robustness of the magnetic detection element 80 and the position detection device 20.

Twentieth Embodiment

The sixteenth embodiment has described the example of positioning the magnetic detection element 80 to protrude from the end surfaces 73a and 74a radially inward around the axis S and positioning the surfaces 62 of the magnets 60A and 60B radially inward around the axis S.

Figure 39:
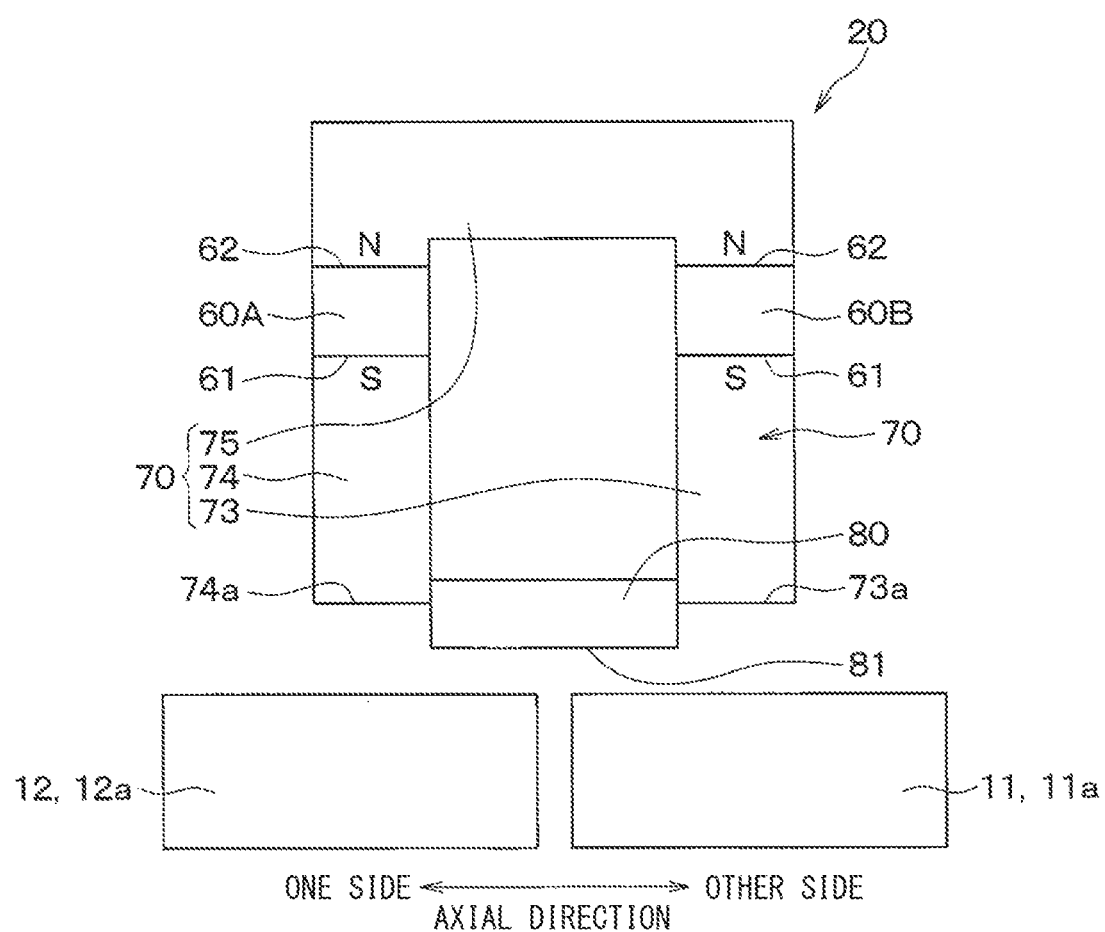
FIG. 39 is an enlarged view of a magnetic flux path portion in the position detection device according to a twentieth embodiment.

Instead, by reference to FIG. 39, the description below explains the twentieth embodiment that positions the magnetic detection element 80 to protrude from the end surfaces 73a and 74a radially inward around the axis S and positions the surfaces 61 of the magnets 60A and 60B radially inward.

The present embodiment differs from the sixteenth embodiment in the orientations of the faces 61 and 62 of the magnets 60A and 60B and shares the other configurations with the sixteenth embodiment. The description below explains the orientations of the faces 61 and 62 of the magnets 60A and 60B according to the present embodiment.

According to the present embodiment, similar to the tenth embodiment, the faces 61 of the magnets 60A and 60B are positioned radially inward around the axis S. The faces 62 of the magnets 60A and 60B are positioned radially outward around the axis S.

Consequently, the S poles of the magnets 60A and 60B are positioned radially inward around the axis S. The N poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (i), (j), (k), and (l) similar to the tenth embodiment. It is possible to provide the position detection device 20 that detects the position relationship between the clutch component portions 11 and 12.

According to the present embodiment, the magnetic detection element 80 can approach the clutch component portions 11 and 12 closer than the second embodiment. The magnetic detection element 80 can be positioned where the magnetic flux varies greatly. A change in the position relationship between the clutch component portions 11 and 12 increases a change in the direction of the magnetic flux passing through the magnetic detection element 80. It is possible to improve the robustness of the magnetic detection element 80 and the position detection device 20.

Twenty-First Embodiment

The sixteenth embodiment has described the example of forming the opposing face 73*b* of magnetic flux path portion 73 to approach the inside from the outside in the radial direction around the axis S according to the axial direction from one side to the other side.

Figure 40:
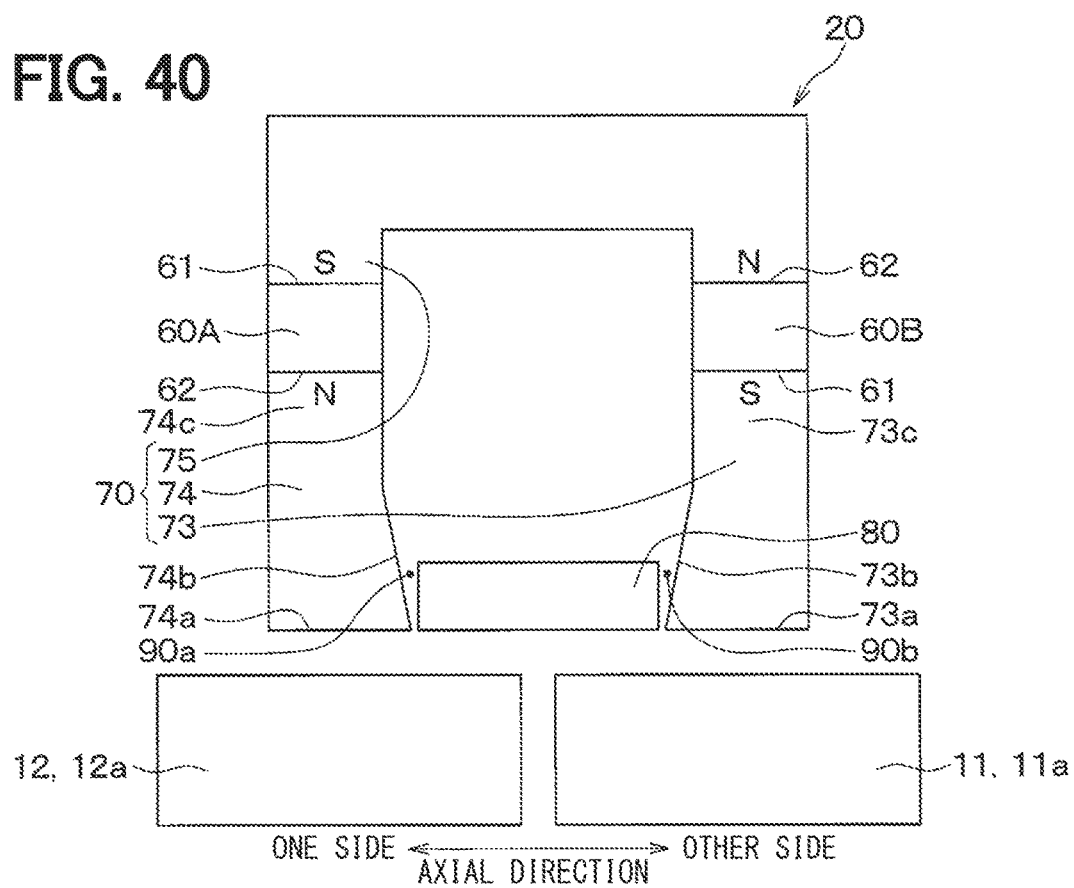
FIG. 40 is an enlarged view of a magnetic flux path portion in the position detection device according to a twenty-first embodiment.

Instead, by reference to FIG. 40, the description below explains the twenty-first embodiment that forms the opposing face 73*b* of magnetic flux path portion 73 to approach the outside from the inside in the radial direction around the axis S according to the axial direction from the other side to one side.

The opposing face 74*b* of the magnetic flux path portion 74 is formed to approach the outside from the inside in the radial direction around the axis S according to the axial direction from the other side to one side.

The present embodiment differs from the fourth embodiment in the tilting orientations of the opposing faces 73*b* and 74*b* and is equal to the fourth embodiment in the other configurations.

According to the present embodiment as above, similar to the fourth embodiment, the magnetic detection element 80 outputs sensor signals, representing the rotational position relationship between the clutch component portions 11 and 12, to the control device 50. It is possible to provide the position detection device 20 that detects the rotational position relationship between the clutch component portions 11 and 12.

Similar to the fourth embodiment, the present embodiment can generate a magnetic flux that passes through the opposing face 74*b*, the magnetic detection element 80, and the opposing face 73*b*. Similar to the fourth embodiment, the direction of the magnetic flux passing through the detection portion of the magnetic detection element 80 highly accurately approximates the magnetic flux detection direction corresponding to the X-axis Hall element of the magnetic detection element 80.

Similar to the fourth embodiment, it is possible to increase a change in the direction of the magnetic flux detected by the magnetic detection element 80. It is possible to improve the robustness of the magnetic detection element 80 and the position detection device 20.

Twenty-Second Embodiment

The twenty-first embodiment has described the example of providing the opposing faces 73*b* and 74*b* for the magnetic flux path portions 73 and 74 and positioning the face 62 of the magnet 60A and the face 61 of the magnet 60B toward the inside in the radial direction around the axis S.

Figure 41:
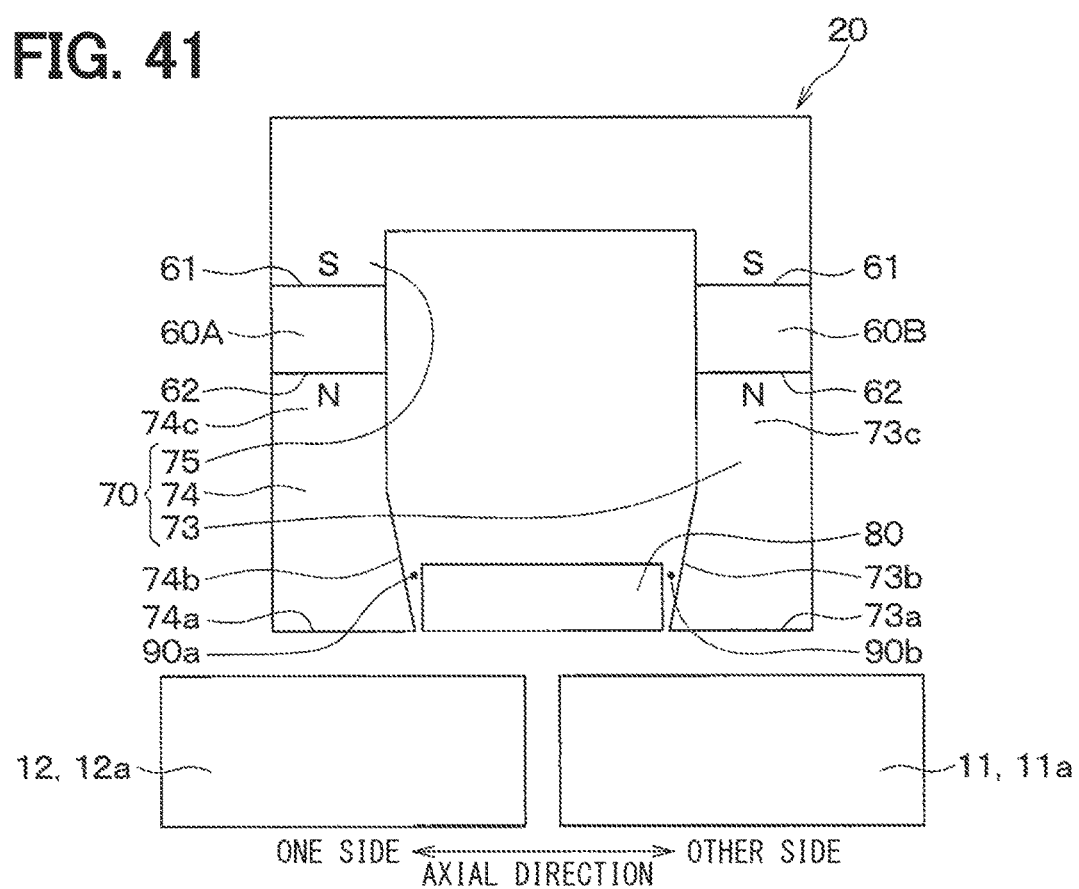
FIG. 41 is an enlarged view of a magnetic flux path portion in the position detection device according to a twenty-second embodiment.

Instead, by reference to FIG. 41, the description below explains the twenty-second embodiment that provides the opposing faces 73*b* and 74*b* for the magnetic flux path portions 73 and 74 and positions the faces 62 of the magnets 60A and 60B toward the inside in the radial direction around the axis S.

According to the present embodiment, similar to the twenty-first embodiment, the opposing face 73*b* of the magnetic flux path portion 73 is formed to approach the outside from the inside in the radial direction around the axis S according to the axial direction from one side to the other side.

Similar to the twenty-first embodiment, the opposing face 74*b* of the magnetic flux path portion 74 is formed to approach the outside from the inside in the radial direction around the axis S according to the axial direction from the other side to one side.

The present embodiment differs from the twenty-first embodiment in the orientations of the surfaces 61 and 62 of the magnets 60A and 60B and is equal to the twenty-first embodiment in the other configurations.

According to the present embodiment as above, similar to the ninth embodiment, the magnetic detection element 80 outputs sensor signals, representing the rotational position relationship between the clutch component portions 11 and 12, to the control device 50. It is possible to provide the position detection device 20 that detects the rotational position relationship between the clutch component portions 11 and 12.

According to the present embodiment, the opposing face 74*b* can guide the magnetic flux from the N pole of the magnet 60A to the magnetic detection element 80. The opposing face 73*b* can guide the magnetic flux from the N pole of the magnet 60B to the magnetic detection element 80. Similar to the thirteenth embodiment, the direction of the magnetic flux passing through the detection portion of the magnetic detection element 80 highly accurately approximates the magnetic flux detection direction corresponding to the Y-axis Hall element of the magnetic detection element 80.

Similar to the thirteenth embodiment, it is possible to increase a change in the direction of the magnetic flux detected by the magnetic detection element 80. It is possible to improve the robustness of the magnetic detection element 80 and the position detection device 20.

Twenty-Third Embodiment

The twenty-second embodiment has described the example of providing the opposing faces 73*b* and 74*b* for the magnetic flux path portions 73 and 74 and positioning the faces 62 of the magnets 60A and 60B toward the inside in the radial direction around the axis S.

Figure 42:
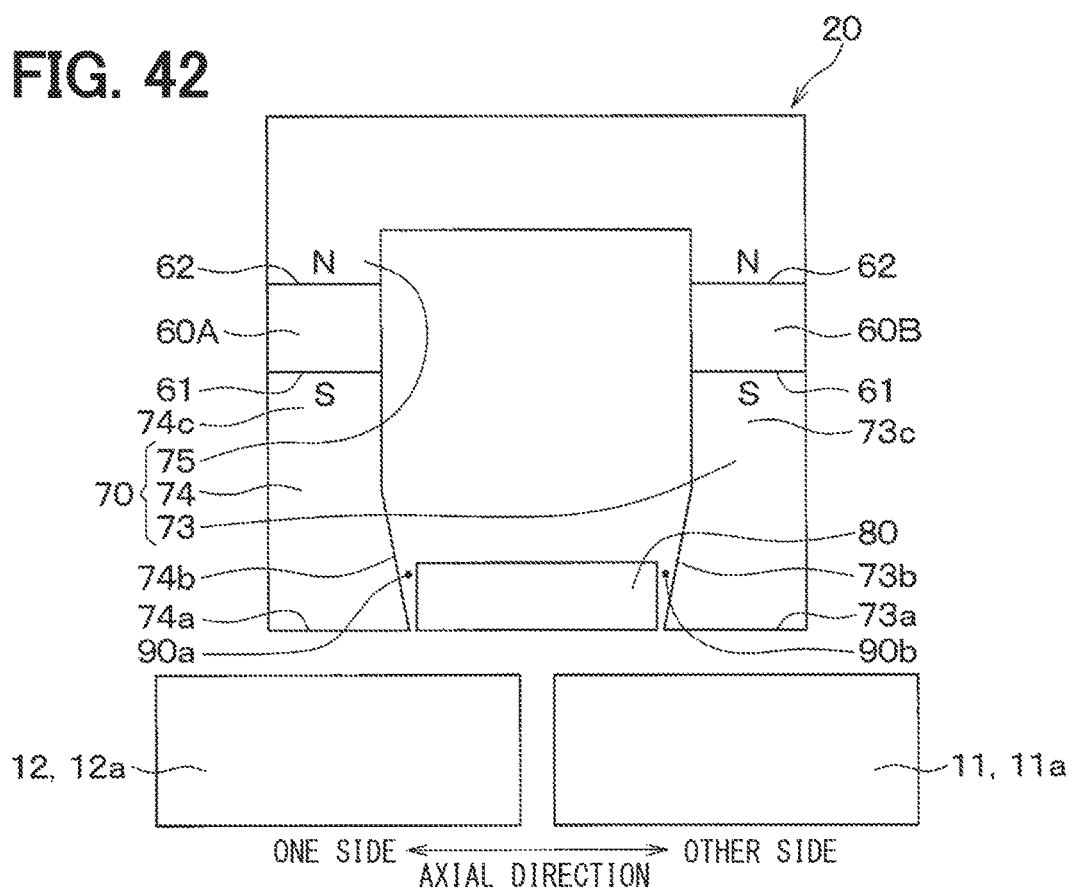
FIG. 42 is an enlarged view of a magnetic flux path portion in the position detection device according to a twenty-third embodiment.

Instead, by reference to FIG. 42, the description below explains the twenty-third embodiment that provides the opposing faces 73*b* and 74*b* for the magnetic flux path portions 73 and 74 and positions the faces 61 of the magnets 60A and 60B toward the inside in the radial direction around the axis S.

According to the present embodiment, similar to the twenty-second embodiment, the opposing face 73*b* of the magnetic flux path portion 73 is formed to approach the outside from the inside in the radial direction around the axis S according to the axial direction from one side to the other side.

Similar to the twenty-first embodiment, the opposing face 74*b* of the magnetic flux path portion 74 is formed to approach the outside from the inside in the radial direction around the axis S according to the axial direction from the other side to one side.

The present embodiment differs from the twenty-second embodiment in the orientations of the surfaces 61 and 62 of the magnets 60A and 60B and is equal to the twenty-second embodiment in the other configurations.

According to the present embodiment as above, similar to the tenth embodiment, the magnetic detection element 80 outputs sensor signals, representing the rotational position relationship between the clutch component portions 11 and 12, to the control device 50. It is possible to provide the position detection device 20 that detects the rotational position relationship between the clutch component portions 11 and 12.

According to the present embodiment, the opposing face 74*b* can guide the magnetic flux from the magnetic detection element 80 to the S pole of the magnet 60A. The opposing face 73*b* can guide the magnetic flux from the magnetic detection element 80 to the S pole of the magnet 60B. Similar to the twenty-second embodiment, the direction of the magnetic flux passing through the detection portion of the magnetic detection element 80 highly accurately approximates the magnetic flux detection direction corresponding to the Y-axis Hall element of the magnetic detection element 80.

In the case of (i) or (l), it is possible to increase the magnetic flux passing through the magnetic detection element 80 in the magnetic flux detection direction of the Y-axis Hall element as compared with the tenth embodiment. In the case of (j), the tooth portion 11*a* can greatly affect the direction of the magnetic flux detected by the magnetic detection element 80. In the case of (k), the tooth portion 12*a* can greatly influence the direction of the magnetic flux detected by the magnetic detection element 80.

Similar to the twenty-second embodiment, it is possible to increase a change in the direction of the magnetic flux detected by the magnetic detection element 80. It is possible to improve the robustness of the magnetic detection element 80 and the position detection device 20.

Twenty-Fourth Embodiment

The third embodiment has described the example of providing the protruding portions 73*d* and 74*d* for the magnetic flux path portions 73 and 74 and positioning the face 62 of the magnet 60A and the face 61 of the magnet 60B toward the inside in the radial direction around the axis S.

Figure 43:
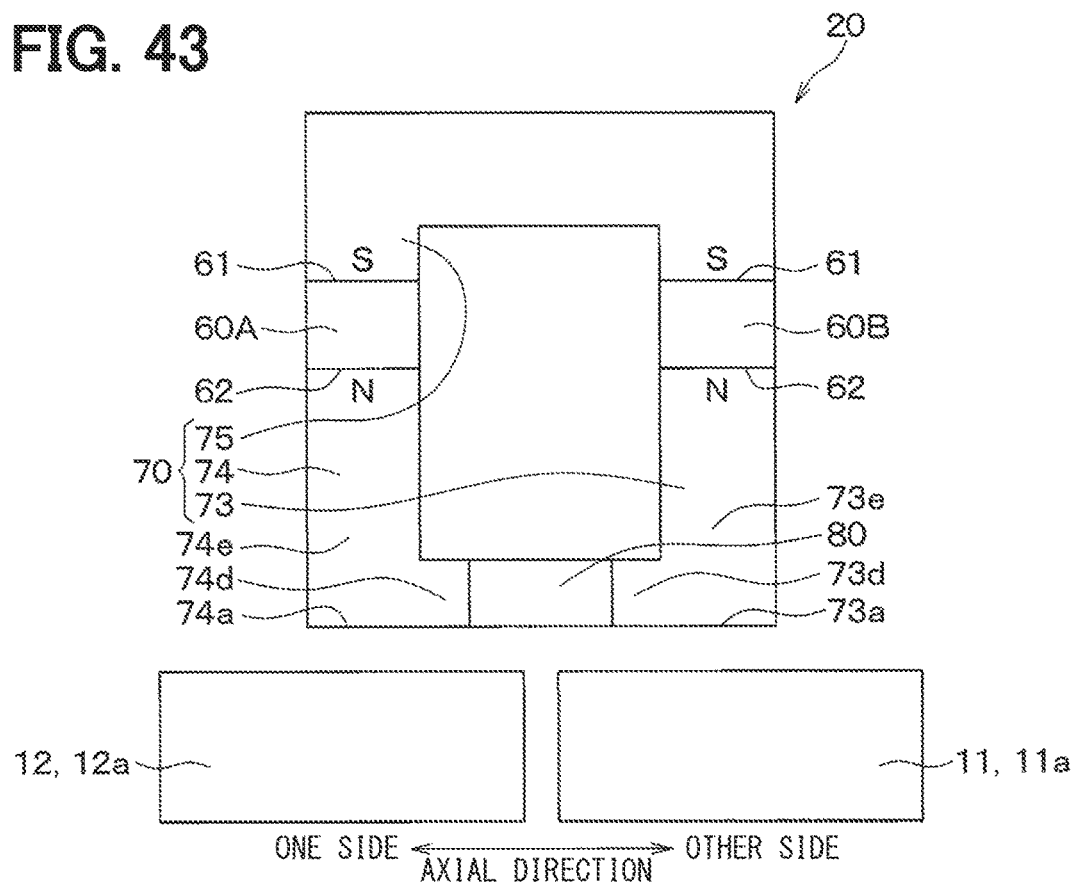
FIG. 43 is an enlarged view of a magnetic flux path portion in the position detection device according to a twenty-fourth embodiment.

Instead, by reference to FIG. 43, the description below explains the twenty-fourth embodiment that provides the protruding portions 73*d* and 74*d* for the magnetic flux path portions 73 and 74 and positions the faces 62 of the magnets 60A and 60B toward the inside in the radial direction around the axis S.

The present embodiment differs from the third embodiment in the orientations of the faces 61 and 62 of the magnets 60A and 60B and shares the other configurations with the third embodiment. The description below explains the orientations of the faces 61 and 62 of the magnets 60A and 60B according to the present embodiment.

According to the present embodiment, similar to the ninth embodiment, the faces 62 of the magnets 60A and 60B are positioned radially inward around the axis S. The faces 61 of the magnets 60A and 60B are positioned radially outward around the axis S.

Consequently, the N poles of the magnets 60A and 60B are positioned radially inward around the axis S. The S poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (e), (f), (g), and (h) similar to the ninth embodiment. It is possible to provide the position detection device 20 that detects the position relationship between the clutch component portions 11 and 12.

As above, the protruding portions 73*d* and 74*d* are provided for the magnetic flux path portions 73 and 74 of the yoke 70 of the position detection device 20 according to the present embodiment. The protruding portion 74*d* is a first protruding portion that protrudes toward the magnetic detection element 80 from the end of the radial magnetic flux path portion 74*e* toward the radial inside around the axis S. The protruding portion 73*d* is a second protruding portion that protrudes toward the magnetic detection element 80 from the end of the radial magnetic flux path portion 73*e* toward the radial inside around the axis S.

The magnetic detection element 80 is sandwiched between the protruding portions 73*d* and 74*d*. The protruding portion 74*d* guides the magnetic flux passing through the radial magnetic flux path portion 74*e* to the magnetic detection element 80. The protruding portion 73*d* guides the magnetic flux passing through the radial magnetic flux path portion 73*e* to the magnetic detection element 80.

As above, the present embodiment provides the yoke 70 with the officer portions 73*d* and 74*d*. When the clutch component portions 11 and 12 maintain the rotational position relationship of (e) or (h), the direction of the magnetic flux passing through the detection portion of the magnetic detection element 80 can highly accurately approximate the radial direction (vertical direction on the drawing).

When the clutch component portions 11 and 12 maintain the rotational position relationship of (e) or (h), the direction of the magnetic flux detected by the magnetic detection element 80 highly accurately approximates the magnetic flux detection direction corresponding to the Y-axis Hall element of the magnetic detection element 80.

The magnetic flux detection direction of the Y-axis Hall element may be used as a reference for the magnetic detection element 80 to detect the magnetic flux direction. Then, similar to the thirteenth embodiment, a change in the position relationship between the clutch component portions 11 and 12 can increase a change in the magnetic flux direction detected by the magnetic detection element 80.

Moreover, as above, the present embodiment provides the yoke 70 with the officer portions 73*d* and 74*d*. It is possible to increase the magnetic flux density passing through the magnetic detection element 80 between the magnetic flux path portions 74 and 73.

It is possible to improve the robustness of the magnetic detection element 80 and the position detection device 20.

Twenty-Fifth Embodiment

The twenty-fourth embodiment has described the example of providing the protruding portions 73*d* and 74*d* for the magnetic flux path portions 73 and 74 and positioning the faces 62 of the magnets 60A and 60B toward the inside in the radial direction around the axis S.

Figure 44:
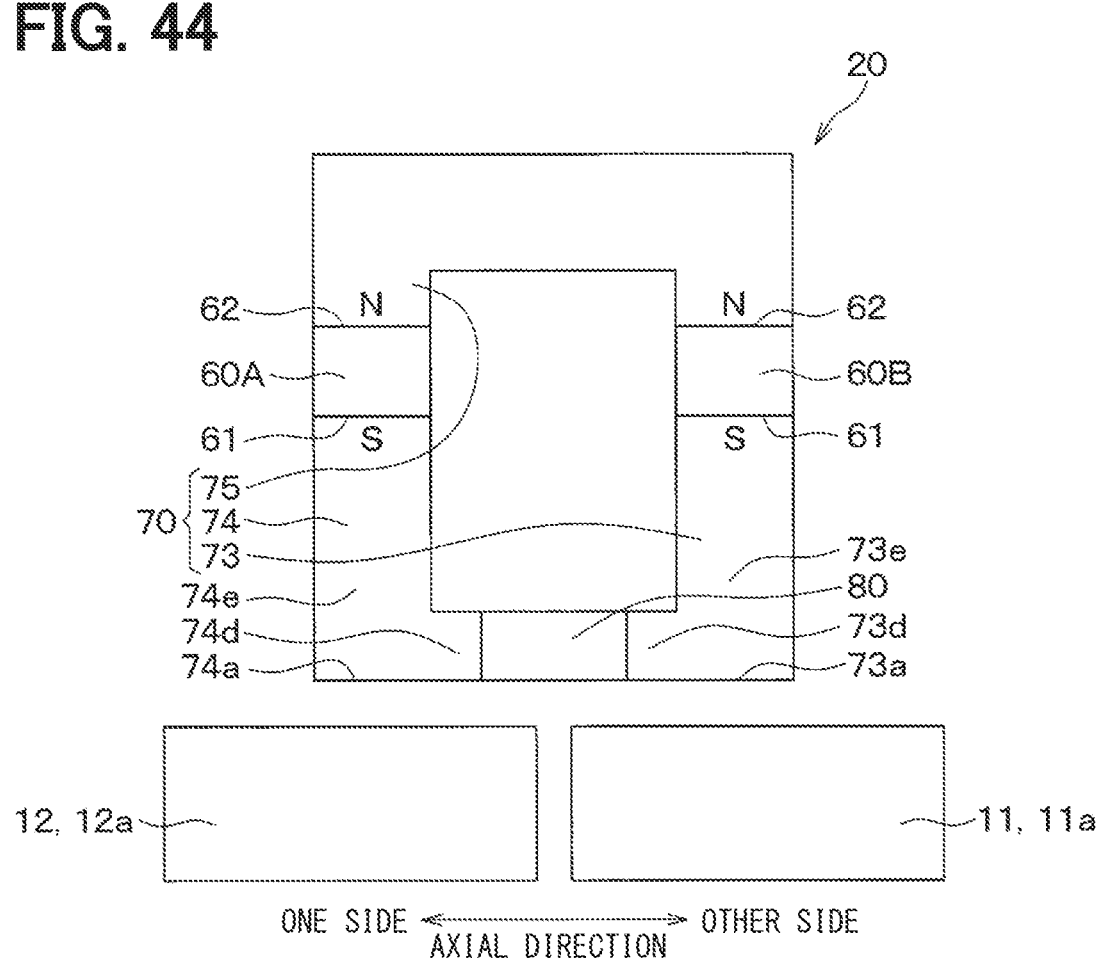
FIG. 44 is an enlarged view of a magnetic flux path portion in the position detection device according to a twenty-fifth embodiment.

Instead, by reference to FIG. 44, the description below explains the twenty-fifth embodiment that provides the protruding portions 73*d* and 74*d* for the magnetic flux path portions 73 and 74 and positions the faces 61 of the magnets 60A and 60B toward the inside in the radial direction around the axis S.

The present embodiment differs from the twenty-fourth embodiment in the orientations of the faces 61 and 62 of the magnets 60A and 60B and shares the other configurations with the twenty-fourth embodiment. The description below explains the orientations of the faces 61 and 62 of the magnets 60A and 60B according to the present embodiment.

According to the present embodiment, similar to the tenth embodiment, the faces 61 of the magnets 60A and 60B are positioned radially inward around the axis S. The faces 62 of the magnets 60A and 60B are positioned radially outward around the axis S.

Consequently, the S poles of the magnets 60A and 60B are positioned radially inward around the axis S. The N poles of the magnets 60A and 60B are positioned radially outward around the axis S.

According to the present embodiment as above, the magnetic detection element 80 outputs sensor signals, representing the rotational position relationship between the clutch component portions 11 and 12, to the control device 50 according to (i), (j), (k), and (l) similar to the tenth embodiment. It is possible to provide the position detection device 20 that detects the rotational position relationship between the clutch component portions 11 and 12.

It is possible to provide the position detection device 20 that detects the position relationship between the clutch component portions 11 and 12.

According to the present embodiment, the protruding portion 74d guides the magnetic flux passing through the magnetic detection element 80 to the S pole of the magnet 60A. The protruding portion 73d guides the magnetic flux passing through the magnetic detection element 80 to the S pole of the magnet 60B.

When the clutch component portions 11 and 12 maintain the rotational position relationship of (i) or (l), the direction of the magnetic flux detected by the magnetic detection element 80 can highly accurately approximate the radial direction (vertical direction on the drawing) around the axis S.

When the clutch component portions 11 and 12 maintain the rotational position relationship of (i) or (l), the direction of the magnetic flux detected by the magnetic detection element 80 highly accurately approximates the magnetic flux detection direction corresponding to the Y-axis Hall element of the magnetic detection element 80.

In the case of (i) or (l), it is possible to increase the magnetic flux passing through the magnetic detection element 80 in the magnetic flux detection direction of the Y-axis Hall element as compared with the tenth embodiment. In the case of (j), the tooth portion 11a can greatly affect the direction of the magnetic flux detected by the magnetic detection element 80. In the case of (k), the tooth portion 12a can greatly influence the direction of the magnetic flux detected by the magnetic detection element 80.

The magnetic flux detection direction of the Y-axis Hall element may be used as a reference for the magnetic detection element 80 to detect the magnetic flux direction. Then, a change in the position relationship between the clutch component portions 11 and 12 can increase a change in the magnetic flux direction detected by the magnetic detection element 80.

Twenty-Sixth Embodiment

The ninth embodiment has described the example of positioning the end surfaces 73a and 74a of the position detection device 20 in the axial direction. Instead, by reference to FIGS. 45, 46, and 47, for example, the description below explains the twenty-sixth embodiment that positions the end surfaces 73a and 74a of the position detection device 20 in the circumferential direction around the axis S.

The power transmission system 1 according to the present embodiment differs from the power transmission system 1 according to the ninth embodiment only in the position relationship between the position detection device 20 and the dog clutch 10. The configurations of the dog clutch 10 and the position detection device 20 are unchanged. The present embodiment mainly explains the position relationship between the position detection device 20 and the dog clutch 10.

Figure 45:
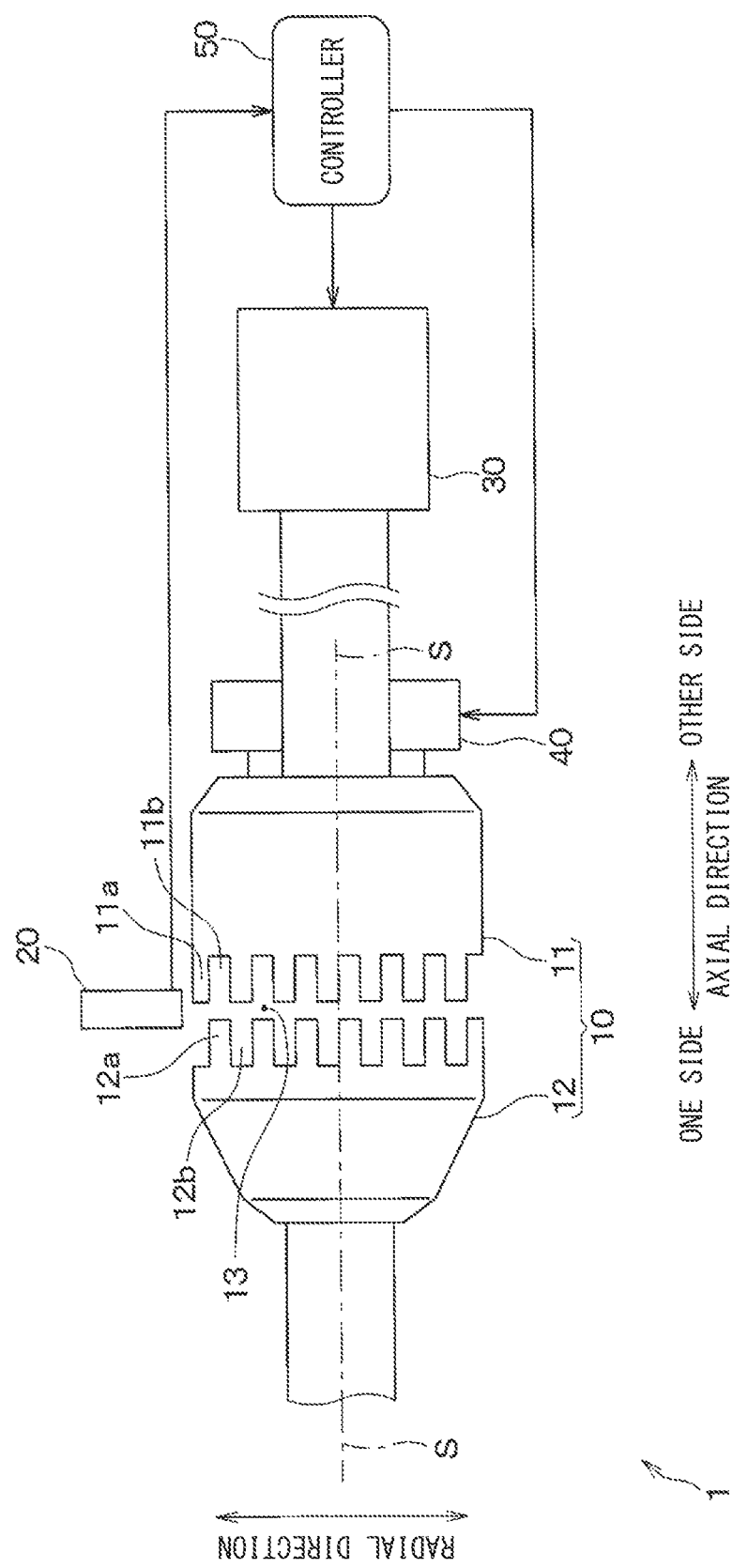
FIG. 45 is an external view of the overall configuration of the power transmission system according to a twenty-sixth embodiment as viewed from the radial outside around the axis and illustrates the dog clutch with two clutch component portions separated and the magnetic detection element.
Figure 46:
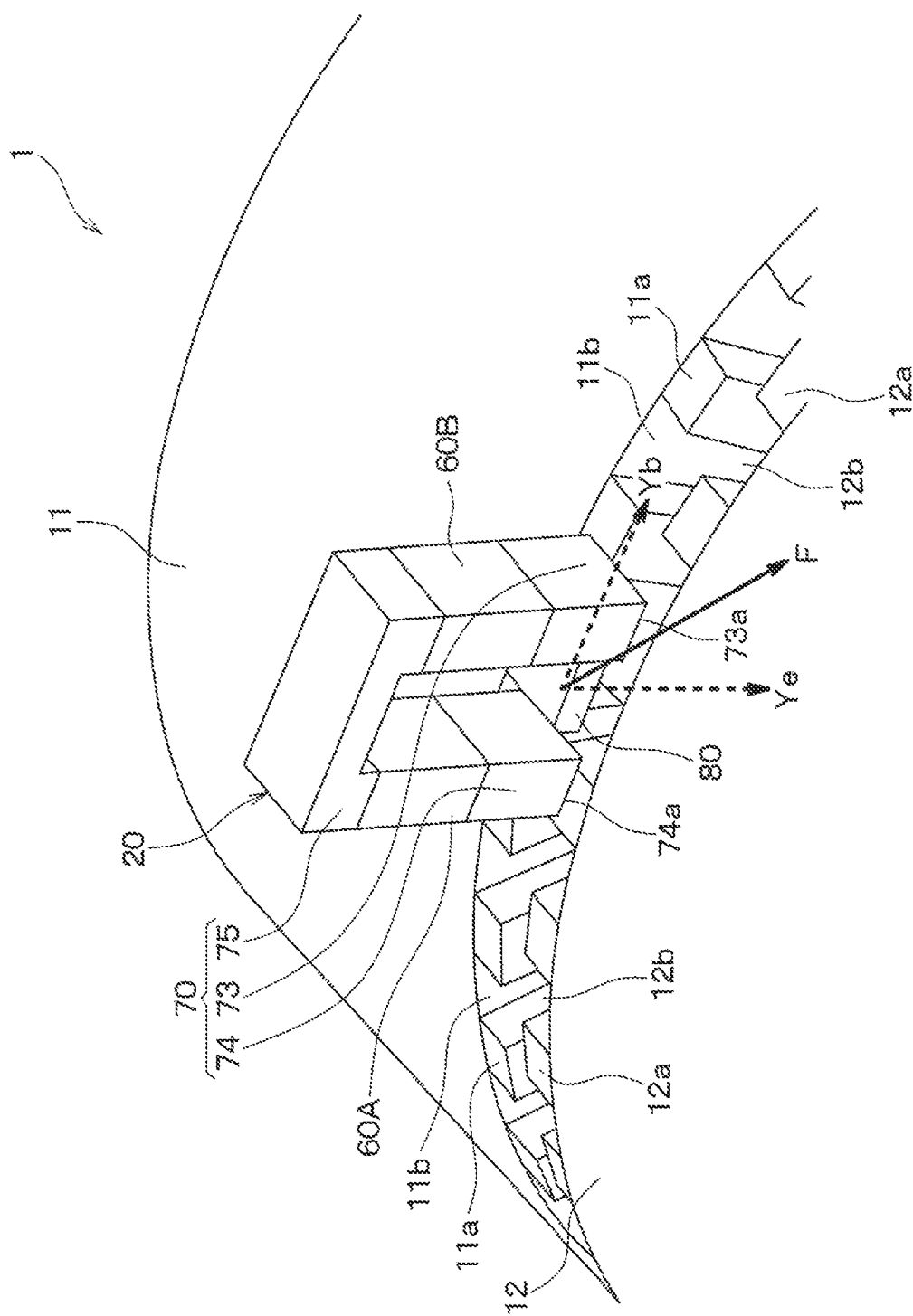
FIG. 46 is a perspective view of the overall configuration of the power transmission system according to the twenty-sixth embodiment as viewed from the radial outside around the axis and illustrates the dog clutch with two clutch component portions separated and the magnetic detection element.
Figure 47:
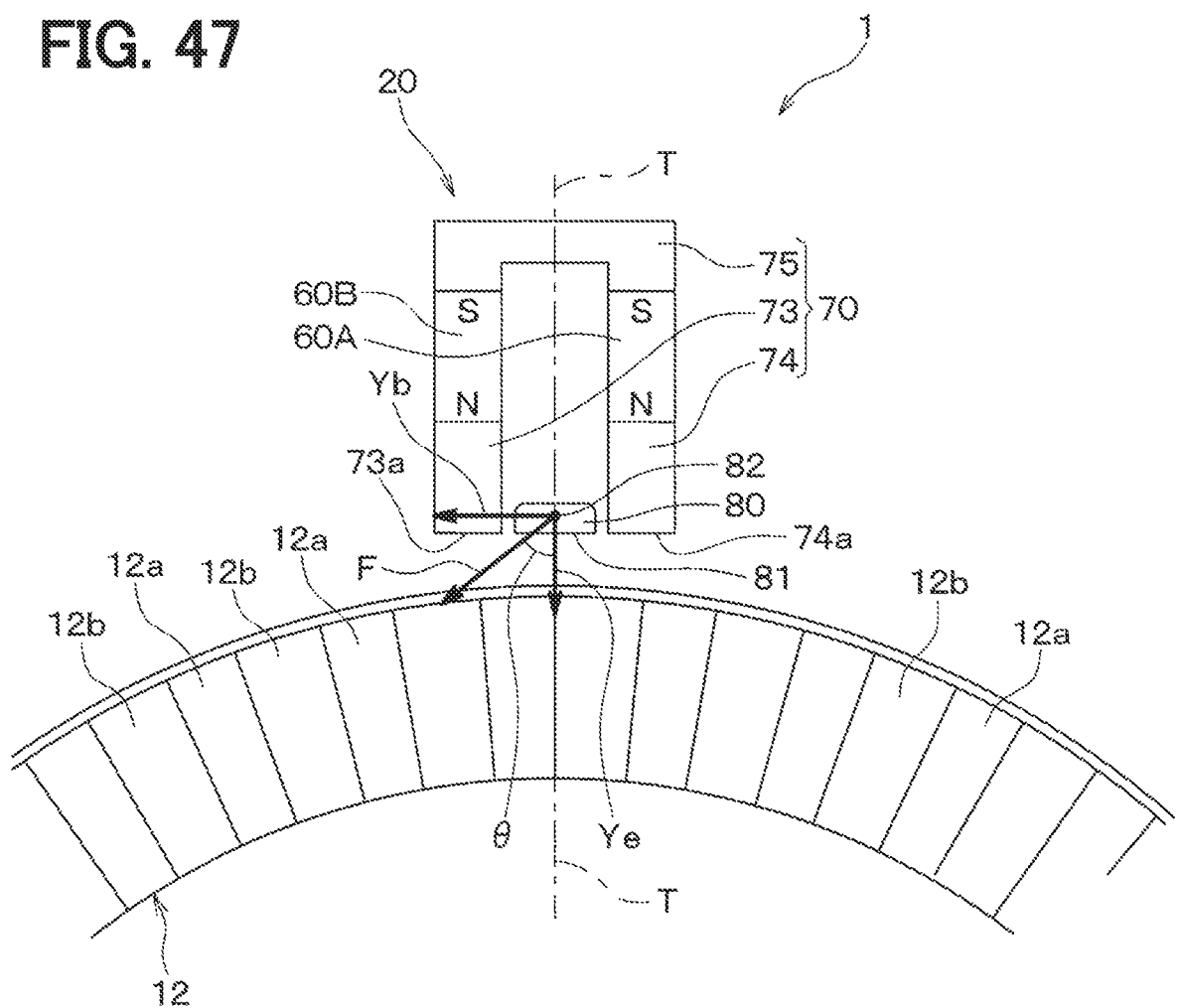
FIG. 47 is a perspective view of the overall configuration of the power transmission system according to the twenty-sixth embodiment as viewed from the other side in the axial direction and illustrates one clutch component portion in the dog clutch and the magnetic detection element.

As illustrated in FIGS. 45, 46, and 47, the magnetic flux path portion 73 of the position detection device 20 includes an end surface 73a that is positioned radially outside the axis S with respect to the clearance 13 between the clutch component portions 11 and 12 and forms a magnetic pole. The magnetic flux path portion 73 configures a first magnetic pole formation portion that generates the magnetic flux (magnetic field) passing between the end surface 73a and clearance 13.

The magnetic flux path portion 74 of the position detection device 20 includes an end surface 74a that is positioned radially outside the axis S with respect to the clearance 13 between the clutch component portions 11 and 12 and forms a magnetic pole. The magnetic flux path portion 74 configures a second magnetic pole formation portion that generates the magnetic flux (magnetic field) passing between the end surface 74a and clearance 13.

According to the present embodiment, the end surface 74a is positioned at one side in the circumferential direction around the axis S with respect to the end surface 73a. Specifically, the end surfaces 74a and 73a form magnetic poles of the same polarity. The end surfaces 74a and 73a form N-pole magnetic poles. Namely, the end surfaces 74a and 73a each form magnetic poles of the same polarity.

The magnetic detection element 80 is positioned between the magnetic flux path portion 73 and the magnetic flux path portion 74 of the position detection device 20. The magnetic detection element 80 is positioned radially outside around the axis S with respect to the clearance 13 between the clutch component portions 11 and 12.

The magnetic detection element 80 includes a detection portion 82 and a detection circuit. As illustrated in FIG. 47, the detection portion 82 detects angle θ of a composite magnetic flux as a combination of a first magnetic flux passing between the end surface 73a and the clearance 13 and a second magnetic flux passing between the end surface 74a and the clearance 13.

Specifically, the detection portion 82 includes a Y-axis Hall element and an X-axis Hall element. The Y-axis Hall element detects the magnetic flux density in the radial direction around the axis S (vertical direction of the drawing in FIG. 47). The X-axis Hall element detects the magnetic flux density in the direction connecting the magnetic flux path portions 74 and 73 (horizontal direction of the drawing in FIG. 47).

The present embodiment identifies the direction of magnetic flux passing through the detection portion 82 by using angle θ found from Y/X=tan θ, where X denotes the magnetic flux density detected by the X-axis Hall element and Y denotes the magnetic flux density detected by the Y-axis Hall element.

The detection circuit of the magnetic detection element 80 outputs a sensor signal indicating the direction of magnetic flux based on detection values from the X-axis Hall element and the Y-axis Hall element. Hereinafter, magnetic flux angle θ is assumed to be angle θ of a composite magnetic flux detected by the detection portion 82.

According to the present embodiment, the detection portion 82 is positioned at an intermediate portion between the magnetic flux path portions 73 and 74 in the circumferential direction around the axis S.

In FIG. 47, arrow Ye passes through the detection portion 82 and points radially inward around the axis S. Arrow Yb passes through the detection portion 82 and points toward one side in the circumferential direction around the axis S. Arrow F indicates the direction of magnetic flux detected by the detection portion 82.

A centerline T in FIG. 47 and FIGS. 49 through 52 is a virtual line that passes through the intermediate portion between the magnetic flux path portions 73 and 74 in the circumferential direction around the axis S and extends in the radial direction around the axis S.

In FIG. 47, arrow Ye indicates the radial inside around the axis S from the detection portion 82. Arrow Ye indicates the reference direction corresponding to the zero degrees of magnetic flux angle θ. Magnetic flux angle θ is formed between arrows Ye and F. Arrow F indicates the magnetic flux direction. A counterclockwise rotation of arrow F increases magnetic flux angle θ. A clockwise rotation of arrow F decreases magnetic flux angle θ. In FIG. 47, magnetic flux angle θ formed between arrows F and Ye provides negative values.

According to the present embodiment, the magnetic detection element 80 outputs a sensor signal indicating magnetic flux angle θ (direction of the composite magnetic flux) detected by the detection portion 82. An increase in magnetic flux angle θ increases the sensor signal. A decrease in magnetic flux angle θ decreases the sensor signal.

By reference to FIGS. 48 through 52, the description below explains sensor signals output from the magnetic detection element 80 in terms of the position relationship between the clutch component portions 11 and 12, particularly, concerning the tooth portion 11a and the hole portion 11b of the clutch component portion 11 and the tooth portion 12a and hole portion 12b of the clutch component portion 12.

According to the present embodiment, the drive source 30 rotates the clutch component portions 11 and 12 at a constant rotation speed around the axis S while the tooth portions 11a and 12a oppose each other via the clearance 13, and the hole portions 11b and 12b oppose each other via the clearance 13.

Figure 48:
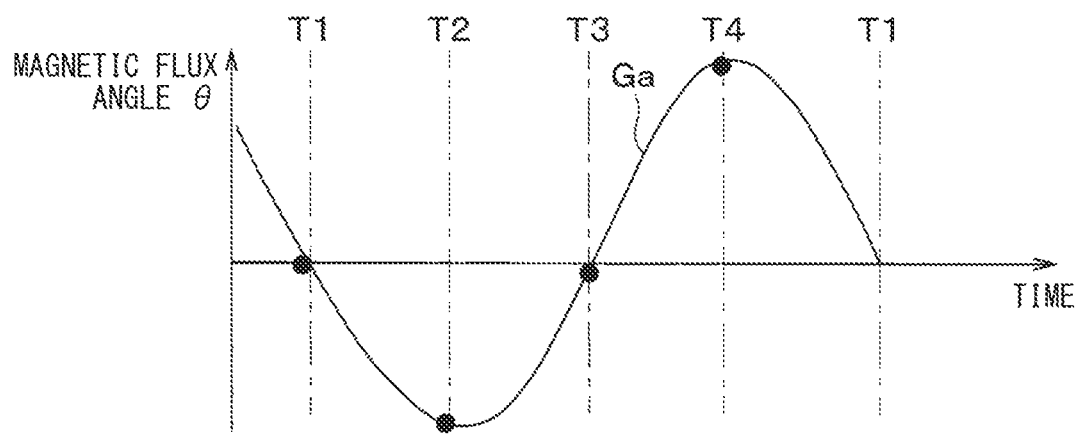
FIG. 48 is a timing chart of a sensor signal from the magnetic detection element according to the twenty-sixth embodiment when the tooth portion of the clutch component portion at one side opposes the tooth portion of the clutch component portion at the other side and the hole portion of the clutch component portion at one side opposes the hole portion of the clutch component portion at the other side.

In this case, as illustrated in FIG. 48, the sensor signal from the magnetic detection element 80 shows a sine wave. Multiple dots in FIG. 48 represent sampled values of sensor signal Ga from the magnetic detection element 80 at timings T1, T2, T3, and T4.

Figure 49:
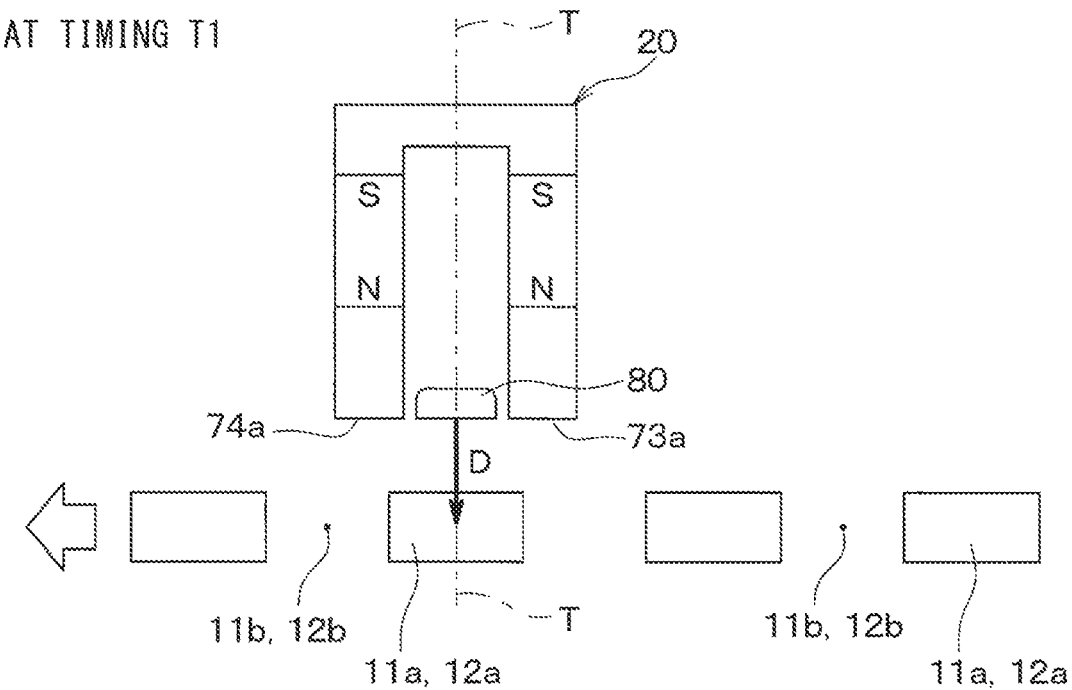
FIG. 49 is a diagram illustrating the magnetic detection element, the position relationship between the two clutch component portions, and the direction of magnetic flux passing through a detection portion of the magnetic detection element according to the twenty-sixth embodiment.

At timing T1, the magnetic detection element 80 opposes a pair of tooth portions 11a and 12a. Then, as illustrated in FIG. 49, the composite magnetic flux detected by the detection portion 82 of the magnetic detection element 80 points radially inward as indicated by arrow D. Sensor signal Ga from the magnetic detection element 80 becomes zero. Hereinafter, the composite magnetic flux detected by the detection portion 82 of the magnetic detection element 80 is also referred to as a detected magnetic flux from the magnetic detection element 80.

The clutch component portions 11 and 12 then rotate toward one side in the circumferential direction around the axis S to rotate a pair of tooth portions 11a and 12a toward one side in the circumferential direction. Then, as indicated by arrow E in FIG. 50, the detected magnetic flux from the magnetic detection element 80 rotates clockwise to follow the pair of tooth portions 11a and 12a. Sensor signal Ga from the magnetic detection element 80 decreases accordingly.

Figure 50:
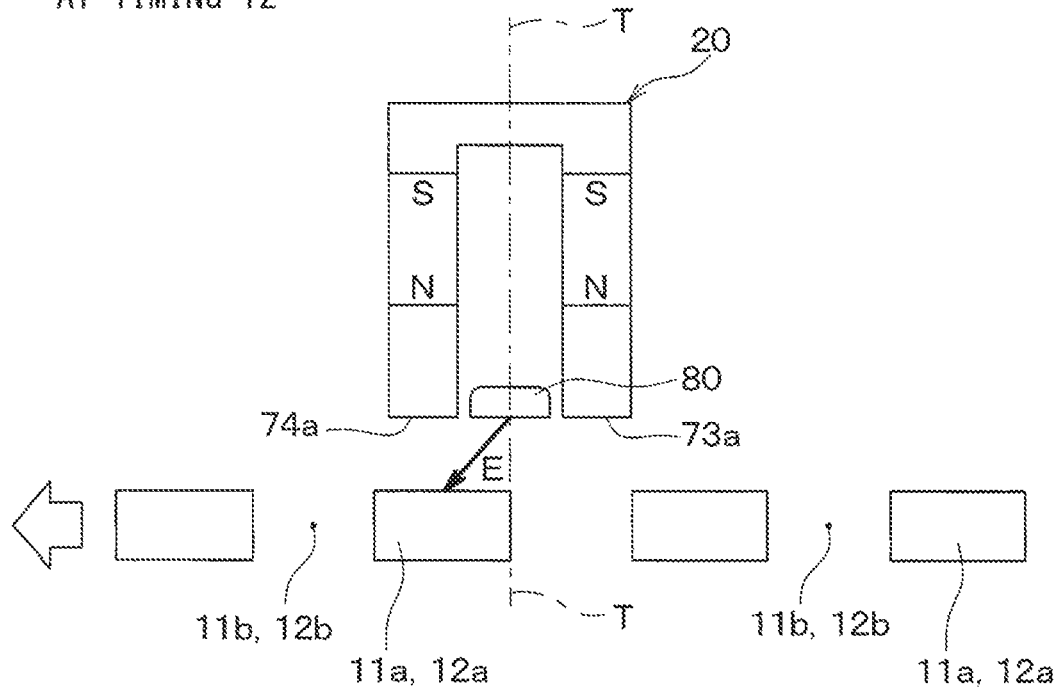
FIG. 50 is a diagram illustrating the magnetic detection element, the position relationship between the two clutch component portions, and the direction of magnetic flux passing through a detection portion of the magnetic detection element according to the twenty-sixth embodiment.

Arrow E in FIG. 50 indicates the direction of the detected magnetic flux from the magnetic detection element 80 at timing T2 when the magnetic detection element 80 opposes the ends of the tooth portions 11a and 12a toward the other side in the circumferential direction.

The clutch component portions 11 and 12 rotate toward one side in the circumferential direction around the axis S. Then, the magnetic detection element 80 opposes a pair of hole portions 11b and 12b. At this time, the pair of hole portions 11b and 12b causes the detected magnetic flux from the magnetic detection element 80 to rotate counterclockwise and point inward in the radial direction as indicated by arrow D in FIG. 51. Sensor signal Ga from the magnetic detection element 80 increases accordingly.

Figure 51:
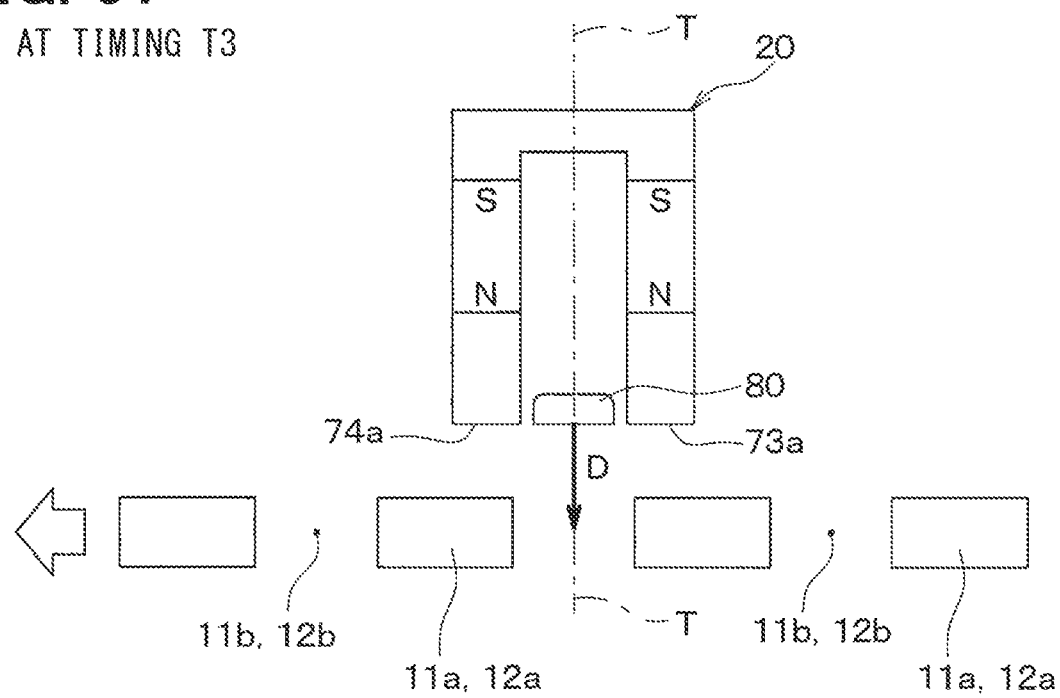
FIG. 51 is a diagram illustrating the magnetic detection element, the position relationship between the two clutch component portions, and the direction of magnetic flux passing through a detection portion of the magnetic detection element according to the twenty-sixth embodiment.

Arrow D in FIG. 51 indicates the direction of the detected magnetic flux from the magnetic detection element 80 at timing T3 when the magnetic detection element 80 opposes the hole portions 11b and 12b.

The clutch component portions 11 and 12 rotate toward one side in the circumferential direction around the axis S. Then, the next pair of tooth portions 11a and 12a approaches the magnetic detection element 80.

Figure 52:
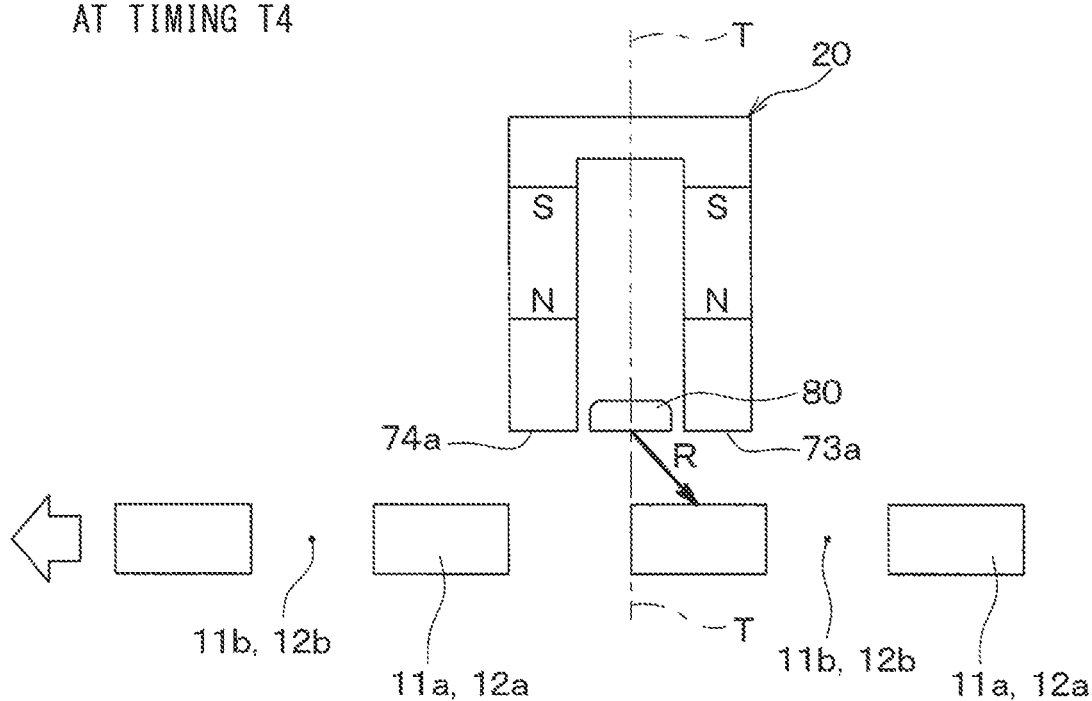
FIG. 52 is a diagram illustrating the magnetic detection element, the position relationship between the two clutch component portions, and the direction of magnetic flux passing through a detection portion of the magnetic detection element according to the twenty-sixth embodiment.

At this time, the following pair of tooth portions 11a and 12a causes the detected magnetic flux from the magnetic detection element 80 to rotate counterclockwise as indicated by arrow R in FIG. 52. Sensor signal Ga from the magnetic detection element 80 increases accordingly.

Arrow R in FIG. 52 indicates the direction of the detected magnetic flux from the magnetic detection element 80 at timing T4 when the magnetic detection element 80 opposes the ends of the tooth portions 11a and 12a toward one side in the circumferential direction.

The clutch component portions 11 and 12 rotate toward one side in the circumferential direction around the axis S. Then, a pair of tooth portions 11a and 12a approaches the magnetic detection element 80. As illustrated in FIG. 49, the pair of tooth portions 11a and 12a causes the detected magnetic flux from the magnetic detection element 80 to rotate clockwise and point inward in the radial direction as indicated by arrow D. Sensor signal Ga from the magnetic detection element 80 decreases accordingly.

Subsequently, the direction of the detected magnetic flux from the detection portion 82 changes in the order of FIGS. 49, 50, 51, and 52 as the clutch component portions 11 and 12 rotate toward one side in the circumferential direction around the axis S.

Suppose the clutch component portions 11 and 12 rotate around the axis S while the tooth portions 11a and 12a oppose each other and the hole portions 11b and 12b oppose each other. Then, the sensor signal indicating magnetic flux angle θ of the detected magnetic flux from the magnetic detection element 80 results in the sine wave with a large amplitude value as illustrated in FIG. 48.

The drive source 30 rotates the clutch component portions 11 and 12 around the axis S while the tooth portion 11a opposes the hole portion 11b and the tooth portion 12a opposes the hole portion 12b. In this case, magnetic flux angle θ of the detected magnetic flux from the magnetic detection element 80 remains zero. Sensor signal Gb from the magnetic detection element 80 becomes zero as illustrated in FIG. 53.

The reason follows. When the tooth portion 11a opposes the hole portion 11b and the tooth portion 12a opposes the hole portion 12b, the rotation of the clutch component portions 11 and 12 inhibits the magnetic detection element 80 from changing the magnetic permeability with respect to the clutch component portions 11 and 12.

Figure 53:
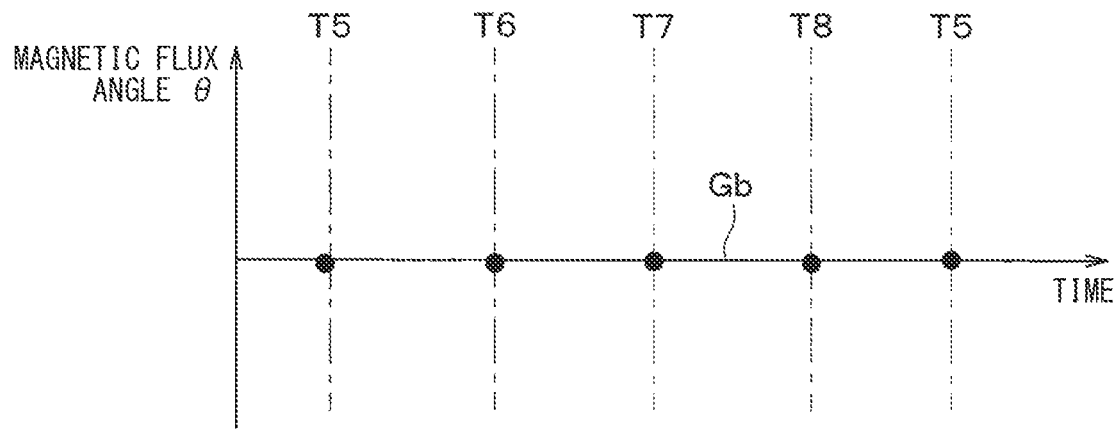
FIG. 53 is a timing chart of a sensor signal from the magnetic detection element according to the twenty-sixth embodiment when the tooth portion of the clutch component portion at one side opposes the hole portion of the clutch component portion at the other side.

FIG. 53 illustrates theoretical values of a sensor signal from the magnetic detection element 80 under the condition that the clutch component portions 11 and 12 are free from dimensional errors, for example. Multiple dots in FIG. 53 represent sampled values of the sensor signal from the magnetic detection element 80 at timings T5, T6, T7, and T8.

As illustrated in FIGS. 54 through 57, the clutch component portions 11 and 12 rotate around the axis S while the tooth portion 11a opposes the hole portion 11b and the tooth portion 12a opposes the hole portion 12b. Then, the detected magnetic flux from the magnetic detection element 80 remains directed inward in the radial direction as indicated by arrow D.

Suppose the clutch component portions 11 and 12 rotate around the axis S while the tooth portion 11a opposes the hole portion 11b and the tooth portion 12a opposes the hole portion 12b. Then, the amplitude of sensor signal Gb from the magnetic detection element 80 remains zero.

Figure 54:
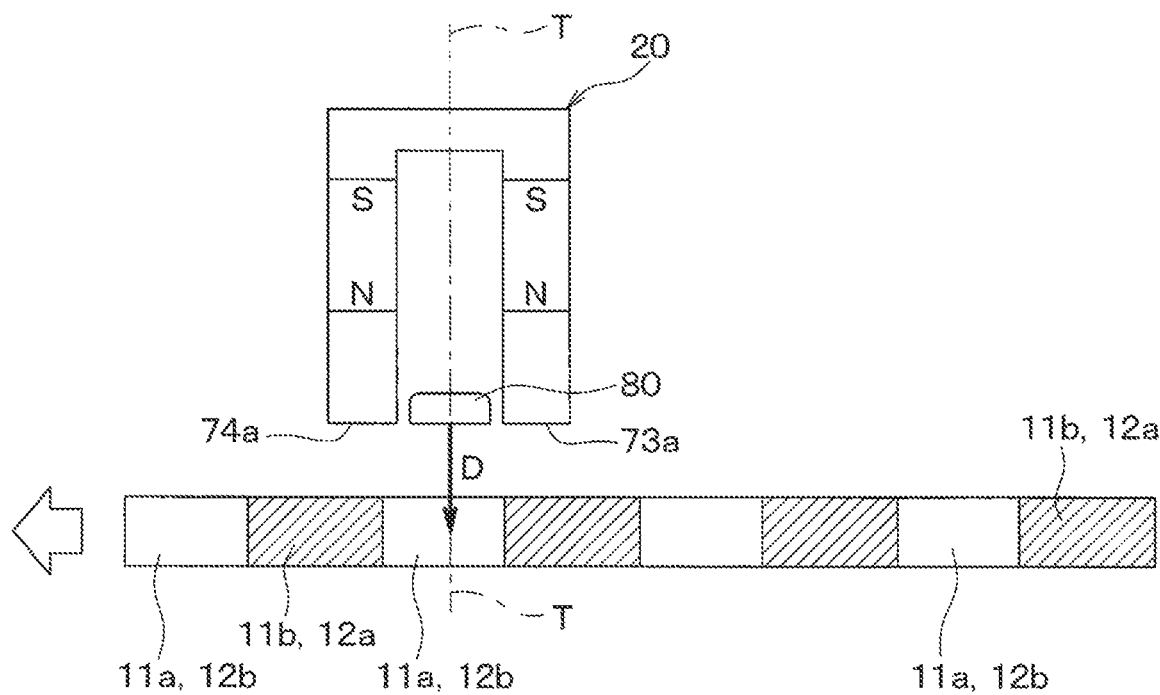
FIG. 54 is a diagram illustrating the magnetic detection element, the position relationship between the two clutch component portions, and the direction of magnetic flux passing through a detection portion of the magnetic detection element according to the twenty-sixth embodiment.

Timing T5 in FIG. 54 shows the direction of the detected magnetic flux from the magnetic detection element 80 when the magnetic detection element 80 opposes a pair of the tooth portion 11a and the hole portion 12b.

Figure 55:
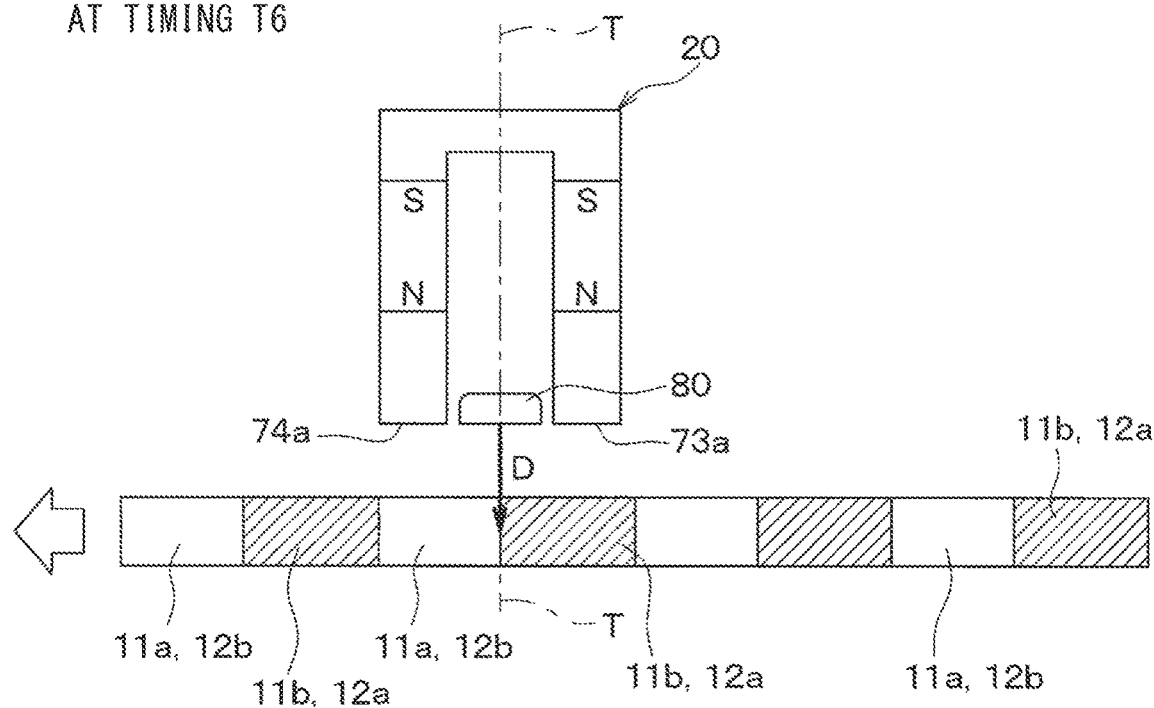
FIG. 55 is a diagram illustrating the magnetic detection element, the position relationship between the two clutch component portions, and the direction of magnetic flux passing through a detection portion of the magnetic detection element according to the twenty-sixth embodiment.

Timing T6 in FIG. 55 shows the direction of the detected magnetic flux from the magnetic detection element 80 when the magnetic detection element 80 opposes the boundary between a pair of the tooth portion 11a and the hole portion 12b and a pair of the hole portion 11b and the tooth portion 12a.

Figure 56:
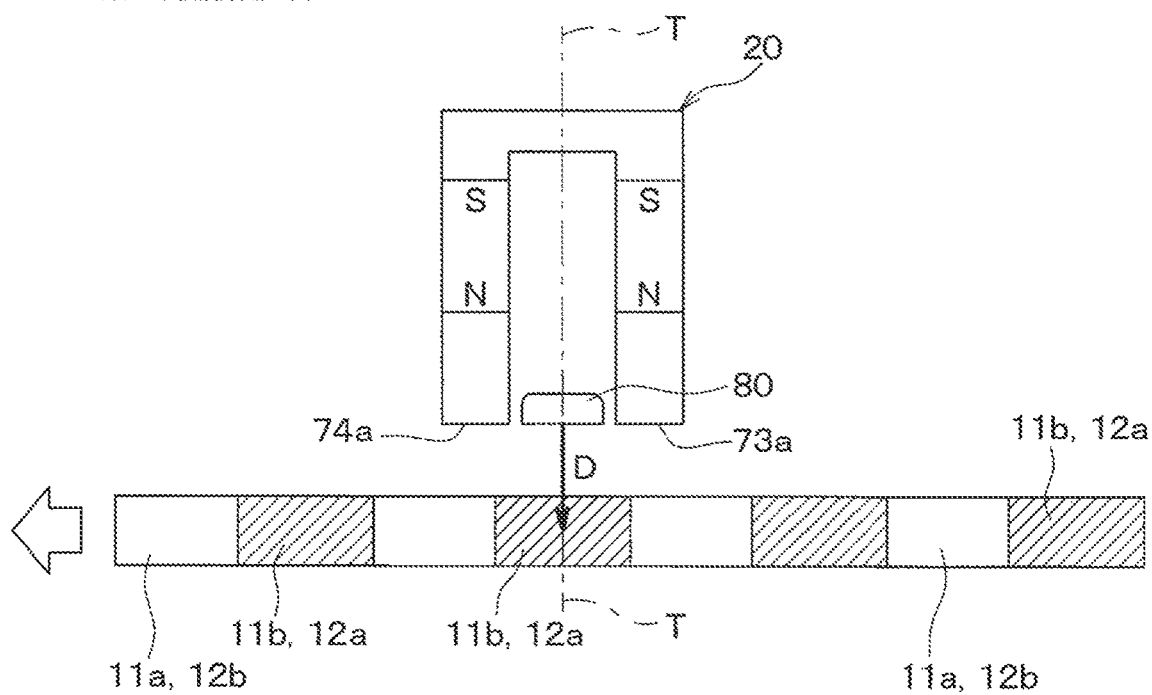
FIG. 56 is a diagram illustrating the magnetic detection element, the position relationship between the two clutch component portions, and the direction of magnetic flux passing through a detection portion of the magnetic detection element according to the twenty-sixth embodiment.

Timing T7 in FIG. 56 shows the direction of the detected magnetic flux from the magnetic detection element 80 when the magnetic detection element 80 opposes a pair of the hole portion 11b and the tooth portion 12a.

Figure 57:
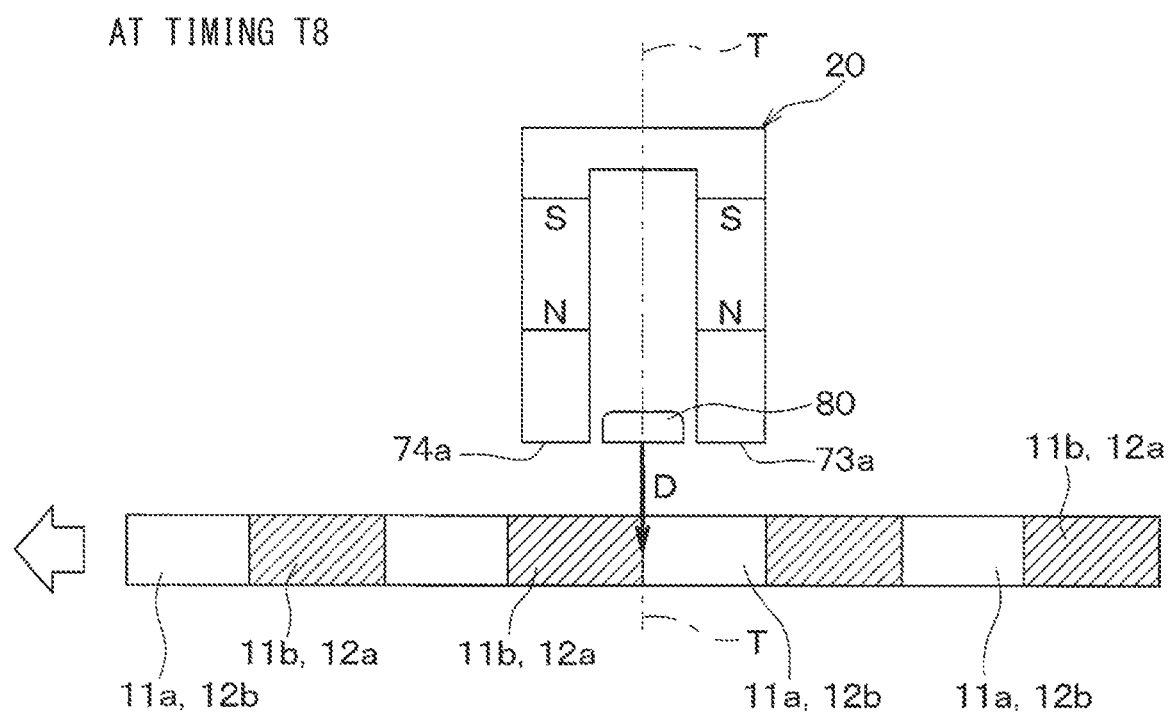
FIG. 57 is a diagram illustrating the magnetic detection element, the position relationship between the two clutch component portions, and the direction of magnetic flux passing through a detection portion of the magnetic detection element according to the twenty-sixth embodiment.

Timing T8 in FIG. 57 shows the direction of the detected magnetic flux from the magnetic detection element 80 when the magnetic detection element 80 opposes the boundary between a pair of the hole portion 11b and the tooth portion 12a and a pair of the tooth portion 11a and the hole portion 12b.

By reference to FIG. 58, the description below explains a case where the drive source 30 changes relative rotation speeds of the clutch component portion 11 with respect to the clutch component portion 12 according to the present embodiment.

Figure 58:
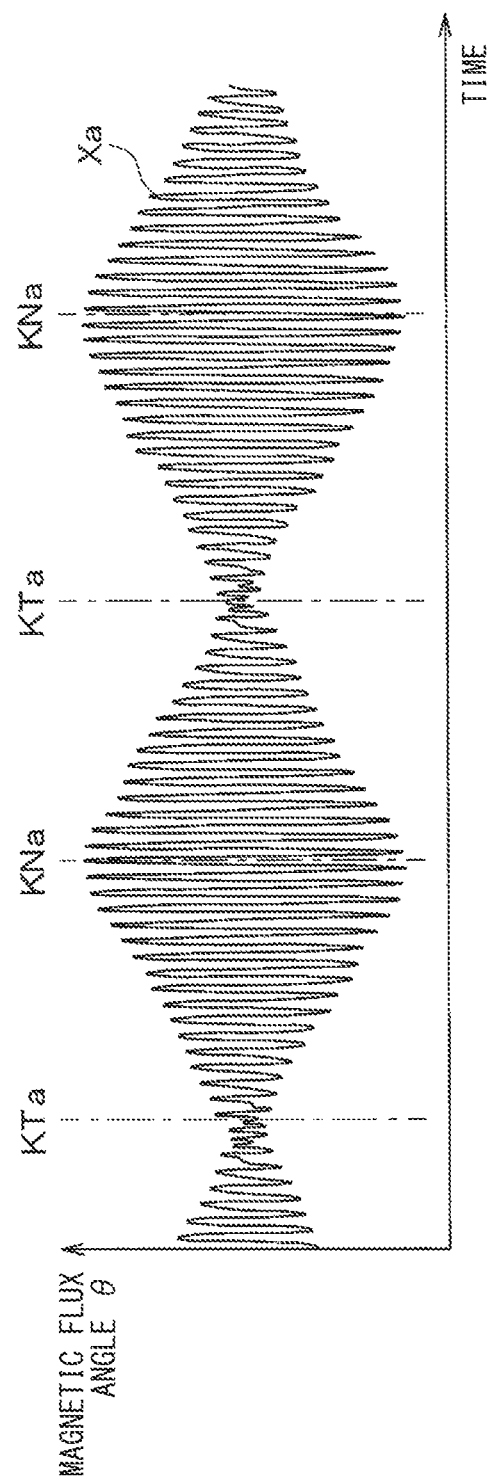
FIG. 58 is a timing chart of a sensor signal output from a magnetic detection element according to the twenty-sixth embodiment when the two clutch component portions are rotated to change a relative speed between the two clutch component portions.

At timing KNa in FIG. 58, the tooth portions 11a and 12a oppose each other, and the hole portions 11b and 12b oppose each other while the drive source 30 rotates the clutch component portions 11 and 12 around the axis S.

At timing KTa in FIG. 58, the tooth portion 11a opposes the hole portion 11b and the tooth portion 12a opposes the hole portion 12b while the drive source 30 rotates the clutch component portions 11 and 12 around the axis S.

At timing KNa, the tooth portions 11a and 12a oppose each other, and the hole portions 11b and 12b oppose each other to maximize the amplitude value of sensor signal Xa from the magnetic detection element 80. At timing KTa, the tooth portion 11a opposes the hole portion 11b, and the tooth portion 12a opposes the hole portion 12b to minimize the amplitude of sensor signal Xa from the magnetic detection element 80.

The amplitude of the sensor signal Xa at timing KTa is smaller than that at timing KNa. At timing KNa, as above, the tooth portions 11a and 12a oppose each other, and the hole portions 11b and 12b oppose each other. At timing KTa, the tooth portion 11a opposes the hole portion 11b and the tooth portion 12a opposes the hole portion 12b.

Figure 59:
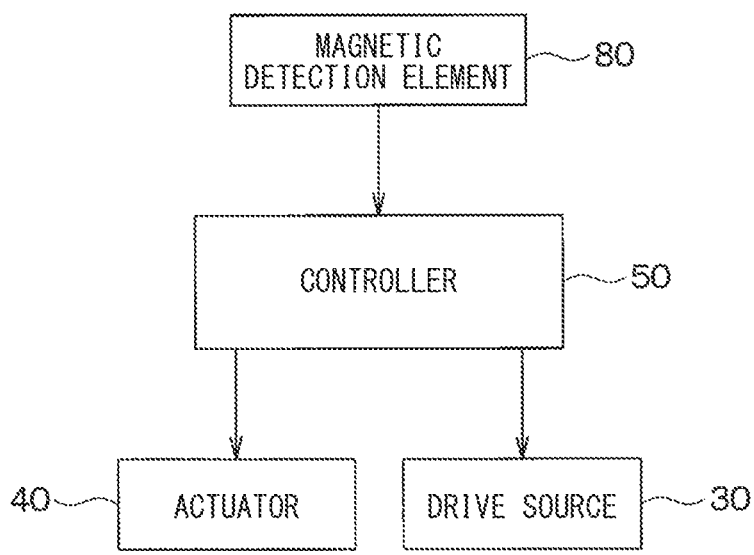
FIG. 59 is a block diagram illustrating an electrical configuration of the power transmission system according to the twenty-sixth embodiment.

By reference to FIG. 59, the description below explains the electrical configuration of the power transmission system 1 according to the present embodiment.

The power transmission system 1 according to the present embodiment includes the drive source 30, the actuator 40, the control device 50, and the magnetic detection element 80. The control device 50 is composed of a microcomputer and memory, for example. The memory is a non-transitory tangible storage medium.

The control device 50 performs a clutch control process to control the dog clutch 10 according to a computer program previously stored in the memory. While performing the clutch control process, the control device 50 controls the actuator 40 based on sensor signals output from the magnetic detection element 80.

By reference to FIG. 60, the description below explains in detail the clutch control process on the control device 50. The control device 50 performs the clutch control process according to a flowchart in FIG. 60. The clutch control process is performed while the clutch component portions 11 and 12 rotate so that the drive source 30 rotates the clutch component portion 11 to change a relative rotation speed of the clutch component portion 11 with respect to the clutch component portion 12.

At step S100, the control device 50 determines whether the amplitude of a sensor signal from the magnetic detection element 80 is smaller than a threshold value, based on the sensor signal from the magnetic detection element 80.

The sensor signal amplitude may be greater than or equal to the threshold value. Then, the control device 50 determines NO at step S100.

Then, at step S120, the control device 50 determines the timing at which the tooth portion 11a does not oppose the hole portion 11b, the tooth portion 12a does not oppose the hole portion 12b, and the clutch component portions 11 and 12 cannot engage with each other.

The control device 50 then returns to step S100 and determines whether the amplitude of a sensor signal is smaller than the threshold value, based on the sensor signal from the magnetic detection element 80.

As long as the sensor signal amplitude is greater than or equal to the threshold value, the control device 50 repeats step S100 to determine NO and step S120 to determine the timing incapable of engagement.

Subsequently, the tooth portion 11a opposes the hole portion 11b and the tooth portion 12a opposes the hole portion 12b. Then, a variation in magnetic flux angle θ of the detected magnetic flux from the magnetic detection element 80 is minimized to zero the amplitude of the sensor signal from the magnetic detection element 80.

When the sensor signal amplitude is smaller than the threshold, the control device 50 assumes the sensor signal amplitude to be minimum. Then, the control device 50 determines YES at step S100.

Then, at step S110, the control device 50 determines the timing at which the tooth portion 11a opposes the hole portion 11b, the tooth portion 12a opposes the hole portion 12b, and the clutch component portions 11 and 12 can engage with each other.

At step S130, the control device 50 controls the actuator 40. Under control of the control device 50, the actuator 40 moves the clutch component portion 11 toward one side in the axial direction.

Any of the tooth portions 11a engages any of the hole portions 12b. Besides, any of the tooth portions 12a engages any of the hole portions 11b.

The clutch component portion 11 engages the clutch component portion 12. The clutch component portion 11 rotates in conjunction with the clutch component portion 12.

According to the present embodiment described above, the position detection device 20 includes the magnets 60A and 60B, the magnetic detection element 80, and the yoke 70.

The yoke 70 configures a magnetic field generator. The yoke 70 includes the magnetic flux path portion 73 that is positioned radially outside the axis S with respect to the clearance 13 and forms the end surface 73a to provide the N pole.

The yoke 70 includes the magnetic flux path portion 74 that is positioned radially outward around the axis S with respect to the clearance 13 and is shifted from the magnetic flux path portion 73 toward one side in the circumferential direction around the axis S. The magnetic flux path portion 74 forms the end surface 74a to provide the N pole.

The magnetic detection element 80 is positioned radially outward around the axis S with respect to the clutch component portions 11 and 12. The magnetic detection element 80 is provided between the magnetic flux path portion 73 and the magnetic flux path portion 74.

The magnetic detection element 80 outputs a sensor signal indicating magnetic flux angle $\theta$ of a composite magnetic flux. The composite magnetic flux is a combination of the first magnetic flux passing between the end surface 73a and the clearance 13 and the second magnetic flux passing between the end surface 74a and the clearance 13. Namely, the magnetic detection element 80 outputs the sensor signal indicating the direction of the composite magnetic flux.

The sensor signal amplitude varies with the position relationship among the hole portion 11b, the tooth portion 11a, the hole portion 12b, and the tooth portion 12a in the rotation direction around the axis S. Based on this, the magnetic detection element 80 outputs a sensor signal indicating the position relationship.

It is possible to provide the position detection device 20 that detects the rotational position relationship between the clutch component portions 11 and 12 in the rotation direction.

According to the present embodiment, the control device 50 determines whether the sensor signal amplitude is smaller than the threshold value based on the sensor signal from the magnetic detection element 80. The control device 50 can accurately determine the engageable timing at which the clutch component portions 11 and 12 can engage with each other.

Twenty-Seventh Embodiment

The twenty-sixth embodiment has described the example of forming the same N pole on the end surfaces 73a and 74a of the yoke 70. Instead, by reference to FIG. 61, the description below explains the twenty-seventh embodiment that forms the S pole on the end surface 73a of the yoke 70 and the N pole on the end surface 74a of the yoke 70.

The present embodiment mainly differs from the twenty-sixth embodiment only in the magnetic pole polarities of the end surfaces 74a and 73a of the position detection device 20 and is substantially equal to the twenty-sixth embodiment in the other configurations. The same reference numerals in FIGS. 61 and 47 denote the same elements. The description below mainly explains magnetic pole polarities on the end surfaces 74a and 73a of the position detection device 20.

The end surface 74a of the magnetic flux path portion 74 is positioned radially inward around the axis S and forms the N pole. According to the present embodiment, the magnet 60A is positioned radially outside the magnetic flux path portion 74. The N pole is formed on the end surface of the magnet 60A radially inward around the axis S. The S pole is formed on the end surface of the magnet 60A radially outward around the axis S.

The end surface 73a of the magnetic flux path portion 73 is positioned radially inward around the axis S and forms the S pole. According to the present embodiment, the magnet 60B is positioned radially outside the magnetic flux path portion 73. The S pole is formed on the end surface of the magnet 60B radially inward around the axis S. The N pole is formed on the end surface of the magnet 60B radially outward around the axis S. The end surface 74a of the magnetic flux path portion 74 and the end surface 73a of the magnetic flux path portion 73 form the magnetic poles of different polarities. The magnetic flux path portion 73 is positioned radially outside the clearance 13 around the axis S and configures a first magnetic field generator that generates a magnetic flux passing between the end surface 73a and the clearance 13.

The magnetic flux path portion 74 is positioned radially outside the clearance 13 around the axis S and configures a second magnetic field generator that generates a magnetic flux passing between the end surface 74a and the clearance 13.

According to the present embodiment, the end surface 74a is positioned at one side with respect to the end surface 73a in the circumferential direction around the axis S.

The magnetic detection element 80 is positioned between the magnetic flux path portions 74 and 73. The magnetic detection element 80 is positioned radially outside the clearance 13 between the clutch component portions 11 and 12 around the axis S. The magnetic detection element 80 includes the detection portion 82 that detects magnetic flux angle $\theta$ passing between the magnetic flux path portions 74 and 73.

Similar to the twenty-sixth embodiment above, the detection portion 82 includes the Y-axis Hall element and the X-axis Hall element. An increase in magnetic flux angle $\theta$ increases the sensor signal value. A decrease in magnetic flux angle $\theta$ decreases the sensor signal value.

Figure 61:
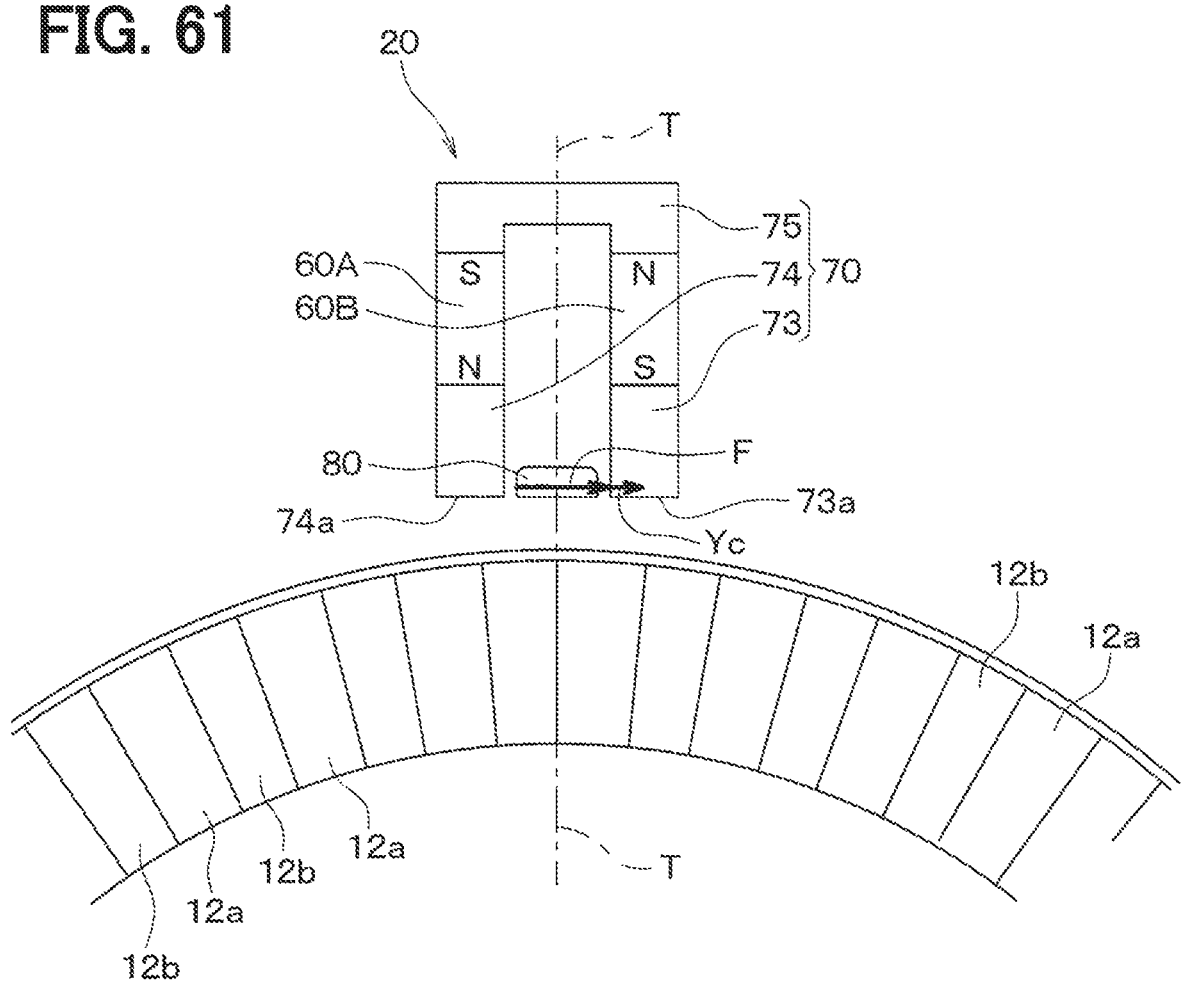
FIG. 61 is a perspective view of the overall configuration of the power transmission system according to a twenty-seventh embodiment as viewed from the other side in the axial direction and illustrates one clutch component portion in the dog clutch and the magnetic detection element.

In FIG. 61, arrow F indicates the direction of the magnetic flux detected by the detection portion 82. Arrow Yc indicates the passage from the magnetic flux path portion 74, the detection portion 82, and then to the magnetic flux path portion 73. Arrow Yc indicates the reference direction corresponding to the zero degrees of magnetic flux angle $\theta$. Magnetic flux angle $\theta$ is formed between arrows Yc and F. As above, arrow F indicates the direction of the magnetic flux. The counterclockwise rotation of arrow F decreases magnetic flux angle $\theta$. The clockwise rotation of arrow F increases magnetic flux angle $\theta$.

In FIG. 61, arrows F and Yc point to the other side in the circumferential direction around the axis S and magnetic flux angle $\theta$ becomes zero. Namely, arrows F and Yc point to the right in the drawing.

By reference to FIGS. 62 through 66, the description below explains sensor signals output from the magnetic detection element 80 in terms of the position relationship between the clutch component portions 11 and 12, particularly, concerning the tooth portion 11a and the hole portion 11b of the clutch component portion 11 and the tooth portion 12a and hole portion 12b of the clutch component portion 12.

According to the present embodiment, the clutch component portions 11 and 12 rotate around the axis S while the tooth portions 11a and 12a oppose each other via the clearance 13, and the hole portions 11b and 12b oppose each other via the clearance 13.

Figure 62:
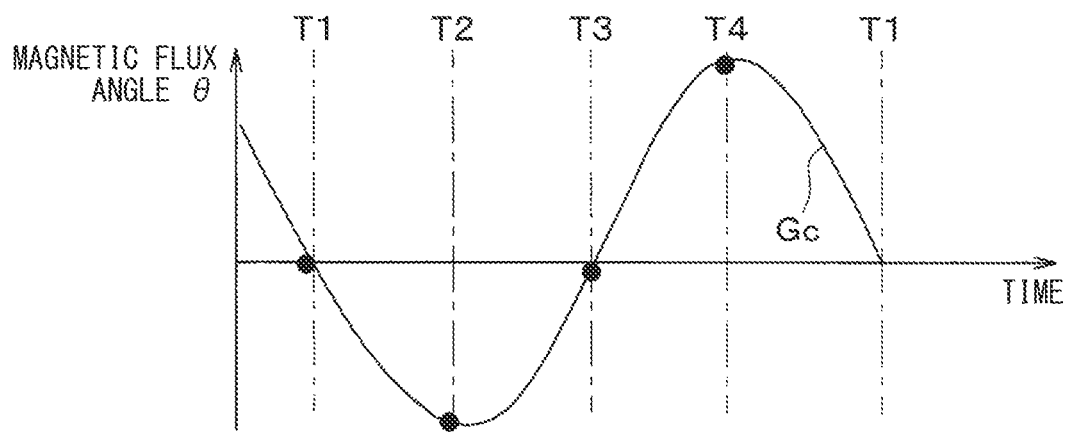
FIG. 62 is a timing chart of a sensor signal from the magnetic detection element according to the twenty-seventh embodiment when the tooth portion of the clutch component portion at one side opposes the tooth portion of the clutch component portion at the other side and the hole portion of the clutch component portion at one side opposes the hole portion of the clutch component portion at the other side.

In this case, as illustrated in FIG. 62, sensor signal Gc from the magnetic detection element 80 shows a sine wave. Multiple dots in FIG. 62 represent sampled values of the sensor signal from the magnetic detection element 80 at timings T1, T2, T3, and T4.

Figure 63:
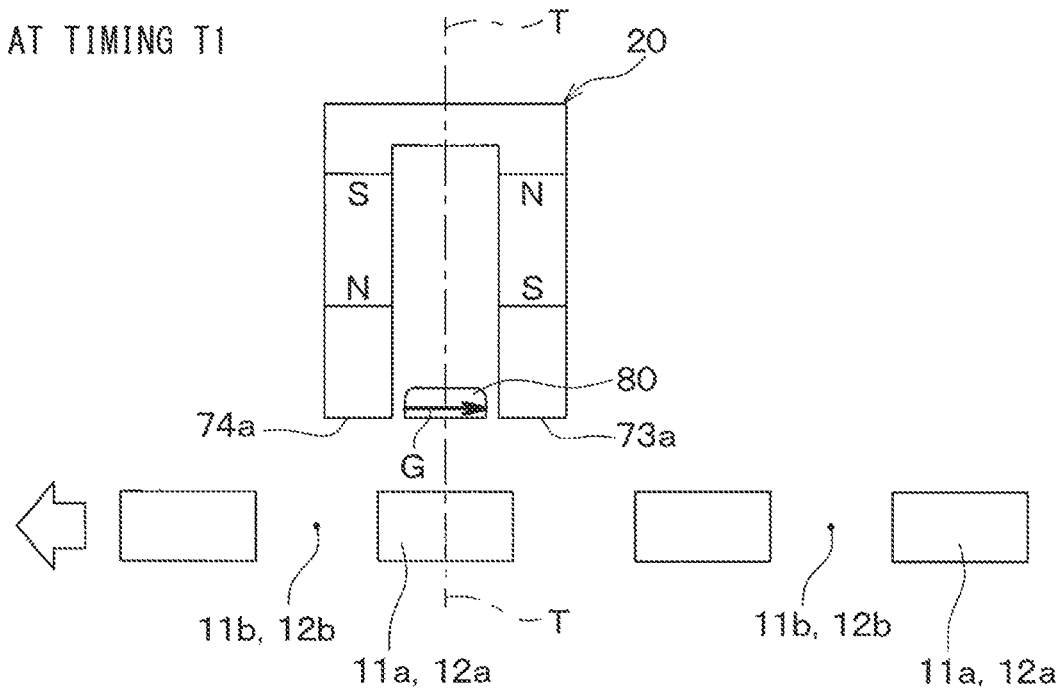
FIG. 63 is a diagram illustrating the magnetic detection element, the position relationship between the two clutch component portions, and the direction of magnetic flux passing through the detection portion of the magnetic detection element according to the twenty-seventh embodiment.

At timing T1, the end surface 81 of the magnetic detection element 80 opposes a pair of tooth portions 11a and 12a. Then, as illustrated in FIG. 63, the detected magnetic flux from the magnetic detection element 80 points toward the other side in the circumferential direction around the axis S as indicated by arrow G. Sensor signal Gc from the magnetic detection element 80 becomes zero.

Figure 64:
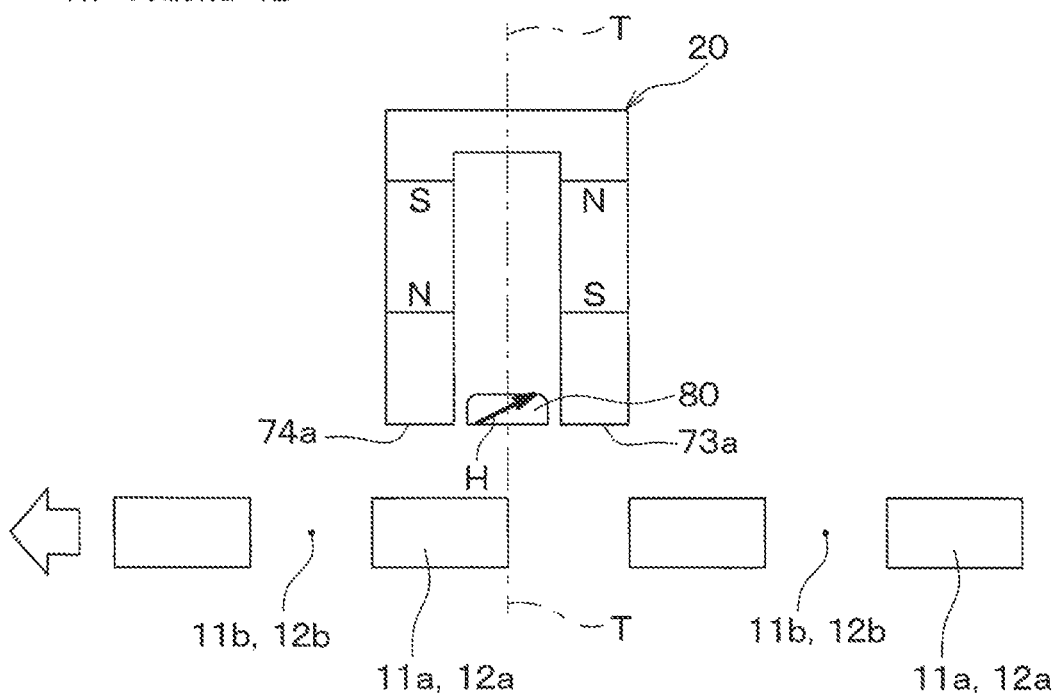
FIG. 64 is a diagram illustrating the magnetic detection element, the position relationship between the two clutch component portions, and the direction of magnetic flux passing through the detection portion of the magnetic detection element according to the twenty-seventh embodiment.

The clutch component portions 11 and 12 then rotate toward one side in the circumferential direction around the axis S to rotate a pair of tooth portions 11a and 12a toward one side in the circumferential direction. As illustrated in FIG. 64, the pair of tooth portions 11a and 12a causes the detected magnetic flux from the magnetic detection element 80 to rotate counterclockwise as indicated by arrow H. Sensor signal Gc from the magnetic detection element 80 decreases accordingly.

Arrow H in FIG. 64 indicates the direction of the detected magnetic flux from the magnetic detection element 80 at timing T2 when the magnetic detection element 80 opposes the ends of the tooth portions 11a and 12a toward the other side in the circumferential direction.

The clutch component portions 11 and 12 rotate toward one side in the circumferential direction around the axis S. Then, the magnetic detection element 80 opposes a pair of hole portions 11b and 12b. At this time, the pair of hole portions 11b and 12b causes the detected magnetic flux from the magnetic detection element 80 to rotate clockwise in FIG. 65 and point toward the other side in the circumferential direction around the axis S as indicated by arrow G. Sensor signal Gc from the magnetic detection element 80 increases accordingly.

Figure 65:
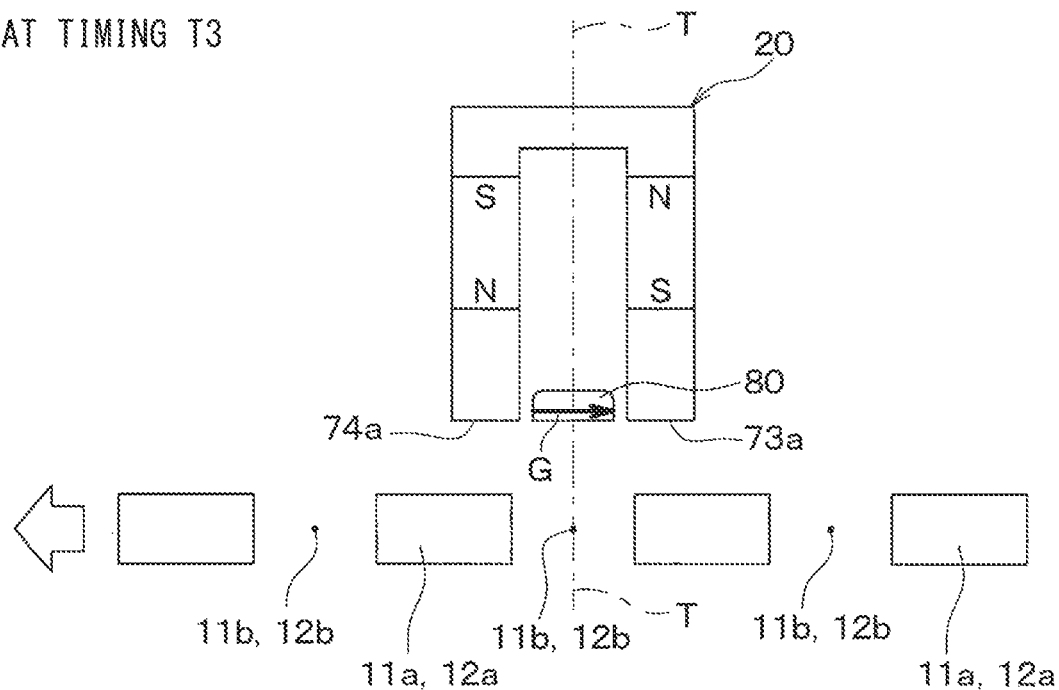
FIG. 65 is a diagram illustrating the magnetic detection element, the position relationship between the two clutch component portions, and the direction of magnetic flux passing through the detection portion of the magnetic detection element according to the twenty-seventh embodiment.

Arrow G in FIG. 65 indicates the direction of the detected magnetic flux from the magnetic detection element 80 at timing T3 when the magnetic detection element 80 opposes the hole portions 11b and 12b.

The clutch component portions 11 and 12 rotate toward one side in the circumferential direction around the axis S. Then, the next pair of tooth portions 11a and 12a approaches the magnetic detection element 80.

Figure 66:
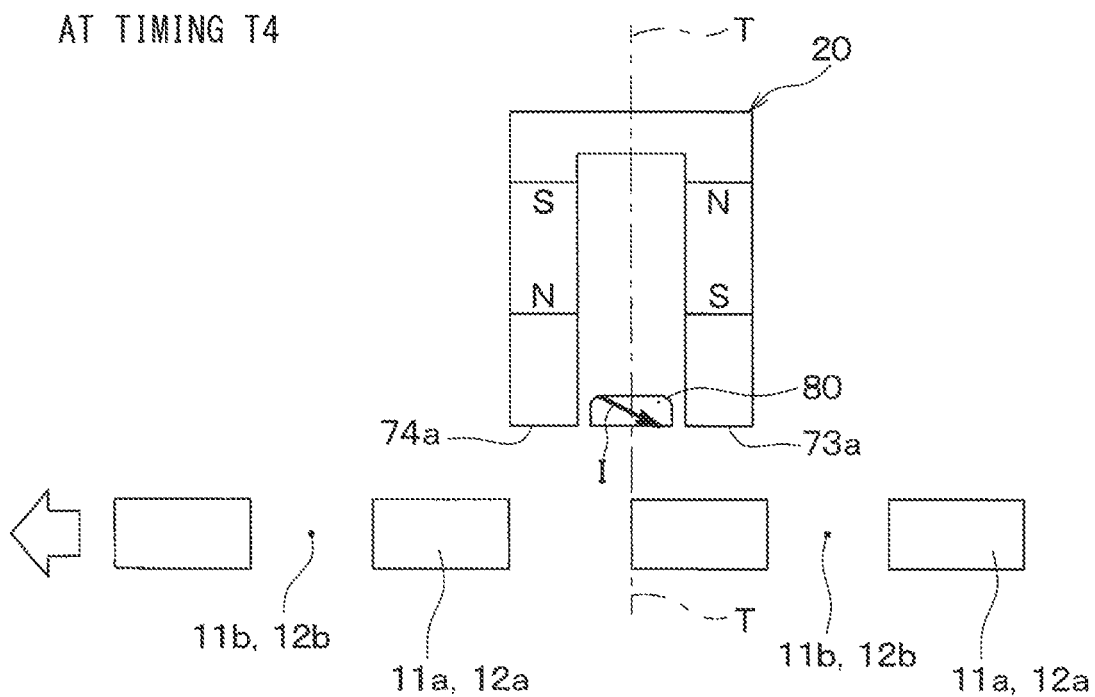
FIG. 66 is a diagram illustrating the magnetic detection element, the position relationship between the two clutch component portions, and the direction of magnetic flux passing through the detection portion of the magnetic detection element according to the twenty-seventh embodiment.

At this time, the following pair of tooth portions 11a and 12a causes the detected magnetic flux from the magnetic detection element 80 to rotate clockwise as indicated by arrow I in FIG. 66. Sensor signal Gc from the magnetic detection element 80 increases accordingly.

Arrow I in FIG. 66 indicates the direction of the detected magnetic flux from the magnetic detection element 80 at timing T4 when the magnetic detection element 80 opposes the ends of the tooth portions 11a and 12a toward one side in the circumferential direction.

The clutch component portions 11 and 12 rotate toward one side in the circumferential direction around the axis S. Then, a pair of tooth portions 11a and 12a opposes the magnetic detection element 80.

Then, as illustrated in FIG. 63, the pair of hole portions 11b and 12b causes the detected magnetic flux from the magnetic detection element 80 to rotate counterclockwise and point toward the other side in the circumferential direction around the axis S as indicated by arrow G. Sensor signal Gc from the magnetic detection element 80 decreases accordingly.

Subsequently, the direction of the detected magnetic flux from the detection portion 82 changes in the order of FIGS. 63, 64, 65, and 66 as the clutch component portions 11 and 12 rotate toward one side in the circumferential direction around the axis S.

Suppose the clutch component portions 11 and 12 rotate around the axis S while the tooth portions 11a and 12a oppose each other and the hole portions 11b and 12b oppose each other. Then, the sensor signal indicating magnetic flux angle θ of the magnetic field results in the sine wave with a large amplitude value as illustrated in FIG. 62.

Suppose the clutch component portions 11 and 12 rotate around the axis S while the tooth portion 11a opposes the hole portion 11b and the tooth portion 12a opposes the hole portion 12b. Then, the amplitude of sensor signal Gc from the magnetic detection element 80 becomes zero as illustrated in FIG. 67.

The reason follows. When the tooth portion 11a opposes the hole portion 11b and the tooth portion 12a opposes the hole portion 12b, the rotation of the clutch component portions 11 and 12 inhibits the magnetic detection element 80 from changing the magnetic permeability with respect to the clutch component portions 11 and 12.

Figure 67:
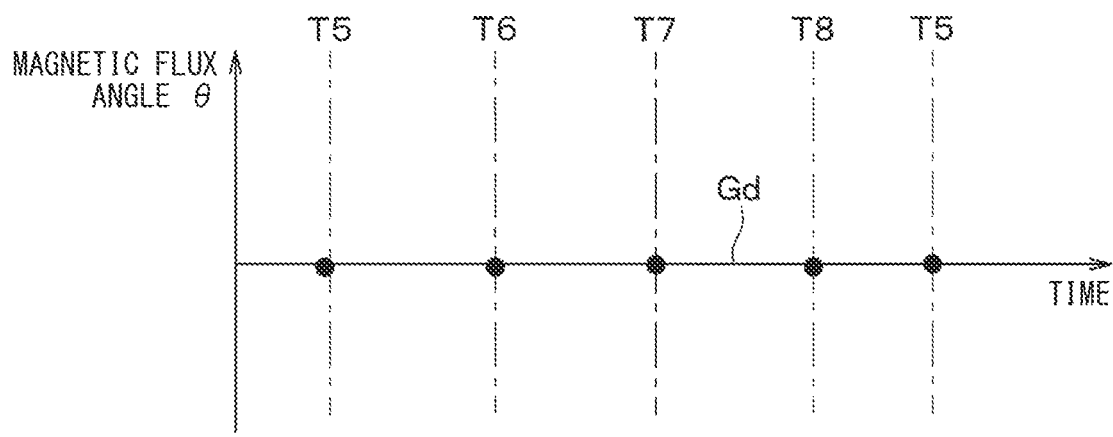
FIG. 67 is a timing chart of a sensor signal from the magnetic detection element according to the twenty-seventh embodiment when the tooth portion of the clutch component portion at one side opposes the hole portion of the clutch component portion at the other side.

FIG. 67 illustrates theoretical values of a sensor signal from the magnetic detection element 80 under the condition that the clutch component portions 11 and 12 are free from dimensional errors, for example. Multiple dots in FIG. 67 represent sampled values of the sensor signal from the magnetic detection element 80 at timings T5, T6, T7, and T8.

As illustrated in FIGS. 68 through 71, the clutch component portions 11 and 12 rotate while the tooth portion 11a opposes the hole portion 11b and the tooth portion 12a opposes the hole portion 12b. Then, the detected magnetic flux from the magnetic detection element 80 points toward the other side in the circumferential direction as indicated by arrow G.

Suppose the clutch component portions 11 and 12 rotate around the axis S while the tooth portion 11a opposes the hole portion 11b and the tooth portion 12a opposes the hole portion 12b. Then, sensor signal Gd from the magnetic detection element 80 becomes zero.

Figure 68:
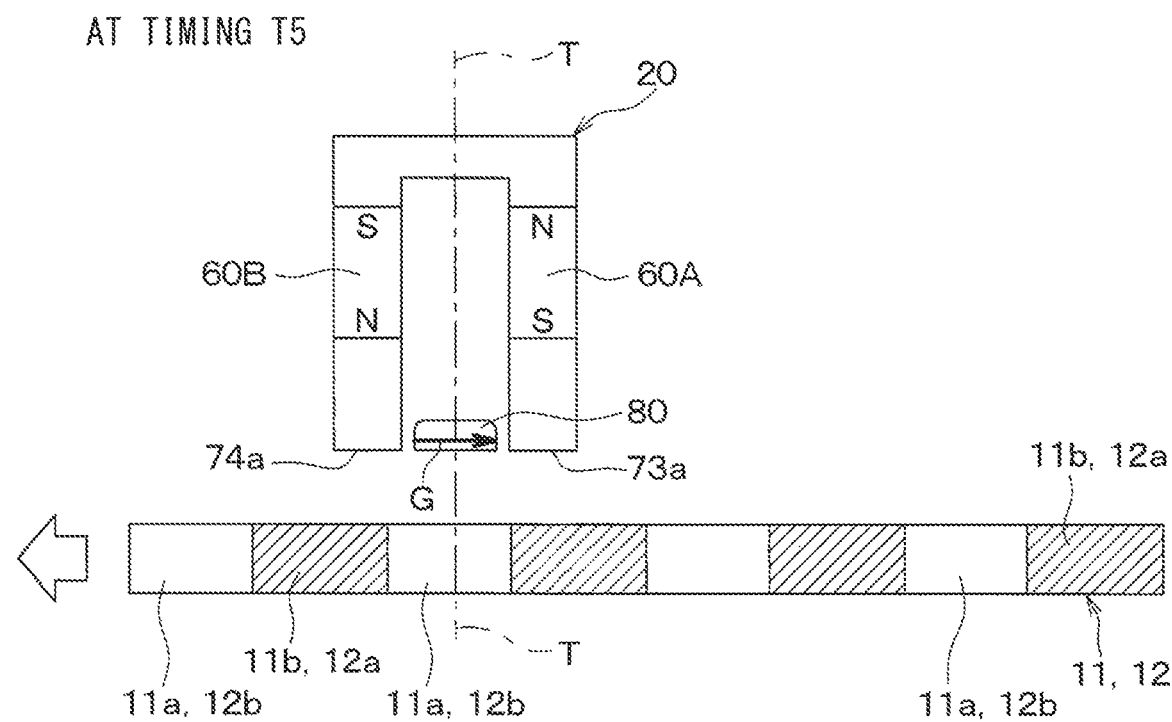
FIG. 68 is a diagram illustrating the magnetic detection element, the position relationship between the two clutch component portions, and the direction of magnetic flux passing through the detection portion of the magnetic detection element according to the twenty-seventh embodiment.

Timing T5 in FIG. 68 shows the direction of the detected magnetic flux from the magnetic detection element 80 when the magnetic detection element 80 opposes a pair of the tooth portion 11a and the hole portion 12b.

Figure 69:
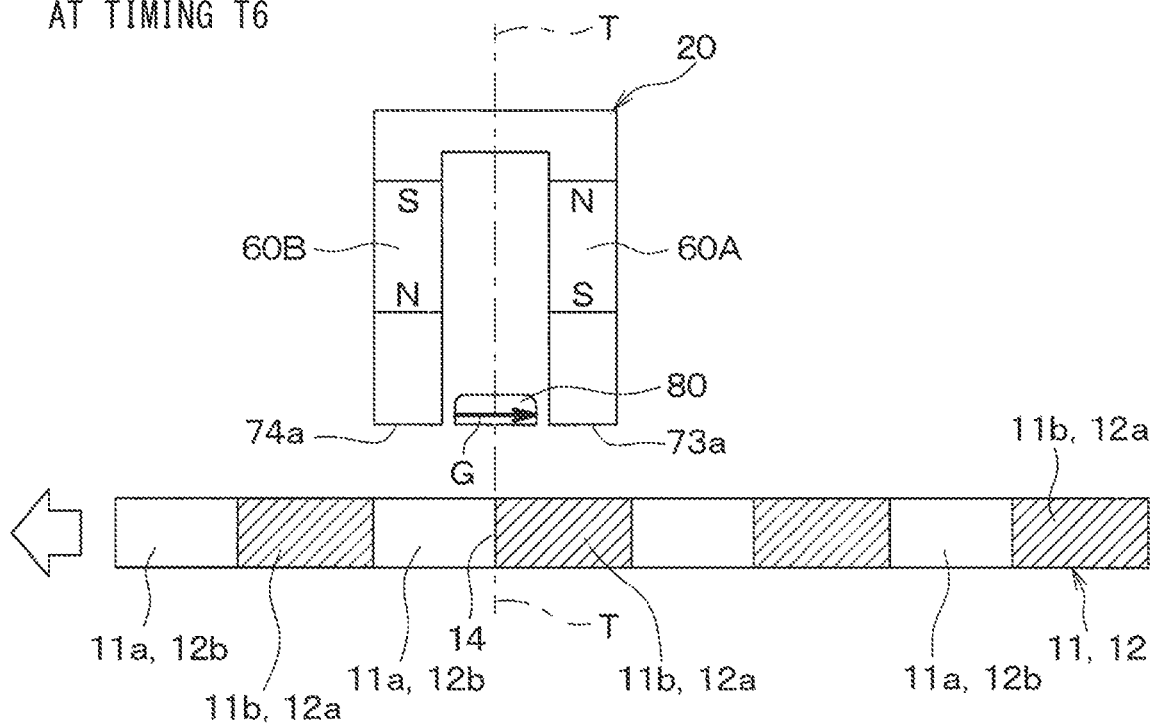
FIG. 69 is a diagram illustrating the magnetic detection element, the position relationship between the two clutch component portions, and the direction of magnetic flux passing through the detection portion of the magnetic detection element according to the twenty-seventh embodiment.

Timing T6 in FIG. 69 shows the direction of the detected magnetic flux from the magnetic detection element 80 when the magnetic detection element 80 opposes the boundary between a pair of the tooth portion 11a and the hole portion 12b and a pair of the hole portion 11b and the tooth portion 12a.

Figure 70:
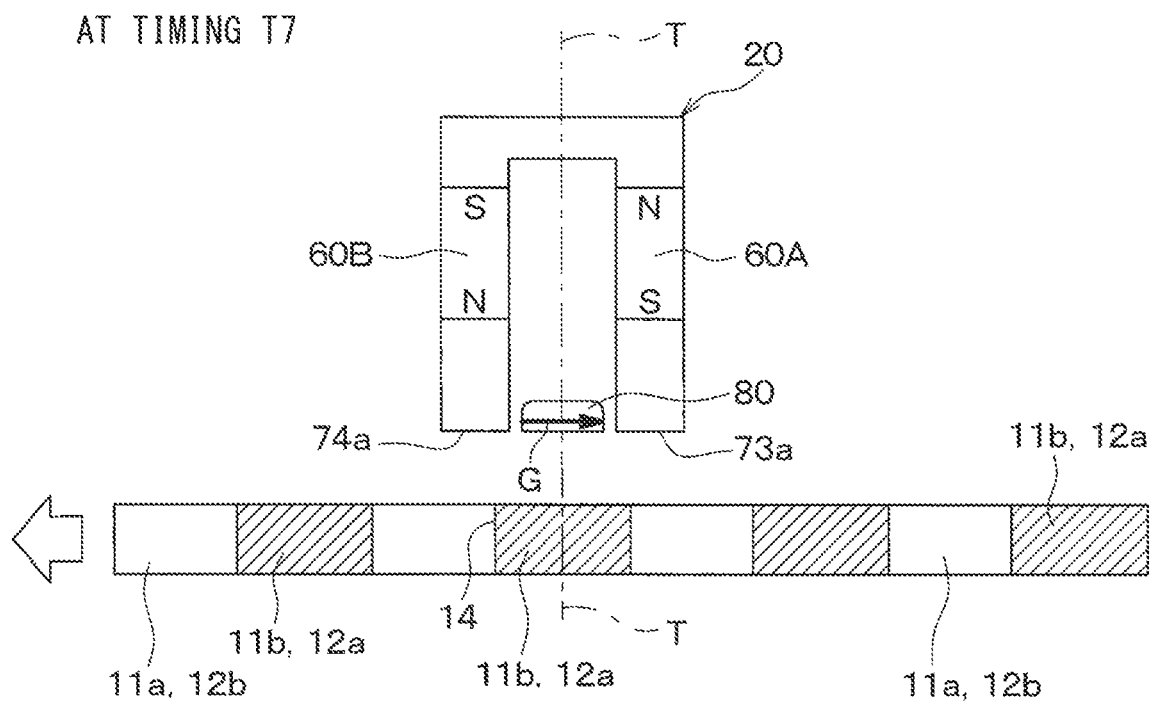
FIG. 70 is a diagram illustrating the magnetic detection element, the position relationship between the two clutch component portions, and the direction of magnetic flux passing through the detection portion of the magnetic detection element according to the twenty-seventh embodiment.

Timing T7 in FIG. 70 shows the direction of the detected magnetic flux from the magnetic detection element 80 when the magnetic detection element 80 opposes a pair of the hole portion 11b and the tooth portion 12a.

Figure 71:
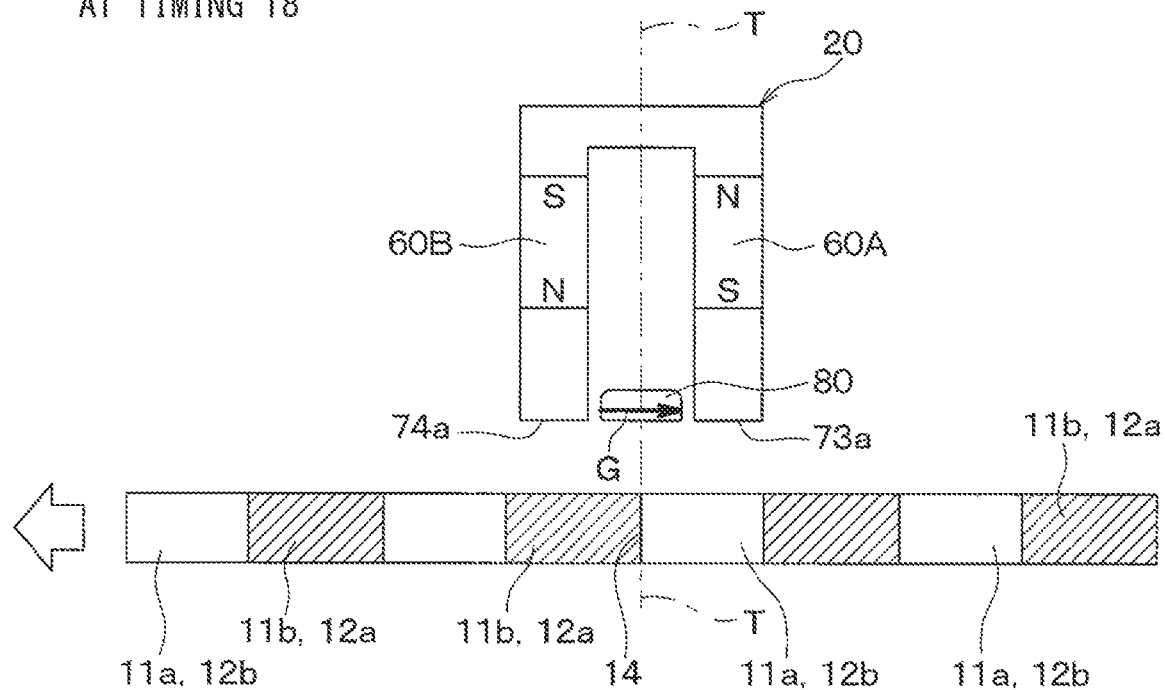
FIG. 71 is a diagram illustrating the magnetic detection element, the position relationship between the two clutch component portions, and the direction of magnetic flux passing through the detection portion of the magnetic detection element according to the twenty-seventh embodiment.

Timing T8 in FIG. 71 shows the direction of the detected magnetic flux from the magnetic detection element 80 when the magnetic detection element 80 opposes a boundary 14 between a pair of the hole portion 11*b* and the tooth portion 12*a* and a pair of the tooth portion 11*a* and the hole portion 12*b*.

By reference to FIG. 72, the description below explains a case of the present embodiment where the drive source 30 changes relative rotation speeds of the clutch component portion 11 with respect to the clutch component portion 12 while the clutch component portions 11 and 12 rotates.

Figure 72:
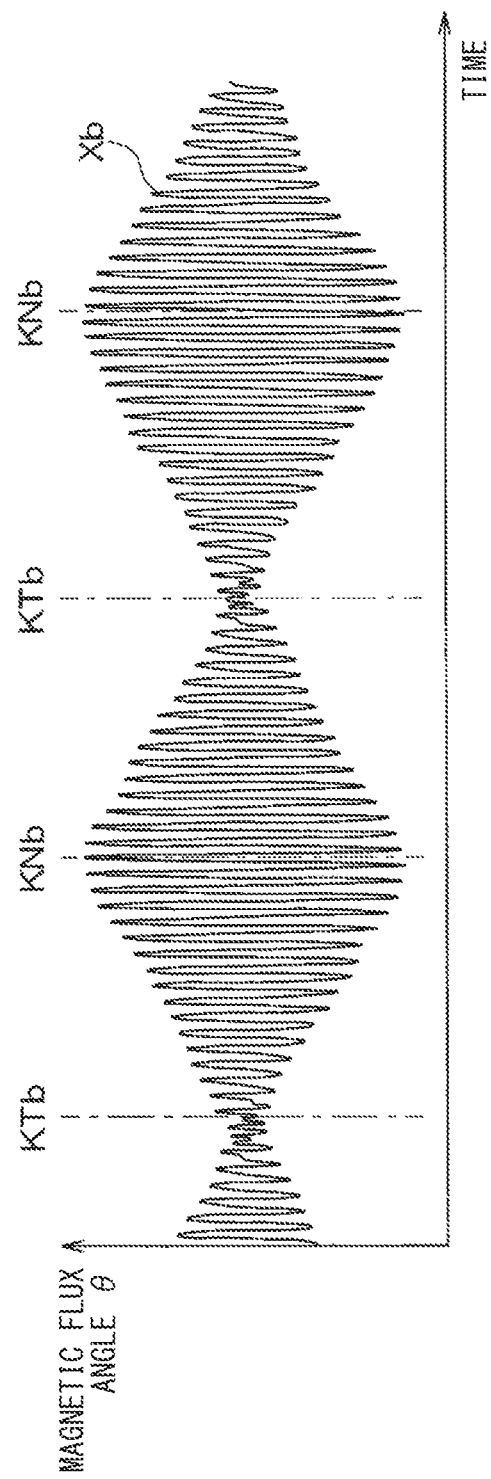
FIG. 72 is a timing chart of a sensor signal output from a magnetic detection element according to the twenty-seventh embodiment when the two clutch component portions are rotated to change a relative speed between the two clutch component portions.

At timing KNb in FIG. 72, the tooth portions 11*a* and 12*a* oppose each other, and the hole portions 11*b* and 12*b* oppose each other while the drive source 30 rotates the clutch component portions 11 and 12 around the axis S.

At timing KTb in FIG. 72, the tooth portion 11*a* opposes the hole portion 11*b* and the tooth portion 12*a* opposes the hole portion 12*b* while the drive source 30 rotates the clutch component portions 11 and 12 around the axis S.

At timing KNb, the tooth portions 11*a* and 12*a* oppose each other, and the hole portions 11*b* and 12*b* oppose each other to maximize the amplitude value of sensor signal Xb from the magnetic detection element 80. At timing KTb, the tooth portion 11*a* opposes the hole portion 11*b*, and the tooth portion 12*a* opposes the hole portion 12*b* to minimize the amplitude of sensor signal Xb from the magnetic detection element 80.

By reference to FIG. 60, the description below explains in detail the clutch control process on the control device 50.

Figure 60:
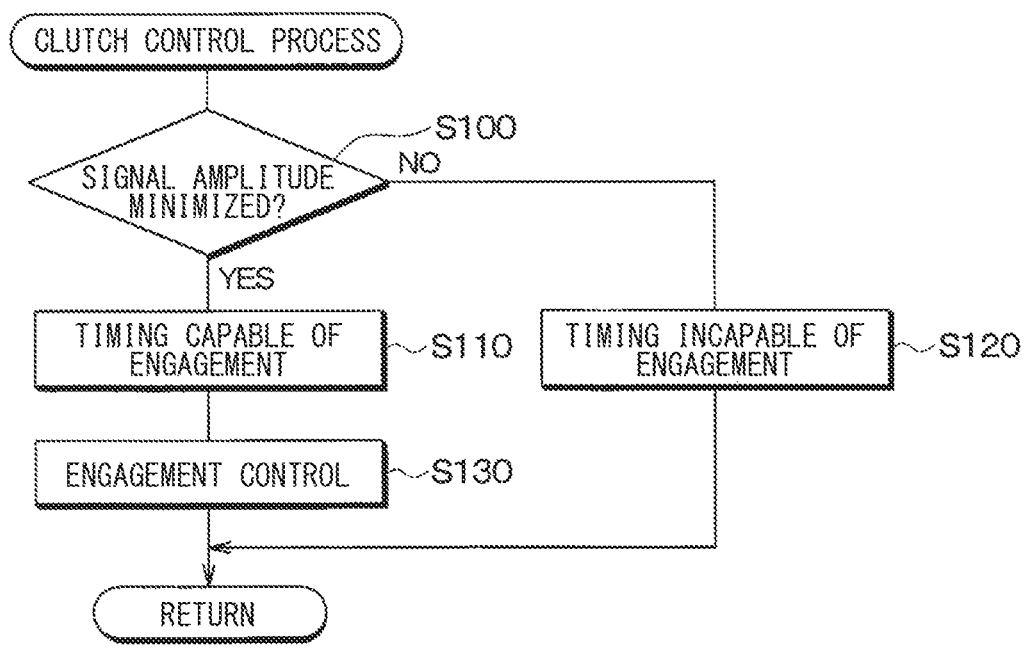
FIG. 60 is a flowchart illustrating details of a clutch control process on the control device in FIG. 59.

Similar to the twenty-sixth embodiment, the control device 50 performs the clutch control process according to the flowchart in FIG. 60.

At step S100, the control device 50 determines whether the sensor signal amplitude is smaller than a threshold value based on the sensor signal from the magnetic detection element 80. The sensor signal amplitude may be greater than or equal to the threshold value. Then, the control device 50 determines NO at step S100. At step S120, the control device 50 determines that the timing disables the clutch component portions 11 and 12 from engaging with each other.

When the sensor signal amplitude is smaller than the threshold value, the control device 50 assumes the sensor signal amplitude to be minimum. Then, the control device 50 determines YES at step S100. Then, at step S110, the control device 50 determines the timing at which the tooth portion 11*a* opposes the hole portion 11*b*, the tooth portion 12*a* opposes the hole portion 12*b*, and the clutch component portions 11 and 12 can engage with each other.

At step S130, the control device 50 controls the actuator 40 to move the clutch component portion 11 toward one side in the axial direction. The clutch component portion 11 engages the clutch component portion 12.

In the position detection device 20 according to the present embodiment, the yoke 70 includes the magnetic flux path portion 73 that is positioned radially outside the axis S with respect to clearance 13 and forms the end surface 73*a* to provide the S pole.

The yoke 70 includes the magnetic flux path portion 74 that is positioned radially outward around the axis S with respect to the clearance 13 and is shifted from the magnetic flux path portion 73 toward one side in the circumferential direction around the axis S. The magnetic flux path portion 74 forms the end surface 74*a* to provide the N pole.

The magnetic detection element 80 is positioned radially outward around the axis S with respect to the clutch component portions 11 and 12. The magnetic detection element 80 is provided between the magnetic flux path portions 73 and 74. The magnetic detection element 80 outputs the sensor signal indicating the direction of a magnetic flux passing between the magnetic flux path portions 73 and 74.

The sensor signal amplitude varies with the position relationship among the hole portion 11*b*, the tooth portion 11*a*, the hole portion 12*b*, and the tooth portion 12*a* in the rotation direction around the axis S. Based on this, the magnetic detection element 80 outputs a sensor signal indicating the position relationship.

Similar to the twenty-sixth embodiment, it is possible to provide the position detection device 20 that detects the rotational position relationship between the clutch component portions 11 and 12 in the rotation direction.

According to the present embodiment, the control device 50 determines whether the sensor signal amplitude is smaller than the threshold value based on the sensor signal from the magnetic detection element 80. The control device 50 can accurately determine the engageable timing at which the clutch component portions 11 and 12 can engage with each other.

Twenty-Eighth Embodiment

The ninth embodiment has described the example where the axial centerline T of the position detection device 20 and the detection portion 82 of magnetic detection element 80 coincide with the centerline Z between the clutch component portions 11 and 12.

Figure 73:
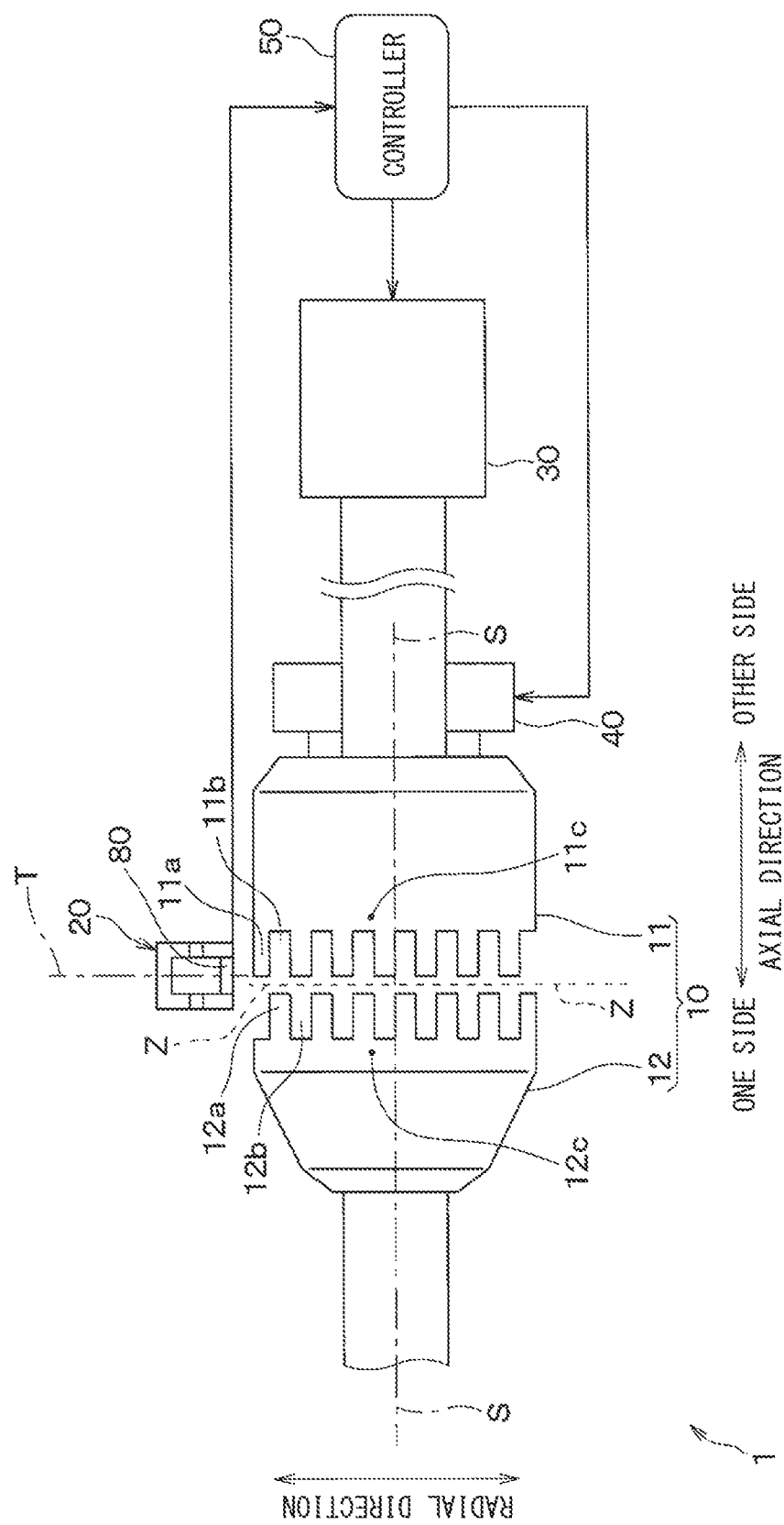
FIG. 73 is an external view of the overall configuration of the power transmission system according to a twenty-eighth embodiment as viewed from the radial outside around the axis and illustrates the dog clutch with two clutch component portions separated and the magnetic detection element.

By reference to FIGS. 73 and 74, for example, the description below explains examples where the centerline T of the position detection device 20 and the detection portion 82 of magnetic detection element 80 are shifted from the centerline Z between the clutch component portions 11 and 12 toward the other side in the axial direction according to the twenty-eighth embodiment, t According to the present embodiment, the centerline Z is a virtual line that passes through the intermediate portion between the clutch component portions 11 and 12 and is orthogonal to the axis S. The centerline T is a virtual line that passes through the intermediate portion between the magnetic flux path portions 73 and 74 in the axial direction and extends in the radial direction around the axis S.

The present embodiment differs from the ninth embodiment in the position relationship between the position detection device 20 and the dog clutch 10 and is equal to the ninth embodiment in the other configurations. The same reference numerals in FIGS. 73, 74, and 20 denote the same elements. The present embodiment mainly explains the position relationship between the position detection device 20 and the dog clutch 10.

According to the present embodiment, the magnetic flux path portions 74 and 73 are axially shifted. The end surface 74*a* of the magnetic flux path portion 74 is positioned radially outside the clutch component portion 12 with respect to the axis S. The end surface 74*a* opposes the tooth portion 12*a*, the hole portion 12*b*, and a base portion 12*c*.

The base portion 12*c* is positioned at one side in the axial direction with respect to the tooth portion 12*a* and the hole portion 12*b* of the clutch component portion 12 and holds multiple tooth portions 12*a*. The base portion 12*c* forms the hole portions 12*b* along with the tooth portions 12*a*. The tooth portions 12*a* and the base portion 12*c* of the clutch component portion 12 are made of a magnetic material including iron.

The end surface 73*a* of the magnetic flux path portion 73 is positioned radially outside the clutch component portion 11 with respect to the axis S. The end surface 73*a* opposes the tooth portion 11*a*, the hole portion 11*b*, and the base portion 11*c*.

The base portion 11c is positioned at the other side in the axial direction with respect to the tooth portion 11a and the hole portion 11b of the clutch component portion 11 and holds multiple tooth portions 11a. The base portion 11c forms the hole portions 11b along with the tooth portions 11a. The tooth portions 11a and the base portion 11c of the clutch component portion 11 are made of a magnetic material including iron.

The end surface 74a of the magnetic flux path portion 74 and the end surface 73a of the magnetic flux path portion 73 form the same N-pole magnetic pole. Namely, the end surfaces 74a and 73a form magnetic poles of the same polarity.

The magnetic detection element 80 is positioned between the magnetic flux path portions 73 and 74 of the position detection device 20. The magnetic detection element 80 is positioned radially outside the clutch component portions 11 and 12 around the axis S.

The magnetic detection element 80 includes the detection portion 82 and the detection circuit. As illustrated in FIG. 74, the detection portion 82 detects angle θ of the composite magnetic flux, namely, a combination of the first magnetic flux passing between the end surface 73a and the clutch component portion 11 and the second magnetic flux passing between the end surface 74a and the clutch component portion 12.

Specifically, the detection portion 82 includes the Y-axis Hall element and the X-axis Hall element. The Y-axis Hall element detects the magnetic flux density in the radial direction (vertical direction in FIG. 74) around the axis S. The X-axis Hall element detects the magnetic flux density in the direction (horizontal direction in FIG. 74) connecting the magnetic flux path portions 74 and 73.

The present embodiment identifies the direction of magnetic flux passing through the detection portion 82 by using angle θ found from $Y/X = \tan\theta$, where X denotes the magnetic flux density detected by the X-axis Hall element and Y denotes the magnetic flux density detected by the Y-axis Hall element.

The detection circuit of the magnetic detection element 80 outputs a sensor signal indicating the direction of magnetic flux based on detection values from the X-axis Hall element and the Y-axis Hall element. Hereinafter, magnetic flux angle θ is assumed to be angle θ of a composite magnetic flux detected by the detection portion 82.

According to the present embodiment, the detection portion 82 is positioned at an intermediate portion between the magnetic flux path portions 73 and 74 in the circumferential direction around the axis S.

The description below explains sensor signal Da from the magnetic detection element 80 according to the present embodiment when the clutch component portions 11 and 12 rotate while the tooth portion 11a opposes the tooth portion 12a and the hole portion 11b opposes the hole portion 12b.

Figure 75:
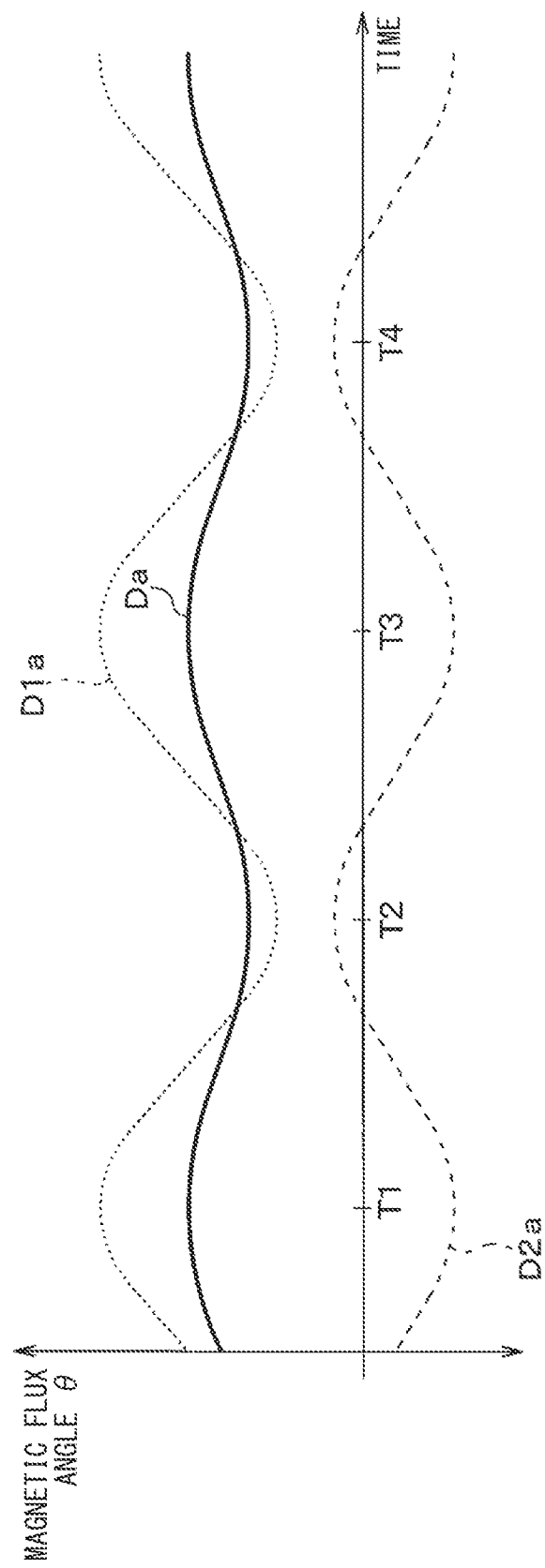
FIG. 75 is a timing chart of a sensor signal from the magnetic detection element according to the twenty-eighth embodiment when the tooth portion of the clutch component portion at one side opposes the tooth portion of the clutch component portion at the other side and the hole portion of the clutch component portion at one side opposes the hole portion of the clutch component portion at the other side.
Figure 76:
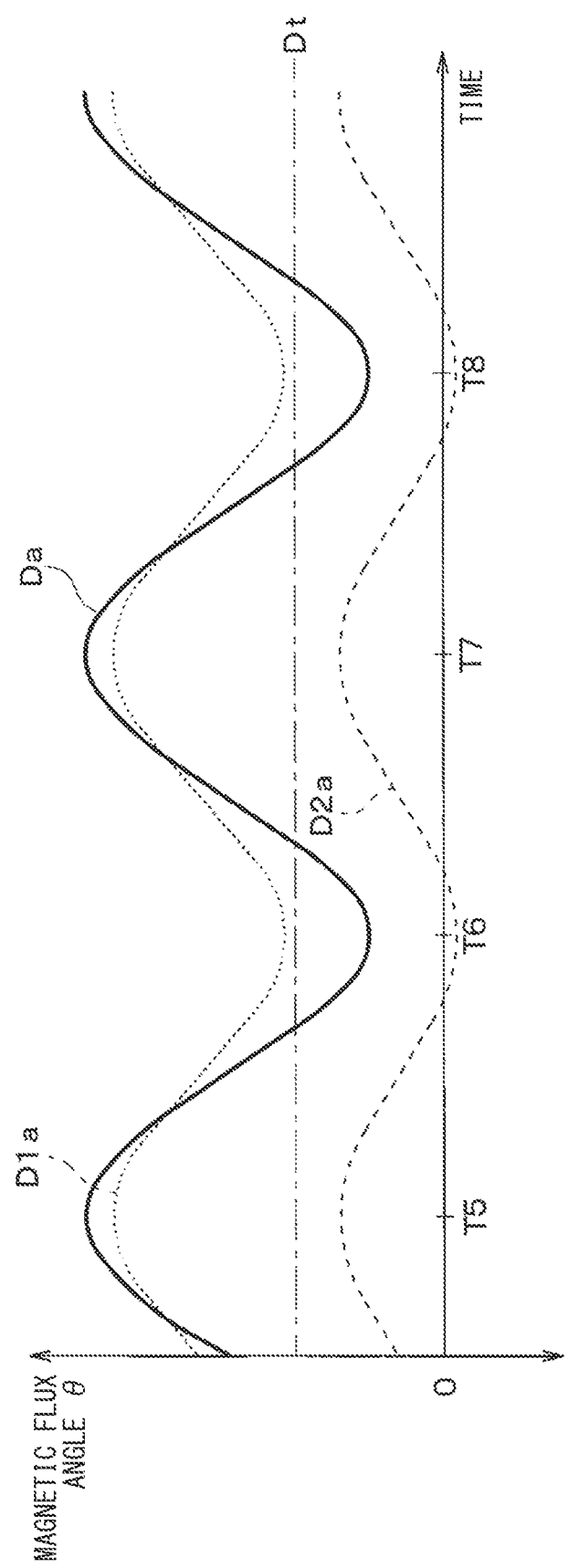
FIG. 76 is a timing chart of a sensor signal from the magnetic detection element according to the twenty-eighth embodiment when the tooth portion of the clutch component portion at one side opposes the hole portion of the clutch component portion at the other side and the hole portion of the clutch component portion at one side opposes the tooth portion of the clutch component portion at the other side.

In FIGS. 75 and 76, signal component D1a of sensor signal Da varies under the influence of the clutch component portion 11. Signal component D2a of sensor signal Da varies under the influence of the clutch component portion 12. Signal components D1a and D2a are added to generate sensor signal Da.

Figure 74:
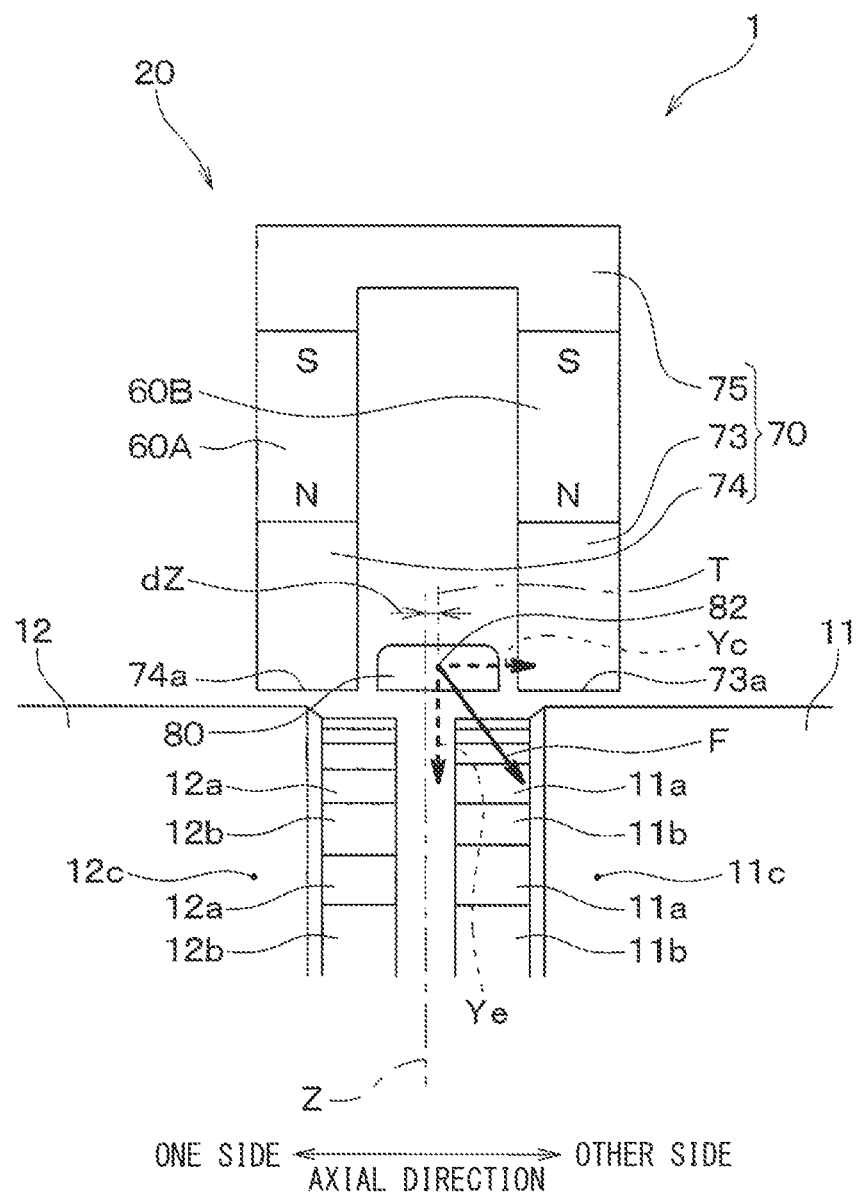
FIG. 74 is a perspective view of the overall configuration of the power transmission system according to the twenty-eighth embodiment as viewed from the radial outside around the axis and illustrates the dog clutch with two clutch component portions separated and the magnetic detection element.

In FIG. 74, arrow Ye indicates the radial inside around the axis S from the detection portion 82. Arrow Yc passes through the detection portion 82 and points toward the other side in the circumferential direction around the axis S. Arrow Ye indicates the reference direction corresponding to the zero degrees of magnetic flux angle θ.

Magnetic flux angle θ is formed between arrows Ye and F. Arrow F indicates the direction of the magnetic flux. A counterclockwise rotation of arrow F increases magnetic flux angle θ. A clockwise rotation of arrow F decreases magnetic flux angle θ. In FIG. 74, magnetic flux angle θ formed between arrow F and arrow Ye indicates a positive value. By reference to FIG. 75, the description below explains signal components D1a and D2a separately.

Signal Component D1a

At timing T1, the tooth portion 11a opposes the magnetic detection element 80 to maximize signal component D1a.

Then, the tooth portion 11a separates from the magnetic detection element 80. The hole portion 11b approaches the magnetic detection element 80. Accordingly, the detected magnetic flux from the magnetic detection element 80 rotates clockwise in FIG. 74. Signal component D1a decreases.

At timing T2, the hole portion 11b opposes the magnetic detection element 80. Signal component D1a is minimized.

Then, the hole portion 11b separates from the magnetic detection element 80. The tooth portion 11a approaches the magnetic detection element 80. Accordingly, the detected magnetic flux from the magnetic detection element 80 rotates counterclockwise in FIG. 74. Signal component D1a increases.

At timing T3, the tooth portion 11a opposes the magnetic detection element 80. The detected magnetic flux from the magnetic detection element 80 is directed toward the tooth portion 11a. Signal component D1a is maximized.

Then, the tooth portion 11a separates from the magnetic detection element 80. The hole portion 11b approaches the magnetic detection element 80. Accordingly, the detected magnetic flux from the magnetic detection element 80 rotates clockwise in FIG. 74. Signal component D1a decreases.

At timing T4, the hole portion 11b opposes the magnetic detection element 80. Signal component D1a is minimized.

The rotation of the clutch component portion 11 sinusoidally varies signal component D1a.

Signal Component D2a

At timing T1, the tooth portion 12a opposes the magnetic detection element 80 to minimize signal component D2a.

Then, the tooth portion 12a separates from the magnetic detection element 80. The hole portion 12b approaches the magnetic detection element 80. Accordingly, the detected magnetic flux from the magnetic detection element 80 rotates counterclockwise in FIG. 74. Signal component D2a increases.

At timing T2, the hole portion 12b opposes the magnetic detection element 80. Signal component D2a is maximized.

Then, the hole portion 12b separates from the magnetic detection element 80. The tooth portion 12a approaches the magnetic detection element 80. Accordingly, the detected magnetic flux from the magnetic detection element 80 rotates clockwise in FIG. 74. Signal component D2a decreases.

At timing T3, the tooth portion 12a opposes the magnetic detection element 80. The detected magnetic flux from the magnetic detection element 80 is directed toward the tooth portion 12a. Signal component D2a is minimized.

Then, the tooth portion 12a separates from the magnetic detection element 80. The hole portion 12b approaches the magnetic detection element 80. Accordingly, the detected magnetic flux from the magnetic detection element 80 rotates counterclockwise in FIG. 74. Signal component D2a increases.

At timing T4, the hole portion 12b opposes the magnetic detection element 80. Signal component D2a is maximized.

The rotation of the clutch component portion 12 sinusoidally varies signal component D2a.

The centerline T of the position detection device 20 and the detection portion 82 are positioned axially at the other side with respect to the centerline Z between the clutch component portions 11 and 12. Signal component D1b is affected by the base portion 11c of the clutch component portion 11. Therefore, signal component D1a is shifted to the positive side of magnetic flux angle θ with respect to signal component D2a.

Signal components D1a and D2a generate opposite-phase waveforms. Therefore, sensor signal Da resulting from adding signal components D1a and D2a generates a sine wave indicating a small amplitude value.

The description below explains sensor signal Da from the magnetic detection element 80 according to the present embodiment when the clutch component portions 11 and 12 rotate while the tooth portion 11a opposes the tooth portion 12b and the hole portion 11b opposes the hole portion 12a.

By reference to FIG. 76, the description below separately explains signal components D1a and D2a contained in sensor signal Da.

Signal Component D1a

At timing T5, the tooth portion 11a opposes the magnetic detection element 80 to maximize signal component D1a.

Then, the tooth portion 11a separates from the magnetic detection element 80. The hole portion 11b approaches the magnetic detection element 80. Accordingly, the detected magnetic flux from the magnetic detection element 80 rotates clockwise in FIG. 74. Signal component D1a decreases.

At timing T6, the hole portion 11b opposes the magnetic detection element 80. Signal component D1a is minimized.

Then, the hole portion 11b separates from the magnetic detection element 80. The tooth portion 11a approaches the magnetic detection element 80. Accordingly, the detected magnetic flux from the magnetic detection element 80 rotates counterclockwise in FIG. 74. Signal component D1a increases.

At timing T7, the tooth portion 11a opposes the magnetic detection element 80. The detected magnetic flux from the magnetic detection element 80 is directed toward the clutch component portion 12. Signal component D1a is maximized.

Then, the tooth portion 11a separates from the magnetic detection element 80. The hole portion 11b approaches the magnetic detection element 80. Accordingly, the detected magnetic flux from the magnetic detection element 80 rotates clockwise in FIG. 74. Signal component D1a decreases.

At timing T8, the hole portion 11b opposes the magnetic detection element 80. The detected magnetic flux from the magnetic detection element 80 rotates clockwise. Signal component D1a is minimized.

The rotation of the clutch component portion 11 sinusoidally varies signal component D1a.

Signal Component D2a

At timing T5, the hole portion 12b opposes the magnetic detection element 80 to maximize signal component D2a.

Then, the hole portion 12b separates from the magnetic detection element 80. The tooth portion 12a approaches the magnetic detection element 80. Accordingly, the detected magnetic flux from the magnetic detection element 80 rotates clockwise in FIG. 74. Signal component D2a decreases.

At timing T6, the tooth portion 12a opposes the magnetic detection element 80. Signal component D2a is minimized.

Then, the tooth portion 12a separates from the magnetic detection element 80. The hole portion 12b approaches the magnetic detection element 80. Accordingly, the detected magnetic flux from the magnetic detection element 80 rotates counterclockwise in FIG. 74. Signal component D2a increases.

At timing T7, the hole portion 12b opposes the magnetic detection element 80 to maximize signal component D2a.

Then, the hole portion 12b separates from the magnetic detection element 80. The tooth portion 12a approaches the magnetic detection element 80. Accordingly, the detected magnetic flux from the magnetic detection element 80 rotates clockwise in FIG. 74. Signal component D2a decreases.

At timing T8, the tooth portion 12a opposes the magnetic detection element 80. Signal component D2a is minimized.

The rotation of the clutch component portion 12 sinusoidally varies signal component D2a.

The centerline T of the position detection device 20 and the detection portion 82 are positioned axially at the other side with respect to the centerline Z between the clutch component portions 11 and 12. Signal component D1b is affected by the base portion 11c of the clutch component portion 11. Therefore, signal component D1a is shifted to the positive side of magnetic flux angle θ with respect to signal component D2a.

Signal components D1a and D2a generate same-phase waveforms. Therefore, sensor signal Da resulting from adding signal components D1a and D2a generates a sine wave indicating a large amplitude value. According to the present embodiment, the minimum value of sensor signal Da is larger than zero.

By reference to FIG. 77, the description below explains the present embodiment where the drive source 30 rotates the clutch component portion 11 to change relative rotation speeds of the clutch component portion 11 with respect to the clutch component portion 12 while the clutch component portion 12 rotates.

Figure 77:
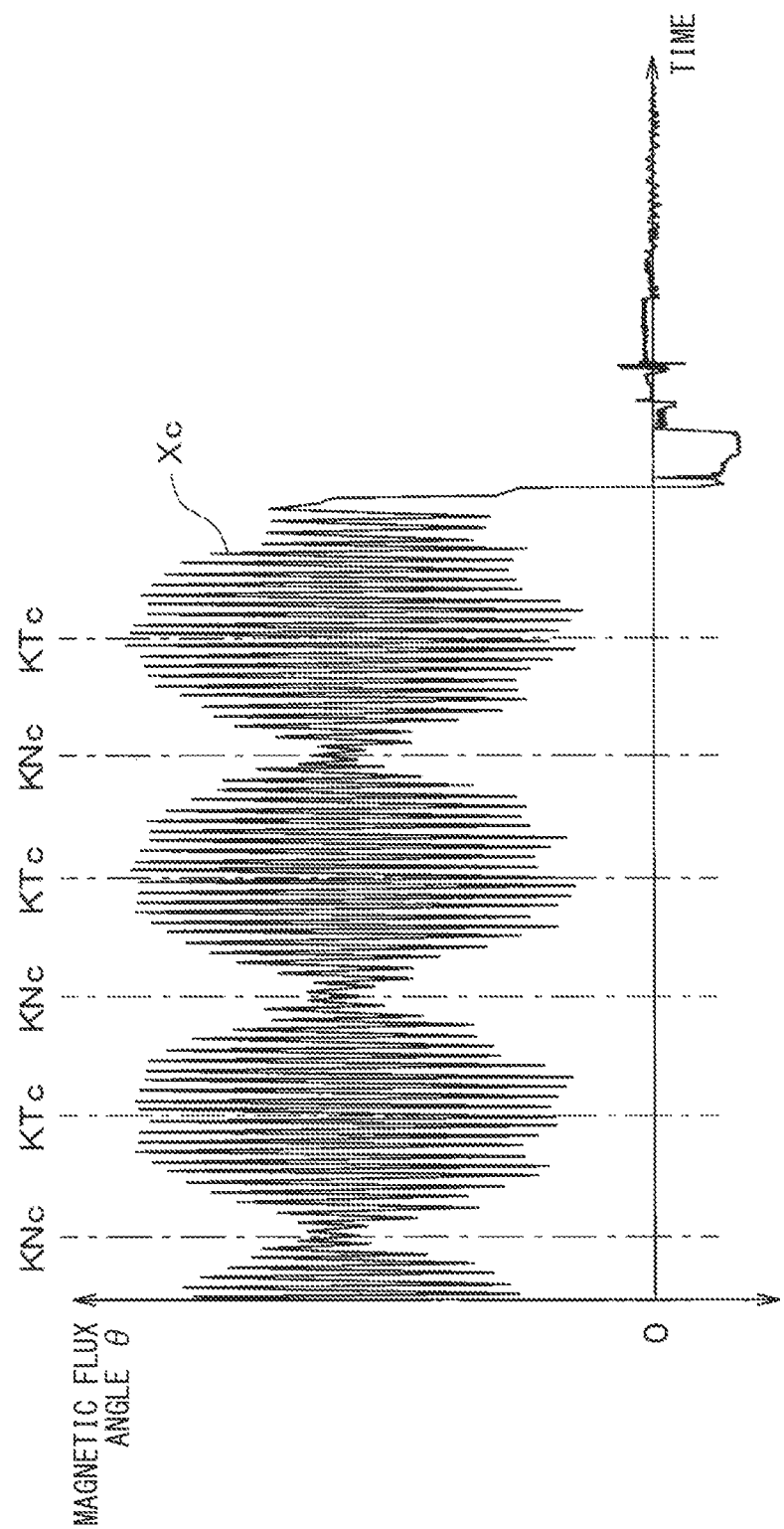
FIG. 77 is a timing chart of a sensor signal output from a magnetic detection element according to the twenty-eighth embodiment when the two clutch component portions are rotated to change a relative speed between the two clutch component portions.

At timing KNc in FIG. 77, the tooth portions 11a and 12a oppose each other and the hole portions 11b and 12b oppose each other while the clutch component portions 11 and 12 rotate around the axis S.

At timing KTc in FIG. 77, the tooth portion 11a opposes the hole portion 11b and the tooth portion 12a opposes the hole portion 12b while the clutch component portions 11 and 12 rotate around the axis S.

At timing KNc, the tooth portions 11a and 12a oppose each other and the hole portions 11b and 12b oppose each other to minimize the amplitude value of sensor signal Xc from the magnetic detection element 80. At timing KTc, the tooth portion 11a opposes the hole portion 11b and the tooth portion 12a opposes the hole portion 12b to maximize the amplitude value of sensor signal Xc from the magnetic detection element 80.

The clutch component portions 11 and 12 may rotate while the clutch component portions 11 and 12 are disengaged. Then, the minimum value of sensor signal Xc from the magnetic detection element 80 is larger than zero.

In FIG. 77, suppose the tooth portion 11a engages the hole portion 11b, the tooth portion 12a engages the hole portion 12b, and the clutch component portions 11 and 12 engage with each other and rotate. Then, sensor signal Xc converges to zero over time.

Figure 78:
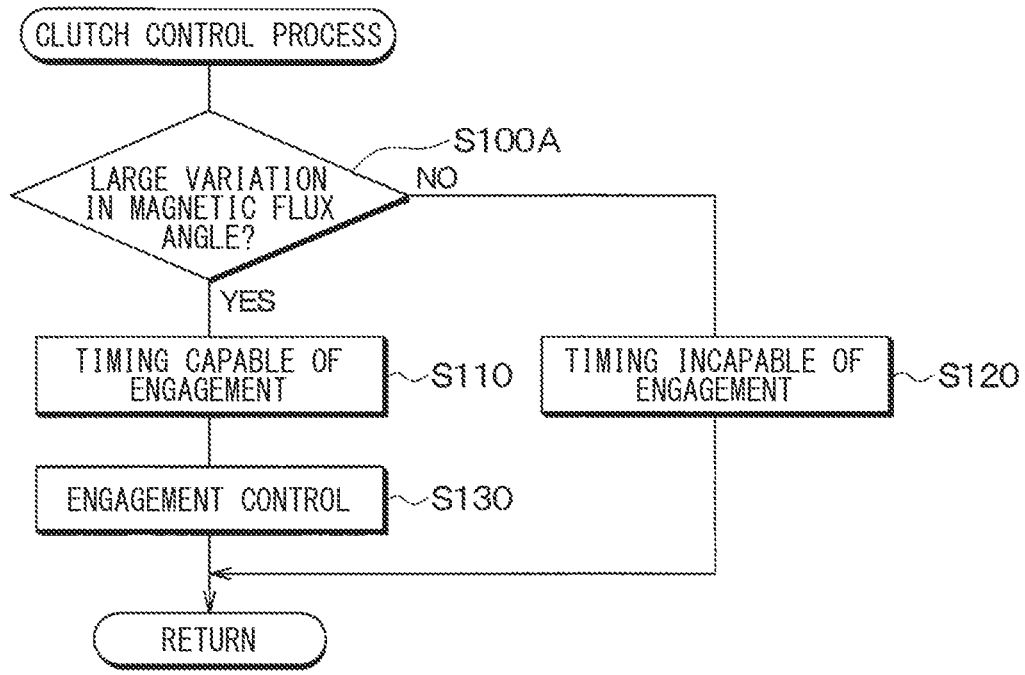
FIG. 78 is a flowchart illustrating details of the clutch control process on the control device according to the twenty-eighth embodiment.
Figure 79:
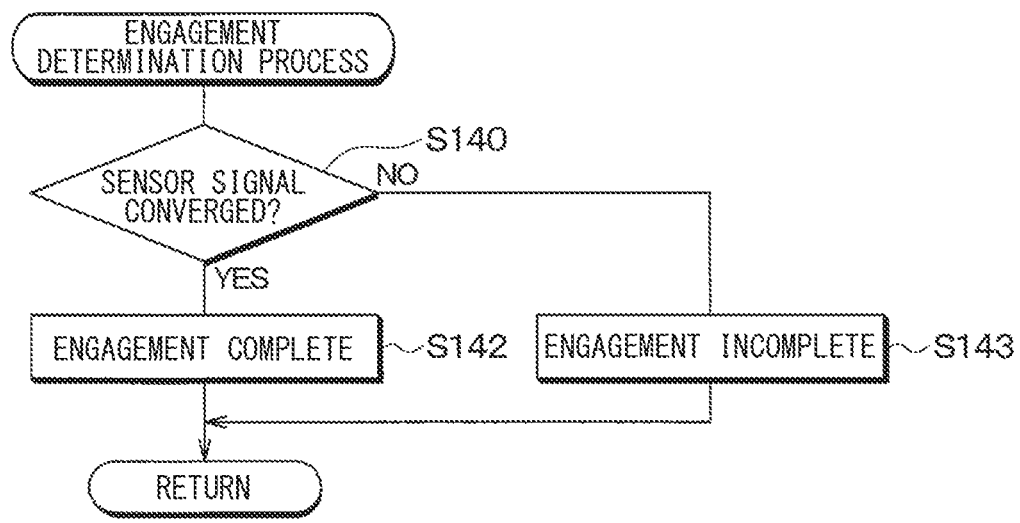
FIG. 79 is a flowchart illustrating details of an engagement determination process on the control device according to the twenty-eighth embodiment.

By reference to FIGS. 78 and 79, the description below explains details of control processes on the control device 50. FIG. 78 is a flowchart illustrating the details of the clutch control process on the control device 50. FIG. 79 is a flowchart illustrating the details of the engagement determination process on the control device 50.

The clutch control process and the engagement determination process will be explained separately.

Clutch Control Process

The control device 50 performs the clutch control process according to the flowchart in FIG. 78.

At step S100A, the control device 50, as an engagement determination unit, determines whether the sensor signal is greater than or equal to threshold value Ha, based on the sensor signal from the magnetic detection element 80.

The sensor signal may be smaller than threshold value Ha. Then, the control device 50 determines NO at step S100A. At step S120, the control device 50 determines that the timing disables the clutch component portions 11 and 12 from engaging with each other.

The sensor signal may be greater than or equal to threshold value Ha. Then, the control device 50 determines YES at step S100A on the assumption that the sensor signal indicates the maximum amplitude. Then, at step S110, the control device 50 determines the timing at which the tooth portion 11a opposes the hole portion 11b, the tooth portion 12a opposes the hole portion 12b, and the clutch component portions 11 and 12 can engage with each other.

At step S130, the control device 50, as an engagement control unit, controls the actuator 40 to move the clutch component portion 11 toward one side in the axial direction. Then, the clutch component portion 11 engages the clutch component portion 12.

Engagement Determination Process

The control device 50 performs the engagement determination process according to the flowchart in FIG. 79. The engagement determination process is performed each time the control device 50 performs the engagement control process at step S130.

At step S140, the control device 50, as an engagement determination unit, determines whether the sensor signal from the magnetic detection element 80 converges to a first predetermined value (such as zero). Specifically, the control device 50 determines whether the absolute value of the sensor signal is smaller than or equal to threshold value Hb.

The first predetermined value according to the present embodiment is a value smaller than the minimum value for sensor signals from the magnetic detection element 80 when the control device 50 determines YES at step S100A on the assumption that the sensor signal is greater than or equal to threshold value Ha.

The absolute value of the sensor signal may be smaller than threshold value Hb. Then, the control device 50 determines YES at step S140 on the assumption that the sensor signal from the magnetic detection element 80 converges to the first predetermined value. At step S142, the control device 50 determines that the clutch component portions 11 and 12 are engaged completely.

The absolute value of the sensor signal may be greater than or equal to threshold value Hb. Then, the control device 50 determines NO at step S140 on the assumption that the sensor signal from the magnetic detection element 80 does not converge to the first predetermined value. At step S143, the control device 50 determines that the clutch component portions 11 and 12 are not engaged completely.

According to the present embodiment described above, the position detection device 20 includes the magnets 60A and 60B, the magnetic detection element 80, and the yoke 70. The yoke 70 includes the magnetic flux path portion 73 as a magnetic field generator that is positioned radially outside the clutch component portion 11 around the axis S and forms the end surface 73a to provide the N pole.

The yoke 70 includes the magnetic flux path portion 74 as a magnetic field generator that is positioned radially outside the clutch component portions 11 and 12 around the axis S and forms the end surface 74a to provide the N pole. The magnetic detection element 80 is positioned radially outside the clutch component portions 11 and 12 around the axis S and is provided between the magnetic flux path portions 73 and 74.

The magnetic detection element 80 outputs a sensor signal indicating magnetic flux angle $\theta$ of the composite magnetic flux. The composite magnetic flux is a combination of the first magnetic flux passing between the end surface 73a and the clutch component portion 11 and the second magnetic flux passing between the end surface 74a and the clutch component portion 12.

The sensor signal amplitude varies with the position relationship among the hole portion 11b, the tooth portion 11a, the hole portion 12b, and the tooth portion 12a in the rotation direction around the axis S. Based on this, the magnetic detection element 80 outputs a sensor signal indicating the position relationship.

It is possible to provide the position detection device 20 that detects the rotational position relationship between the clutch component portions 11 and 12 in the rotation direction.

According to the present embodiment, the control device 50 determines whether the sensor signal amplitude is greater than or equal to the threshold value, based on the sensor signal from the magnetic detection element 80. The control device 50 can accurately determine the engageable timing at which the clutch component portions 11 and 12 can engage with each other.

According to the present embodiment, the control device 50 determines whether the sensor signal from the magnetic detection element 80 converges to the first predetermined value (such as zero) and thereby determines whether the clutch component portions 11 and 12 engage completely. It is possible to accurately determine whether the clutch component portions 11 and 12 engage completely.

Twenty-Ninth Embodiment

The twenty-eighth embodiment has described the example where the end surfaces 73a and 74a of the yoke 70 form the N poles. Instead, by reference to FIG. 80, for example, the description below explains the twenty-ninth embodiment according to which the end surface 73a of the yoke 70 forms the S pole and the end surface 74a forms the N pole.

The present embodiment mainly differs from the twenty-eighth embodiment in the magnetic pole polarities of the end surfaces 73a and 74a of the yoke 70 and is substantially equal to the twenty-eighth embodiment in the other configurations. The same reference numerals in FIGS. 80, 73, and 74 denote the same elements.

The end surface 74a of the magnetic flux path portion 74 is positioned radially inside around the axis S and forms the N pole. The magnet 60A is positioned radially outside the magnetic flux path portion 74. The N pole is formed at the end of the magnet 60A radially inward around the axis S. The S pole is formed at the end of the magnet 60A radially outward around the axis S.

The end surface 73a of the magnetic flux path portion 73 is positioned radially inside around the axis S and forms the S pole. According to the present embodiment, the magnet 60B is positioned radially outside the magnetic flux path portion 73. The S pole is formed at the end of the magnet 60B radially inward around the axis S. The N pole is formed at the end of the magnet 60B radially outward around the axis S.

The end surface 74a of the magnetic flux path portion 74 and the end surface 73a of the magnetic flux path portion 73 form the magnetic poles of different polarities. According to the present embodiment, the centerline T of the position detection device 20 and the detection portion 82 of magnetic detection element 80 are shifted from the centerline Z between the clutch component portions 11 and 12 toward the other side in the axial direction.

The end surface 74a of the magnetic flux path portion 74 is positioned radially outside the clutch component portion 12 around the axis S. The end surface 74a opposes the tooth portion 12a, the hole portion 12b, and the base portion 12c.

The end surface 73a of the magnetic flux path portion 73 is positioned radially outside the clutch component portion 11 around the axis S. The end surface 73a opposes the tooth portion 11a, the hole portion 11b, and the base portion 11c.

The magnetic detection element 80 is positioned radially outside the clutch component portions 11 and 12 around the axis S. The magnetic detection element 80 is provided between magnetic flux path portions 73 and 74. The magnetic detection element 80 outputs a sensor signal indicating angle θ of the magnetic flux passing between the magnetic flux path portions 73 and 74.

The sensor signal amplitude varies with the position relationship among the hole portion 11b, the tooth portion 11a, the hole portion 12b, and the tooth portion 12a in the rotation direction around the axis S. Based on this, the magnetic detection element 80 outputs a sensor signal indicating the position relationship.

By reference to FIGS. 80, 81, and 82, the description below explains the present embodiment concerning sensor signal db from the magnetic detection element 80 when the clutch component portions 11 and 12 rotate while the tooth portion 11a opposes the tooth portion 12a and the hole portion 11b opposes the hole portion 12b.

Figure 81:
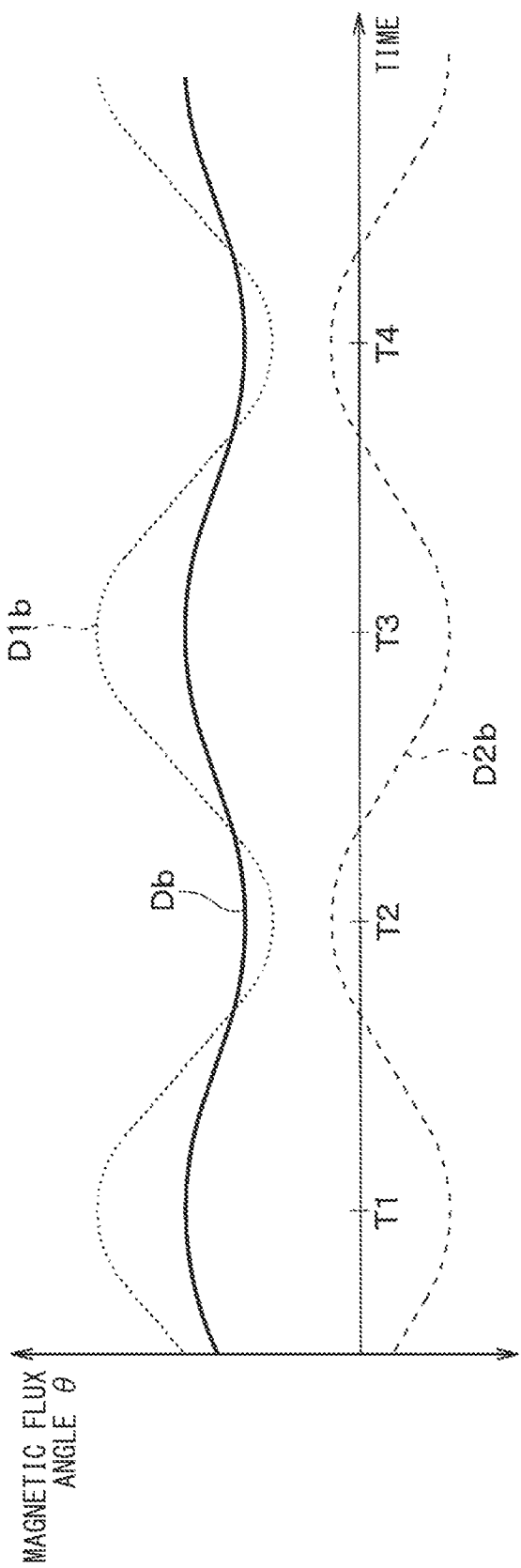
FIG. 81 is a timing chart of a sensor signal from the magnetic detection element according to the twenty-ninth embodiment when the tooth portion of the clutch component portion at one side opposes the tooth portion of the clutch component portion at the other side and the hole portion of the clutch component portion at one side opposes the hole portion of the clutch component portion at the other side.
Figure 82:
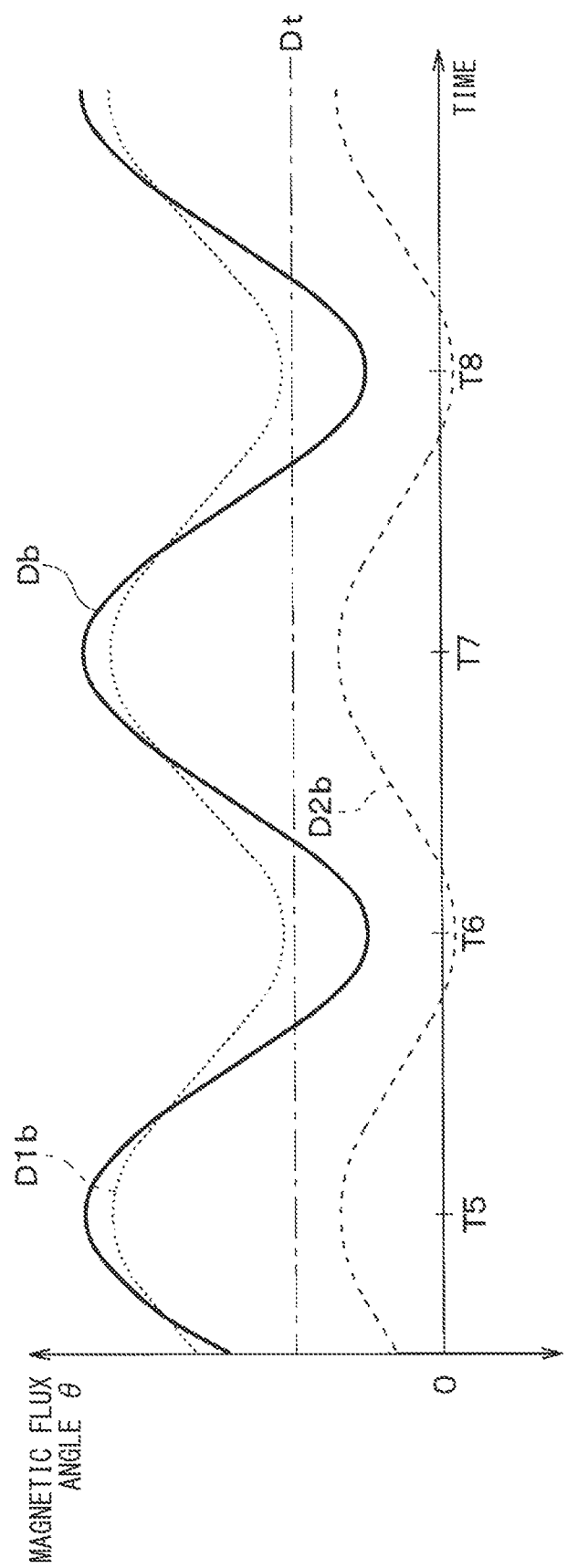
FIG. 82 is a timing chart of a sensor signal from the magnetic detection element according to the twenty-ninth embodiment when the tooth portion of the clutch component portion at one side opposes the hole portion of the clutch component portion at the other side and the hole portion of the clutch component portion at one side opposes the tooth portion of the clutch component portion at the other side.

In FIGS. 81 and 82, signal component D1b of sensor signal db varies under the influence of the clutch component portion 11. Signal component D2b of sensor signal db varies under the influence of the clutch component portion 12. Signal components D1b and D2b are added to generate sensor signal db.

Figure 80:
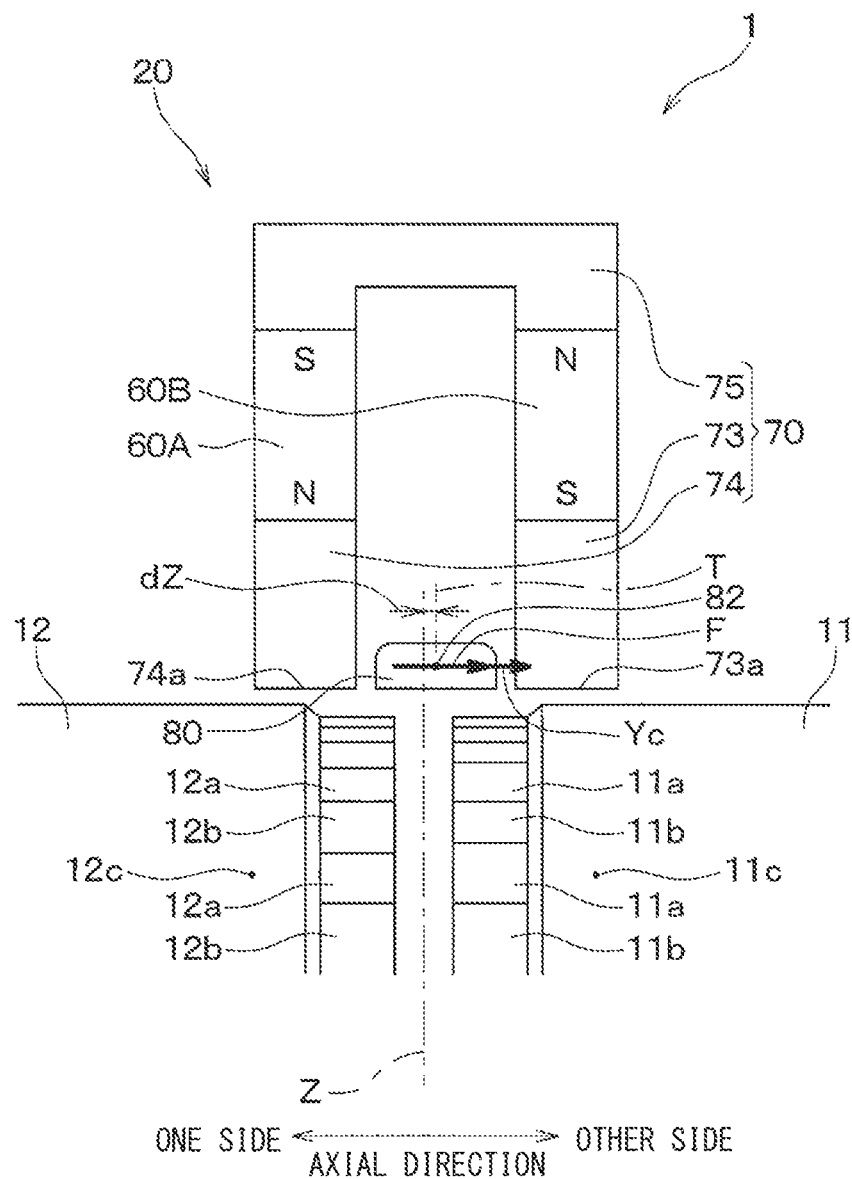
FIG. 80 is a perspective view of the overall configuration of the power transmission system according to a twenty-ninth embodiment as viewed from the radial outside around the axis and illustrates the dog clutch with two clutch component portions separated and the magnetic detection element.

In FIG. 80, arrow F indicates the direction of the magnetic flux detected by the detection portion 82 of the magnetic detection element 80. Arrow Yc indicates the passage from the magnetic flux path portion 74, the detection portion 82, and then to the magnetic flux path portion 73. Arrow Yc indicates the reference direction corresponding to the zero degrees of magnetic flux angle θ. Magnetic flux angle θ is formed between arrows Yc and F. As above, arrow F indicates the direction of the magnetic flux. The counterclockwise rotation of arrow F decreases magnetic flux angle θ. The clockwise rotation of arrow F increases magnetic flux angle θ.

In FIG. 80, arrows F and Yc point to the other side in the circumferential direction around the axis S and magnetic flux angle θ becomes zero. In FIG. 80, arrows F and Yc point to the right in the drawing.

By reference to FIGS. 80 and 81, the description below separately explains signal components D1b and D2b contained in sensor signal db.

Signal Component D1b

At timing T1, the tooth portion 11a opposes the magnetic detection element 80 to maximize signal component D1b.

Then, the tooth portion 11a separates from the magnetic detection element 80. The hole portion 11b approaches the magnetic detection element 80. Accordingly, the detected magnetic flux from the magnetic detection element 80 rotates counterclockwise in FIG. 80. Signal component D1b decreases.

At timing T2, the hole portion 11b opposes the magnetic detection element 80. Signal component D1b is minimized.

Then, the hole portion 11b separates from the magnetic detection element 80. The tooth portion 11a approaches the magnetic detection element 80. Accordingly, the detected magnetic flux from the magnetic detection element 80 rotates clockwise in FIG. 80. Signal component D1b increases.

At timing T3, the tooth portion 11a opposes the magnetic detection element 80 to maximize signal component D1b.

Then, the tooth portion 11a separates from the magnetic detection element 80. The hole portion 11b approaches the magnetic detection element 80. Accordingly, the detected magnetic flux from the magnetic detection element 80 rotates counterclockwise in FIG. 80. Signal component D1b decreases.

At timing T4, the hole portion 11b opposes the magnetic detection element 80. Signal component D1b is minimized.

The rotation of the clutch component portion 11 sinusoidally varies signal component D1b.

Signal Component D2b

At timing T1, the tooth portion 12a opposes the magnetic detection element 80 to minimize signal component D2b.

Then, the tooth portion 12a separates from the magnetic detection element 80. The hole portion 12b approaches the magnetic detection element 80. Accordingly, the detected magnetic flux from the magnetic detection element 80 rotates clockwise in FIG. 80. Signal component D2b increases.

At timing T2, the hole portion 12b opposes the magnetic detection element 80. Signal component D2b is maximized.

Then, the hole portion 12b separates from the magnetic detection element 80. The tooth portion 12a approaches the magnetic detection element 80. Accordingly, the detected magnetic flux from the magnetic detection element 80 rotates counterclockwise in FIG. 80. Signal component D2b decreases.

At timing T3, the tooth portion 12a opposes the magnetic detection element 80. Signal component D2b is minimized.

Then, the tooth portion 12a separates from the magnetic detection element 80. The hole portion 12b approaches the magnetic detection element 80. Accordingly, the detected magnetic flux from the magnetic detection element 80 rotates clockwise in FIG. 80. Signal component D2b increases.

At timing T4, the hole portion 12b opposes the magnetic detection element 80. Signal component D2b is maximized.

The rotation of the clutch component portion 12 sinusoidally varies signal component D2b.

The centerline T of the position detection device 20 and the detection portion 82 are positioned axially at the other side with respect to the centerline Z between the clutch component portions 11 and 12. Signal component D1b is affected by the base portion 11c of the clutch component portion 11. Therefore, signal component D1b is shifted to the positive side of magnetic flux angle θ with respect to signal component D2b.

Signal components D1b and D2b generate opposite-phase waveforms. Therefore, sensor signal db resulting from adding signal components D1$b$ and D2$b$ generates a sine wave indicating a small amplitude value.

The description below explains sensor signal db from the magnetic detection element 80 according to the present embodiment when the clutch component portions 11 and 12 rotate while the tooth portion 11$a$ opposes the tooth portion 12$b$ and the hole portion 11$b$ opposes the hole portion 12$a$.

By reference to FIGS. 80 and 82, the description below separately explains signal components D1$b$ and D2$b$ contained in sensor signal db.

Signal Component D1$b$

At timing T5, the tooth portion 11$a$ opposes the magnetic detection element 80 to maximize signal component D1$b$.

Then, the tooth portion 11$a$ separates from the magnetic detection element 80. The hole portion 11$b$ approaches the magnetic detection element 80. Accordingly, the detected magnetic flux from the magnetic detection element 80 rotates counterclockwise in FIG. 80. Signal component D1$b$ decreases.

At timing T6, the hole portion 11$b$ opposes the magnetic detection element 80. Signal component D1$b$ is minimized.

Then, the hole portion 11$b$ separates from the magnetic detection element 80. The tooth portion 11$a$ approaches the magnetic detection element 80. Accordingly, the detected magnetic flux from the magnetic detection element 80 rotates clockwise in FIG. 80. Signal component D1$b$ increases.

At timing T7, the tooth portion 11$a$ opposes the magnetic detection element 80. Signal component D1$b$ is maximized.

Then, the tooth portion 11$a$ separates from the magnetic detection element 80. The hole portion 11$b$ approaches the magnetic detection element 80. Accordingly, the detected magnetic flux from the magnetic detection element 80 rotates clockwise in FIG. 80. Signal component D1$b$ decreases.

At timing T8, the hole portion 11$b$ opposes the magnetic detection element 80. Signal component D1$b$ is minimized.

The rotation of the clutch component portion 11 sinusoidally varies signal component D1$b$.

Signal Component D2$b$

At timing T5, the hole portion 12$b$ opposes the magnetic detection element 80 to maximize signal component D2$b$.

Then, the hole portion 12$b$ separates from the magnetic detection element 80. The tooth portion 12$a$ approaches the magnetic detection element 80. Accordingly, the detected magnetic flux from the magnetic detection element 80 rotates counterclockwise in FIG. 80. Signal component D2$b$ decreases.

At timing T6, the tooth portion 12$a$ opposes the magnetic detection element 80. Signal component D2$b$ is minimized.

Then, the tooth portion 12$a$ separates from the magnetic detection element 80. The hole portion 12$b$ approaches the magnetic detection element 80. Accordingly, the detected magnetic flux from the magnetic detection element 80 rotates clockwise in FIG. 80. Signal component D2$b$ increases.

At timing T7, the hole portion 12$b$ opposes the magnetic detection element 80 to maximize signal component D2$b$.

Then, the hole portion 12$b$ separates from the magnetic detection element 80. The tooth portion 12$a$ approaches the magnetic detection element 80. Accordingly, the detected magnetic flux from the magnetic detection element 80 rotates counterclockwise in FIG. 80. Signal component D2$b$ decreases.

At timing T8, the tooth portion 12$a$ opposes the magnetic detection element 80. Signal component D2$b$ is minimized.

The rotation of the clutch component portion 12 sinusoidally varies signal component D2$b$.

The centerline T of the position detection device 20 and the detection portion 82 are positioned axially at the other side with respect to the centerline Z between the clutch component portions 11 and 12. Signal component D1$b$ is affected by the base portion 11$c$ of the clutch component portion 11. Therefore, signal component D1$b$ is shifted to the positive side of magnetic flux angle θ with respect to signal component D2$b$.

Signal components D1$b$ and D2$b$ generate same-phase waveforms. Therefore, sensor signal db resulting from adding signal components D1$b$ and D2$b$ generates a sine wave indicating a large amplitude value.

According to the present embodiment, the clutch component portions 11 and 12 may rotate while the clutch component portions 11 and 12 are disengaged. Then, the minimum value of sensor signal db is larger than zero.

By reference to FIG. 83, the description below explains the present embodiment where the drive source 30 rotates the clutch component portion 11 to change relative rotation speeds of the clutch component portion 11 with respect to the clutch component portion 12 while the clutch component portions 11 and 12 rotate.

Figure 83:
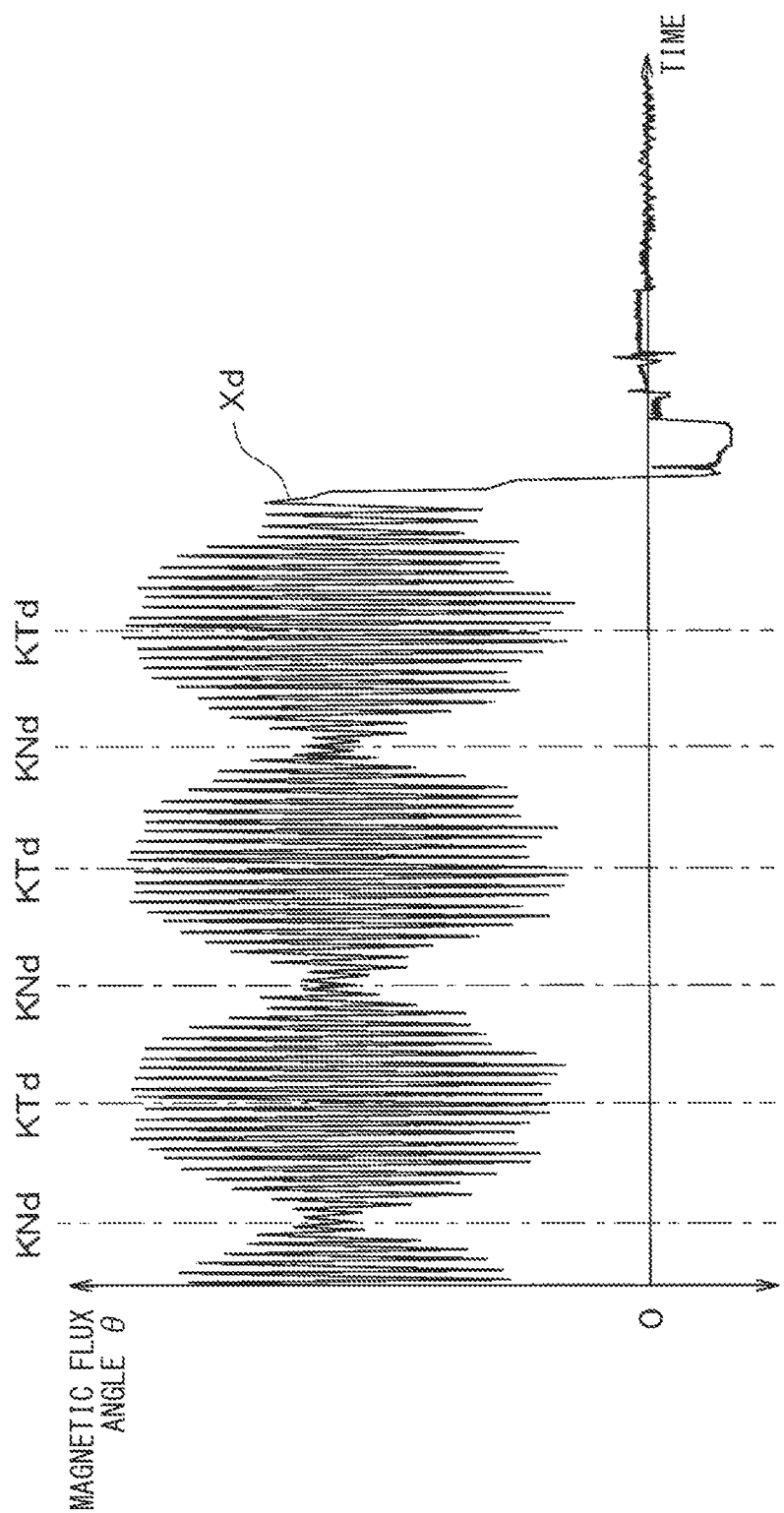
FIG. 83 is a timing chart of a sensor signal output from a magnetic detection element according to the twenty-ninth embodiment when the two clutch component portions are rotated to change a relative speed between the two clutch component portions.

At timing KNd in FIG. 83, the tooth portions 11$a$ and 12$a$ oppose each other and the hole portions 11$b$ and 12$b$ oppose each other while the clutch component portions 11 and 12 rotate around the axis S.

At timing KTd in FIG. 83, the tooth portion 11$a$ opposes the hole portion 11$b$ and the tooth portion 12$a$ opposes the hole portion 12$b$ while the clutch component portions 11 and 12 rotate around the axis S.

At timing KNd, the tooth portions 11$a$ and 12$a$ oppose each other and the hole portions 11$b$ and 12$b$ oppose each other to minimize the amplitude value of sensor signal Xd from the magnetic detection element 80. At timing KTd, the tooth portion 11$a$ opposes the hole portion 11$b$ and the tooth portion 12$a$ opposes the hole portion 12$b$ to maximize the amplitude value of sensor signal Xd from the magnetic detection element 80.

The clutch component portions 11 and 12 may rotate while the clutch component portions 11 and 12 are disengaged. Then, the minimum value of sensor signal Xd from the magnetic detection element 80 is larger than zero.

In FIG. 83, suppose the tooth portion 11$a$ engages the hole portion 11$b$, the tooth portion 12$a$ engages the hole portion 12$b$, and the clutch component portions 11 and 12 engage with each other. Then, sensor signal Xd converges to zero over time.

Figure 85:
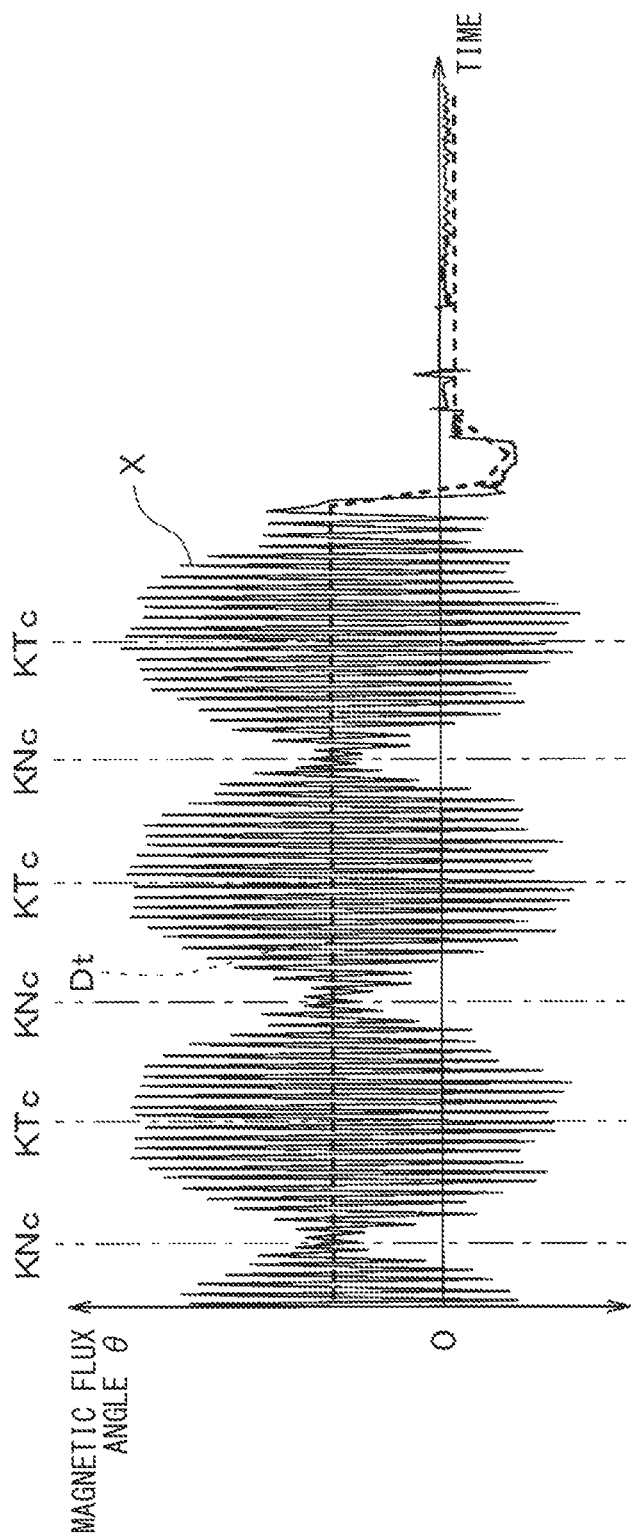
FIG. 85 is a timing chart of a sensor signal output from a magnetic detection element according to the other embodiments when the two clutch component portions are rotated to change a relative speed between the two clutch component portions.

In FIG. 85, reference numeral Dt indicates the DC component of sensor signal Xd from the magnetic detection element 80. When the clutch component portions 11 and 12 are disengaged, the DC component of sensor signal Xd shows a positive value. When the clutch component portions 11 and 12 are engaged with each other, the DC component of sensor signal Xd converges to zero over time.

By reference to FIGS. 78 and 79, the description below explains details of control processes on the control device 50.

Similar to the twenty-eighth embodiment, the control device 50 performs the clutch control process according to the flowchart in FIG. 78.

The sensor signal amplitude may be smaller than the threshold value. Then, the control device 50 determines NO at step S100A. At step S120, the control device 50 determines that the timing disables the clutch component portions 11 and 12 from engaging with each other.

The sensor signal amplitude may be greater than or equal to the threshold value. Then, the control device 50 determines YES at step S100A on the assumption that the sensor signal indicates the maximum amplitude. Then, at step S110, the control device 50 determines the timing at which the tooth portion 11*a* opposes the hole portion 11*b*, the tooth portion 12*a* opposes the hole portion 12*b*, and the clutch component portions 11 and 12 can engage with each other.

At step S130, the control device 50 controls the actuator 40 to move the clutch component portion 11 toward one side in the axial direction. Then, the clutch component portion 11 engages the clutch component portion 12.

Similar to the twenty-eighth embodiment, the control device 50 performs the engagement determination process according to the flowchart in FIG. 79.

The control device 50 determines whether the sensor signal from the magnetic detection element 80 converges to the first predetermined value (such as zero). Specifically, the sensor signal may be smaller than threshold value Hb. Then, the control device 50 determines YES at step S140 on the assumption that the sensor signal from the magnetic detection element 80 converges to the first predetermined value. At step S142, the control device 50 determines that the clutch component portions 11 and 12 are engaged completely.

The sensor signal may be greater than or equal to threshold value Hb. Then, the control device 50 determines NO at step S140 on the assumption that the sensor signal from the magnetic detection element 80 does not converge to the first predetermined value. At step S143, the control device 50 determines that the clutch component portions 11 and 12 are not engaged completely.

Similar to the twenty-eighth embodiment, the present embodiment can provide the position detection device 20 that detects the rotational position relationship between the clutch component portions 11 and 12 in the rotation direction.

According to the present embodiment, the control device 50 determines whether the sensor signal amplitude is greater than or equal to the threshold value, based on the sensor signal from the magnetic detection element 80. The control device 50 can accurately determine the engageable timing at which the clutch component portions 11 and 12 can engage with each other.

According to the present embodiment, the control device 50 determines whether the sensor signal from the magnetic detection element 80 converges to the first predetermined value (such as zero) and thereby determines whether the clutch component portions 11 and 12 engage completely. It is possible to accurately determine whether the clutch component portions 11 and 12 engage completely.

Other Embodiments (1) The first and the seventh embodiments have described the example of using a permanent magnet for the magnet 60 of the position detection device 20. Instead, an electric magnet may be used for the magnet 60 of the position detection device 20.

(2) The second through the sixth embodiments and the eighth through the twenty-ninth embodiments have described the example of using permanent magnets for the magnets 60A and 60B of the position detection device 20. Instead, electric magnets may be used for the magnets 60A and 60B of the position detection device 20.

(3) The first and the seventh embodiments have described the example of using one magnet for the position detection device 20. The second through the sixth embodiments and the eighth through the twenty-ninth embodiments have described the example of using two magnets for the position detection device 20.

Instead, the second through the sixth embodiments and the eighth through the twenty-fifth embodiments may use three or more magnets for the position detection device 20.

The twenty-sixth to the twenty-ninth embodiments have described the example of using two magnets for the position detection device 20. Instead, similar to the first and the seventh embodiments, one magnet may be used to configure the position detection device 20.

(4) The eleventh and the twelfth embodiments have described the example of providing the gap 75*d* for the magnetic flux path portion 75 of the yoke 70 in the position detection device 20. Instead, a gap may be provided for the magnetic flux path portions 74 and 73 of the yoke 70.

(5) The eleventh and the twelfth embodiments have described the example of providing the gap 75*d* for the yoke 70 in the position detection device 20 to divide the yoke 70 in the direction of magnetic flux passage.

Similarly, the first through the tenth embodiments and the thirteenth the through twenty-ninth embodiments may provide a gap for the yoke 70 in the position detection device 20.

(6) The first through the twenty-ninth embodiments have described the example of using a Hall element to configure the magnetic detection element 80. Moreover, magnetic resistance elements such as TMR, GMR, or AMR elements may be used to configure the magnetic detection element 80.

(7) The first through the twenty-ninth embodiments have described the example where the actuator 40 moves the clutch component portion 11 to one side in the axial direction to couple the clutch component portion 11 with the clutch component portion 12. Instead, there may be alternatives as follows.

For example, the actuator 40 moves the clutch component portion 12 to the other side in the axial direction to couple the clutch component portion 12 with the clutch component portion 11.

Alternatively, the actuator 40 moves the clutch component portion 12 to the other side in the axial direction and moves the clutch component portion 11 to one side in the axial direction to couple the clutch component portions 12 and 11.

(8) The first and the sixth embodiments have described the example of positioning the face 62 of the magnet 60 radially inward and positioning the face 61 of the magnet 60 radially outward. Instead, the face 61 of the magnet 60 may be positioned radially inward and the face 62 of the magnet 60 may be positioned radially outward.

(9) The twenty-sixth and the twenty-eighth embodiments have described the example of using the radial inside of the magnet 60A as the N pole, using the radial outside of the magnet 60A as the S pole, using the radial inside of the magnet 60B as the N pole, and using the radial outside of the magnet 60B as the S pole.

Instead, the radial inside of the magnet 60A may be used as the S pole. The radial outside of the magnet 60A may be used as the N pole. The radial inside of the magnet 60B may be used as the S pole. The radial outside of the magnet 60B may be used as the N pole. In this case, the end surface 73*a* of the yoke 70 forms the S pole, and the end surface 74*a* of the yoke 70 forms the S pole.

(10) The twenty-seventh and the twenty-ninth embodiments have described the example of using the radial inside of the magnet 60A as the N pole, using the radial outside of the magnet 60A as the S pole, using the radial inside of the magnet 60B as the S pole, and using the radial outside of the magnet 60B as the N pole.

Instead, the radial inside of the magnet 60A may be used as the S pole. The radial outside of the magnet 60A may be used as the N pole. The radial inside of the magnet 60B may be used as the N pole. The radial outside of the magnet 60B may be used as the S pole.

In this case, the end surface 73a of the yoke 70 forms the N pole, and the end surface 74a of the yoke 70 forms the S pole.

(11) The twenty-eighth and the twenty-ninth embodiments have described the example of shifting the centerline T of the position detection device 20 and the detection portion 82 to the other side in the axial direction with respect to the centerline Z between the clutch component portions 11 and 12.

Instead, the centerline T of the position detection device 20 and the detection portion 82 may be shifted to one side in the axial direction with respect to the centerline Z between the clutch component portions 11 and 12.

Figure 84:
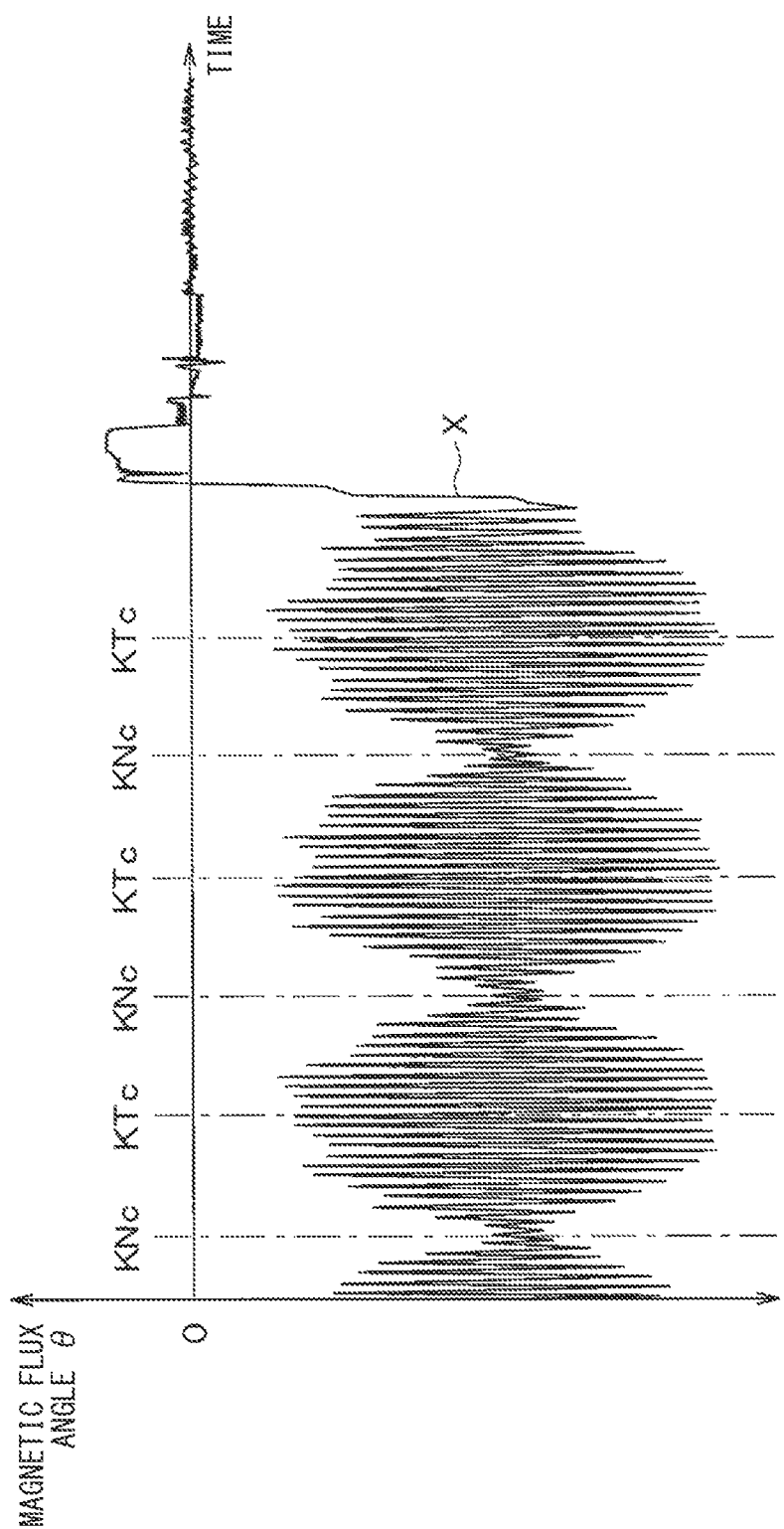
FIG. 84 is a timing chart of a sensor signal output from a magnetic detection element according to the other embodiments when the two clutch component portions are rotated to change a relative speed between the two clutch component portions.

In this case, suppose the drive source 30 rotates the clutch component portion 11 to change relative rotation speeds of the clutch component portion 11 with respect to the clutch component portion 12 while the clutch component portions 11 and 12 rotate. Then, the magnetic detection element 80 generates sensor signal X as illustrated in FIG. 84.

The maximum value of sensor signal X from the magnetic detection element 80 is smaller than zero when the clutch component portions 11 and 12 rotate while the clutch component portions 11 and 12 are disengaged.

Similar to the twenty-eighth and the twenty-ninth embodiments, the control device 50 performs the engagement determination process according to the flowchart in FIG. 79.

The control device 50 determines whether the sensor signal from the magnetic detection element 80 converges to the first predetermined value (such as zero). Specifically, the sensor signal may be greater than or equal to threshold value Hc. Then, the control device 50 determines YES at step S140 on the assumption that the sensor signal from the magnetic detection element 80 converges to the first predetermined value. At step S142, the control device 50 determines that the clutch component portions 11 and 12 are engaged completely.

The sensor signal may be smaller than threshold value Hc. Then, the control device 50 determines NO at step S140 on the assumption that the sensor signal from the magnetic detection element 80 does not converge to the first predetermined value. At step S143, the control device 50 determines that the clutch component portions 11 and 12 are not engaged completely.

(12) The twenty-eighth and the twenty-ninth embodiments have described the example where the minimum value of sensor signal X from the magnetic detection element 80 is greater than zero.

Figure 86:
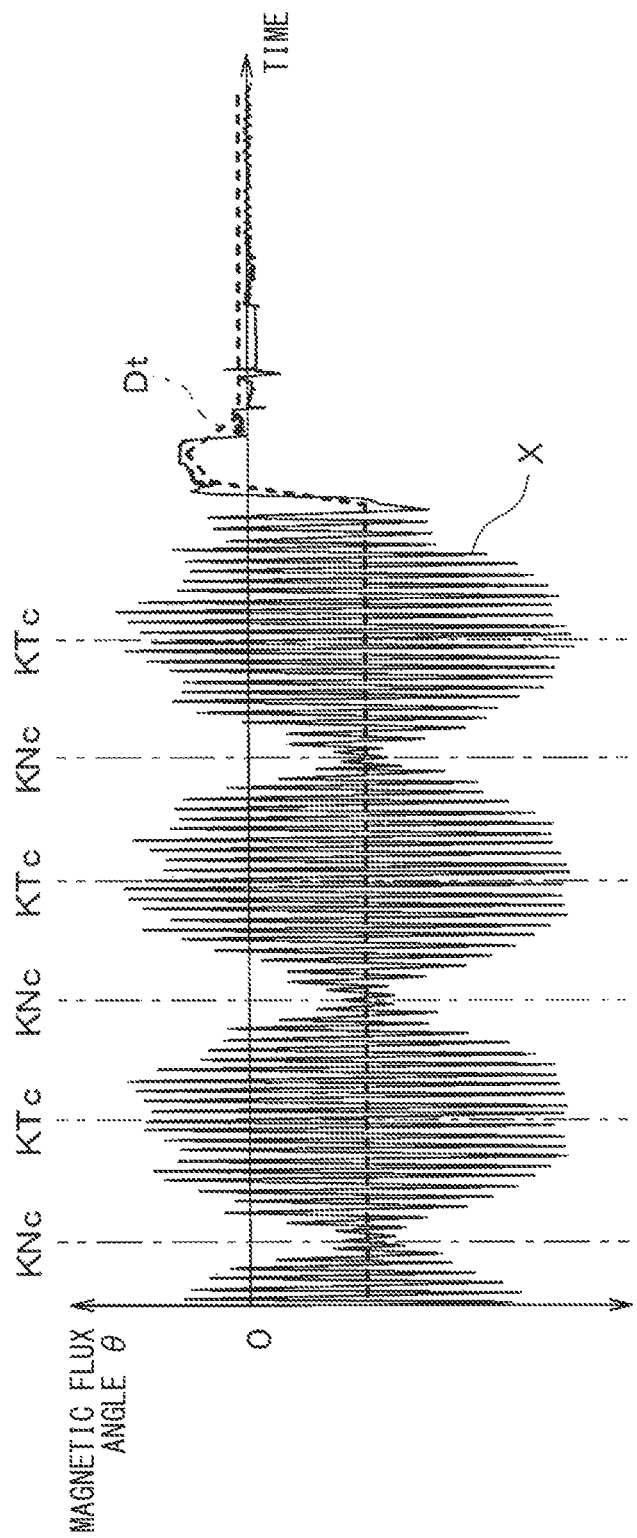
FIG. 86 is a timing chart of a sensor signal output from a magnetic detection element according to the other embodiments when the two clutch component portions are rotated to change a relative speed between the two clutch component portions.

However, the magnetic detection element 80 may generate sensor signal X as illustrated in FIG. 85 or 86 depending on the position relationship among the centerline T, the detection portion 82, and the centerline Z of the position detection device 20, and shapes of the clutch component portions 11 and 12.

FIGS. 85 and 86 illustrate sensor signal X from the magnetic detection element 80 when the drive source 30 rotates the clutch component portion 11 to change relative rotation speeds of the clutch component portion 11 with respect to the clutch component portion 12 while the clutch component portion 12 rotates.

In FIG. 85, sensor signal X from the magnetic detection element 80 indicates the maximum value greater than zero and the minimum value smaller than zero. In FIG. 85, signal Dt indicates the DC component of sensor signal X. When the clutch component portions 11 and 12 are disengaged, the DC component of sensor signal X shows a positive value. When the clutch component portions 11 and 12 engages with each other, the DC component of sensor signal X converges to a second predetermined value (such as zero).

In FIG. 86, sensor signal X from the magnetic detection element 80 indicates the maximum value greater than zero and the minimum value smaller than zero. In FIG. 86, signal Dt indicates the DC component of sensor signal X. When the clutch component portions 11 and 12 are disengaged, the DC component of sensor signal X shows a negative value. When the clutch component portions 11 and 12 engages with each other, the DC component of sensor signal X converges to the second predetermined value (such as zero).

Figure 87:
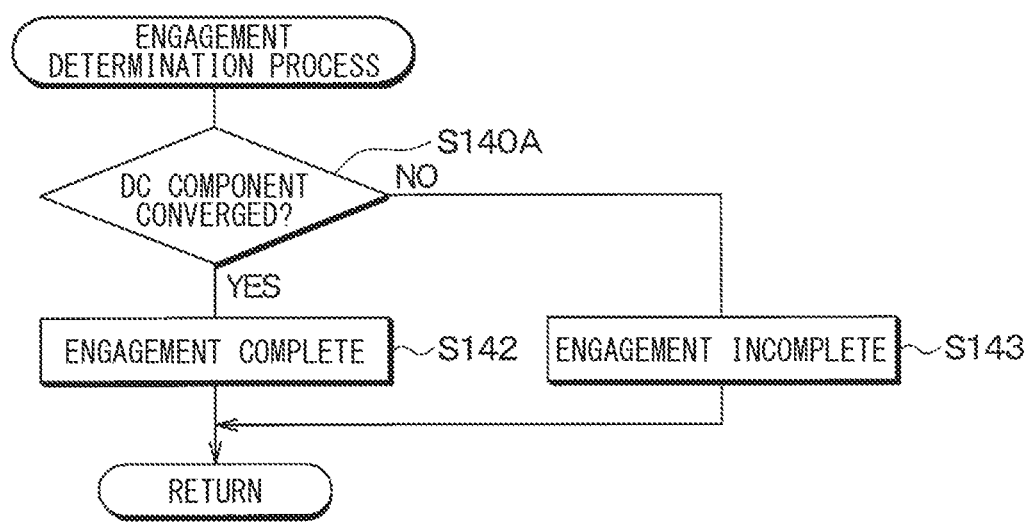
FIG. 87 is a flowchart illustrating details of an engagement determination process on the control device according to the twenty-eighth embodiment.

In this case, the control device 50 performs the engagement determination process according to the flowchart in FIG. 87. The engagement determination process is performed each time the control device 50 performs the engagement control process at step S130.

At step S140A, the control device 50, as an engagement determination unit, extracts the DC component of the sensor signal from the magnetic detection element 80 and determines whether the absolute value of the extracted DC component converges to the second predetermined value (such as zero).

According to the present embodiment, the second predetermined value is smaller than the absolute value of the DC component in the sensor signal from the magnetic detection element 80 when the clutch component portions 11 and 12 rotate while disengaged.

Specifically, the control device 50 determines whether the absolute value of the DC component in the sensor signal is smaller than threshold value Hd.

The absolute value of the DC component in the sensor signal may be smaller than threshold value Hd. Then, the control device 50 determines YES at step S140A on the assumption that the DC component in the sensor signal from the magnetic detection element 80 converges to the second predetermined value. At step S142, the control device 50 determines that the clutch component portions 11 and 12 are engaged completely.

The absolute value of the DC component in the sensor signal may be greater than or equal to threshold value Hd. Then, the control device 50 determines NO at step S140A on the assumption that the DC component in the sensor signal from the magnetic detection element 80 does not converge to the second predetermined value. At step S143, the control device 50 determines that the clutch component portions 11 and 12 are not engaged completely.

(13) The first through the twenty-ninth embodiments have described the example of configuring the control device 50 as a microcomputer. Instead, the control device 50 may be configured as an electronic circuit including various hardware components such as gate arrays other than a microcomputer, for example.

(14) The first through the twenty-ninth embodiments have described the example where the tooth portions 12a, the hole portions 11b, the tooth portions 12a, and the hole portions 12b are exposed to the atmosphere.

Instead, the tooth portions 12a, the hole portions 11b, the tooth portions 12a, and the hole portions 12b may be exposed to a gas or liquid other than the atmosphere.

(15) The twenty-eighth and the twenty-ninth embodiments have described the example where the control device 50 determines whether a sensor signal from the magnetic detection element 80 converges to the first predetermined value and thereby determines whether the clutch component portions 11 and 12 engage completely.

Instead, similar to (12) above, the control device 50 may determine whether the absolute value of the DC component in the sensor signal converges to the second predetermined value and thereby determine that the clutch component portions 11 and 12 engage completely.

(16) The present disclosure is not limited to the above-described embodiments but may be modified as needed. The embodiments are related to each other and can be appropriately combined unless the combination is apparently impossible. The elements constituting the embodiment are not necessarily required except when the elements are explicitly stated to be required or are apparently considered to be required in principle. In the embodiments, the number of composing elements, values, quantities, and ranges, for example, are not limited to specific numerals except when the numeral is explicitly stated to be required and is apparently required for the limitation in principle. In the embodiments, the composing elements are not limited to specific shapes or position relationships, for example, except when the composing element is explicitly specified and is limited to a specific shape or position relationship in principle, for example.

Overview

According to a first aspect described in all or part of the first through the twenty-ninth embodiments and the other embodiments, a power transmission system includes a dog clutch and the dog clutch includes a first clutch component portion and a second clutch component portion.

When an axial direction is predetermined, the first clutch component portion is configured to be rotatable around an axis extending in the axial direction. A first hole portion recessed toward one side in the axial direction and a first tooth portion protruding toward the other side in the axial direction are alternately positioned in a circumferential direction around the axis.

The second clutch component portion is positioned at the other side in the axial direction with respect to the first clutch component portion and is configured to be rotatable around the axis. A second hole portion recessed toward the other side in the axial direction and a second tooth portion protruding toward one side in the axial direction are alternately positioned in the circumferential direction around the axis.

While a drive source rotates the first clutch component portion around the axis, an actuator moves one of the first clutch component portion and the second clutch component portion from one side to the other side to engage the first tooth portion with the second hole portion and engage the second tooth portion with the first hole portion.

Torque output from the drive source is transmitted from the first clutch component portion to the second clutch component portion.

A position detection device is positioned radially outside the first clutch component portion and the second clutch component portion around the axis and includes a magnetic field generator including a first magnetic pole portion and a second magnetic pole portion to form different polarities.

The position detection device includes a yoke and a magnetic detection element. The yoke includes a first end surface located radially outside the first tooth portion or the first hole portion around the axis. The yoke also includes a first magnetic flux path portion that allows the magnetic flux to pass between the first end surface and the first magnetic pole portion.

The yoke includes a second end surface located radially outside the second tooth portion or the second hole portion around the axis. The yoke also includes a second magnetic flux path portion that allows the magnetic flux to pass between the second magnetic pole portion and the second end surface.

The magnetic detection element is positioned radially outside the first clutch component portion and the second clutch component portion around the axis. The magnetic detection element is provided between the first magnetic flux path portion and the second magnetic flux path portion and outputs a sensor signal indicating the direction of the magnetic flux passing between the first magnetic flux path portion and the second magnetic flux path portion.

The magnetic detection element outputs a sensor signal indicating the position relationship between the first clutch component portion concerning the first hole portion as well as the first tooth portion and the second clutch component portion concerning the second hole portion as well as the second tooth portion based on changes in magnetic flux directions depending on the position relationship in the rotation direction around the axis.

According to a second aspect, the magnetic field generator includes one magnet including the first magnetic pole portion and the second magnetic pole portion.

The position detection device can be configured at a low cost.

According to a third aspect, the magnetic field generator includes a first magnet and a second magnet. The first magnet includes a first magnetic pole portion and a third magnetic pole portion differing from the first magnetic pole portion in polarity. The second magnet includes a second magnetic pole portion and a fourth magnetic pole portion differing from the second magnetic pole portion in polarity.

There is provided a third magnetic flux path portion that allows the magnetic flux to pass between the third magnetic pole portion of the first magnet and the fourth magnetic pole portion of the second magnet. The first magnetic pole portion and the fourth magnetic pole portion have the same polarity. The third magnetic pole portion and the second magnetic pole portion have the same polarity.

Two magnets are used to configure the magnetic field generator, making it possible to increase the magnetic flux generated from the magnetic field generator. The robustness of the position detection device can be increased. A change in the position relationship can increase a change in the magnetic flux.

Moreover, the size of the magnet itself can be decreased as compared with the case of using one magnet to configure the magnetic field generator. The position detection device can be downsized.

According to a fourth aspect, the magnetic detection element outputs a sensor signal indicating a first direction as a magnetic flux direction while the first tooth portion opposes the second hole portion, the first end surface opposes the first tooth portion, and the second end surface opposes the second hole portion.

The magnetic detection element outputs a sensor signal indicating a second direction as a magnetic flux direction while the first tooth portion opposes the second tooth portion, the first end surface opposes the first tooth portion, and the second end surface opposes the second tooth portion.

The magnetic detection element outputs a sensor signal indicating the second direction while the first hole portion opposes the second hole portion, the first end surface opposes the first hole portion, and the second end surface opposes the second hole portion.

The magnetic detection element outputs a sensor signal indicating a third direction as a magnetic flux direction while the first hole portion opposes the second tooth portion, the first end surface opposes the first hole portion, and the second end surface opposes the second tooth portion.

The first direction, the second direction, and the third direction differ from each other.

According to a fifth aspect, the power transmission system includes the dog clutch and the dog clutch includes a first clutch component portion and a second clutch component portion.

When an axial direction is predetermined, the first clutch component portion is configured to be rotatable around an axis extending in the axial direction. A first hole portion recessed toward one side in the axial direction and a first tooth portion protruding toward the other side in the axial direction are alternately positioned in a circumferential direction around the axis.

The second clutch component portion is positioned at the other side in the axial direction with respect to the first clutch component portion and is configured to be rotatable around the axis. A second hole portion recessed toward the other side in the axial direction and a second tooth portion protruding toward one side in the axial direction are alternately positioned in the circumferential direction around the axis.

While a drive source rotates the first clutch component portion around the axis, an actuator moves one of the first clutch component portion and the second clutch component portion from one side to the other side to engage the first tooth portion with the second hole portion and engage the second tooth portion with the first hole portion.

Torque output from the drive source is transmitted from the first clutch component portion to the second clutch component portion.

A position detection device is positioned radially outside the first clutch component portion and the second clutch component portion around the axis and includes a magnetic field generator including a first magnetic pole portion and a second magnetic pole portion to form the same polarity.

The position detection device includes a yoke and a magnetic detection element. The yoke includes a first end surface located radially outside the first tooth portion or the first hole portion around the axis. The yoke also includes a first magnetic flux path portion that allows the magnetic flux to pass between the first end surface and the first magnetic pole portion.

The yoke includes a second end surface located radially outside the second tooth portion or the second hole portion around the axis. The yoke also includes a second magnetic flux path portion that allows the magnetic flux to pass between the second end surface and the second magnetic pole portion.

The magnetic detection element is positioned radially outside the first clutch component portion and the second clutch component portion around the axis and is provided between the first magnetic flux path portion and the second magnetic flux path portion.

The magnetic detection element outputs a sensor signal indicating the direction of a composite magnetic flux, that is, a combination of a first magnetic flux passing between the first clutch component portion and the first magnetic flux path portion and a second magnetic flux passing between the second clutch component portion and the second magnetic flux path portion.

The magnetic detection element outputs a sensor signal indicating the position relationship between the first clutch component portion concerning the first hole portion as well as the first tooth portion and the second clutch component portion concerning the second hole portion as well as the second tooth portion based on changes in composite magnetic flux directions depending on the position relationship in the rotation direction around the axis.

According to a sixth aspect, the magnetic field generator includes a first magnet and a second magnet. The first magnet includes a first magnetic pole portion and a third magnetic pole portion differing from the first magnetic pole portion in polarity. The second magnet includes a second magnetic pole portion and a fourth magnetic pole portion differing from the second magnetic pole portion in polarity. The third magnetic pole portion and the fourth magnetic pole portion have the same polarity.

According to a seventh aspect, the magnetic detection element outputs a sensor signal indicating a first direction as a composite magnetic flux direction while the first tooth portion opposes the second hole portion, the first end surface opposes the first tooth portion, and the second end surface opposes the second hole portion.

The magnetic detection element outputs a sensor signal indicating a second direction as a composite magnetic flux direction while the first tooth portion opposes the second tooth portion, the first end surface opposes the first tooth portion, and the second end surface opposes the second tooth portion.

The magnetic detection element outputs a sensor signal indicating the second direction while the first hole portion opposes the second hole portion, the first end surface opposes the first hole portion, and the second end surface opposes the second hole portion.

The magnetic detection element outputs a sensor signal indicating a third direction as a composite magnetic flux direction while the first hole portion opposes the second tooth portion, the first end surface opposes the first hole portion, and the second end surface opposes the second tooth portion.

The first direction, the second direction, and the third direction differ from each other.

According to an eighth aspect, the first magnetic flux path portion includes a first opposing face formed to approach the outside from the inside in the radial direction around the axis according to the axial direction from one side to the other side.

The second magnetic flux path portion includes a second opposing face formed to approach the outside from the inside in the radial direction around the axis according to the axial direction from the other side to one side.

According to a ninth aspect, the first magnetic flux path portion includes the first opposing face formed to approach the outside from the inside in the radial direction around the axis according to the axial direction from the other side to one side.

The second magnetic flux path portion includes the second opposing face formed to approach the outside from the inside in the radial direction around the axis according to the axial direction from one side to the other side.

According to a tenth aspect, the first magnetic flux path portion includes a first path portion and a first protruding portion. The first path portion is formed from the first end surface to the radial outside around the axis. The first protruding portion protrudes toward the magnetic detection element from the first path portion.

The second magnetic flux path portion includes a second path portion and a second protruding portion. The second path portion is formed from the second end surface to the radial outside around the axis. The second protruding portion protrudes toward the magnetic detection element from the second path portion.

It is possible to increase the magnetic flux passing through the magnetic detection element between the first magnetic flux path portion and the second magnetic flux path portion.

According to an eleventh aspect, the first magnetic flux path portion includes a first side face formed at one side in the axial direction and a second side face formed at the other side in the axial direction. The first side face is formed so that the distance between the first side face and the second side face decreases as approaching the magnetic detection element.

The second magnetic flux path portion includes a third side face formed at one side in the axial direction and a fourth side face formed at the other side in the axial direction. The fourth side face is formed so that the distance between the third side face and the fourth side face decreases as approaching the magnetic detection element.

According to a twelfth aspect, the magnetic detection element is formed to protrude radially inward around the axis from the first end surface and the second end surface.

The magnetic detection element can be positioned where a change in the position relationship greatly changes the magnetic flux direction. The magnetic detection element can satisfactorily detect a change in the position relationship. The robustness of the position detection device can be increased.

According to a thirteenth aspect, the position detection device includes the magnetic field generator including a first magnetic pole formation portion and a second magnetic pole formation portion. The first magnetic pole formation portion is located radially outside a clearance around the axis and forms the first end surface to provide a magnetic pole.

The second magnetic pole formation portion is positioned radially outside the clearance around the axis, circumferentially shifts from the first magnetic pole formation portion around the axis, and forms the second end surface to provide a magnetic pole.

The magnetic detection element is positioned radially outside the first clutch component portion and the second clutch component portion around the axis between the first magnetic pole formation portion and the second magnetic pole formation portion and outputs a sensor signal indicating the direction of a magnetic flux generated by the magnetic field generator.

The magnetic detection element outputs a sensor signal indicating the position relationship based on changes in the sensor signal amplitude depending on the position relationship between the first clutch component portion concerning the first hole portion as well as the first tooth portion and the second clutch component portion concerning the second hole portion as well as the second tooth portion in the rotation direction around the axis.

According to a fourteenth aspect, the first end surface of the first magnetic pole formation portion and the second end surface of the second magnetic pole formation portion form magnetic poles of the same polarity.

The magnetic field generator generates a composite magnetic flux, a combination of the first magnetic flux passing between the first end surface and the clearance and the second magnetic flux passing between the second end surface and the clearance.

According to a fifteenth aspect, the first end surface of the first magnetic pole formation portion and the second end surface of the second magnetic pole formation portion form magnetic poles of different polarities. The magnetic field generator generates a magnetic flux that passes between the first magnetic pole formation portion and the second magnetic pole formation portion.

According to a sixteenth aspect, the position detection device includes an engagement determination unit that determines whether the second tooth portion opposes the first hole portion and the first tooth portion opposes the second hole portion, based on the sensor signal amplitude.

The position detection device includes an engagement control unit to control the actuator when the engagement determination unit determines that the second tooth portion opposes the first hole portion and the first tooth portion opposes the second hole portion.

The engagement control unit controls the actuator to move the first clutch component portion or the second clutch component portion from one side to the other side to engage the first tooth portion with the second hole portion and engage the second tooth portion with the first hole portion.

According to a seventeenth aspect, the engagement determination unit determines whether the sensor signal amplitude is smaller than or equal to a threshold value to determine whether the second tooth portion opposes the first hole portion and the first tooth portion opposes the second hole portion.

It is possible to accurately determine whether the second tooth portion opposes the first hole portion and the first tooth portion opposes the second hole portion.

According to an eighteenth aspect, the position detection device includes the magnetic field generator including the first magnetic pole formation portion and the second magnetic pole formation portion. The first magnetic pole formation portion is positioned radially outside the first tooth portion or the first hole portion around the axis and forms the first end surface to provide a magnetic pole. The second magnetic pole formation portion is positioned radially outside the second tooth portion or the second hole portion around the axis and forms the second end surface to provide a magnetic pole.

The magnetic detection element is positioned radially outside the first clutch component portion and the second clutch component portion around the axis between the first magnetic pole formation portion and the second magnetic pole formation portion and outputs a sensor signal indicating the direction of a magnetic flux generated by the magnetic field generator.

The sensor signal amplitude varies with the position relationship between the first clutch component portion concerning the first hole portion as well as the first tooth portion and the second clutch component portion concerning the second hole portion as well as the second tooth portion in the rotation direction around the axis. Based on this, the magnetic detection element outputs a sensor signal indicating the position relationship.

According to a nineteenth aspect, the first end surface of the first magnetic pole formation portion and the second end surface of the second magnetic pole formation portion form magnetic poles of the same polarity. The magnetic field generator generates a composite magnetic flux, a combination of the first magnetic flux passing between the first clutch component portion and the first magnetic pole formation portion and the second magnetic flux passing between the second clutch component portion and the second magnetic pole formation portion.

According to a twentieth aspect, the first end surface of the first magnetic pole formation portion and the second end surface of the second magnetic pole formation portion form magnetic poles of different polarities.

The magnetic field generator generates a magnetic flux that passes between the first magnetic pole formation portion and the second magnetic pole formation portion.

According to a twenty-first aspect, the magnetic detection element includes a detection portion that detects the direction of a magnetic flux generated by the magnetic field generator and outputs a sensor signal.

A centerline between the first clutch component portion and the second clutch component portion is assumed to correspond to a virtual line that passes through an intermediate portion between the first clutch component portion and the second clutch component portion and extends in the direction orthogonal to the axial direction.

A centerline between the first magnetic pole formation portion and the second magnetic pole formation portion is assumed to correspond to a virtual line that passes through an intermediate portion between the first magnetic pole formation portion and the second magnetic pole formation portion and extends in the direction orthogonal to the axial direction.

The centerline between the first magnetic pole formation portion and the second magnetic pole formation portion and the detection portion shift from the centerline between the first clutch component portion and the second clutch component portion toward one side or the other side in the axial direction.

According to a twenty-second aspect, the position detection device includes an engagement determination unit that determines whether the second tooth portion opposes the first hole portion and the first tooth portion opposes the second hole portion, based on the sensor signal amplitude.

The position detection device includes an engagement control unit to control the actuator when the engagement determination unit determines that the second tooth portion opposes the first hole portion and the first tooth portion opposes the second hole portion.

The engagement control unit controls the actuator to move the first clutch component portion or the second clutch component portion from one side to the other side to engage the first tooth portion with the second hole portion and engage the second tooth portion with the first hole portion.

According to a twenty-third aspect, the position detection device includes an engagement completion determination unit that determines whether the sensor signal converges to a predetermined value to determine whether engagement between the first tooth portion and the second hole portion is completed and engagement between the second tooth portion and the first hole portion is completed.

A direct-current component of the sensor signal can be used to accurately determine whether engagement between the first tooth portion and the second hole portion is completed and engagement between the second tooth portion and the first hole portion is completed.

According to a twenty-fourth aspect, the position detection device includes an engagement completion determination unit that determines whether a direct-current component of the sensor signal converges to a predetermined value to determine whether engagement between the first tooth portion and the second hole portion is completed and engagement between the second tooth portion and the first hole portion is completed.

A direct-current component of the sensor signal can be used to accurately determine whether engagement between the first tooth portion and the second hole portion is completed and engagement between the second tooth portion and the first hole portion is completed.

According to a twenty-fifth aspect, the first tooth portion and the second tooth portion are made of a material including iron, and the first hole portion and the second hole portion are exposed to an atmosphere.

What is claimed is:

1. A position detection device to be applied to a power transmission system, the position detection device comprising:
    a dog clutch;
    a magnetic field generator;
    a yoke; and
    a magnetic detection element,
    wherein the dog clutch includes a first clutch component portion and a second clutch component portion,
    wherein the first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis,
    wherein the second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis,
    wherein, in a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion,
    wherein the magnetic field generator is positioned radially outside the first clutch component portion and the second clutch component portion around the axis, and includes a first magnetic pole portion and a second magnetic pole portion to form different polarities,
    wherein the yoke includes a first end surface, a first magnetic flux path portion, a second end surface, and a second magnetic flux path portion,
    wherein the first end surface is positioned radially outside one of the first tooth portion and the first hole portion around the axis,
    wherein the first magnetic flux path portion is configured to pass a magnetic flux between the first end surface and the first magnetic pole portion, wherein the second end surface is positioned radially outside one of the second tooth portion and the second hole portion around the axis, wherein the second magnetic flux path portion is configured to pass a magnetic flux between the second magnetic pole portion and the second end surface, wherein the magnetic detection element is positioned radially outside the first clutch component portion and the second clutch component portion around the axis between the first magnetic flux path portion and the second magnetic flux path portion, to output a sensor signal indicating the direction of the magnetic flux passing between the first magnetic flux path portion and the second magnetic flux path portion, and wherein the magnetic detection element is configured to output a sensor signal indicating the position relationship between the first clutch component portion concerning the first hole portion as well as the first tooth portion and the second clutch component portion concerning the second hole portion as well as the second tooth portion, based on changes in directions of the magnetic flux depending on the position relationship in a rotation direction around the axis.

2. The position detection device according to claim 1, wherein the magnetic field generator includes a single magnet including the first magnetic pole portion and the second magnetic pole portion.

3. The position detection device according to claim 1, wherein the magnetic field generator includes a first magnet, a second magnet, and a third magnetic flux path portion, wherein the first magnet includes the first magnetic pole portion, and a third magnetic pole portion having a polarity different from that of the first magnetic pole portion, wherein the second magnet includes the second magnetic pole portion, and a fourth magnetic pole portion having a polarity different from that of the second magnetic pole portion, wherein the third magnetic flux path portion is configured to pass a magnetic flux between the third magnetic pole portion of the first magnet and the fourth magnetic pole portion of the second magnet, wherein the first magnetic pole portion and the fourth magnetic pole portion have the same polarity, and wherein the third magnetic pole portion and the second magnetic pole portion have the same polarity.

4. The position detection device according to claim 1, wherein the magnetic detection element is configured to output the sensor signal indicating a first direction as the magnetic flux direction while the first tooth portion opposes the second hole portion, the first end surface opposes the first tooth portion, and the second end surface opposes the second hole portion, to output the sensor signal indicating a second direction as the magnetic flux direction while the first tooth portion opposes the second tooth portion, the first end surface opposes the first tooth portion, and the second end surface opposes the second tooth portion, to output the sensor signal indicating the second direction while the first hole portion opposes the second hole portion, the first end surface opposes the first hole portion, and the second end surface opposes the second hole portion, and to output the sensor signal indicating a third direction as the magnetic flux direction while the first hole portion opposes the second tooth portion, the first end surface opposes the first hole portion, and the second end surface opposes the second tooth portion, and wherein the first direction, the second direction, and the third direction differ from each other.

5. The position detection device according to claim 1, wherein the first magnetic flux path portion includes a first opposing face that is configured to approach the radial outside from the radial inside around the axis from one side to the other side in the axial direction, and wherein the second magnetic flux path portion includes a second opposing face that is configured to approach the radial outside from the radial inside around the axis from the other side to one side in the axial direction.

6. The position detection device according to claim 1, wherein the first magnetic flux path portion includes a first opposing face that is configured to approach the radial outside from the radial inside around the axis from the other side to one side in the axial direction, and wherein the second magnetic flux path portion includes a second opposing face that is configured to approach the radial outside from the radial inside around the axis from one side to the other side in the axial direction.

7. The position detection device according to claim 1, wherein the first magnetic flux path portion includes a first path portion and a first protruding portion, wherein the first path portion is formed from the first end surface to the radial outside around the axis, wherein the first protruding portion protrudes toward the magnetic detection element from the first path portion, wherein the second magnetic flux path portion includes a second path portion and a second protruding portion, wherein the second path portion is formed from the second end surface to the radial outside around the axis, and wherein the second protruding portion protrudes toward the magnetic detection element from the second path portion.

8. The position detection device according to claim 1, wherein the first magnetic flux path portion includes a first side face formed at the one side in the axial direction and a second side face formed at the other side in the axial direction, wherein the first side face is configured in a shape, and a distance between the first side face and the second side face decreases as approaching the magnetic detection element in the radial direction around the axis, wherein the second magnetic flux path portion includes a third side face formed at the one side in the axial direction and a fourth side face formed at the other side in the axial direction, and wherein the fourth side face is configured in a shape, and a distance between the third side face and the fourth side face decreases as approaching the magnetic detection element in the radial direction around the axis.

9. The position detection device according to claim 1, wherein the magnetic detection element is configured to protrude radially inward around the axis from the first end surface and the second end surface.

10. The position detection device according to claim 1, wherein the first tooth portion and the second tooth portion are made of a material including iron, and wherein the first hole portion and the second hole portion are exposed to an atmosphere.

11. A position detection device to be applied to a power transmission system, the position detection device comprising:
- a dog clutch;
- a magnetic field generator;
- a yoke; and
- a magnetic detection element,
- wherein the dog clutch includes a first clutch component portion and a second clutch component portion,
- wherein the first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis,
- wherein the second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis,
- wherein, in a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion,
- wherein the magnetic field generator is positioned radially outside the first clutch component portion and the second clutch component portion around the axis, and includes a first magnetic pole portion and a second magnetic pole portion having the same polarity,
- wherein the yoke includes: a first end surface positioned radially outside one of the first tooth portion and the first hole portion around the axis; a first magnetic flux path portion configured to pass a magnetic flux between the first end surface and the first magnetic pole portion; a second end surface positioned radially outside one of the second tooth portion and the second hole portion around the axis; and a second magnetic flux path portion configured to pass a magnetic flux between the second end surface and the second magnetic pole portion,
- wherein the magnetic detection element is positioned radially outside the first clutch component portion and the second clutch component portion around the axis, between the first magnetic flux path portion and the second magnetic flux path portion, and is configured to output a sensor signal indicating a direction of a composite magnetic flux with a combination of a first magnetic flux passing between the first clutch component portion and the first magnetic flux path portion and a second magnetic flux passing between the second clutch component portion and the second magnetic flux path portion, and
- wherein the magnetic detection element is configured to output the sensor signal indicating the position relationship between the first clutch component portion concerning the first hole portion as well as the first tooth portion and the second clutch component portion concerning the second hole portion as well as the second tooth portion, based on changes in directions of the composite magnetic flux depending on the position relationship in a rotation direction around the axis.

12. The position detection device according to claim 11,
- wherein the magnetic field generator includes a first magnet and a second magnet,
- wherein the first magnet includes the first magnetic pole portion and a third magnetic pole portion having a polarity different from that of the first magnetic pole portion,
- wherein the second magnet includes the second magnetic pole portion and a fourth magnetic pole portion having a polarity different from that of the second magnetic pole portion, and
- wherein the third magnetic pole portion and the fourth magnetic pole portion have the same polarity.

13. The position detection device according to claim 11,
- wherein the magnetic detection element is configured
- to output the sensor signal indicating a first direction as the composite magnetic flux direction while the first tooth portion opposes the second hole portion, the first end surface opposes the first tooth portion, and the second end surface opposes the second hole portion,
- to output the sensor signal indicating a second direction as the composite magnetic flux direction while the first tooth portion opposes the second tooth portion, the first end surface opposes the first tooth portion, and the second end surface opposes the second tooth portion,
- to output the sensor signal indicating the second direction while the first hole portion opposes the second hole portion, the first end surface opposes the first hole portion, and the second end surface opposes the second hole portion, and
- to output the sensor signal indicating a third direction as the composite magnetic flux direction while the first hole portion opposes the second tooth portion, the first end surface opposes the first hole portion, and the second end surface opposes the second tooth portion, and
- wherein the first direction, the second direction, and the third direction are different from each other.

14. A position detection device to be applied to a power transmission system, the position detection device comprising:
- a dog clutch;
- a magnetic field generator; and
- a magnetic detection element,
- wherein the dog clutch includes a first clutch component portion and a second clutch component portion,
- wherein the first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis,
- wherein the second clutch component portion is positioned at the other side in the axial direction with respect to the first clutch component portion to have a clearance between the first clutch component portion and the second clutch component portion, and the second clutch component portion is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis, wherein, in a state where the first clutch component portion is rotated around the axis by a drive source of the power transmission system, one of the first clutch component portion and the second clutch component portion is moved by an actuator of the power transmission system from one side to the other side, to engage the first tooth portion with the second hole portion and to engage the second tooth portion with the first hole portion, and torque output from the drive source is transmitted from the first clutch component portion to the second clutch component portion, wherein the magnetic field generator includes a first magnetic pole formation portion and a second magnetic pole formation portion, wherein the first magnetic pole formation portion is positioned radially outside the axis with respect to the clearance and has a first end surface providing a magnetic pole, wherein the second magnetic pole formation portion is positioned radially outside the axis with respect to the clearance to be shifted from the first magnetic pole formation portion in a circumferential direction around the axis and has a second end surface providing a magnetic pole, wherein the magnetic detection element is positioned radially outside the first clutch component portion and the second clutch component portion around the axis between the first magnetic pole formation portion and the second magnetic pole formation portion, and is configured to output a sensor signal indicating the direction of a magnetic flux generated by the magnetic field generator, and wherein the magnetic detection element is configured to output the sensor signal indicating the position relationship between the first clutch component portion concerning the first hole portion as well as the first tooth portion and the second clutch component portion concerning the second hole portion as well as the second tooth portion in a rotation direction around the axis, based on changes in the sensor signal amplitude depending on the position relationship.

15. The position detection device according to claim 14, wherein the first end surface of the first magnetic pole formation portion and the second end surface of the second magnetic pole formation portion have magnetic poles of the same polarity, and wherein the magnetic field generator is configured to generate a composite magnetic flux that is a combination of a first magnetic flux passing between the first end surface and the clearance and a second magnetic flux passing between the second end surface and the clearance.

16. The position detection device according to claim 14, wherein the first end surface of the first magnetic pole formation portion and the second end surface of the second magnetic pole formation portion have magnetic poles of different polarities, and wherein the magnetic field generator is configured to generate a magnetic flux passing between the first magnetic pole formation portion and the second magnetic pole formation portion.

17. The position detection device according to claim 14, further comprising:

an engagement determination unit configured to determine whether the second tooth portion opposes the first hole portion and the first tooth portion opposes the second hole portion, based on the amplitude of the sensor signal, and an engagement control unit configured to control the actuator to move one of the first clutch component portion and the second clutch component portion from one side to the other side to engage the first tooth portion with the second hole portion and to engage the second tooth portion with the first hole portion, when the engagement determination unit determines that the second tooth portion opposes the first hole portion and the first tooth portion opposes the second hole portion.

18. The position detection device according to claim 17, wherein the engagement determination unit determines whether the sensor signal amplitude is smaller than or equal to a threshold value so as to determine whether the second tooth portion opposes the first hole portion and the first tooth portion opposes the second hole portion.

19. A position detection device to be applied to a power transmission system, the position detection device comprising:

a dog clutch;
a magnetic field generator; and
a magnetic detection element, wherein the dog clutch includes a first clutch component portion and a second clutch component portion, wherein the first clutch component portion is configured to be rotatable around an axis extending in an axial direction as a predetermined direction and to have a first hole portion recessed toward one side in the axial direction and a first tooth portion protruding toward the other side in the axial direction, the first hole portion and the first tooth portion being alternately positioned in a circumferential direction around the axis, wherein the second clutch component portion is positioned at the other side in the axial direction with respect to the first clutch component portion, and is configured to be rotatable around the axis to have a second hole portion recessed toward the other side in the axial direction and a second tooth portion protruding toward one side in the axial direction, the second hole portion and the second tooth portion being alternately positioned in a circumferential direction around the axis, wherein, in a state where the first clutch component portion is rotated around the axis by a drive source of the power transmission system, one of the first clutch component portion and the second clutch component portion is moved by an actuator of the power transmission system from the one side to the other side, to engage the first tooth portion with the second hole portion and to engage the second tooth portion with the first hole portion, and torque output from the drive source is transmitted from the first clutch component portion to the second clutch component portion, wherein the magnetic field generator includes: a first magnetic pole formation portion positioned radially outside one of the first tooth portion and the first hole portion around the axis and has a first end surface providing a magnetic pole; and a second magnetic pole formation portion positioned radially outside one of the second tooth portion and the second hole portion around the axis and has a second end surface providing a magnetic pole, wherein the magnetic detection element is positioned radially outside the first clutch component portion and the second clutch component portion around the axis between the first magnetic pole formation portion and the second magnetic pole formation portion, and is configured to output a sensor signal indicating the direction of the magnetic flux generated by the magnetic field generator, and wherein the magnetic detection element is configured to output the sensor signal indicating the position relationship between the first clutch component portion concerning the first hole portion as well as the first tooth portion and the second clutch component portion concerning the second hole portion as well as the second tooth portion in a rotation direction around the axis, based on changes in the sensor signal amplitude depending on the position relationship.

20. The position detection device according to claim 19, wherein the first end surface of the first magnetic pole formation portion and the second end surface of the second magnetic pole formation portion have magnetic poles of the same polarity, and wherein the magnetic field generator is configured to generate a composite magnetic flux that is a combination of a first magnetic flux passing between the first clutch component portion and the first magnetic pole formation portion and a second magnetic flux passing between the second clutch component portion and the second magnetic pole formation portion.

21. The position detection device according to claim 19, wherein the first end surface of the first magnetic pole formation portion and the second end surface of the second magnetic pole formation portion have magnetic poles of different polarities, and wherein the magnetic field generator is configured to generate a magnetic flux passing between the first magnetic pole formation portion and the second magnetic pole formation portion.

22. The position detection device according to claim 19, wherein the magnetic detection element includes a magnetic flux detector configured to detect a direction of the magnetic flux generated by the magnetic field generator and to output a sensor signal, wherein a centerline between the first clutch component portion and the second clutch component portion is assumed as a virtual line that passes through an intermediate portion between the first clutch component portion and the second clutch component portion and extends in a direction orthogonal to the axial direction, wherein a centerline between the first magnetic pole formation portion and the second magnetic pole formation portion is assumed as a virtual line that passes through an intermediate portion between the first magnetic pole formation portion and the second magnetic pole formation portion and extends in a direction orthogonal to the axial direction, and wherein the centerline between the first magnetic pole formation portion and the second magnetic pole formation portion and the magnetic flux detector are positioned to be shifted from the centerline between the first clutch component portion and the second clutch component portion toward one of the one side and the other side in the axial direction.

23. The position detection device according to claim 19, further comprising:

an engagement determination unit configured to determine whether the second tooth portion opposes the first hole portion and the first tooth portion opposes the second hole portion based on the amplitude of the sensor signal; and an engagement control unit configured to control the actuator to move one of the first clutch component portion and the second clutch component portion from one side to the other side, to engage the first tooth portion with the second hole portion and to engage the second tooth portion with the first hole portion, when the engagement determination unit determines that the second tooth portion opposes the first hole portion and the first tooth portion opposes the second hole portion.

24. The position detection device according to claim 23, further comprising:

an engagement completion determination unit configured to determine whether the sensor signal converges to a predetermined value, so as to determine whether the first tooth portion completely engages the second hole portion and the second tooth portion completely engages the first hole portion.

25. The position detection device according to claim 23, further comprising:

an engagement completion determination unit configured to determine whether a direct-current component of the sensor signal converges to a predetermined value, so as to determine whether the first tooth portion completely engages the second hole portion and the second tooth portion completely engages the first hole portion.

* * * * *